(12) United States Patent
Giraud et al.

(10) Patent No.: US 9,632,270 B2
(45) Date of Patent: Apr. 25, 2017

(54) FIBER OPTIC HOUSINGS CONFIGURED FOR TOOL-LESS ASSEMBLY, AND RELATED COMPONENTS AND METHODS

(75) Inventors: William J. Giraud, Azle, TX (US); Brian D. Kingsbury, Watauga, TX (US); M. Heath Rasmussen, Keller, TX (US); Diana Rodriguez, Fort Worth, TX (US)

(73) Assignee: Corning Optical Communications LLC, Hickory, NC (US)

( * ) Notice: Subject to any disclaimer, the term of this patent is extended or adjusted under 35 U.S.C. 154(b) by 1341 days.

(21) Appl. No.: 12/953,134

(22) Filed: Nov. 23, 2010

(65) Prior Publication Data

US 2011/0268411 A1 Nov. 3, 2011

Related U.S. Application Data

(60) Provisional application No. 61/332,572, filed on May 7, 2010, provisional application No. 61/329,898, filed on Apr. 30, 2010, provisional application No. 61/332,572, filed on May 7, 2010, provisional application No. 61/332,548, filed on May 7, 2010, (Continued)

(51) Int. Cl.
*G02B 6/00* (2006.01)
*G02B 6/44* (2006.01)

(52) U.S. Cl.
CPC .................................. *G02B 6/4452* (2013.01)

(58) Field of Classification Search
None
See application file for complete search history.

(56) References Cited

U.S. PATENT DOCUMENTS

| 620,013 A | 2/1899 | Barnes |
|---|---|---|
| 2,614,685 A | 10/1952 | Miller |

(Continued)

FOREIGN PATENT DOCUMENTS

| CA | 2029592 A1 | 5/1992 |
|---|---|---|
| CA | 2186314 A1 | 4/1997 |

(Continued)

OTHER PUBLICATIONS

International Search Report for PCT/US2009/066779 mailed Aug. 27, 2010, 3 pages.

(Continued)

*Primary Examiner* — Sung Pak

(57) ABSTRACT

Fiber optic housings configured for tool-less assembly, and related components and methods are disclosed. A fiber optic housing is provided having a top, a bottom, a right side, and a left side which removably attach to each other tool-lessly, and by other than external fastening means, thereby defining at least one interior chamber configured to support fiber optic equipment. The top, bottom, right side, and left side may be removably attached to each other by using a snap attachment integral to at least one of the bottom, the right side, and the left side. One or more mounting brackets and/or strain relief brackets may be attached to the fiber optic housing by other than external fastening means, which may be done by using a quick snap attachment integral to at least one of the sides of the fiber optic housing and the mounting brackets and/or strain relief brackets.

29 Claims, 65 Drawing Sheets

Related U.S. Application Data provisional application No. 61/332,529, filed on May 7, 2010, provisional application No. 61/332,508, filed on May 7, 2010, provisional application No. 61/329,925, filed on Apr. 30, 2010, provisional application No. 61/329,948, filed on Apr. 30, 2010, provisional application No. 12/940,699, filed on Nov. 5, 2010.

(56) References Cited

U.S. PATENT DOCUMENTS

| | | |
|---|---|---|
| 3,175,873 A | 3/1965 | Blomquist et al. |
| 3,212,192 A | 10/1965 | Bachmann et al. |
| 3,433,886 A | 3/1969 | Myers |
| 3,568,263 A | 3/1971 | Meehan |
| 3,646,244 A | 2/1972 | Cole |
| 3,880,396 A | 4/1975 | Freiberger et al. |
| 3,906,592 A | 9/1975 | Sakasegawa et al. |
| 4,047,797 A | 9/1977 | Arnold et al. |
| 4,059,872 A | 11/1977 | Delesandri |
| 4,119,285 A | 10/1978 | Bisping et al. |
| 4,239,316 A | 12/1980 | Spaulding |
| 4,285,486 A | 8/1981 | Von Osten et al. |
| 4,354,731 A | 10/1982 | Mouissie |
| 4,457,482 A * | 7/1984 | Kitagawa ............ 248/74.3 |
| 4,525,012 A | 6/1985 | Dunner |
| 4,597,173 A | 7/1986 | Chino et al. |
| 4,611,875 A | 9/1986 | Clarke et al. |
| 4,645,292 A | 2/1987 | Sammueller |
| 4,657,340 A | 4/1987 | Tanaka et al. |
| 4,702,551 A | 10/1987 | Coulombe |
| 4,736,100 A | 4/1988 | Vastagh |
| 4,744,629 A | 5/1988 | Bertoglio et al. |
| 4,747,020 A | 5/1988 | Brickley et al. |
| 4,752,110 A | 6/1988 | Blanchet et al. |
| 4,787,706 A | 11/1988 | Cannon, Jr. et al. |
| 4,792,203 A | 12/1988 | Nelson et al. |
| 4,798,432 A | 1/1989 | Becker et al. |
| 4,808,774 A | 2/1989 | Crane |
| 4,824,193 A | 4/1989 | Maeda et al. |
| 4,824,196 A | 4/1989 | Bylander |
| 4,826,277 A | 5/1989 | Weber et al. |
| 4,838,643 A | 6/1989 | Hodges et al. |
| 4,865,280 A | 9/1989 | Wollar |
| 4,898,448 A | 2/1990 | Cooper |
| 4,900,123 A | 2/1990 | Barlow et al. |
| 4,911,662 A | 3/1990 | Debortoli et al. |
| 4,948,220 A | 8/1990 | Violo et al. |
| 4,949,376 A | 8/1990 | Nieves et al. |
| 4,971,421 A | 11/1990 | Ori |
| 4,991,928 A | 2/1991 | Zimmer |
| 4,995,688 A | 2/1991 | Anton et al. |
| 5,001,602 A | 3/1991 | Suffi et al. |
| 5,005,941 A | 4/1991 | Barlow et al. |
| 5,017,211 A | 5/1991 | Wenger et al. |
| 5,023,646 A | 6/1991 | Ishida et al. |
| 5,024,498 A | 6/1991 | Becker et al. |
| 5,028,114 A | 7/1991 | Krausse et al. |
| 5,037,175 A | 8/1991 | Weber |
| 5,048,918 A | 9/1991 | Daems et al. |
| 5,066,149 A | 11/1991 | Wheeler et al. |
| 5,067,784 A | 11/1991 | Debortoli et al. |
| 5,071,211 A | 12/1991 | Debortoli et al. |
| 5,071,220 A | 12/1991 | Ruello et al. |
| 5,073,042 A | 12/1991 | Mulholland et al. |
| 5,074,635 A | 12/1991 | Justice et al. |
| 5,076,688 A | 12/1991 | Bowen et al. |
| 5,080,459 A | 1/1992 | Wettengel et al. |
| 5,100,221 A | 3/1992 | Carney et al. |
| 5,104,336 A | 4/1992 | Hatanaka et al. |
| 5,125,060 A | 6/1992 | Edmundson |
| 5,127,082 A | 6/1992 | Below et al. |
| 5,127,851 A | 7/1992 | Hilbert et al. |
| 5,129,030 A | 7/1992 | Petrunia |
| 5,133,039 A | 7/1992 | Dixit |
| 5,138,678 A | 8/1992 | Briggs et al. |
| 5,138,688 A | 8/1992 | Debortoli |
| 5,142,598 A | 8/1992 | Tabone |
| 5,142,607 A | 8/1992 | Petrotta et al. |
| 5,150,277 A | 9/1992 | Bainbridge et al. |
| D330,368 S | 10/1992 | Bourgeois et al. |
| 5,152,760 A | 10/1992 | Latina |
| 5,153,910 A | 10/1992 | Mickelson et al. |
| 5,157,749 A | 10/1992 | Briggs et al. |
| 5,167,001 A | 11/1992 | Debortoli et al. |
| 5,170,452 A | 12/1992 | Ott |
| 5,189,723 A | 2/1993 | Johnson et al. |
| 5,204,929 A | 4/1993 | Machall et al. |
| 5,209,572 A | 5/1993 | Jordan |
| 5,214,735 A | 5/1993 | Henneberger et al. |
| 5,224,186 A | 6/1993 | Kishimoto et al. |
| 5,231,687 A | 7/1993 | Handley |
| 5,231,688 A | 7/1993 | Zimmer |
| 5,233,674 A | 8/1993 | Vladic |
| 5,239,609 A | 8/1993 | Auteri |
| 5,243,679 A | 9/1993 | Sharrow et al. |
| 5,253,320 A | 10/1993 | Takahashi et al. |
| 5,260,957 A | 11/1993 | Hakimi et al. |
| 5,261,633 A | 11/1993 | Mastro |
| 5,265,187 A | 11/1993 | Morin et al. |
| 5,274,731 A | 12/1993 | White |
| 5,280,138 A | 1/1994 | Preston et al. |
| 5,285,515 A | 2/1994 | Milanowski et al. |
| 5,315,679 A | 5/1994 | Baldwin et al. |
| 5,317,663 A | 5/1994 | Beard et al. |
| 5,323,478 A | 6/1994 | Milanowski et al. |
| 5,323,480 A | 6/1994 | Mullaney et al. |
| 5,333,193 A | 7/1994 | Cote et al. |
| 5,333,221 A | 7/1994 | Briggs et al. |
| 5,333,222 A | 7/1994 | Belenkiy et al. |
| 5,337,400 A | 8/1994 | Morin et al. |
| 5,339,379 A | 8/1994 | Kutsch et al. |
| 5,347,603 A | 9/1994 | Belenkiy et al. |
| 5,353,367 A | 10/1994 | Czosnowski et al. |
| 5,359,688 A | 10/1994 | Underwood |
| 5,363,466 A | 11/1994 | Milanowski et al. |
| 5,366,388 A | 11/1994 | Freeman et al. |
| 5,367,598 A | 11/1994 | Devenish, III et al. |
| 5,373,421 A | 12/1994 | Detsikas et al. |
| 5,383,051 A | 1/1995 | Delrosso et al. |
| 5,390,272 A | 2/1995 | Repta et al. |
| 5,398,295 A | 3/1995 | Chang et al. |
| 5,398,820 A | 3/1995 | Kiss |
| 5,399,814 A | 3/1995 | Staber et al. |
| 5,401,193 A | 3/1995 | Lo Cicero et al. |
| 5,402,515 A | 3/1995 | Vidacovich et al. |
| 5,408,557 A | 4/1995 | Hsu |
| RE34,955 E | 5/1995 | Anton et al. |
| 5,412,751 A | 5/1995 | Siemon et al. |
| 5,416,837 A | 5/1995 | Cote et al. |
| 5,418,874 A | 5/1995 | Carlisle et al. |
| 5,420,956 A | 5/1995 | Grugel et al. |
| 5,420,958 A | 5/1995 | Henson et al. |
| 5,438,641 A | 8/1995 | Malacarne |
| 5,442,725 A | 8/1995 | Peng |
| 5,442,726 A | 8/1995 | Howard et al. |
| 5,443,232 A | 8/1995 | Kesinger et al. |
| 5,444,804 A | 8/1995 | Yui et al. |
| 5,448,015 A | 9/1995 | Jamet et al. |
| 5,450,518 A | 9/1995 | Burek et al. |
| 5,458,019 A | 10/1995 | Trevino |
| 5,471,555 A | 11/1995 | Braga et al. |
| 5,479,505 A | 12/1995 | Butler et al. |
| 5,481,634 A | 1/1996 | Anderson et al. |
| 5,481,939 A | 1/1996 | Bernardini |
| 5,490,229 A | 2/1996 | Ghandeharizadeh et al. |
| 5,497,416 A | 3/1996 | Butler, III et al. |
| 5,497,444 A | 3/1996 | Wheeler |
| 5,511,144 A | 4/1996 | Hawkins et al. |
| 5,511,798 A | 4/1996 | Kawamoto et al. |
| 5,519,804 A | 5/1996 | Burek et al. |
| 5,542,015 A | 7/1996 | Hultermans |
| 5,546,495 A | 8/1996 | Bruckner et al. |
| 5,548,641 A | 8/1996 | Butler et al. |
| 5,553,183 A | 9/1996 | Bechamps |

(56) References Cited

U.S. PATENT DOCUMENTS

| | | |
|---|---|---|
| 5,553,186 A | 9/1996 | Allen |
| 5,572,617 A | 11/1996 | Bernhardt et al. |
| 5,575,680 A | 11/1996 | Suffi |
| 5,577,151 A | 11/1996 | Hoffer |
| 5,590,234 A | 12/1996 | Pulido |
| 5,595,507 A | 1/1997 | Braun et al. |
| 5,600,020 A | 2/1997 | Wehle et al. |
| 5,602,954 A | 2/1997 | Nolf et al. |
| 5,608,606 A | 3/1997 | Blaney |
| 5,613,030 A | 3/1997 | Hoffer et al. |
| 5,617,501 A | 4/1997 | Miller et al. |
| 5,638,474 A | 6/1997 | Lampert et al. |
| 5,640,476 A | 6/1997 | Womack et al. |
| 5,640,482 A | 6/1997 | Barry et al. |
| 5,647,043 A | 7/1997 | Anderson et al. |
| 5,647,045 A | 7/1997 | Robinson et al. |
| 5,650,334 A | 7/1997 | Zuk et al. |
| 5,668,911 A | 9/1997 | Debortoli |
| 5,671,273 A | 9/1997 | Lanquist |
| 5,689,605 A | 11/1997 | Cobb et al. |
| 5,689,607 A | 11/1997 | Vincent et al. |
| 5,694,511 A | 12/1997 | Pimpinella et al. |
| 5,701,380 A | 12/1997 | Larson et al. |
| 5,708,742 A | 1/1998 | Beun et al. |
| 5,708,751 A | 1/1998 | Mattei |
| 5,710,851 A | 1/1998 | Walter et al. |
| 5,717,810 A | 2/1998 | Wheeler |
| 5,734,776 A | 3/1998 | Puetz |
| 5,740,300 A | 4/1998 | Hodge |
| 5,742,982 A | 4/1998 | Dodd et al. |
| 5,751,874 A | 5/1998 | Chudoba et al. |
| 5,751,882 A | 5/1998 | Daems et al. |
| 5,758,003 A | 5/1998 | Wheeler et al. |
| 5,758,004 A | 5/1998 | Alarcon et al. |
| 5,761,026 A | 6/1998 | Robinson et al. |
| 5,769,908 A | 6/1998 | Koppelman |
| 5,774,612 A | 6/1998 | Belenkiy et al. |
| 5,778,122 A | 7/1998 | Giebel et al. |
| 5,778,130 A | 7/1998 | Walters et al. |
| 5,781,686 A | 7/1998 | Robinson et al. |
| 5,790,741 A | 8/1998 | Vincent et al. |
| 5,793,920 A | 8/1998 | Wilkins et al. |
| 5,793,921 A | 8/1998 | Wilkins et al. |
| 5,796,908 A | 8/1998 | Vicory |
| 5,823,646 A | 10/1998 | Arizpe et al. |
| 5,825,955 A | 10/1998 | Ernst et al. |
| 5,825,961 A | 10/1998 | Wilkins et al. |
| 5,828,807 A | 10/1998 | Tucker et al. |
| 5,832,162 A | 11/1998 | Sarbell |
| 5,835,657 A | 11/1998 | Suarez et al. |
| 5,835,658 A | 11/1998 | Smith |
| 5,862,290 A | 1/1999 | Burek et al. |
| 5,870,519 A | 2/1999 | Jenkins et al. |
| 5,874,733 A | 2/1999 | Silver et al. |
| 5,877,565 A | 3/1999 | Hollenbach et al. |
| 5,880,864 A | 3/1999 | Williams et al. |
| 5,881,200 A | 3/1999 | Burt |
| 5,883,995 A | 3/1999 | Lu et al. |
| 5,884,003 A | 3/1999 | Cloud et al. |
| 5,887,095 A | 3/1999 | Nagase et al. |
| 5,887,106 A | 3/1999 | Cheeseman et al. |
| 5,892,877 A | 4/1999 | Meyerhoefer |
| 5,894,540 A | 4/1999 | Drewing |
| 5,901,220 A | 5/1999 | Garver et al. |
| 5,903,693 A | 5/1999 | Brown |
| 5,909,298 A | 6/1999 | Shimada et al. |
| 5,913,006 A | 6/1999 | Summach |
| 5,914,976 A | 6/1999 | Jayaraman et al. |
| 5,915,055 A | 6/1999 | Bennett et al. |
| 5,923,804 A | 7/1999 | Rosson |
| 5,930,425 A | 7/1999 | Abel et al. |
| 5,933,557 A | 8/1999 | Ott |
| 5,943,460 A | 8/1999 | Mead et al. |
| 5,945,633 A | 8/1999 | Ott et al. |
| 5,946,440 A | 8/1999 | Puetz |
| 5,949,946 A | 9/1999 | Debortoli et al. |
| 5,953,962 A | 9/1999 | Hewson |
| 5,956,439 A | 9/1999 | Pimpinella |
| 5,956,444 A | 9/1999 | Duda et al. |
| 5,966,492 A | 10/1999 | Bechamps et al. |
| 5,969,294 A | 10/1999 | Eberle et al. |
| 5,975,769 A | 11/1999 | Larson et al. |
| 5,978,540 A | 11/1999 | Bechamps et al. |
| 5,980,303 A | 11/1999 | Lee et al. |
| 5,993,071 A | 11/1999 | Hultermans |
| 5,995,700 A | 11/1999 | Burek et al. |
| 5,999,393 A | 12/1999 | Brower |
| 6,001,831 A | 12/1999 | Papenfuhs et al. |
| 6,009,224 A | 12/1999 | Allen |
| 6,009,225 A | 12/1999 | Ray et al. |
| 6,011,831 A | 1/2000 | Nieves et al. |
| 6,027,252 A | 2/2000 | Erdman et al. |
| 6,044,193 A | 3/2000 | Szentesi et al. |
| 6,058,235 A | 5/2000 | Hiramatsu et al. |
| 6,061,492 A | 5/2000 | Strause et al. |
| 6,078,661 A | 6/2000 | Arnett et al. |
| 6,079,881 A | 6/2000 | Roth |
| 6,127,627 A | 10/2000 | Daoud |
| 6,130,983 A | 10/2000 | Cheng |
| 6,134,370 A | 10/2000 | Childers et al. |
| 6,149,313 A | 11/2000 | Giebel et al. |
| 6,149,315 A | 11/2000 | Stephenson |
| 6,151,432 A | 11/2000 | Nakajima et al. |
| 6,160,946 A | 12/2000 | Thompson et al. |
| 6,181,861 B1 | 1/2001 | Wenski et al. |
| 6,188,687 B1 | 2/2001 | Mussman et al. |
| 6,188,825 B1 | 2/2001 | Bandy et al. |
| 6,192,180 B1 | 2/2001 | Kim et al. |
| 6,201,920 B1 | 3/2001 | Noble et al. |
| 6,208,796 B1 | 3/2001 | Williams Vigliaturo |
| 6,212,324 B1 | 4/2001 | Lin et al. |
| 6,215,938 B1 | 4/2001 | Reitmeier et al. |
| 6,227,717 B1 | 5/2001 | Ott et al. |
| 6,234,683 B1 | 5/2001 | Waldron et al. |
| 6,234,685 B1 | 5/2001 | Carlisle et al. |
| 6,236,795 B1 | 5/2001 | Rodgers |
| 6,240,229 B1 | 5/2001 | Roth |
| 6,243,522 B1 | 6/2001 | Allan et al. |
| 6,245,998 B1 * | 6/2001 | Curry et al. ............... 174/72 A |
| 6,263,141 B1 | 7/2001 | Smith |
| 6,265,680 B1 | 7/2001 | Robertson |
| 6,269,212 B1 | 7/2001 | Schiattone |
| 6,275,641 B1 | 8/2001 | Daoud |
| 6,278,829 B1 | 8/2001 | BuAbbud et al. |
| 6,278,831 B1 | 8/2001 | Henderson et al. |
| D448,005 S | 9/2001 | Klein, Jr. et al. |
| 6,292,614 B1 | 9/2001 | Smith et al. |
| 6,301,424 B1 | 10/2001 | Hwang |
| 6,307,997 B1 | 10/2001 | Walters et al. |
| 6,318,824 B1 | 11/2001 | LaGrotta et al. |
| 6,321,017 B1 | 11/2001 | Janus et al. |
| 6,322,279 B1 | 11/2001 | Yamamoto et al. |
| 6,325,549 B1 | 12/2001 | Shevchuk |
| RE37,489 E | 1/2002 | Anton et al. |
| 6,343,313 B1 | 1/2002 | Salesky et al. |
| 6,347,888 B1 | 2/2002 | Puetz |
| 6,353,696 B1 | 3/2002 | Gordon et al. |
| 6,353,697 B1 | 3/2002 | Daoud |
| 6,359,228 B1 | 3/2002 | Strause et al. |
| 6,363,200 B1 | 3/2002 | Thompson et al. |
| 6,370,309 B1 | 4/2002 | Daoud |
| 6,377,218 B1 | 4/2002 | Nelson et al. |
| 6,379,052 B1 | 4/2002 | De Jong et al. |
| 6,385,381 B1 | 5/2002 | Janus et al. |
| 6,389,214 B1 | 5/2002 | Smith et al. |
| 6,397,166 B1 | 5/2002 | Leung et al. |
| 6,398,149 B1 | 6/2002 | Hines et al. |
| 6,411,767 B1 | 6/2002 | Burrous et al. |
| 6,418,262 B1 | 7/2002 | Puetz et al. |
| 6,424,781 B1 | 7/2002 | Puetz et al. |
| 6,425,694 B1 | 7/2002 | Szilagyi et al. |
| 6,427,045 B1 | 7/2002 | Matthes et al. |
| 6,431,762 B1 | 8/2002 | Taira et al. |
| 6,434,313 B1 | 8/2002 | Clapp, Jr. et al. |

(56) References Cited

U.S. PATENT DOCUMENTS

| | | |
|---|---|---|
| 6,438,310 B1 | 8/2002 | Lance et al. |
| 6,452,925 B1 | 9/2002 | Sistanizadeh et al. |
| 6,456,773 B1 | 9/2002 | Keys |
| 6,464,402 B1 | 10/2002 | Andrews et al. |
| 6,466,724 B1 | 10/2002 | Glover et al. |
| 6,469,905 B1 | 10/2002 | Hwang |
| D466,087 S | 11/2002 | Cuny et al. |
| 6,478,472 B1 | 11/2002 | Anderson et al. |
| 6,480,487 B1 | 11/2002 | Wegleitner et al. |
| 6,480,660 B1 | 11/2002 | Reitmeier et al. |
| 6,483,977 B2 | 11/2002 | Battey et al. |
| 6,484,958 B1 | 11/2002 | Xue et al. |
| 6,496,640 B1 | 12/2002 | Harvey et al. |
| 6,504,988 B1 | 1/2003 | Trebesch et al. |
| 6,507,980 B2 | 1/2003 | Bremicker |
| 6,510,274 B1 | 1/2003 | Wu et al. |
| 6,532,332 B2 | 3/2003 | Solheid et al. |
| 6,533,472 B1 | 3/2003 | Dinh et al. |
| 6,535,397 B2 | 3/2003 | Clark et al. |
| 6,539,147 B1 | 3/2003 | Mahony |
| 6,539,160 B2 | 3/2003 | Battey et al. |
| 6,542,688 B1 | 4/2003 | Battey et al. |
| 6,550,977 B2 | 4/2003 | Hizuka |
| 6,554,485 B1 | 4/2003 | Beatty et al. |
| 6,560,334 B1 | 5/2003 | Mullaney et al. |
| 6,567,601 B2 | 5/2003 | Daoud et al. |
| 6,571,048 B1 | 5/2003 | Bechamps et al. |
| 6,577,595 B1 | 6/2003 | Counterman |
| 6,577,801 B2 | 6/2003 | Broderick et al. |
| 6,579,014 B2 | 6/2003 | Melton et al. |
| 6,584,267 B1 | 6/2003 | Caveney et al. |
| 6,587,630 B2 | 7/2003 | Spence et al. |
| 6,588,938 B1 | 7/2003 | Lampert et al. |
| 6,591,051 B2 | 7/2003 | Solheid et al. |
| 6,592,266 B1 | 7/2003 | Hankins et al. |
| 6,597,670 B1 | 7/2003 | Tweedy et al. |
| 6,600,866 B2 | 7/2003 | Gatica et al. |
| 6,601,997 B2 | 8/2003 | Ngo |
| 6,612,515 B1 | 9/2003 | Tinucci et al. |
| 6,614,978 B1 | 9/2003 | Caveney |
| 6,614,980 B1 | 9/2003 | Mahony |
| 6,621,975 B2 | 9/2003 | Laporte et al. |
| 6,625,374 B2 | 9/2003 | Holman et al. |
| 6,625,375 B1 | 9/2003 | Mahony |
| 6,631,237 B2 | 10/2003 | Knudsen et al. |
| 6,640,042 B2 | 10/2003 | Araki et al. |
| RE38,311 E | 11/2003 | Wheeler |
| 6,644,863 B1 | 11/2003 | Azami et al. |
| 6,647,197 B1 | 11/2003 | Marrs et al. |
| 6,648,520 B2 | 11/2003 | McDonald et al. |
| 6,654,536 B2 | 11/2003 | Battey et al. |
| 6,668,127 B1 | 12/2003 | Mahony |
| 6,677,520 B1 | 1/2004 | Kim et al. |
| 6,679,604 B1 | 1/2004 | Bove et al. |
| 6,687,450 B1 | 2/2004 | Kempeneers et al. |
| 6,710,366 B1 | 3/2004 | Lee et al. |
| 6,715,619 B2 | 4/2004 | Kim et al. |
| 6,719,149 B2 | 4/2004 | Tomino |
| 6,741,784 B2 | 5/2004 | Guan |
| 6,741,785 B2 | 5/2004 | Barthel et al. |
| 6,746,037 B1 | 6/2004 | Kaplenski et al. |
| 6,748,154 B2 | 6/2004 | O'Leary et al. |
| 6,748,155 B2 | 6/2004 | Kim et al. |
| 6,758,600 B2 | 7/2004 | Del Grosso et al. |
| 6,768,860 B2 | 7/2004 | Liberty |
| 6,771,861 B2 | 8/2004 | Wagner et al. |
| 6,773,297 B2 | 8/2004 | Komiya |
| 6,778,525 B1 | 8/2004 | Baum et al. |
| 6,778,752 B2 | 8/2004 | Laporte et al. |
| 6,786,647 B1 | 9/2004 | Hinds et al. |
| 6,788,871 B2 | 9/2004 | Taylor |
| 6,792,190 B2 | 9/2004 | Xin et al. |
| 6,798,751 B1 | 9/2004 | Voit et al. |
| 6,804,447 B2 | 10/2004 | Smith et al. |
| 6,810,194 B2 | 10/2004 | Griffiths et al. |
| 6,813,412 B2 | 11/2004 | Lin |
| 6,816,660 B2 | 11/2004 | Nashimoto |
| 6,819,856 B2 | 11/2004 | Dagley et al. |
| 6,819,857 B2 | 11/2004 | Douglas et al. |
| 6,826,174 B1 | 11/2004 | Erekson et al. |
| 6,826,346 B2 | 11/2004 | Sloan et al. |
| 6,839,428 B2 | 1/2005 | Brower et al. |
| 6,839,438 B1 | 1/2005 | Riegelsberger et al. |
| 6,840,815 B2 | 1/2005 | Musolf et al. |
| 6,845,207 B2 | 1/2005 | Schray |
| 6,848,862 B1 | 2/2005 | Schlig |
| 6,850,685 B2 | 2/2005 | Tinucci et al. |
| 6,853,637 B1 | 2/2005 | Norrell et al. |
| 6,854,894 B1 | 2/2005 | Yunker et al. |
| 6,856,334 B1 | 2/2005 | Fukui |
| 6,865,331 B2 | 3/2005 | Mertesdorf |
| 6,865,334 B2 | 3/2005 | Cooke et al. |
| 6,866,541 B2 | 3/2005 | Barker et al. |
| 6,868,216 B1 | 3/2005 | Gehrke |
| 6,869,227 B2 | 3/2005 | Del Grosso et al. |
| 6,870,734 B2 | 3/2005 | Mertesdorf et al. |
| 6,870,997 B2 | 3/2005 | Cooke |
| 6,879,545 B2 | 4/2005 | Cooke et al. |
| 6,915,058 B2 | 7/2005 | Pons |
| 6,920,273 B2 | 7/2005 | Knudsen |
| 6,920,274 B2 | 7/2005 | Rapp et al. |
| 6,925,241 B2 | 8/2005 | Bohle et al. |
| 6,934,451 B2 | 8/2005 | Cooke |
| 6,934,456 B2 * | 8/2005 | Ferris et al. .................. 385/134 |
| 6,937,807 B2 | 8/2005 | Franklin et al. |
| 6,944,383 B1 | 9/2005 | Herzog et al. |
| 6,944,389 B2 | 9/2005 | Giraud et al. |
| 6,963,690 B1 | 11/2005 | Kassal et al. |
| 6,968,107 B2 | 11/2005 | Belardi et al. |
| 6,968,111 B2 | 11/2005 | Trebesch et al. |
| 6,985,665 B2 | 1/2006 | Baechtle |
| 6,993,237 B2 | 1/2006 | Cooke et al. |
| 7,000,784 B2 | 2/2006 | Canty et al. |
| 7,005,582 B2 | 2/2006 | Muller et al. |
| 7,006,748 B2 | 2/2006 | Dagley et al. |
| 7,007,296 B2 | 2/2006 | Rakib |
| 7,027,695 B2 | 4/2006 | Cooke et al. |
| 7,027,706 B2 | 4/2006 | Diaz et al. |
| 7,031,588 B2 | 4/2006 | Cowley et al. |
| 7,035,510 B2 | 4/2006 | Zimmel et al. |
| 7,038,137 B2 | 5/2006 | Grubish et al. |
| 7,054,513 B2 | 5/2006 | Herz et al. |
| 7,066,748 B2 | 6/2006 | Bricaud et al. |
| 7,068,907 B2 | 6/2006 | Schray |
| 7,070,459 B2 | 7/2006 | Denovich et al. |
| 7,079,744 B2 | 7/2006 | Douglas et al. |
| 7,090,406 B2 | 8/2006 | Melton et al. |
| 7,090,407 B2 | 8/2006 | Melton et al. |
| 7,094,095 B1 | 8/2006 | Caveney |
| 7,097,047 B2 | 8/2006 | Lee et al. |
| 7,101,093 B2 | 9/2006 | Hsiao et al. |
| 7,102,884 B2 | 9/2006 | Mertesdorf et al. |
| 7,103,255 B2 | 9/2006 | Reagan et al. |
| 7,110,654 B2 | 9/2006 | Dillat |
| 7,111,990 B2 | 9/2006 | Melton et al. |
| 7,113,679 B2 | 9/2006 | Melton et al. |
| 7,113,686 B2 | 9/2006 | Bellekens et al. |
| 7,113,687 B2 | 9/2006 | Womack et al. |
| 7,116,491 B1 | 10/2006 | Willey et al. |
| 7,116,883 B2 | 10/2006 | Kline et al. |
| 7,118,281 B2 | 10/2006 | Chiu et al. |
| 7,118,405 B2 | 10/2006 | Peng |
| 7,120,347 B2 | 10/2006 | Blackwell, Jr. et al. |
| 7,120,348 B2 | 10/2006 | Trebesch et al. |
| 7,120,349 B2 | 10/2006 | Elliott |
| 7,128,471 B2 | 10/2006 | Wilson |
| 7,139,462 B2 | 11/2006 | Richtman |
| 7,171,099 B2 | 1/2007 | Barnes et al. |
| 7,171,121 B1 | 1/2007 | Skarica et al. |
| 7,181,142 B1 | 2/2007 | Xu et al. |
| 7,193,783 B2 | 3/2007 | Willey et al. |
| 7,194,181 B2 | 3/2007 | Holmberg et al. |
| 7,195,521 B2 | 3/2007 | Musolf et al. |
| 7,200,314 B2 | 4/2007 | Womack et al. |

(56) References Cited

U.S. PATENT DOCUMENTS

| | | |
|---|---|---|
| 7,200,316 B2 | 4/2007 | Giraud et al. |
| 7,228,036 B2 | 6/2007 | Elkins, II et al. |
| 7,231,125 B2 | 6/2007 | Douglas et al. |
| 7,234,878 B2 | 6/2007 | Yamauchi et al. |
| 7,236,677 B2 | 6/2007 | Escoto et al. |
| 7,245,809 B1 | 7/2007 | Gniadek et al. |
| 7,259,325 B2 | 8/2007 | Pincu et al. |
| 7,266,283 B2 | 9/2007 | Kline et al. |
| 7,270,485 B1 | 9/2007 | Robinson et al. |
| 7,272,291 B2 | 9/2007 | Bayazit et al. |
| 7,274,852 B1 | 9/2007 | Smrha et al. |
| 7,289,731 B2 | 10/2007 | Thinguldstad |
| 7,292,769 B2 | 11/2007 | Watanabe et al. |
| 7,298,950 B2 | 11/2007 | Frohlich |
| 7,300,308 B2 | 11/2007 | Laursen et al. |
| 7,302,149 B2 | 11/2007 | Swam et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,310,471 B2 | 12/2007 | Bayazit et al. |
| 7,310,472 B2 | 12/2007 | Haberman |
| 7,315,681 B2 | 1/2008 | Kewitsch |
| 7,325,975 B2 | 2/2008 | Yamada et al. |
| 7,330,625 B2 | 2/2008 | Barth |
| 7,330,626 B2 | 2/2008 | Kowalczyk et al. |
| 7,330,629 B2 | 2/2008 | Cooke et al. |
| 7,331,718 B2 | 2/2008 | Yazaki et al. |
| 7,340,145 B2 | 3/2008 | Allen |
| 7,349,615 B2 | 3/2008 | Frazier et al. |
| 7,373,071 B2 | 5/2008 | Douglas et al. |
| 7,376,321 B2 | 5/2008 | Bolster et al. |
| 7,376,323 B2 | 5/2008 | Zimmel |
| 7,391,952 B1 | 6/2008 | Ugolini et al. |
| 7,397,996 B2 | 7/2008 | Herzog et al. |
| 7,400,813 B2 | 7/2008 | Zimmel |
| 7,409,137 B2 | 8/2008 | Barnes |
| 7,414,198 B2 | 8/2008 | Stansbie et al. |
| 7,417,188 B2 | 8/2008 | McNutt et al. |
| 7,418,182 B2 | 8/2008 | Krampotich |
| 7,418,184 B1 | 8/2008 | Gonzales et al. |
| 7,421,182 B2 | 9/2008 | Bayazit et al. |
| 7,428,363 B2 | 9/2008 | Leon et al. |
| 7,437,049 B2 | 10/2008 | Krampotich |
| 7,439,453 B2 | 10/2008 | Murano et al. |
| 7,454,113 B2 | 11/2008 | Barnes |
| 7,460,757 B2 | 12/2008 | Hoehne et al. |
| 7,460,758 B2 | 12/2008 | Xin |
| 7,461,981 B2 | 12/2008 | Yow, Jr. et al. |
| 7,462,779 B2 | 12/2008 | Caveney et al. |
| 7,463,810 B2 | 12/2008 | Bayazit et al. |
| 7,463,811 B2 | 12/2008 | Trebesch et al. |
| 7,469,090 B2 * | 12/2008 | Ferris et al. ............ 385/135 |
| 7,471,867 B2 | 12/2008 | Vogel et al. |
| 7,474,828 B2 | 1/2009 | Leon et al. |
| 7,477,824 B2 | 1/2009 | Reagan et al. |
| 7,477,826 B2 | 1/2009 | Mullaney et al. |
| 7,480,438 B2 | 1/2009 | Douglas et al. |
| 7,488,205 B2 | 2/2009 | Spisany et al. |
| 7,493,002 B2 | 2/2009 | Coburn et al. |
| 7,496,269 B1 | 2/2009 | Lee |
| 7,499,622 B2 | 3/2009 | Castonguay et al. |
| 7,499,623 B2 | 3/2009 | Barnes et al. |
| 7,507,111 B2 | 3/2009 | Togami et al. |
| 7,509,015 B2 | 3/2009 | Murano |
| 7,509,016 B2 | 3/2009 | Smith et al. |
| 7,522,804 B2 | 4/2009 | Araki et al. |
| 7,526,171 B2 | 4/2009 | Caveney et al. |
| 7,526,172 B2 | 4/2009 | Gniadek et al. |
| 7,526,174 B2 | 4/2009 | Leon et al. |
| 7,529,458 B2 | 5/2009 | Spisany et al. |
| 7,534,958 B2 | 5/2009 | McNutt et al. |
| 7,536,075 B2 | 5/2009 | Zimmel |
| 7,542,645 B1 | 6/2009 | Hua et al. |
| 7,555,193 B2 | 6/2009 | Rapp et al. |
| 7,558,458 B2 | 7/2009 | Gronvall et al. |
| 7,565,051 B2 | 7/2009 | Vongseng |
| 7,567,744 B2 | 7/2009 | Krampotich et al. |
| 7,570,860 B2 | 8/2009 | Smrha et al. |
| 7,570,861 B2 | 8/2009 | Smrha et al. |
| 7,577,331 B2 | 8/2009 | Laurisch et al. |
| 7,603,020 B1 | 10/2009 | Wakileh et al. |
| 7,607,938 B2 | 10/2009 | Clark et al. |
| 7,609,967 B2 | 10/2009 | Hochbaum et al. |
| 7,613,377 B2 | 11/2009 | Gonzales et al. |
| 7,620,272 B2 | 11/2009 | Hino et al. |
| 7,620,287 B2 | 11/2009 | Appenzeller et al. |
| 7,641,398 B2 | 1/2010 | O'Riorden et al. |
| 7,668,430 B2 | 2/2010 | McClellan et al. |
| 7,668,433 B2 * | 2/2010 | Bayazit et al. ............ 385/135 |
| 7,672,561 B1 | 3/2010 | Keith et al. |
| 7,676,135 B2 | 3/2010 | Chen |
| 7,697,811 B2 | 4/2010 | Murano et al. |
| 7,715,125 B2 | 5/2010 | Willey |
| 7,715,683 B2 | 5/2010 | Kowalczyk et al. |
| 7,740,409 B2 | 6/2010 | Bolton et al. |
| 7,743,495 B2 | 6/2010 | Mori et al. |
| 7,756,382 B2 | 7/2010 | Saravanos et al. |
| 7,760,984 B2 | 7/2010 | Solheid et al. |
| 7,764,858 B2 | 7/2010 | Bayazit et al. |
| 7,809,235 B2 | 10/2010 | Reagan et al. |
| 7,822,310 B2 | 10/2010 | Castonguay et al. |
| 7,850,372 B2 | 12/2010 | Nishimura et al. |
| 7,853,112 B2 | 12/2010 | Zimmel et al. |
| 7,856,166 B2 | 12/2010 | Biribuze et al. |
| 7,914,332 B2 | 3/2011 | Song et al. |
| 7,942,589 B2 | 5/2011 | Yazaki et al. |
| 7,945,135 B2 | 5/2011 | Cooke et al. |
| 7,945,136 B2 | 5/2011 | Cooke et al. |
| 7,970,250 B2 | 6/2011 | Morris |
| 8,014,171 B2 | 9/2011 | Kelly et al. |
| 8,014,646 B2 | 9/2011 | Keith et al. |
| 8,020,813 B1 | 9/2011 | Clark et al. |
| 8,107,785 B2 | 1/2012 | Berglund et al. |
| 8,206,058 B2 | 6/2012 | Vrondran et al. |
| 8,537,477 B2 | 9/2013 | Shioda |
| 2001/0010741 A1 | 8/2001 | Hizuka |
| 2001/0029125 A1 | 10/2001 | Morita et al. |
| 2002/0010818 A1 | 1/2002 | Wei et al. |
| 2002/0012353 A1 | 1/2002 | Gerszberg et al. |
| 2002/0034290 A1 | 3/2002 | Pershan |
| 2002/0037139 A1 | 3/2002 | Asao et al. |
| 2002/0064364 A1 | 5/2002 | Battey et al. |
| 2002/0131730 A1 | 9/2002 | Keeble et al. |
| 2002/0136519 A1 | 9/2002 | Tinucci et al. |
| 2002/0141724 A1 | 10/2002 | Ogawa et al. |
| 2002/0150372 A1 | 10/2002 | Schray |
| 2002/0172467 A1 | 11/2002 | Anderson et al. |
| 2002/0181918 A1 | 12/2002 | Spence et al. |
| 2002/0181922 A1 | 12/2002 | Xin et al. |
| 2002/0194596 A1 | 12/2002 | Srivastava |
| 2003/0007743 A1 | 1/2003 | Asada |
| 2003/0007767 A1 | 1/2003 | Douglas et al. |
| 2003/0021539 A1 | 1/2003 | Kwon et al. |
| 2003/0066998 A1 | 4/2003 | Lee |
| 2003/0086675 A1 | 5/2003 | Wu et al. |
| 2003/0095753 A1 | 5/2003 | Wada et al. |
| 2003/0147604 A1 | 8/2003 | Tapia et al. |
| 2003/0174996 A1 | 9/2003 | Henschel et al. |
| 2003/0180012 A1 | 9/2003 | Deane et al. |
| 2003/0183413 A1 | 10/2003 | Kato |
| 2003/0199201 A1 | 10/2003 | Mullaney et al. |
| 2003/0210882 A1 | 11/2003 | Barthel et al. |
| 2003/0223723 A1 | 12/2003 | Massey et al. |
| 2003/0235387 A1 | 12/2003 | Dufour |
| 2004/0013389 A1 | 1/2004 | Taylor |
| 2004/0013390 A1 | 1/2004 | Kim et al. |
| 2004/0074852 A1 | 4/2004 | Knudsen et al. |
| 2004/0086238 A1 | 5/2004 | Finona et al. |
| 2004/0086252 A1 | 5/2004 | Smith et al. |
| 2004/0147159 A1 | 7/2004 | Urban et al. |
| 2004/0151465 A1 | 8/2004 | Krampotich et al. |
| 2004/0175090 A1 | 9/2004 | Vastmans et al. |
| 2004/0192115 A1 | 9/2004 | Bugg |
| 2004/0208459 A1 | 10/2004 | Mizue et al. |

(56) References Cited

U.S. PATENT DOCUMENTS

| | | |
|---|---|---|
| 2004/0228598 A1 | 11/2004 | Allen et al. |
| 2004/0240882 A1 | 12/2004 | Lipski et al. |
| 2004/0264873 A1 | 12/2004 | Smith et al. |
| 2005/0002633 A1 | 1/2005 | Solheid et al. |
| 2005/0008131 A1 | 1/2005 | Cook |
| 2005/0026497 A1 | 2/2005 | Holliday |
| 2005/0036749 A1 | 2/2005 | Vogel et al. |
| 2005/0074990 A1 | 4/2005 | Shearman et al. |
| 2005/0076149 A1 | 4/2005 | McKown et al. |
| 2005/0083959 A1 | 4/2005 | Binder |
| 2005/0107086 A1 | 5/2005 | Tell et al. |
| 2005/0111809 A1 | 5/2005 | Giraud et al. |
| 2005/0111810 A1 | 5/2005 | Giraud et al. |
| 2005/0123261 A1 | 6/2005 | Bellekens et al. |
| 2005/0129379 A1 | 6/2005 | Reagan et al. |
| 2005/0175293 A1 | 8/2005 | Byers et al. |
| 2005/0201073 A1 | 9/2005 | Pincu et al. |
| 2005/0232566 A1 | 10/2005 | Rapp et al. |
| 2005/0233647 A1 | 10/2005 | Denovich et al. |
| 2005/0254757 A1 | 11/2005 | Ferretti, III et al. |
| 2005/0281526 A1 | 12/2005 | Vongseng et al. |
| 2005/0281527 A1 | 12/2005 | Wilson et al. |
| 2006/0007562 A1 | 1/2006 | Willey et al. |
| 2006/0018448 A1 | 1/2006 | Stevens et al. |
| 2006/0018622 A1 | 1/2006 | Caveney |
| 2006/0039290 A1 | 2/2006 | Roden et al. |
| 2006/0044774 A1 | 3/2006 | Vasavda et al. |
| 2006/0072606 A1 | 4/2006 | Posthuma |
| 2006/0077968 A1 | 4/2006 | Pitsoulakis et al. |
| 2006/0093303 A1 | 5/2006 | Reagan et al. |
| 2006/0110118 A1 | 5/2006 | Escoto et al. |
| 2006/0147172 A1 | 7/2006 | Luther et al. |
| 2006/0153517 A1 | 7/2006 | Reagan et al. |
| 2006/0160377 A1 | 7/2006 | Huang |
| 2006/0165365 A1 | 7/2006 | Feustel et al. |
| 2006/0165366 A1 | 7/2006 | Feustel et al. |
| 2006/0191700 A1 | 8/2006 | Herzog et al. |
| 2006/0193590 A1 | 8/2006 | Puetz et al. |
| 2006/0193591 A1 | 8/2006 | Rapp et al. |
| 2006/0198098 A1 | 9/2006 | Clark et al. |
| 2006/0215980 A1 | 9/2006 | Bayazit et al. |
| 2006/0269194 A1 | 11/2006 | Luther et al. |
| 2006/0269206 A1 | 11/2006 | Zimmel |
| 2006/0269208 A1 | 11/2006 | Allen et al. |
| 2006/0275008 A1 | 12/2006 | Xin |
| 2006/0275009 A1 | 12/2006 | Ellison et al. |
| 2006/0285812 A1* | 12/2006 | Ferris et al. ............... 385/135 |
| 2007/0003204 A1 | 1/2007 | Makrides-Saravanos et al. |
| 2007/0025070 A1 | 2/2007 | Jiang et al. |
| 2007/0031099 A1 | 2/2007 | Herzog et al. |
| 2007/0033629 A1 | 2/2007 | McGranahan et al. |
| 2007/0047894 A1 | 3/2007 | Holmberg et al. |
| 2007/0104447 A1 | 5/2007 | Allen |
| 2007/0127201 A1 | 6/2007 | Mertesdorf et al. |
| 2007/0131628 A1 | 6/2007 | Mimlitch, III et al. |
| 2007/0189692 A1 | 8/2007 | Zimmel et al. |
| 2007/0196071 A1 | 8/2007 | Laursen et al. |
| 2007/0221793 A1 | 9/2007 | Kusuda et al. |
| 2007/0237484 A1 | 10/2007 | Reagan et al. |
| 2007/0274718 A1 | 11/2007 | Bridges et al. |
| 2008/0011514 A1 | 1/2008 | Zheng et al. |
| 2008/0025683 A1 | 1/2008 | Murano |
| 2008/0031585 A1 | 2/2008 | Solheid et al. |
| 2008/0063350 A1 | 3/2008 | Trebesch et al. |
| 2008/0068788 A1 | 3/2008 | Ozawa et al. |
| 2008/0069511 A1 | 3/2008 | Blackwell, Jr. et al. |
| 2008/0069512 A1 | 3/2008 | Barnes et al. |
| 2008/0080826 A1 | 4/2008 | Leon et al. |
| 2008/0080827 A1 | 4/2008 | Leon et al. |
| 2008/0080828 A1 | 4/2008 | Leon et al. |
| 2008/0085094 A1 | 4/2008 | Krampotich |
| 2008/0089656 A1 | 4/2008 | Wagner et al. |
| 2008/0095541 A1 | 4/2008 | Dallesasse |
| 2008/0100440 A1 | 5/2008 | Downie et al. |
| 2008/0106871 A1 | 5/2008 | James |
| 2008/0118207 A1 | 5/2008 | Yamamoto et al. |
| 2008/0121423 A1 | 5/2008 | Vogel et al. |
| 2008/0124039 A1 | 5/2008 | Gniadek et al. |
| 2008/0131068 A1 | 6/2008 | Mertesdorf et al. |
| 2008/0145013 A1 | 6/2008 | Escoto et al. |
| 2008/0152294 A1 | 6/2008 | Hirano et al. |
| 2008/0166094 A1 | 7/2008 | Bookbinder et al. |
| 2008/0166131 A1 | 7/2008 | Hudgins et al. |
| 2008/0175550 A1 | 7/2008 | Coburn et al. |
| 2008/0175551 A1 | 7/2008 | Smrha et al. |
| 2008/0175552 A1 | 7/2008 | Smrha et al. |
| 2008/0193091 A1 | 8/2008 | Herbst |
| 2008/0205823 A1 | 8/2008 | Luther et al. |
| 2008/0205844 A1 | 8/2008 | Castonguay et al. |
| 2008/0212928 A1 | 9/2008 | Kowalczyk et al. |
| 2008/0219632 A1 | 9/2008 | Smith et al. |
| 2008/0219634 A1 | 9/2008 | Rapp et al. |
| 2008/0236858 A1 | 10/2008 | Quijano |
| 2008/0247723 A1 | 10/2008 | Herzog et al. |
| 2008/0267573 A1 | 10/2008 | Douglas et al. |
| 2008/0285934 A1 | 11/2008 | Standish et al. |
| 2008/0292261 A1 | 11/2008 | Kowalczyk et al. |
| 2008/0298763 A1 | 12/2008 | Appenzeller et al. |
| 2008/0304803 A1 | 12/2008 | Krampotich et al. |
| 2008/0310810 A1 | 12/2008 | Gallagher |
| 2009/0010607 A1 | 1/2009 | Elisson et al. |
| 2009/0016685 A1 | 1/2009 | Hudgins et al. |
| 2009/0022470 A1 | 1/2009 | Krampotich |
| 2009/0060439 A1 | 3/2009 | Cox et al. |
| 2009/0060440 A1 | 3/2009 | Wright et al. |
| 2009/0067800 A1 | 3/2009 | Vazquez et al. |
| 2009/0097813 A1 | 4/2009 | Hill |
| 2009/0136194 A1 | 5/2009 | Barnes |
| 2009/0136196 A1 | 5/2009 | Trebesch et al. |
| 2009/0146342 A1 | 6/2009 | Haney et al. |
| 2009/0148117 A1 | 6/2009 | Laurisch |
| 2009/0169163 A1 | 7/2009 | Abbott, III et al. |
| 2009/0175588 A1 | 7/2009 | Brandt et al. |
| 2009/0180749 A1 | 7/2009 | Douglas et al. |
| 2009/0185782 A1 | 7/2009 | Parikh et al. |
| 2009/0191891 A1 | 7/2009 | Ma et al. |
| 2009/0194647 A1 | 8/2009 | Keith |
| 2009/0196563 A1 | 8/2009 | Mullsteff et al. |
| 2009/0202214 A1* | 8/2009 | Holmberg et al. ........... 385/135 |
| 2009/0207577 A1 | 8/2009 | Fransen et al. |
| 2009/0208178 A1 | 8/2009 | Kowalczyk et al. |
| 2009/0208210 A1 | 8/2009 | Trojer et al. |
| 2009/0214171 A1 | 8/2009 | Coburn et al. |
| 2009/0220200 A1 | 9/2009 | Wong et al. |
| 2009/0220204 A1 | 9/2009 | Ruiz |
| 2009/0226142 A1 | 9/2009 | Barnes et al. |
| 2009/0238531 A1 | 9/2009 | Holmberg et al. |
| 2009/0245743 A1 | 10/2009 | Cote et al. |
| 2009/0252472 A1 | 10/2009 | Solheid et al. |
| 2009/0257726 A1 | 10/2009 | Redmann et al. |
| 2009/0257727 A1 | 10/2009 | Laurisch et al. |
| 2009/0257754 A1 | 10/2009 | Theodoras, II et al. |
| 2009/0263096 A1 | 10/2009 | Solheid et al. |
| 2009/0263122 A1 | 10/2009 | Helkey et al. |
| 2009/0267865 A1 | 10/2009 | Miller et al. |
| 2009/0269018 A1 | 10/2009 | Fr hlich et al. |
| 2009/0274429 A1 | 11/2009 | Krampotich et al. |
| 2009/0274430 A1 | 11/2009 | Krampotich et al. |
| 2009/0274432 A1 | 11/2009 | Iwaya |
| 2009/0290842 A1 | 11/2009 | Bran de Leon et al. |
| 2009/0297111 A1 | 12/2009 | Reagan et al. |
| 2009/0304342 A1 | 12/2009 | Adomeit et al. |
| 2009/0324189 A1 | 12/2009 | Hill et al. |
| 2010/0003000 A1 | 1/2010 | Rapp et al. |
| 2010/0012671 A1 | 1/2010 | Vrondran et al. |
| 2010/0054681 A1 | 3/2010 | Biribuze et al. |
| 2010/0054682 A1 | 3/2010 | Cooke et al. |
| 2010/0054685 A1 | 3/2010 | Cooke et al. |
| 2010/0061691 A1 | 3/2010 | Murano et al. |
| 2010/0061693 A1 | 3/2010 | Bran de Leon et al. |
| 2010/0074587 A1 | 3/2010 | Loeffelholz et al. |
| 2010/0080517 A1 | 4/2010 | Cline et al. |
| 2010/0086274 A1 | 4/2010 | Keith |
| 2010/0111483 A1 | 5/2010 | Reinhardt et al. |

(56) References Cited

U.S. PATENT DOCUMENTS

| | | |
|---|---|---|
| 2010/0119201 A1 | 5/2010 | Smrha et al. |
| 2010/0142544 A1 | 6/2010 | Chapel et al. |
| 2010/0142910 A1 | 6/2010 | Hill et al. |
| 2010/0150518 A1 | 6/2010 | Leon et al. |
| 2010/0158467 A1 | 6/2010 | Hou et al. |
| 2010/0166377 A1 | 7/2010 | Nair et al. |
| 2010/0178022 A1 | 7/2010 | Schroeder et al. |
| 2010/0202745 A1 | 8/2010 | Sokolowski et al. |
| 2010/0220967 A1 | 9/2010 | Cooke et al. |
| 2010/0278499 A1 | 11/2010 | Mures et al. |
| 2010/0296790 A1 | 11/2010 | Cooke et al. |
| 2010/0310225 A1 | 12/2010 | Anderson et al. |
| 2010/0310226 A1 | 12/2010 | Wakileh et al. |
| 2010/0316334 A1 | 12/2010 | Kewitsch |
| 2010/0322582 A1 | 12/2010 | Cooke et al. |
| 2010/0322583 A1 | 12/2010 | Cooke et al. |
| 2011/0073730 A1 | 3/2011 | Kitchen |
| 2011/0085774 A1 | 4/2011 | Murphy et al. |
| 2011/0085776 A1 | 4/2011 | Biribuze et al. |
| 2011/0097053 A1 | 4/2011 | Smith et al. |
| 2011/0097977 A1 | 4/2011 | Bubnick et al. |
| 2011/0280537 A1 | 11/2011 | Cowen et al. |
| 2012/0051707 A1 | 3/2012 | Barnes et al. |
| 2012/0183263 A1 | 7/2012 | Wu |
| 2013/0077927 A1 | 3/2013 | O'Connor |

FOREIGN PATENT DOCUMENTS

| | | |
|---|---|---|
| CH | 688705 A5 | 1/1998 |
| DE | 8711970 U1 | 10/1987 |
| DE | 3726718 A1 | 2/1989 |
| DE | 3726719 A1 | 2/1989 |
| DE | 4030301 A1 | 3/1992 |
| DE | 4231181 C1 | 8/1993 |
| DE | 10338848 A1 | 3/2005 |
| DE | 202005009932 U1 | 11/2005 |
| EP | 0250900 A2 | 1/1988 |
| EP | 0408266 A2 | 1/1991 |
| EP | 0474091 A1 | 8/1991 |
| EP | 0468671 A1 | 1/1992 |
| EP | 0490698 A1 | 6/1992 |
| EP | 0529830 A1 | 3/1993 |
| EP | 0544004 A1 | 6/1993 |
| EP | 0547778 A1 | 6/1993 |
| EP | 0581527 A1 | 2/1994 |
| EP | 0620462 A1 | 10/1994 |
| EP | 0693699 A1 | 1/1996 |
| EP | 0720322 A2 | 7/1996 |
| EP | 0940700 A2 | 9/1999 |
| EP | 0949522 A2 | 10/1999 |
| EP | 1041417 A2 | 10/2000 |
| EP | 1056177 A1 | 11/2000 |
| EP | 1065542 A1 | 1/2001 |
| EP | 1203974 A2 | 5/2002 |
| EP | 1289319 A2 | 3/2003 |
| EP | 1316829 A2 | 6/2003 |
| EP | 1777563 A1 | 4/2007 |
| FR | 2378378 A1 | 8/1978 |
| GB | 2241591 A | 9/1991 |
| GB | 2277812 A | 11/1994 |
| JP | 3172806 A | 7/1991 |
| JP | 5045541 A | 2/1993 |
| JP | 06018749 A | 1/1994 |
| JP | 7308011 A | 11/1995 |
| JP | 8007308 A | 1/1996 |
| JP | 8248235 A | 9/1996 |
| JP | 8248237 A | 9/1996 |
| JP | 3487946 A | 10/1996 |
| JP | 8254620 A | 10/1996 |
| JP | 3279474 A | 10/1997 |
| JP | 9258033 A | 10/1997 |
| JP | 9258055 A | 10/1997 |
| JP | 2771870 B2 | 7/1998 |
| JP | 3448448 A | 8/1998 |
| JP | 10227919 A | 8/1998 |
| JP | 3478944 A | 12/1998 |
| JP | 10339817 A | 12/1998 |
| JP | 11023858 A | 1/1999 |
| JP | 2000098138 A | 4/2000 |
| JP | 2000098139 A | 4/2000 |
| JP | 2000241631 A | 9/2000 |
| JP | 2001004849 A | 1/2001 |
| JP | 3160322 B2 | 4/2001 |
| JP | 2001133636 A | 5/2001 |
| JP | 3173962 B2 | 6/2001 |
| JP | 3176906 B2 | 6/2001 |
| JP | 2001154030 A | 6/2001 |
| JP | 2001159714 A | 6/2001 |
| JP | 2002022974 A | 1/2002 |
| JP | 2002169035 A | 6/2002 |
| JP | 3312893 B2 | 8/2002 |
| JP | 2002305389 A | 10/2002 |
| JP | 3344701 B2 | 11/2002 |
| JP | 2003029054 A | 1/2003 |
| JP | 3403573 B2 | 5/2003 |
| JP | 2003169026 A | 6/2003 |
| JP | 2003215353 A | 7/2003 |
| JP | 2003344701 A | 12/2003 |
| JP | 3516765 B2 | 4/2004 |
| JP | 2004144808 A | 5/2004 |
| JP | 2004514931 A | 5/2004 |
| JP | 3542939 B2 | 7/2004 |
| JP | 2004246147 A | 9/2004 |
| JP | 2004361652 A | 12/2004 |
| JP | 2004361893 A | 12/2004 |
| JP | 3107704 U | 2/2005 |
| JP | 2005055748 A | 3/2005 |
| JP | 2005062569 A | 3/2005 |
| JP | 2005084241 A | 3/2005 |
| JP | 2005148327 A | 6/2005 |
| JP | 3763645 B2 | 4/2006 |
| JP | 3778021 B2 | 5/2006 |
| JP | 2006126513 A | 5/2006 |
| JP | 2006126516 A | 5/2006 |
| JP | 3794540 B2 | 7/2006 |
| JP | 2006227041 A1 | 8/2006 |
| JP | 3833638 B2 | 10/2006 |
| JP | 3841344 B2 | 11/2006 |
| JP | 3847533 B2 | 11/2006 |
| JP | 200747336 A | 2/2007 |
| JP | 3896035 B2 | 3/2007 |
| JP | 2007067458 A1 | 3/2007 |
| JP | 3934052 B2 | 6/2007 |
| JP | 3964191 B2 | 8/2007 |
| JP | 3989853 B2 | 10/2007 |
| JP | 4026244 B2 | 12/2007 |
| JP | 4029494 B2 | 1/2008 |
| JP | 4065223 B2 | 3/2008 |
| JP | 4093475 B2 | 6/2008 |
| JP | 4105696 B2 | 6/2008 |
| JP | 4112437 B2 | 7/2008 |
| JP | 4118862 B2 | 7/2008 |
| JP | 2008176118 A1 | 7/2008 |
| JP | 2008180817 A1 | 8/2008 |
| JP | 4184329 B2 | 11/2008 |
| JP | 2008542822 T | 11/2008 |
| JP | 2009503582 T | 1/2009 |
| WO | 9105281 A1 | 4/1991 |
| WO | 9326070 A1 | 12/1993 |
| WO | 9520175 A1 | 7/1995 |
| WO | 9636896 A1 | 11/1996 |
| WO | 9712268 A1 | 4/1997 |
| WO | 9744605 A1 | 11/1997 |
| WO | 9825416 A1 | 6/1998 |
| WO | 0005611 A2 | 2/2000 |
| WO | 0127660 A2 | 4/2001 |
| WO | 0242818 A1 | 5/2002 |
| WO | 03009527 A2 | 1/2003 |
| WO | 2004052066 A1 | 6/2004 |
| WO | 2007050515 A1 | 5/2007 |
| WO | 2007079074 A2 | 7/2007 |
| WO | 2007149215 A2 | 12/2007 |
| WO | 2008063054 A2 | 5/2008 |
| WO | 2009120280 A2 | 10/2009 |

(56) References Cited

FOREIGN PATENT DOCUMENTS

OTHER PUBLICATIONS

"MPO Fiber Optic Rack Panels now available from L-com Connectivity Products," article dated Jun. 4, 2007, 16 pages, http://www.I-com.com/content/Article.aspx?Type=P&ID=438.
"19 Rack Panel with 16 MPO Fiber Optic Couplers—1U high," product page, accessed Oct. 23, 2012, 2 pages, http://www.I-com.com/item.aspx?id=9767#.UlbgG8XXay5.
"Drawing for L-com 1U Panel with 16 MTP couplers," May 15, 2007, 1 page, http://www.I-com.com/multimedia/eng_drawings/PR17516MTP.pdf.
"RapidNet Fibre MTP VHD Cassette," Brochure, Date Unknown, 1 page, http://www.hellermanntyton.se/documents/5000/576_fiber_1U.pdf.
"MPO for Gigabit Ethernet/FAS-NET MTP Solution," Brochure, Date Unknown, 11 pages, http://www.infinique.com/upload/13182286190.pdf.
"Hubbell OptiChannel High Density 144 Port 1U Fiber Enclosure," Brochure, Date Unknown, 2 pages, http://www.hubbell-premise.com/literature/PLDF010.pdf.
Non-final Office Action for U.S. Appl. No. 12/771,473 mailed Oct. 4, 2012, 6 pages.
Non-final Office Action for U.S. Appl. No. 12/819,081 mailed Aug. 21, 2012, 12 pages.
International Search Report for PCT/US20101038986 mailed Aug. 18, 2010, 1 page.
Notice of Allowance for U.S. Appl. No. 12/417,325 mailed Aug. 22, 2012, 7 pages.
Notice of Panel Decision for Pre-Appeal Brief for U.S. Appl. No. 12/417,325 mailed Aug. 8, 2012, 2 pages.
Advisory Action for U.S. Appl. No. 12/417,325 mailed Jun. 29, 2012, 3 pages.
Advisory Action for U.S. Appl. No. 12/417,325 mailed Jun. 12, 2012, 3 pages.
Final Office Action for U.S. Appl. No. 12/417,325 mailed Apr. 16, 2012, 6 pages.
Final Office Action for U.S. Appl. No. 12/417,325 mailed Feb. 7, 2012, 7 pages.
Non-final Office Action for U.S. Appl. No. 12/417,325 mailed Jun. 15, 2011, 6 pages.
Notice of Allowance for U.S. Appl. No. 12/487,929 mailed Sep. 12, 2012, 4 pages.
Notice of Allowance for U.S. Appl. No. 12/487,929 mailed Jun. 13, 2012, 8 pages.
Advisory Action for U.S. Appl. No. 12/487,929 mailed Apr. 17, 2012, 3 pages.
Final Office Action for U.S. Appl. No. 12/487,929 mailed Feb. 14, 2012, 6 pages.
Final Office Action for U.S. Appl. No. 12/487,929 mailed Dec. 5, 2011, 7 pages.
Non-final Office Action for U.S. Appl. No. 12/487,929 mailed May 23, 2011, 7 pages.
Notice of Allowance for U.S. Appl. No. 12/415,253 mailed Mar. 11, 2011, 7 pages.
Non-final Office Action for U.S. Appl. No. 12/415,253 mailed Jul. 12, 2010, 11 pages.
Final Office Action for U.S. Appl. No. 12/415,253 mailed Apr. 16, 2010, 9 pages.
Non-final Office Action for U.S. Appl. No. 12/415,253 mailed Sep. 30, 2009, 8 pages.
Non-final Office Action for U.S. Appl. No. 12/641,617 mailed Oct. 5, 2012, 21 pages.
Final Office Action for U.S. Appl. No. 12/630,938 mailed Jun. 1, 2012, 18 pages.
Non-final Office Action for U.S. Appl. No. 12/630,938 mailed Dec. 19, 2011, 15 pages.
Non-final Office Action for U.S. Appl. No. 12/751,884 mailed Jul. 2, 2012, 9 pages.
Non-final Office Action for U.S. Appl. No. 12/871,052 mailed Aug. 13, 2012, 8 pages.
Annex to Form PCT/ISA/2006, Communication Relating to the Results of the Partial International Search, for PCT/US2009/004549 mailed Feb. 10, 2010, 2 pages.
Annex to Form PCT/ISA/206, Communication Relating to the Results of the Partial International Search, for PCT/US2009/004548 mailed Jan. 19, 2010, 2 pages.
Corning Cable Systems, "Corning Cable Systems Products for BellSouth High Density Shelves," Jun. 2000, 2 pages.
Corning Cable Systems, "Corning Cable Systems Quick Reference Guide for Verizon FTTP FDH Products," Jun. 2005, 4 pages.
Conner, M. "Passive Optical Design for RFOG and Beyond," Braodband Properties, Apr. 2009, pp. 78-81.
Corning Evolant, "Eclipse Hardware Family," Nov. 2009, 1 page.
Corning Evolant, "Enhanced Management Frame," Dec. 2009, 1 page.
Corning Evolant, "Enhanced Management Frame (EMF)," Specification Sheet, Nov. 2009, 24 pages.
Corning Cable Systems, "Evolant Solutions for Evolving Networks: Fiber Optic Hardware," Oct. 2002, 2 pages.
Corning Cable Systems, "Fiber Optic Hardware with Factory-Installed Pigtails: Features and Benefits," Nov. 2010, 12 pages.
Corning Cable Systems, "FiberManager System 1- and 3-Position Compact Shelves," Jan. 2003, 4 pages.
Corning Cable Systems, "FiberManager System Frame and Components," Jan. 2003, 12 pages.
Corning Cable Systems, "High Density Frame," Jul. 2001, 2 pages.
Corning Cable Systems, "High Density Frame (HDF) Connector-Splice Shelves and Housings," May 2003, 4 pages.
International Search Report for PCT/US10/35529 mailed Jul. 23, 2010, 2 pages.
International Search Report for PCT/US10/35563 mailed Jul. 23, 2012, 1 page.
International Search Report for PCT/US2008/002514 mailed Aug. 8, 2008, 2 pages.
International Search Report for PCT/US2008/010317 mailed Mar. 4, 2008, 2 pages.
International Search Report for PCT/US2009/001692 mailed Nov. 24, 2009, 5 pages.
International Search Report for PCT/US2010/024888 mailed Jun. 23, 2010, 5 pages.
International Search Report for PCT/US2010/027402 mailed Jun. 16, 2010, 2 pages.
Corning Cable Systems, "MTX Frames and Accessories," Feb. 2006, 4 pages.
Panduit, "Lock-in LC Duplex Clip," Accessed Mar. 22, 2012, 1 page.
International Search Report for PCT/US06/49351 mailed Apr. 25, 2008, 1 page.
International Search Report for PCT/US09/57069 mailed Mar. 24, 2010, 2 pages.
International Search Report for PCT/US2009/057244 mailed Nov. 9, 2009 3 pages.
International Search Report for PCTUS2009004548 mailed Mar. 19, 2010, 5 pages.
International Search Report for PCTUS2009004549 mailed Apr. 20, 2010, 6 pages.
Siecor, "Single Shelf HDF with Slack Storage and Heat Shield (HH1-CSH-1238-1V-BS)," Jan. 1998, 12 pages.
Corning Cable Systems, "Mass Termination Xchange (MTX) Frame System Equipment Office Planning and Application Guide," SRP003-664, Issue 1, Mar. 2005, 57 pages.
Corning Cable Systems, "Mass Termination Xchange (MTX) Equipment Patch Cord Interbay Vertical Channel," SRP003-684, Issue 1, Mar. 2005, 8 pages.
Corning Cable Systems, "High Density Frame (HDF) Installation," SRP003-355, Issue 4, Sep. 2002, 18 pages.
Written Opinion for PCT/US2010/023901 mailed Aug. 25, 2011, 8 pages.
Advisory Action for U.S. Appl. No. 12/221,117 mailed Aug. 24, 2011, 3 pages.

(56) References Cited

OTHER PUBLICATIONS

Examiner's Answer to Appeal Brief for U.S. Appl. No. 12/221,117 mailed Mar. 29, 2012, 16 pages.
Final Office Action for U.S. Appl. No. 12/221,117 mailed Feb. 19, 2010, 7 pages.
Final Office Action for U.S. Appl. No. 12/221,117 mailed Jun. 10, 2011, 8 pages.
Non-final Office Action for U.S. Appl. No. 12/221,117 mailed Jul. 14, 2010, 7 pages.
Non-final Office Action for U.S. Appl. No. 12/221,117 mailed Jun. 9, 2009, 5 pages.
Non-final Office Action for U.S. Appl. No. 12/221,117 mailed Dec. 21, 2010, 7 pages.
Advisory Action for U.S. Appl. No. 12/394,483 mailed Feb. 16, 2012, 3 pages.
Final Office Action for U.S. Appl. No. 12/394,483 mailed Dec. 6, 2011, 14 pages.
Non-final Office Action for U.S. Appl. No. 12/394,483 mailed Jun. 17, 2011, 11 pages.
Advisory Action for U.S. Appl. No. 12/950,234 mailed Dec. 21, 2011, 3 pages.
Non-final Office Action for U.S. Appl. No. 12/950,234 mailed Jun. 17, 2011, 7 pages.
Non-final Office Action for U.S. Appl. No. 12/950,234 mailed Mar. 12, 2012, 10 pages.
Final Office Action for U.S. Appl. No. 12/950,234 mailed Oct. 14, 2011, 10 pages.
Advisory Action mailed May 12, 2011, for U.S. Appl. No. 12/323,423, 3 pages.
Final Rejection mailed Mar. 3, 2011, for U.S. Appl. No. 12/323,423, 17 pages.
Non-Final Rejection mailed Aug. 5, 2011, for U.S. Appl. No. 12/323,423, 13 pages.
Unknown, Author, "QuickNet SFQ Series MTP Fiber Optic Cassettes," Panduit Specification Sheet, Jan. 2009, 2 pages.
Unknown Author, "Cellular Specialties introduces the first simulated in-building location-based tracking solution," smart-grid.tmenet.com/news, Sep. 14, 2009, 2 pages.
Unknown Author, "CDMA Co-Pilot Transmitter," Cellular Specialties, Inc., Aug. 2009, 2 pages.
International Search Report for PCT/US2010/038986 mailed Aug. 18, 2010, 1 page.
International Search Report for PCT/US2010/023901 mailed Jun. 11, 2010, 3 pages.
Notice of Allowance for U.S. Appl. No. 12/576,769 mailed May 31, 2012, 9 pages.
Non-final Office Action for U.S. Appl. No. 12/576,806 mailed Dec. 13, 2011, 6 pages.
Notice of Allowance for U.S. Appl. No. 12/576,806 mailed Apr. 18, 2012, 5 pages.
Non-Final Rejection mailed Sep. 7, 2010, for U.S. Appl. No. 12/323,423, 18 pages.
Notice of Allowance for U.S. Appl. No. 12/323,423 mailed Jan. 24, 2012, 8 pages.
Examiner's Answer mailed Mar. 4, 2011, for U.S. Appl. No. 12/323,415, 11 pages.
Final Rejection mailed Jun. 25, 2010, for U.S. Appl. No. 12/323,415, 10 pages.
Non-Final Rejection mailed Aug. 5, 2011, for U.S. Appl. No. 12/323,415, 41 pages.
Non-final Office Action for U.S. Appl. No. 12/323,415 mailed Apr. 23, 2012, 11 pages.
Non-Final Rejection mailed Dec. 10, 2009, for U.S. Appl. No. 12/323,415, 7 pages.
Examiner's Answer to Appeal Brief for U.S. Appl. No. 11/320,062 mailed Dec. 8, 2011, 8 pages.
Final Office Action for U.S. Appl. No. 11/320,062 mailed Mar. 8, 2011, 8 pages.
Non-final Office Action for U.S. Appl. No. 11/320,062 mailed Jan. 15, 2010, 11 pages.
Non-final Office Action for U.S. Appl. No. 12/320,062 mailed Sep. 30, 2010, 7 pages.
Final Office Action for U.S. Appl. No. 11/439,086 mailed Feb. 4, 2010, 14 pages.
Non-final Office Action for U.S. Appl. No. 11/439,086 mailed May 3, 2010, 11 pages.
Non-final Office Action for U.S. Appl. No. 11/439,086 mailed Sep. 21, 2009, 10 pages.
Final Office Action for U.S. Appl. No. 12/079,481 mailed Mar. 18, 2010, 10 pages.
Non-final Office Action for U.S. Appl. No. 12/079,481 mailed Dec. 26, 2008, 9 pages.
Non-final Office Action for U.S. Appl. No. 12/079,481 mailed Sep. 16, 2009, 10 pages.
Notice of Allowance for U.S. Appl. No. 12/079,481 mailed Jun. 3, 2010, 6 pages.
Notice of Allowance for U.S. Appl. No. 12/079,481 mailed Oct. 4, 2010, 4 pages.
Final Office Action for U.S. Appl. No. 12/394,114 mailed Dec. 22, 2011, 8 pages.
Non-final Office Action for U.S. Appl. No. 12/394,114 mailed Mar. 16, 2012, 8 pages.
Non-final Office Action for U.S. Appl. No. 12/394,114 mailed Sep. 1, 2011, 7 pages.
Non-final Office Action for U.S. Appl. No. 12/323,373 mailed May 3, 2012, 7 pages.
Non-final Office Action for U.S. Appl. No. 11/809,474 mailed Apr. 8, 2008, 13 pages.
Non-final Office Action for U.S. Appl. No. 11/809,474 mailed Nov. 13, 2008, 10 pages.
Notice of Allowance for U.S. Appl. No. 11/809,474 mailed Jul. 6, 2009, 6 pages.
Final Office Action for U.S. Appl. No. 11/320,031 mailed Mar. 8, 2011, 8 pages.
Non-final Office Action for U.S. Appl. No. 11/320,031 mailed Jan. 5, 2010, 16 pages.
Non-final Office Action for U.S. Appl. No. 11/320,031 mailed Sep. 30, 2010, 7 pages.
Notice of Allowance for U.S. Appl. No. 11/320,031 mailed Nov. 15, 2011, 7 pages.
Non-final Office Action for U.S. Appl. No. 12/157,622 mailed Mar. 31, 2009, 9 pages.
Non-final Office Action for U.S. Appl. No. 12/157,622 mailed Oct. 15, 2009, 9 pages.
Notice of Allowance for U.S. Appl. No. 12/157,622 mailed Apr. 22, 2010, 4 pages.
Non-final Office Action for U.S. Appl. No. 12/323,395 mailed Dec. 8, 2011, 7 pages.
Non-final Office Action for U.S. Appl. No. 12/415,454 mailed Mar. 2, 2012, 5 pages.
Non-final Office Action for U.S. Appl. No. 12/415,454 mailed Sep. 6, 2011, 7 pages.
Notice of Allowance for U.S. Appl. No. 12/415,454 mailed Jan. 13, 2012, 5 pages.
Non-final Office Action for U.S. Appl. No. 12/576,769 mailed Feb. 2, 2012, 23 pages.
Notice of Allowance for U.S. Appl. No. 12/415,454 mailed Jun. 19, 2012, 5 pages.
Final Office Action for U.S. Appl. No. 12/394,114 mailed Oct. 25, 2012, 8 pages.
Non-final Office Action for U.S. Appl. No. 12/732,487 mailed Sep. 19, 2012, 22 pages.
Non-final Office Action for U.S. Appl. No. 12/818,986 mailed Feb. 3, 2012, 12 pages.
Final Office Action for U.S. Appl. No. 12/818,986 mailed Oct. 18, 2012, 13 pages.
Non-final Office Action for U.S. Appl. No. 12/952,960 mailed Oct. 4, 2012, 11 pages.
Non-final Office Action for U.S. Appl. No. 12/915,682 mailed Oct. 24, 2012, 8 pages.
Non-final Office Action for U.S. Appl. No. 12/946,139 mailed Jul. 26, 2012, 12 pages.

(56) References Cited

OTHER PUBLICATIONS

European Search Report for patent application 10790017.7 mailed Nov. 8, 2012, 7 pages.
Final Office Action for U.S. Appl. No. 12/946,139 mailed Feb. 15, 2013, 17 pages.
Non-final Office Action for U.S. Appl. No. 12/751,884 mailed Feb. 15, 2013, 5 pages.
Non-final Office Action for U.S. Appl. No. 12/394,114 mailed Feb. 27, 2013, 8 pages.
Non-final Office Action for U.S. Appl. No. 12/819,065 mailed Mar. 4, 2013, 7 pages.
Final Office Action for U.S. Appl. No. 12/952,960 mailed Mar. 7, 2013, 13 pages.
Notice of Allowance for U.S. Appl. No. 12/732,487 mailed Mar. 19, 2013, 11 pages.
Final Office Action for U.S. Appl. No. 12/641,617 mailed May 10, 2013, 21 pages.
Examination Report for European patent application 09789090.9-2216 mailed Aug. 29, 2011, 4 pages.
Examination Report for European patent application 09789090.9-2216 mailed Mar. 30, 2012, 6 pages.
Written Opinion of the International Searching Authority for International patent application PCT/US2009004548, mailed Apr. 5, 2011, 6 pages.
European Search Report for European patent application 09789090.9-2217 mailed Jan. 24, 2013, 5 pages.
Notice of Allowance for U.S. Appl. No. 13/090,621 mailed Apr. 22, 2013, 8 pages.
Final Office Action for U.S. Appl. No. 12/953,039 mailed May 1, 2013, 8 pages.
Final Office Action for U.S. Appl. No. 12/953,118 mailed May 3, 2013, 11 pages.
Final Office Action for U.S. Appl. No. 12/915,682 mailed Apr. 18, 2013, 9 pages.
Advisory Action for U.S. Appl. No. 12/952,960 mailed May 15, 2013, 2 pages.
Non-final Office Action for U.S. Appl. No. 12/952,960 mailed Jun. 20, 2013, 13 pages.
Non-final Office Action for U.S. Appl. No. 12/953,536 mailed Jun. 6, 2013, 21 pages.
Non-final Office Action for U.S. Appl. No. 11/820,300 mailed Apr. 25, 2012, 10 pages.
Final Office Action for U.S. Appl. No. 12/871,052 mailed Jul. 1, 2013, 12 pages.
Non-final Office Action for U.S. Appl. No. 12/940,699 mailed Jun. 26, 2013, 9 pages.
Notice of Allowance for U.S. Appl. No. 13/090,621 mailed Jun. 25, 2013, 8 pages.
Non-Final Office Action for U.S. Appl. No. 12/953,039 mailed Jan. 11, 2013, 6 pages.
Non-Final Office Action for U.S. Appl. No. 12/952,912 mailed Dec. 28, 2012, 9 pages.
Non-Final Office Action for U.S. Appl. No. 12/953,118 mailed Jan. 7, 2013, 9 pages.
Non-Final Office Action for U.S. Appl. No. 12/707,889 mailed Jan. 2, 2013, 7 pages.
Non-Final Office Action for U.S. Appl. No. 12/953,536 mailed Jan. 2, 2013, 20 pages.
Non-final Office Action for U.S. Appl. No. 13/302,067 mailed Jun. 7, 2013, 13 pages.
Notice of Allowance for U.S. Appl. No. 12/751,884 mailed Jul. 17, 2013, 8 pages.
Non-final Office Action for U.S. Appl. No. 12/940,585 mailed Aug. 16, 2013, 14 pages.
Final Office Action for U.S. Appl. No. 12/771,473 mailed Jul. 19, 2013, 7 pages.
Ex parte Quayle Action for U.S. Appl. No. 12/953,164 mailed Aug. 16, 2013, 5 pages.
Non-final Office Action for U.S. Appl. No. 12/732,487 mailed Jul. 17, 2013, 22 pages.
Non-final Office Action and Interview Summary for U.S. Appl. No. 12/707,889 mailed Aug. 8, 2013, 15 pages.
Advisory Action for U.S. Appl. No. 12/953,039 mailed Jul. 12, 2013, 3 pages.
Advisory Action for U.S. Appl. No. 12/953,118 mailed Jul. 12, 2013, 3 pages.
Advisory Action for U.S. Appl. No. 12/641,617 mailed Jul. 29, 2013, 3 pages.
Final Office Action for U.S. Appl. No. 12/952,912 mailed Aug. 30, 2013, 15 pages.
Advisory Action for U.S. Appl. No. 12/771,473 mailed Oct. 2, 2013, 3 pages.
Notice of Allowance for U.S. Appl. No. 12/641,617 mailed Sep. 4, 2013, 9 pages.
Notice of Allowance for U.S. Appl. No. 12/871,052 mailed Sep. 18, 2013, 9 pages.
Non-final Office Action for U.S. Appl. No. 12/953,039 mailed Sep. 12, 2013, 8 pages.
Non-final Office Action for U.S. Appl. No. 12/946,139 mailed Oct. 2, 2013, 18 pages.
Final Office Action for U.S. Appl. No. 12/394,114 mailed Oct. 4, 2013, 10 pages.
Non-final Office Action for U.S. Appl. No. 12/818,986 mailed Oct. 4, 2013, 19 pages.
Final Office Action for U.S. Appl. No. 12/952,960 mailed Oct. 29, 2013, 8 pages.
Notice of Allowance for U.S. Appl. No. 13/292,130 mailed Oct. 18, 2013, 9 pages.
Non-final Office Action for U.S. Appl. No. 13/901,074 mailed Oct. 9, 2013, 6 pages.
Non-final Office Action for U.S. Appl. No. 12/956,446 mailed Sep. 6, 2013, 10 pages.

\* cited by examiner

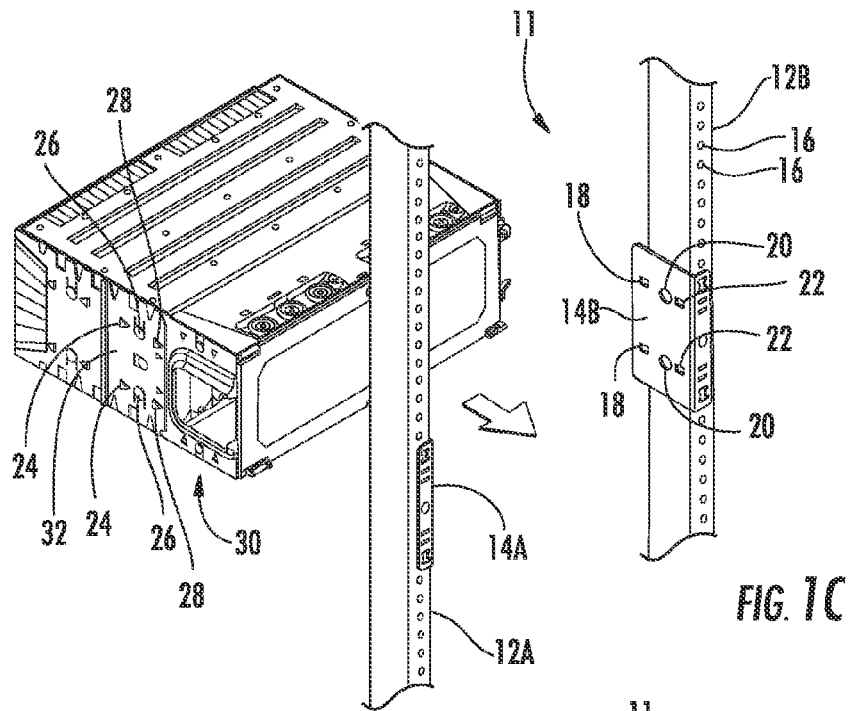
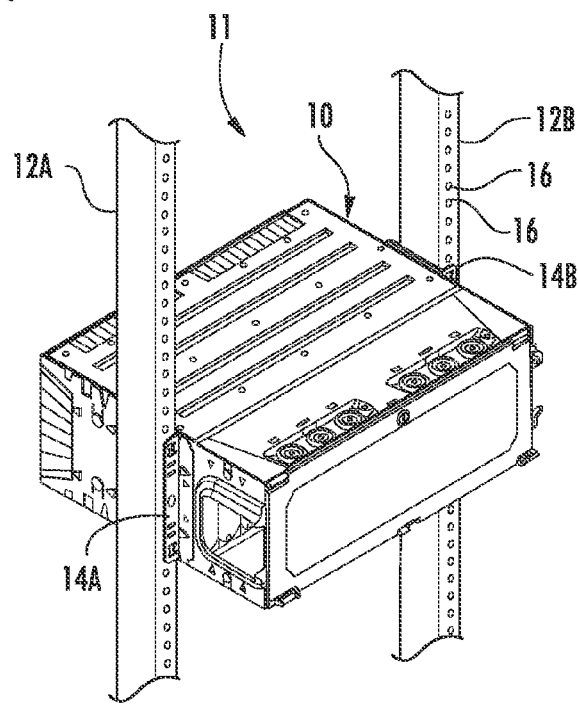

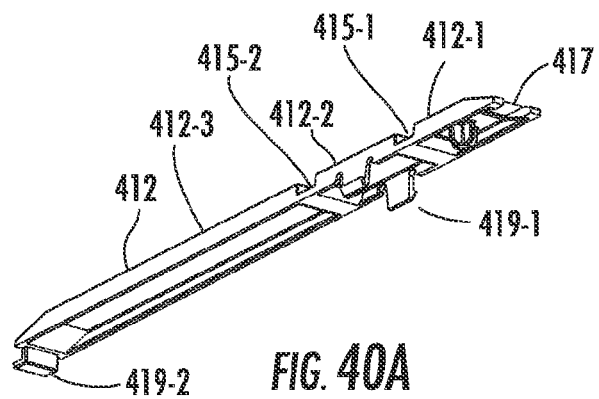
FIG. 40A
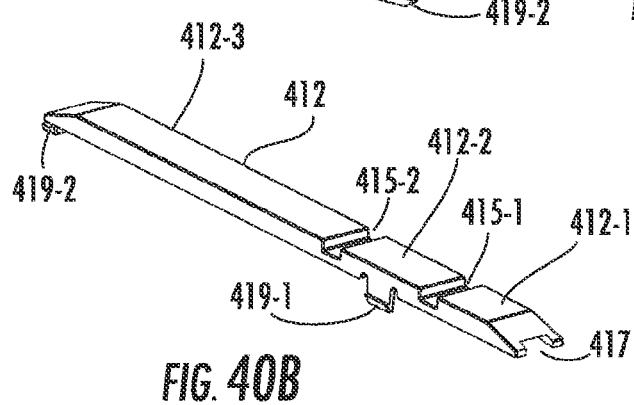
FIG. 40B
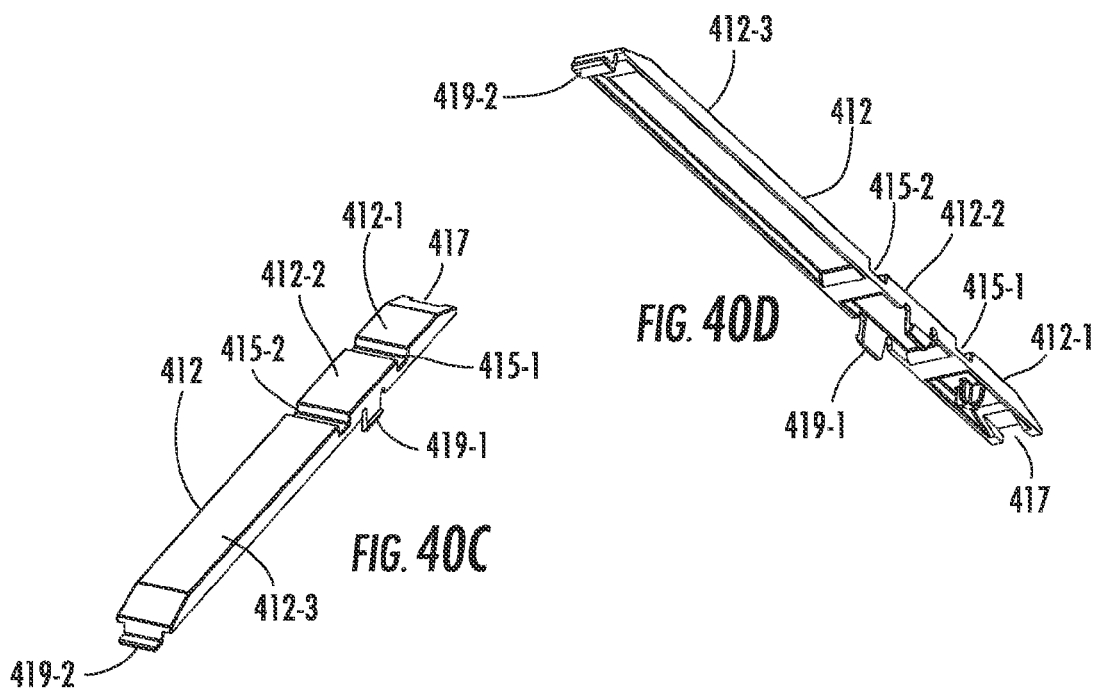
FIG. 40C
FIG. 40D

FIBER OPTIC HOUSINGS CONFIGURED FOR TOOL-LESS ASSEMBLY, AND RELATED COMPONENTS AND METHODS

RELATED APPLICATIONS

The present application claims priority to U.S. Provisional Patent Application Ser. No. 61/332,572, filed May 7, 2010, entitled "Fiber Optic Housing," the disclosure of which is relied upon and incorporated herein by reference in its entirety.

The present application is related to U.S. patent application Ser. No. 12/953,101, filed Nov. 23, 2010, entitled "Apparatuses and Related Components And Methods For Expanding Capacity Of Fiber Optic Housings," the disclosure of which is relied upon and incorporated herein by reference in its entirety.

The present application is also related to U.S. patent application Ser. No. 12/953,164, filed Nov. 23, 2010, entitled "Fiber Optic Housings Having A Removable Top, And Related Components and Methods," the disclosure of which is relied upon and incorporated herein by reference in its entirety.

The present application is also related to U.S. patent application Ser. No. 12/953,003, filed Nov. 23, 2010, entitled "Removable Fiber Management Devices For Fiber Optic Housings, and Related Components And Methods," the disclosure of which is relied upon and incorporated herein by reference in its entirety.

The present application is also related to U.S. patent application Ser. No. 12/953,039, filed Nov. 23, 2010, entitled "Door Fiber Management For Fiber Optic Housings, and Related Components And Methods," the disclosure of which is relied upon and incorporated herein by reference in its entirety.

The present application is also related to U.S. patent application Ser. No. 12/952,960, filed Nov. 23, 2010, entitled "Fiber Management Devices For Fiber Optic Housings, And Related Components and Methods," the disclosure of which is relied upon and incorporated herein by reference in its entirety.

The present application is also related to U.S. patent application Ser. No. 12/952,912, filed Nov. 23, 2010, entitled "Apparatuses And Related Components And Methods For Attachment and Release Of Fiber Optic Housings To And From An Equipment Rack," the disclosure of which is relied upon and incorporated herein by reference in its entirety.

The present application is also related to U.S. patent application Ser. No. 12/953,118, filed Nov. 23, 2010, entitled "Removable Fiber Management Sections For Fiber Optic Housings, and Related Components And Methods," the disclosure of which is relied upon and incorporated herein by reference in its entirety.

The present application is also related to U.S. Provisional Patent Application Ser. No. 61/329,898, filed Apr. 30, 2010, entitled "Rotatable Routing Guide Assembly" the contents of which are relied upon and incorporated herein by reference in their entirety.

The present application is also related to U.S. Provisional Patent Application Ser. No. 61/332,572, filed May 7, 2010, entitled "Fiber Optic Housing" the contents of which are relied upon and incorporated herein by reference in their entirety.

The present application is also related to U.S. Provisional Patent Application Ser. No. 61/332,548, filed May 7, 2010, entitled "Attachment Housing for a Fiber Optic Housing" the contents of which are relied upon and incorporated herein by reference in their entirety.

The present application is also related to U.S. Provisional Patent Application Ser. No. 61/332,529, filed May 7, 2010, entitled "Fiber Optic Management Area in a Fiber Optic Housing" the contents of which are relied upon and incorporated herein by reference in their entirety.

The present application is also related to U.S. Provisional Patent Application Ser. No. 61/332,508, filed May 7, 2010, entitled "Grommet and Routing Clip Assembly" the contents of which are relied upon and incorporated herein by reference in their entirety.

The present application is also related to U.S. Provisional Patent Application Ser. No. 61/329,925, filed Apr. 30, 2010, entitled "Fiber Optic Housing Adapted to Accommodate Both Modules and Panels," the disclosure of which is relied upon and incorporated herein by reference in its entirety.

The present application is also related to U.S. patent application Ser. No. 12/940,585, filed Nov. 5, 2010, entitled "Fiber Optic Housings Configured to Accommodate Fiber Optic Modules/Cassettes and Fiber Optic Panels, and Related Components and Methods," the disclosure of which is relied upon and incorporated herein by reference in its entirety.

The present application is related to U.S. Provisional Patent Application Ser. No. 61/329,948, filed Apr. 30, 2010, entitled "Stackable Shelf for a Fiber Optic Housing," the disclosure of which is relied upon and incorporated herein by reference in its entirety.

The present application is also related to U.S. patent application Ser. No. 12/940,699, filed Nov. 5, 2010, entitled "Stackable Shelves For a Fiber Optic Housing, and Related Components and Methods," the disclosure of which is relied upon and incorporated herein by reference in its entirety.

The present application is also related to U.S. Patent Application Ser. No. 61/180,331, filed May 21, 2009, entitled "Fiber Optic Equipment Guides and Rails Configured With Stopping Position(s), and Related Equipment," the disclosure of which is relied upon and incorporated herein by reference in its entirety.

The present application is also related to U.S. patent application Ser. No. 12/576,806, filed Oct. 9, 2009, entitled "Fiber Optic Equipment Guides and Rails Configured With Stopping Position(s), and Related Equipment and Methods," the disclosure of which is relied upon and incorporated herein by reference in its entirety.

BACKGROUND

1. Field of the Disclosure

The technology of the disclosure relates to fiber optic housings for supporting fiber optic equipment, including but not limited to fiber optic equipment that provides interconnect and/or cross-connect capabilities between optical components and opto-electrical components using fiber optic cables, and more particularly to fiber optic housings configured to be assembled without using tools.

2. Technical Background

Benefits of optical fiber include extremely wide bandwidth and low noise operation. Because of these advantages, optical fiber is increasingly being used for a variety of applications, including but not limited to broadband voice, video, and data transmission. Fiber optic networks employing optical fiber are being developed and used to deliver voice, video, and data transmissions to subscribers over both private and public networks. These fiber optic networks often include separated connection points linking optical fibers to provide a contiguous fiber optic link from one connection point to another connection point. In this regard, fiber optic equipment is located in data distribution centers or central offices to support interconnections.

The fiber optic equipment is customized based on the application need. The fiber optic equipment is typically included in housings designed to support the fiber optic equipment, which are mounted in equipment racks to optimize use of space. One example of such fiber optic equipment is a fiber optic module/cassette. A fiber optic module/cassette is designed to provide cable-to-cable fiber optic connections and manage the polarity of fiber optic cable connections. A fiber optic module or cassette is mounted to a chassis or housing that is specifically designed to support fiber optic modules and cassettes. Another example of such fiber optic equipment is a fiber optic panel (also referred to as a "patch panel"). A fiber optic panel is designed to provide connection or termination points for optical fiber. A fiber optic panel typically includes fiber optic adapters that are configured to receive fiber optic connectors connected to the optical fiber to be connected or terminated. A fiber optic panel is typically mounted to a chassis or housing that is specifically designed to support fiber optic panels.

A fiber optic housing is typically assembled from various parts by a technician using tools. Fiber optic equipment, such as fiber optic modules/cassettes and fiber optic panels as examples, may be loaded into and supported by a fiber optic housing prior to shipment to the installation site. Alternatively, the fiber optic equipment may be loaded into a fiber optic housing after shipment at the installation site. Whether loaded or unloaded, an assembled fiber optic housing consumes a given volume during shipping. It may be desirable and more cost efficient in terms of shipping costs to ship the components of the fiber optic housing unassembled to the installation site and assemble the components of the fiber optic housing on site.

SUMMARY OF THE DETAILED DESCRIPTION

Embodiments disclosed in the detailed description include fiber optic housings configured for tool-less assembly, and related components and methods. In one embodiment, a fiber optic housing is provided having a top, a bottom, a right side, and a left side which removably attach to each other tool-lessly, and by other than external fastening means, thereby defining at least one interior chamber configured to support fiber optic equipment. The top, bottom, right side, and left side of the fiber optic housing may be removably attached to each other by using a snap attachment integral to at least one of the bottom, the right side, and the left side. In an embodiment, the fiber optic housing further has one or more mounting brackets and/or strain relief brackets, which may be attached to the fiber optic housing by other than external fastening means. In another embodiment, the mounting brackets and/or strain relief brackets may be attached to a side of the fiber optic housing by using a quick snap attachment integral to at least one of the side of the fiber optic housing and the mounting brackets and/or strain relief brackets.

In another embodiment, a method of assembling a fiber optic housing without tools is disclosed. A top, a bottom, a right side, and a left side of a fiber optic housing are provided and attached to each other tool-lessly, by other than external fastening means, thereby defining at least one interior chamber configured to support fiber optic equipment. The top, bottom, right side, and left side of the fiber optic housing can also be detached tool-lessly. In one embodiment, the top, bottom, right side, and left side are removably attached to each other by using snap attachments integral to at least one of the top, the bottom, the right side, and the left side. In an embodiment, the method further comprises removably mounting a side mounting bracket and/or a strain relief bracket to the fiber optic housing. In one embodiment, the side mounting bracket or the strain relief bracket is attached to the fiber optic housing by using snap attachments on a side of the fiber optic housing. In another embodiment, the method further comprises removably mounting the fiber optic housing to an equipment rack tool-lessly, and by other than external fastening means, using a side mounting bracket.

In this disclosure, "tool-less" assembly of any set of components is used to refer to the assembly of that set of components being done without the use of tools or external fastening means. One non-limiting example of "tool-less" assembly is when a set of components is assembled using fastening means, such as snap attachments, that are integral to one or more of the components in the set of components. Once the set of components is assembled tool-lessly, then the assembled set of components may be attached to another component or device using external fasteners and tools, and even with this use of external fasteners and tools, the assembly of the original set of components is still considered to be "tool-less."

Additional features and advantages will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE FIGURES

FIG. 1C is a front perspective view of the fiber optic housing of FIG. 1A being mounted to the equipment rack in FIG. 1A from the rear of the equipment rack;

FIG. 1D is a front perspective view of the fiber optic housing in FIG. 1A after being mounted to the equipment rack in FIG. 1A from the rear of the equipment rack;

FIGS. 40A-40D illustrate various views of exemplary rails to be used in mounting exemplary fiber optic splice cassettes in an exemplary fiber optic housing;

DETAILED DESCRIPTION OF THE EMBODIMENTS

Reference will now be made in detail to certain embodiments, examples of which are illustrated in the accompanying drawings, in which some, but not all features are illustrated. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include apparatuses, and related components and methods for attachment and release of fiber optic housings to and from equipment racks. The fiber optic housings may be attached to equipment racks such that the fiber optic housings may be easily and quickly removed from the equipment rack. In one embodiment, a fiber optic apparatus is disclosed that comprises a fiber optic housing and at least one mounting bracket. The fiber optic housing may have a top, a bottom, a right side, and a left side defining at least one interior chamber configured to support fiber optic equipment. The at least one mounting bracket is configured to removably attach to at least one of the right side or the left side of the fiber optic housing. The at least one mounting bracket is also configured to attach the fiber optic housing to an equipment rack. In one embodiment, the at least one mounting bracket is configured to removably attach to the at least one of the right side or the left side of the fiber optic housing tool-lessly, and by other than external fastening means. In an embodiment, the at least one mounting bracket is removably attached to the at least one of the right side or the left side of the fiber optic housing by a snap attachment integral to at least one of the right side or the left side.

In this regard, FIGS. 1A-1G illustrate a first embodiment of a fiber optic housing 10 that may be attached to and removed from an equipment rack 11 easily and quickly. The fiber optic housing 10 is configured to support fiber optic equipment for establishing fiber optic connections. As non-limiting examples, the fiber optic equipment may include fiber optic modules and/or fiber optic panels. As described in more detail below, the fiber optic housing 10 may be removably attached to the equipment rack 11 from the front or the rear of the equipment rack 11, as is illustrated in FIGS. 1A-1G.

Figure 1A:
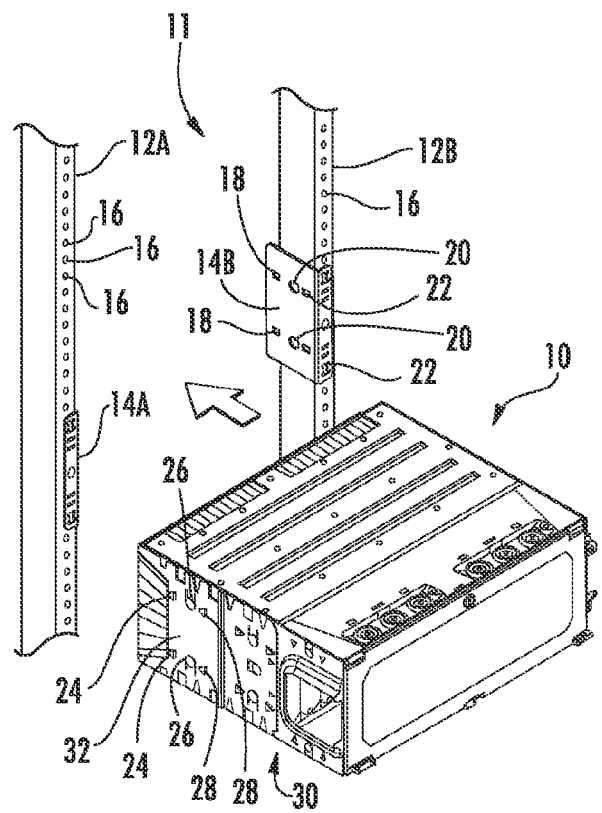
FIG. 1A is a front perspective view of an exemplary fiber optic housing being mounted to an exemplary equipment rack from the front of the equipment rack.
Figure 1B:
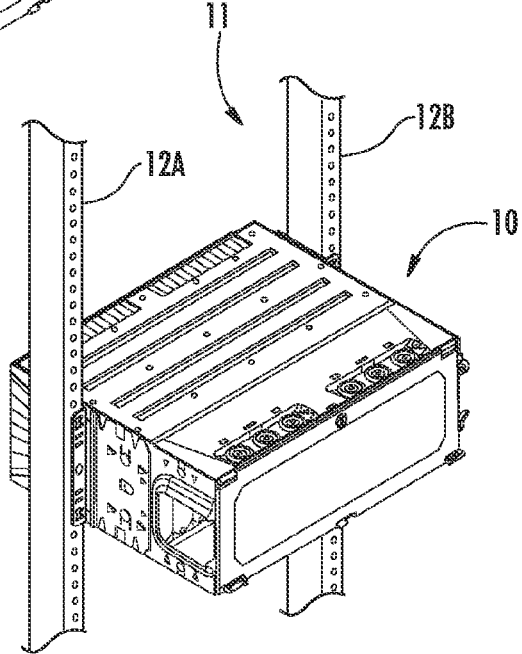
FIG. 1B is a front perspective view of the fiber optic housing in FIG. 1A after being mounted to the equipment rack in FIG. 1A from the front of the equipment rack.

FIG. 1A is a front perspective view of the fiber optic housing 10 being mounted to the equipment rack 11 from the front of the equipment rack 11. FIG. 1B is a front perspective view of the fiber optic housing 10 after it has been mounted to the equipment rack 11 from the front. Referring to FIG. 1A, the equipment rack 11 may comprise a pair of vertical supports 12A, 12B in one embodiment. Mounting brackets 14A, 14B may be attached to the vertical supports 12A, 12B to support the fiber optic housing 10 in the equipment rack 11. The mounting brackets 14A, 14B may be mounted on the equipment rack 11 before sliding the fiber optic housing 10 into the equipment rack 11. However, in other embodiments, the mounting brackets 14A, 14B may be snapped onto the side of the fiber optic housing 10 first. In one embodiment, each of the pair of vertical supports 12A, 12B of the equipment rack 11 includes a plurality of openings or holes 16 disposed along the length of the vertical supports 12A, 12B of the equipment rack 11 configured to receive a fastener to attach the mounting brackets 14A, 14B to the vertical supports 12A, 12B.

In one embodiment, the mounting brackets 14A, 14B are mounted to the vertical supports 12A, 12B before the fiber optic housing 10 is installed in the equipment rack 11. The fiber optic housing 10 is then slid into place in the equipment rack 11 and removably attached to the mounting brackets 14A, 14B using features disclosed herein. This process of supporting the fiber optic housing 10 in the equipment rack 11 may be easier for a technician than securing the mounting brackets 14A, 14B to the fiber optic housing 10 first before securing the mounting brackets 14A, 14B to the vertical supports 12A, 12B. The mounting brackets 14A, 14B are typically smaller, lighter, and easier for a technician to align to the holes 16 and evenly in the vertical supports 12A, 12B without having to support the additional weight of the fiber optic housing 10. Therefore, it may be safer for the technician to slide the fiber optic housing 10 into place in the mounting brackets 14A, 14B after the mounting brackets 14A, 14B are mounted to the equipment rack 11 than to use screws or other fasteners to try to attach the fiber optic housing 10 to the equipment rack 11.

Once the mounting brackets 14A, 14B are mounted to the equipment rack 11, the fiber optic housing 10 may be placed and secured into the equipment rack 11 by snapping the fiber optic housing 10 into place in the mounting brackets 14A, 14B. In one embodiment, the mounting brackets 14A, 14B may include a plurality of receivers 18, 20, and 22. Although the receivers 18, 20, and 22 may be seen only on the mounting bracket 14B in FIG. 1A, the mounting bracket 14A may have similar receivers 18, 20, and 22. In one embodiment as illustrated in FIG. 1A, there may be a pair of receivers 18, one at or near the top rear part of the mounting bracket 14B, and a corresponding receiver 18 at or near the bottom rear part of the mounting bracket 14B. The mounting bracket 14B may also include a pair of receivers 20, one at or near the top middle part of the mounting bracket 14B, and a corresponding receiver 20 at or near the bottom middle part of the mounting bracket 14B. The mounting bracket 14B may also include a pair of receivers 22, one at or near the top front part of the mounting bracket 14B, and a corresponding receiver 22 at or near the bottom front part of the mounting bracket 14B. Although the embodiment of FIG. 1A illustrates three (3) pairs of receivers 18, 20, and 22, any number of receivers sufficient to attach the fiber optic housing 10 to the mounting brackets 14A, 14B may be used.

In one embodiment, the fiber optic housing 10 may include a plurality of snap features 24, 26, and 28 disposed on a side 30 of the fiber optic housing 10. The snap features 24, 26, and 28 may also be referred to as snap attachments or snap attachment features. Although the snap features 24, 26, and 28 may be seen only on one side 30 of the fiber optic housing 10 in FIG. 1A, the fiber optic housing 10 may have similar snap features 24, 26, and 28 on the other side as well. In one embodiment, as seen in FIG. 1A, there may be a pair of snap features 24, one at or near the top rear part of a rear portion 32 of the side 30 of the fiber optic housing 10, and a corresponding snap feature 24 at or near the bottom rear part of the rear portion 32 of the side 30. The side 30 may also include a pair of snap features 26, one at or near the top middle part of the rear portion 32 of the side 30, and a corresponding snap feature 26 at or near the bottom middle part of the rear portion 32 of the side 30. The side 30 may also include a pair of snap features 28, one at or near the top front part of the rear portion 32 of the side 30, and a corresponding snap feature 28 at or near the bottom front part of the rear portion 32 of the side 30. Although the embodiment of FIG. 1A illustrates three (3) pairs of snap features 24, 26, and 28, any number of snap features 24, 26, and 28 sufficient to attach the fiber optic housing 10 to the mounting brackets 14A, 14B may be used.

The receivers 18, 20, and 22 of the mounting brackets 14A, 14B are configured to receive the snap features 24, 26, and 28 disposed on the sides 30 of the fiber optic housing 10. As the fiber optic housing 10 is slid into the equipment rack 12, the snap features 24, 26, and 28 disposed on the sides 30 of the fiber optic housing 10 selectably engage with the receivers 18, 20, and 22 of the mounting brackets 14A, 14B and are locked into place, thereby allowing the fiber optic housing 10 to be quickly and easily snapped into place in the equipment rack 11.

The receivers 18, 20, and 22 of the mounting brackets 14A, 14B may take a variety of shapes and sizes, as may the snap features 24, 26, and 28 disposed on the sides 30 of the fiber optic housing 10. The receivers 18, 20, and 22 may be of any shape and size that correspond to the shape and size of the snap features 24, 26, and 28 such that the snap features 24, 26, and 28 selectably engage with the receivers 18, 20, and 22 of the mounting brackets 14A, 14B and are locked into place to hold the fiber optic housing 10 in the equipment rack 11.

The fiber optic housing 10 may also be loaded into the equipment rack 11 from the rear of the equipment rack 11. FIG. 1C is a front perspective view of the fiber optic housing 10 as it is being mounted to the equipment rack 11 from the rear. FIG. 1D is a front perspective view of a fiber optic housing 10 after it has been mounted to the equipment rack 11 from the rear. The fiber optic housing 10 is snapped into place in a similar fashion as described above with respect to FIGS. 1A and 1B. The snap features 24, 26, and 28 on the side 30 of the fiber optic housing 10 selectably engage the receivers 18, 20, and 22 of the mounting brackets 14A, 14B as the fiber optic housing 10 is slid into the equipment rack 11. In this manner, the fiber optic housing 10 may be quickly and easily attached to the mounting brackets 14A, 14B, thereby installing the fiber optic housing 10 into the equipment rack 11.

Figure 1E:
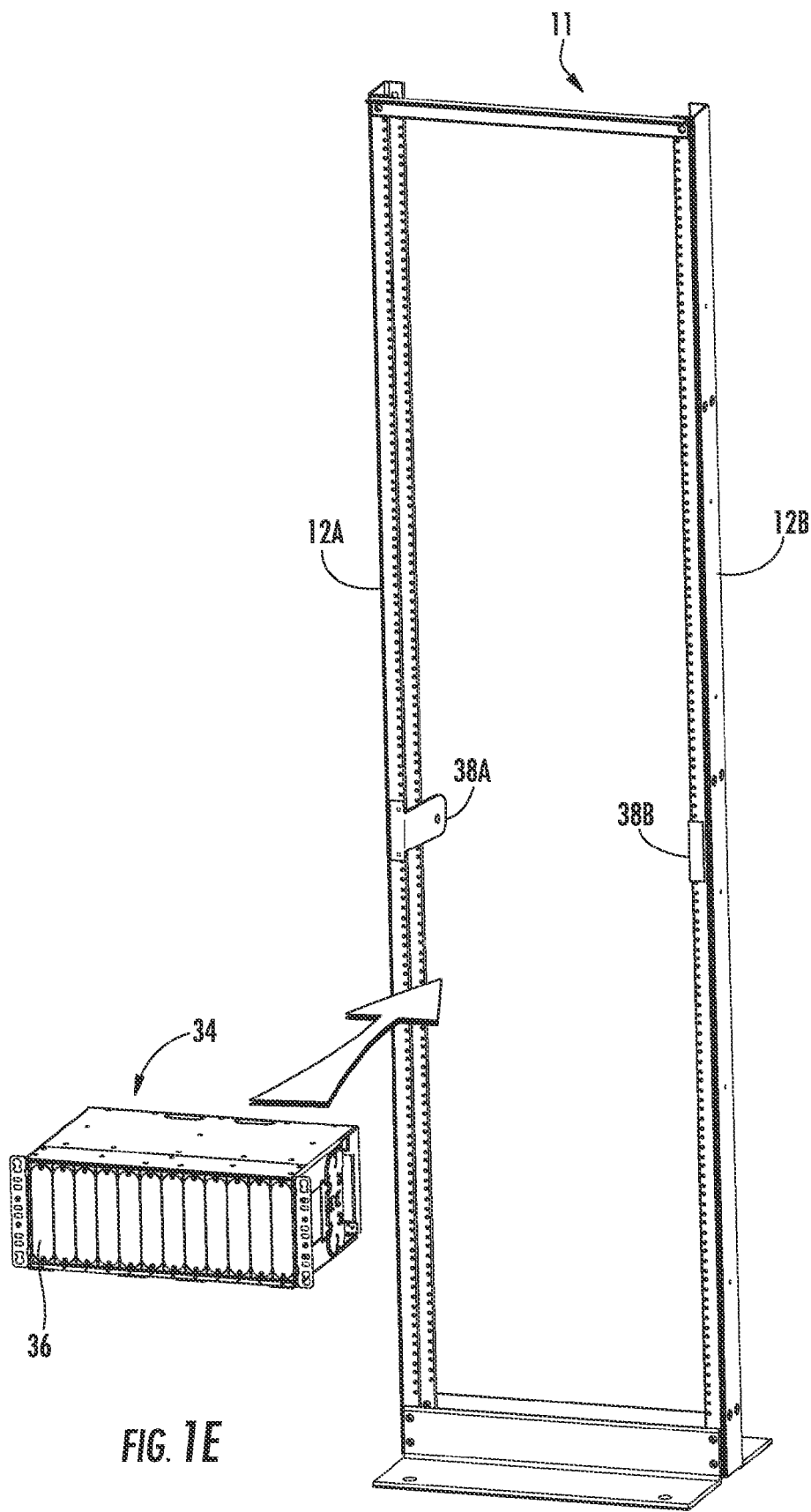
FIG. 1E is a front perspective view of an alternate exemplary fiber optic housing being mounted to an exemplary equipment rack from the front of the equipment rack.
Figure 1F:
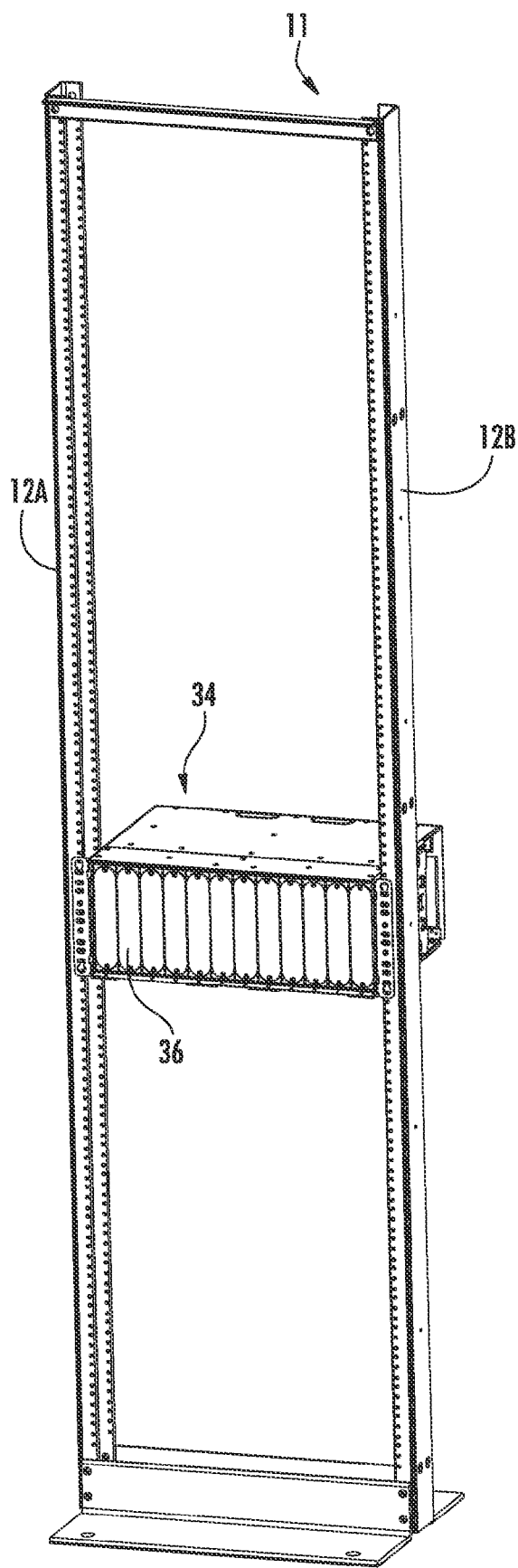
FIG. 1F is a front perspective view of the fiber optic housing in FIG. 1E after being mounted to the equipment rack in FIG. 1E.

Any type of fiber optic housing having the above described snap features may be quickly and easily mounted in an equipment rack having mounting brackets with receivers of the type described above. FIG. 1E is a front perspective view of an alternate embodiment of a fiber optic housing 34 being mounted to the equipment rack 11 from the front. FIG. 1F is a front perspective view of the alternate embodiment of the fiber optic housing 34 illustrated in FIG. 1E after being mounted to the equipment rack 11. The fiber optic housing 34 in FIG. 1E has fiber optic modules 36 vertically mounted in the fiber optic housing 34. The fiber optic housings 10 and 34 illustrated in FIGS. 1A-1F are 4U in this embodiment, but any size fiber optic housing may be mounted in an equipment rack having mounting brackets with the receivers disclosed above to selectably engage snap features disposed on the side of the fiber optic housing as disclosed above.

The designation "U" refers to a standard equipment shelf size of a fiber optic equipment rack or a cabinet. This may also be referred to as "RU." For example, an equipment rack may support 42 1U-sized shelves, with "U" equal to a standard 1.75 inches in height and nineteen (19) inches in width. In certain applications, the width of "U" may be twenty-three (23) inches. Other heights and widths may be designated as "U." Typically, the more rack space (the more "U's") a fiber optic housing takes up, the higher the fiber capacity in the fiber optic housing.

Figure 1G:
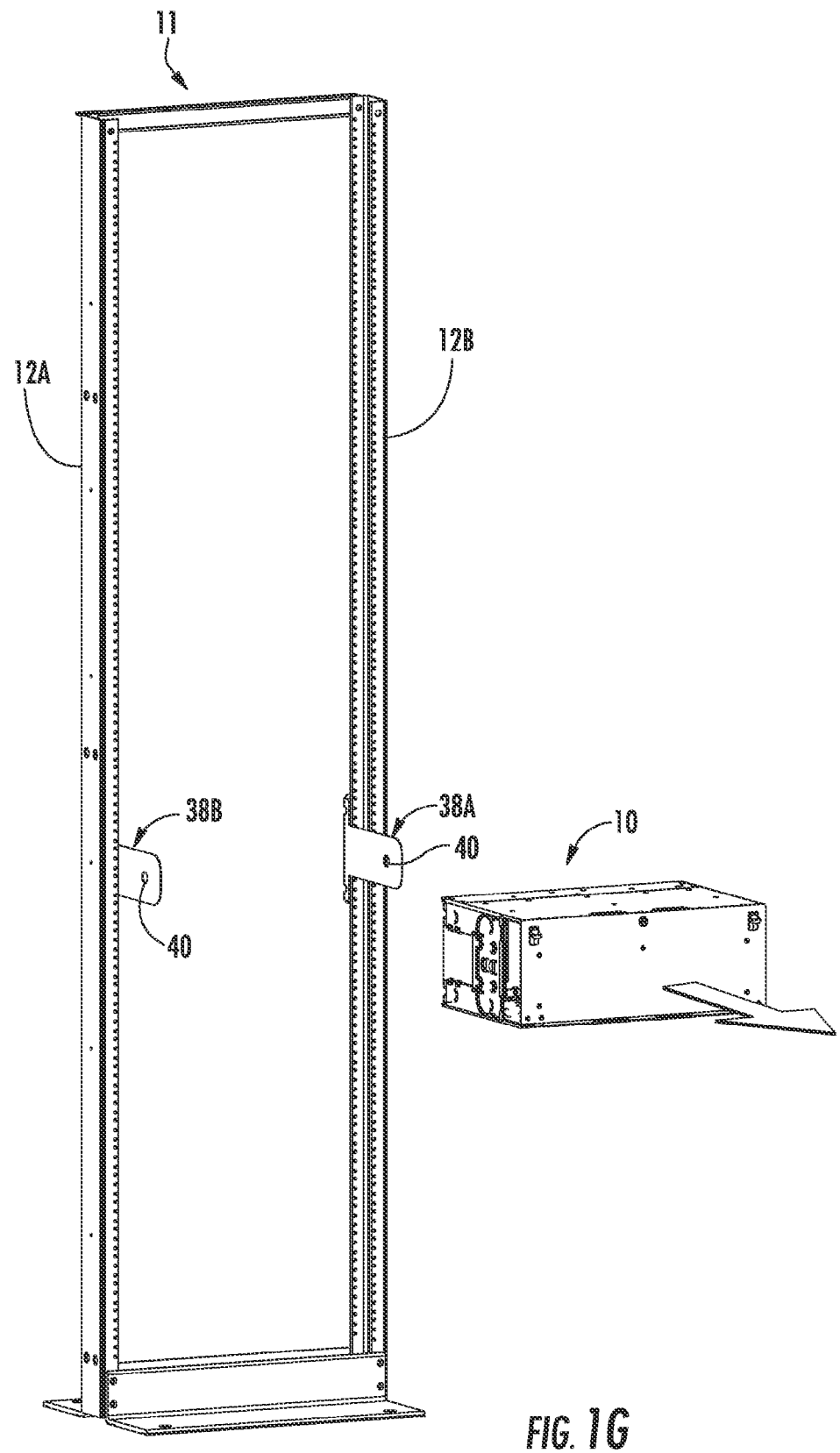
FIG. 1G is a rear perspective view of the fiber optic housing in FIG. 1E being removed from the equipment rack in FIG. 1E.

FIG. 1G is a rear perspective view of the fiber optic housing 34 being removed from the equipment rack 11. When the fiber optic housing 34 is removed from the equipment rack 11, as will be discussed in more detail below with respect to FIGS. 3A-3C and 4, mounting brackets 38A, 38B remain attached to the equipment rack 11. In this manner, the fiber optic housing 34 can be easily re-mounted into the equipment rack 11 at a later time if desired. As mentioned above, the mounting brackets 38A, 38B may have any number of receivers configured to receive snap features on a side of the fiber optic housing 34. In the embodiment seen in FIG. 1G, the mounting brackets 38A, 38B each have a single circular receiver 40.

Figure 2:
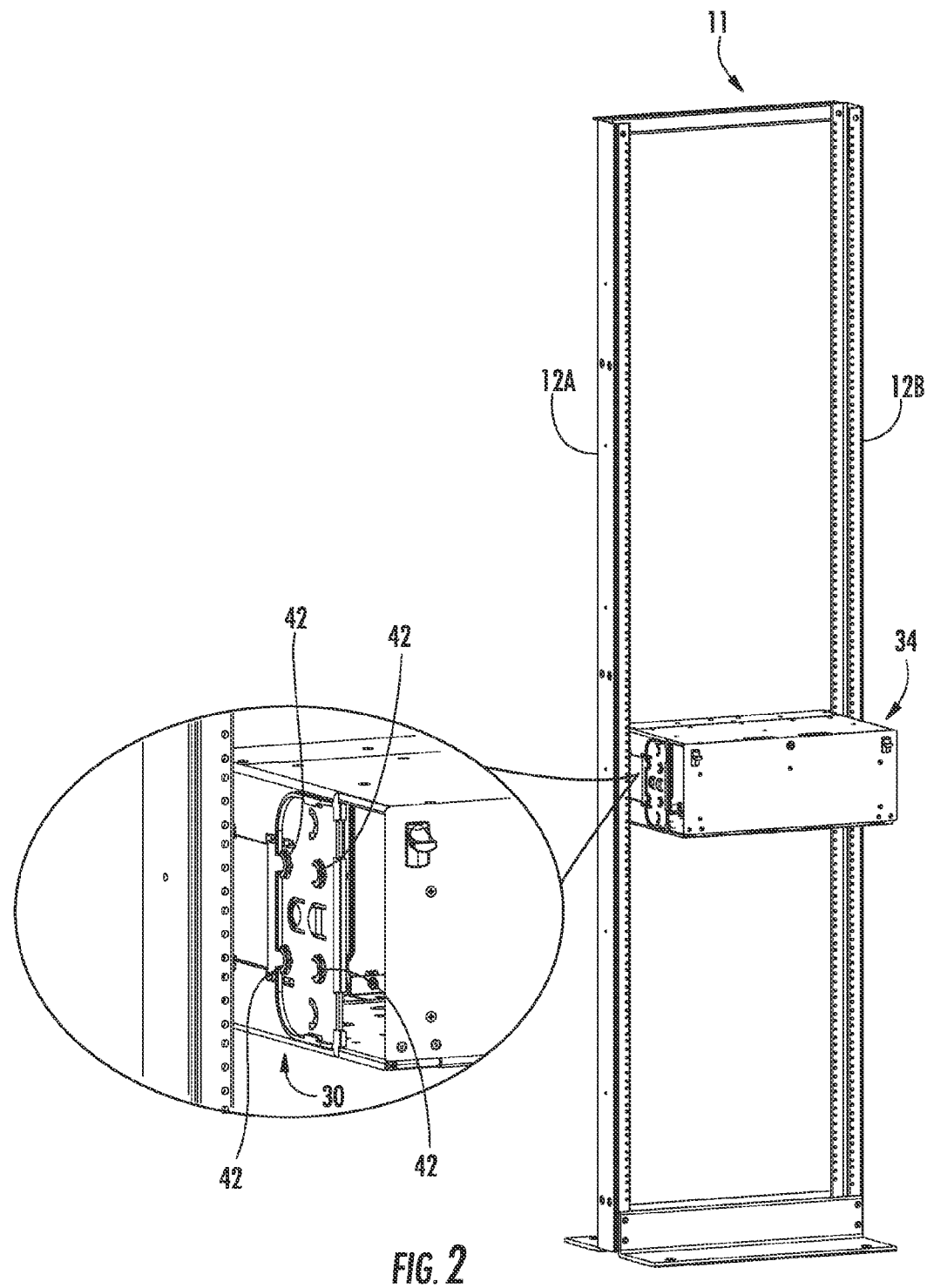
FIG. 2 is a rear view of the fiber optic housing in FIG. 1E mounted in the equipment rack in FIG. 1E with a close-up view of exemplary snap features disposed on a side of the fiber optic housing.

FIG. 2 is a rear view of the fiber optic housing 34 mounted in the equipment rack 11 with a close-up view of snap features disposed on the side 30 of the fiber optic housing 34. The fiber optic housing 34 in this embodiment has a plurality of snap features 42 disposed on the side 30 of the fiber optic housing 34. The snap features 42 in FIG. 2 are of a half-circle shape and are configured to selectably engage with corresponding receivers on the mounting brackets attached to the equipment rack 11.

Figure 3:
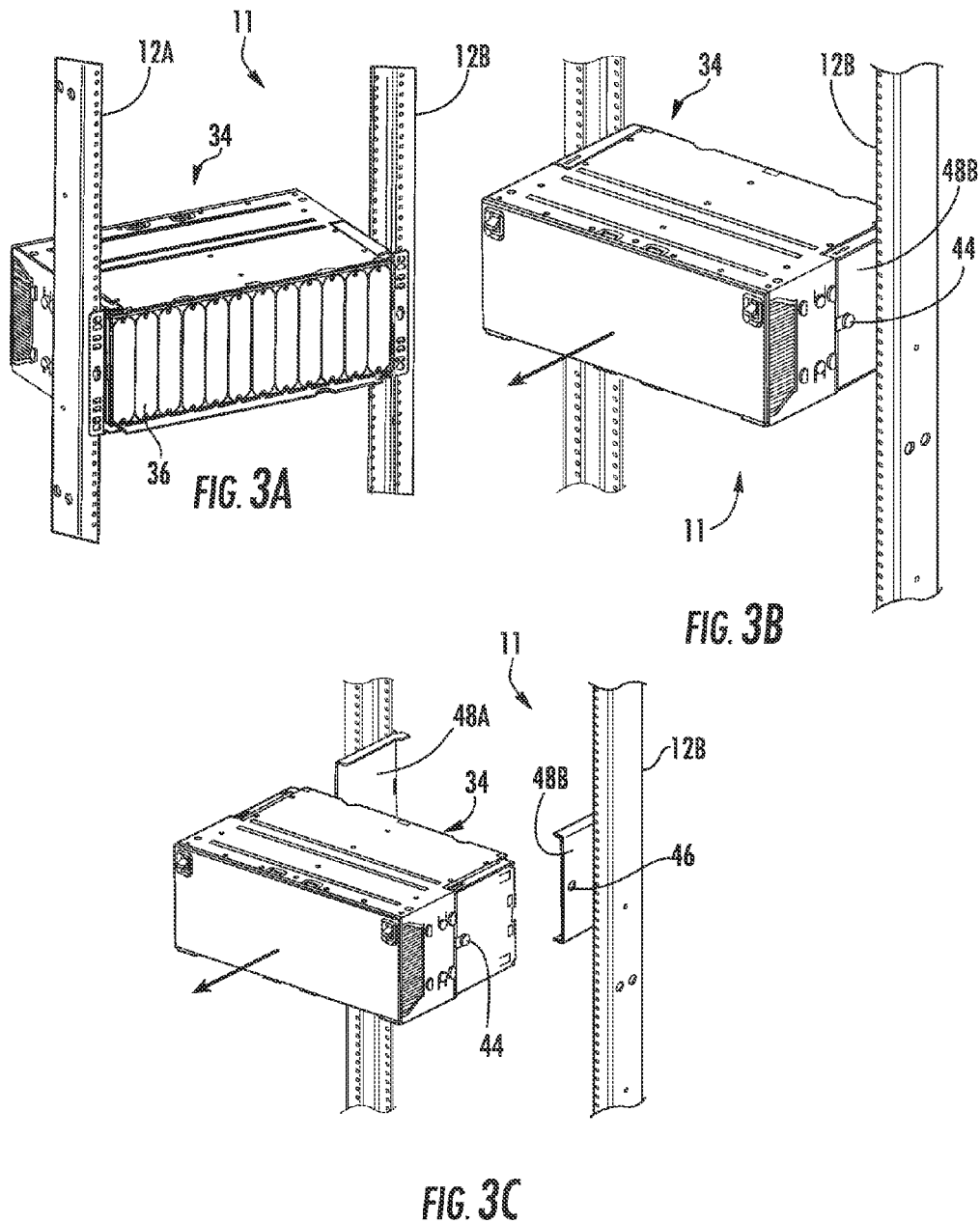
FIG. 3A is a front perspective view of another exemplary fiber optic housing mounted in an exemplary equipment rack.
FIG. 3B is a rear perspective view of the fiber optic housing in FIG. 3A illustrating an exemplary release tab for removing the fiber optic housing from the equipment rack in FIG. 3A.
FIG. 3C is a rear perspective view of the fiber optic housing of FIG. 3A being removed from the equipment rack in FIG. 3A.

FIGS. 3A-3C illustrate how a fiber optic housing can be easily removed from an equipment rack. In this regard, FIG. 3A is a front perspective view of the fiber optic housing 34 mounted in the equipment rack 11. Although the fiber optic housing 34 in FIG. 3A has the fiber optic modules 36 vertically mounted in the fiber optic housing 34, any type of fiber optic housing, including but not limited to the fiber optic housing 10 illustrated in FIGS. 1A-1D, or the fiber optic housing 10 illustrated in FIG. 2, may be mounted into the equipment rack 11 and then removed.

FIG. 3B is a rear perspective view of the fiber optic housing 34 of FIG. 3A illustrating a release tab 44 for removing the fiber optic housing 34 from the equipment rack 11. FIG. 3C is a rear perspective view of the fiber optic housing 34 of FIG. 3A being removed from the equipment rack 11. Referring to FIGS. 3B and 3C, the release tab 44 is selectably engaged with an opening 46 in a mounting bracket 48B attached to the equipment rack 11. Although only a single release tab 44 and a single opening 46 on the mounting bracket 48B are illustrated in FIG. 3C, in one embodiment, there may be a similar opening on a mounting bracket 48A to receive a release tab similar to the release tab 44 on the other side of the fiber optic housing 34. In another embodiment, there may be multiple release tabs 44 for each of the mounting brackets 48A, 48B.

To remove the fiber optic housing 34 from the equipment rack 11, the release tab 44 is pressed inward by a user in one embodiment, which causes the release tab 44 to disengage from the opening 46 on the mounting bracket 48B, allowing the fiber optic housing 34 to be removed from the equipment rack 11. In one embodiment, the release tab 44 is flexible and resilient, such that it is biased to move from a first position to a second position when a force is exerted on the release tab 44, and then returns to the first position by itself when the force is no longer exerted. In another embodiment, the release tab 44 may be spring loaded. In the embodiment having two (2) release tabs 44, one on each side of the fiber optic housing 34, both release tabs 44 may be pressed inward by the user at approximately the same time to remove the fiber optic housing 34 from the equipment rack 11. Although the release tab 44 is pressed inward in the above embodiments, in other embodiments, the release tab 44 may be lifted up, pulled outward, pressed downward, or manipulated in other ways and/or directions to cause the release tab 44 to disengage from the opening 46 on the mounting bracket 48B, allowing the fiber optic housing 34 to be removed from the equipment rack 11.

Figure 4:
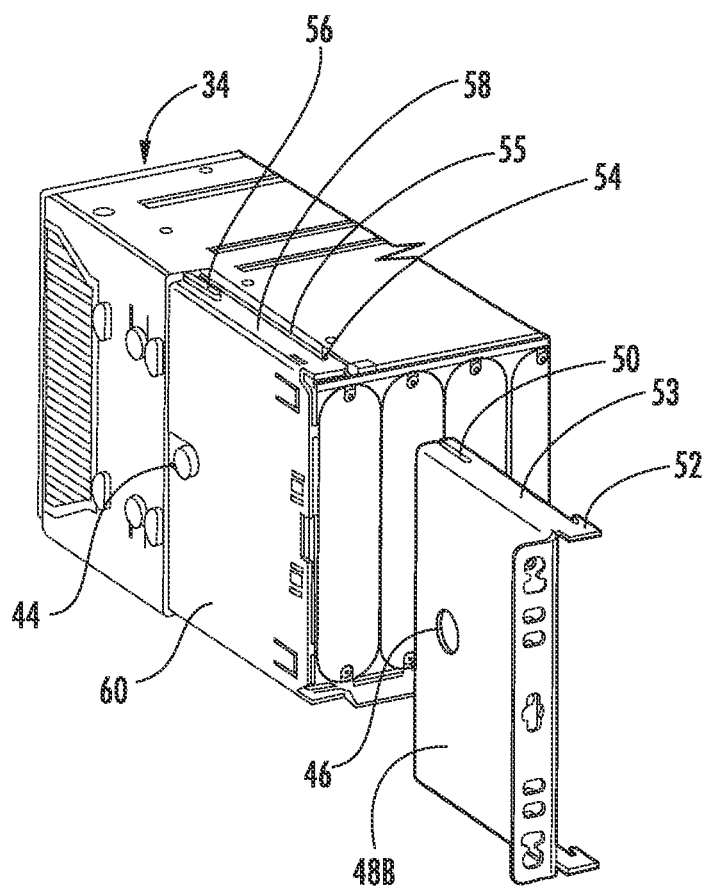
FIG. 4 is a detail view of an exemplary mounting bracket configured to be removably attached to a side of the fiber optic housing in FIGS. 3A-3C.

FIG. 4 is a detail view of a mounting bracket configured to be removably attached to a side of a fiber optic housing according to an exemplary embodiment. The mounting bracket 48B in the embodiment illustrated in FIG. 4 has the opening 46 and slot features 50, 52 on a top surface 53 of the mounting bracket 48B. The slot features 50, 52 on the mounting bracket 48B engage with tongue features 54, 55, and 56 on a top surface 58 of a side plate 60 of the fiber optic housing 34. The slot features 50, 52 on the mounting bracket 48B may be a slot 50 and a tab 52 in one embodiment, as seen in FIG. 4. The tongue features 54, 55, and 56 may be a protrusion 54 at one end of a raised guide member 55 and a tongue 56 at the opposite end of the raised guide member 55 in one embodiment, as seen in FIG. 4. As the fiber optic housing 34 is moved into contact with the mounting bracket 48B, the top surface 53 of the mounting bracket 48B slides along the side of the raised guide member 55 until the slot 50 mates with the tongue 56 and the tab 52 mates with the protrusion 54. As this occurs, the opening 46 of the mounting bracket 48B selectively engages with the release tab 44 on the side plate 60 of the fiber optic housing 34. The release tab 44 extends outwards from the side plate 60 of the fiber optic housing 34 a sufficient distance to extend out of the opening 46 when the opening 46 selectively engages with the release tab 44. If the fiber optic housing 34 is mounted to an equipment rack 11, and a user wishes to remove the fiber optic housing 34 from the equipment rack 11, the release tab 44 may be pressed inward by a user, which causes the release tab 44 to disengage from the opening 46 on the mounting bracket 48B, allowing the fiber optic housing 34 to be removed from the equipment rack 11.

Figure 5:
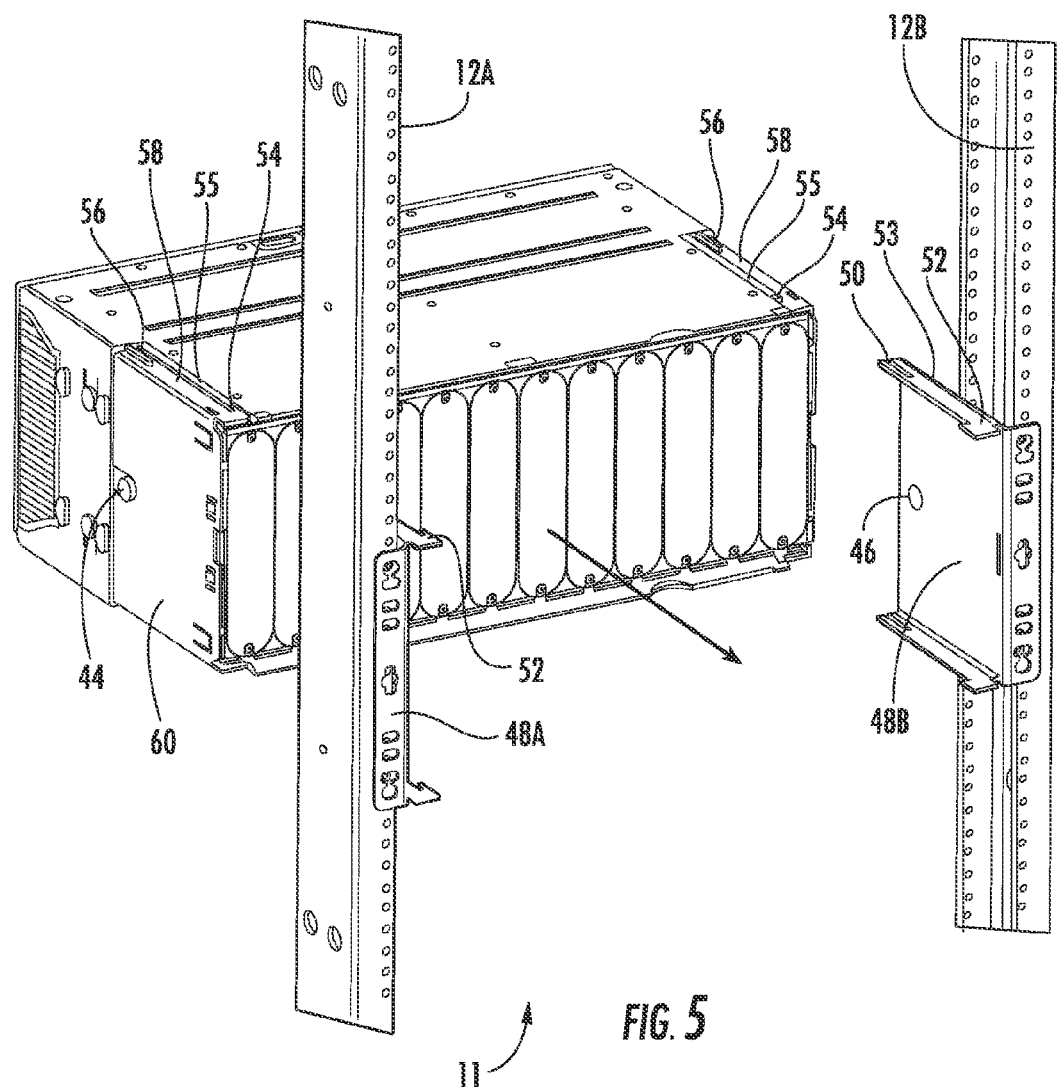
FIG. 5 is a front perspective view of the fiber optic housing in FIGS. 3A-3C being reinstalled into an equipment rack.

When the fiber optic housing 34 is removed from the equipment rack 11 (as illustrated in FIG. 3C), the mounting brackets 48A, 48B remain attached to the equipment rack 11. Then, if the user wishes to re-install the fiber optic housing 34 in the equipment rack 11, such can be done quickly and easily. FIG. 5 is a front perspective view of the fiber optic housing 34 of FIGS. 3A-3C being re-installed into the equipment rack 11 from the rear of the equipment rack 11. As the fiber optic housing 34 is slid forward by the user toward the mounting brackets 48A, 48B attached to the equipment rack 11, the raised guide member 55 on each side of the top surface 58 of the side plate 60 slides along the side of the top surface 53 of the respective mounting brackets 48A, 48B until the protrusion 54 on each side plate 60 mates with the tab 52 on the respective mounting bracket 48A or 48B and the tongue 56 mates with the slot 50 of the respective mounting bracket 48A or 48B. As this occurs, the release tab 44 on each side plate 60 selectively engages with the opening 46 of the respective mounting bracket 48A or 48B, thereby locking the fiber optic housing 34 into place in the equipment rack 11. The mounting brackets 48A, 48B may be mounted on the equipment rack 11 before sliding the fiber optic housing 34 into the equipment rack 11, as seen in FIG. 5.

Figure 6:
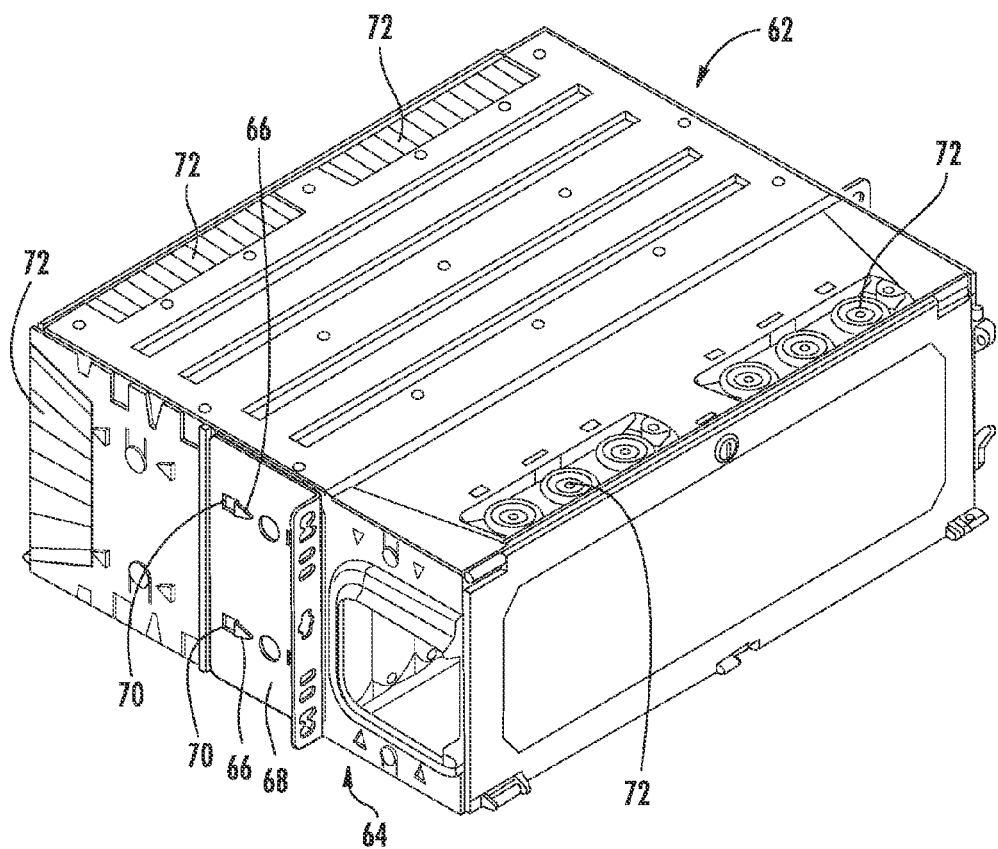
FIG. 6 is a front perspective view of the fiber optic housing in FIGS. 1A-1D including an exemplary mounting bracket snap attachment feature.

However, in other embodiments, the mounting brackets may be snapped onto the side of the fiber optic housing first. FIG. 6 is a front perspective view of a fiber optic housing 62 including a mounting bracket snap attachment feature 66. In this regard, the fiber optic housing 62 has a left side 64. In one embodiment, the left side 64 of the fiber optic housing 62 has a plurality of mounting bracket snap attachment features 66. Although only the left side 64 of the fiber optic housing 62 is illustrated in FIG. 6, the opposite side may also have similar mounting bracket snap attachment features 66. In addition, although the embodiment of FIG. 6 illustrates two (2) mounting bracket snap attachment features 66, any number of mounting bracket snap attachment features 66 may be used.

With continuing reference to FIG. 6, a mounting bracket 68 has a plurality of openings 70 which are configured to fit together with the mounting bracket snap attachment features 66 integral to the fiber optic housing 62 to attach the mounting bracket 68 to the fiber optic housing 62. The mounting bracket 68 can be removably attached to the fiber optic housing 62 such that the mounting bracket 68 can be removed from the fiber optic housing 62, or the fiber optic housing 62 can be removed from the mounting bracket 68, such as when the mounting bracket 68 is mounted to an equipment rack. The number of openings 70 may correspond to the number of mounting bracket snap attachment features 66. The openings 70 of the mounting bracket 68 are placed over the mounting bracket snap attachment features 66 and slid toward the back of the fiber optic housing 62 until the mounting bracket snap attachment features 66 lock, or snap, into place against an edge of the openings 70. In one embodiment, the mounting bracket snap attachment features 66 fit tightly enough in the openings 70 that there is sufficient friction between the mounting bracket snap attachment features 66 and the mounting bracket 68 to form a friction fit. The mounting bracket snap attachment features 66 in FIG. 6 are triangular in shape and the openings 70 are square in shape, but any shape of mounting bracket snap attachment features 66 and openings 70 can be used that will allow the mounting bracket snap attachment features 66 to lock, or snap, into the openings 70. The mounting bracket 68 can then be easily removed from the fiber optic housing 62 by sliding the mounting bracket 68 back toward the front of the fiber optic housing 62 until the mounting bracket snap attachment features 66 are within the openings 70, and the mounting bracket 68 can be lifted away from the left side 64 such that the mounting bracket snap attachment features 66 pass through the openings 70. In another embodiment, the fiber optic housing 62 can be removed from the mounting bracket 68 in a similar fashion, such as when the mounting bracket 68 is mounted to an equipment rack.

As also illustrated in FIG. 6, the mounting brackets 68 may be one or more snap-on, removable mounting brackets 68 that are removably attachable to the side of the fiber optic housing without the use of screws or other hardware. In one embodiment, the mounting brackets 68 are removably attached to the fiber optic housing 62 using the mounting bracket snap attachment features 66. These mounting bracket snap attachment features 66 can save time during installation. No tools may be needed for installation of the fiber optic housing 62 to an equipment rack for tool-less installation, and no additional hardware may be needed. Thus, a technician need not worry about tools or hardware that may be lost or missing. The mounting brackets may be easily changed out with different designs for different types of equipment racks and for different positions in the equipment racks.

In this manner, the mounting brackets may be removably attached to at least one of the right side and the left side of the fiber optic housing tool-lessly, and by other than external fastening means. As described above, "tool-lessly" as used here means that the set of components is assembled using fastening means, such as snap attachments, that are integral to one or more of the components in the set of components, rather than external fastening means. Once the set of components is assembled tool-lessly, then the assembled set of components may be attached to another component or device using external fasteners and tools, and even with this use of external fasteners and tools, the assembly of the original set of components is still considered to be "tool-less." For example, the mounting brackets may be attached to an equipment rack using tools and external fastening means, but the mounting brackets may be tool-lessly attached to the fiber optic housing.

FIG. 6 also illustrates rubber entry grommets 72 on the top and bottom rear and front, and left and right sides rear and front of the fiber optic housing 62. Rubber provides better protection than solid materials, especially on the edges, and provides a better seal to keep dust, insects, and rodents out of the housings. The rubber entry grommets 72 provide entry and exit points for fiber optic cables or optical fibers to be routed in and out of the fiber optic housing 62 to the appropriate locations.

Figure 7:
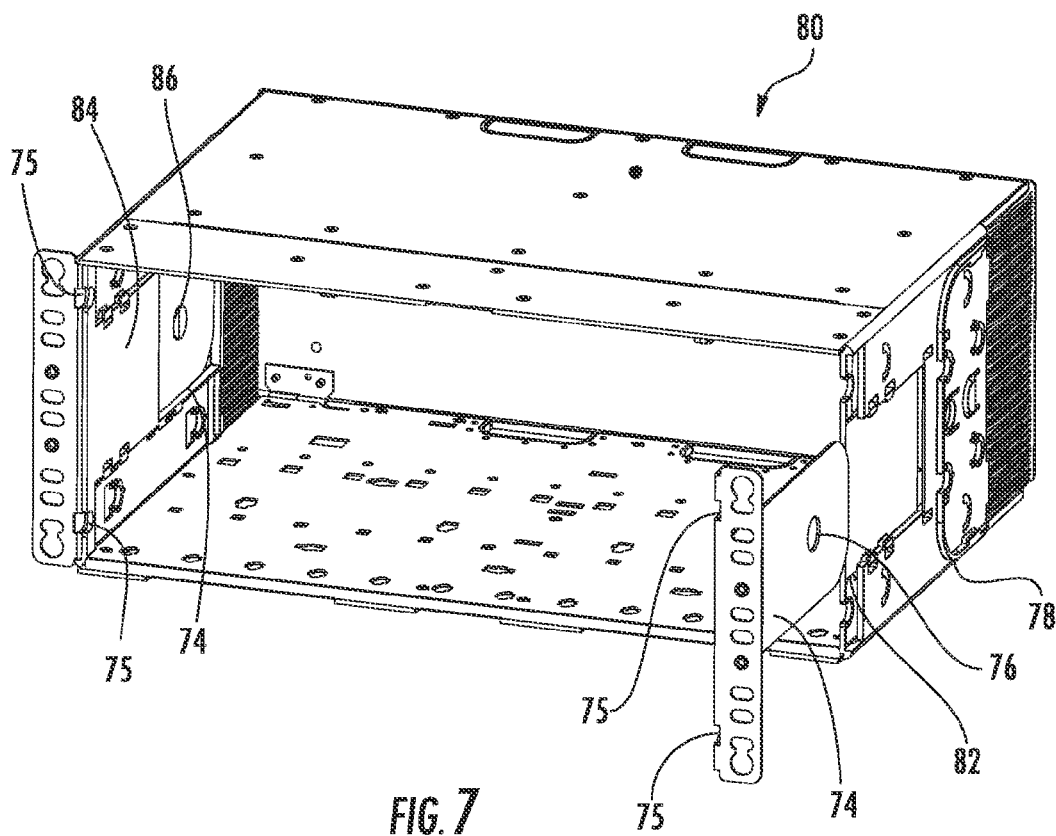
FIG. 7 is a front perspective view of an exemplary mounting bracket configured to be removably attached to a side of an exemplary fiber optic housing.
Figure 8:
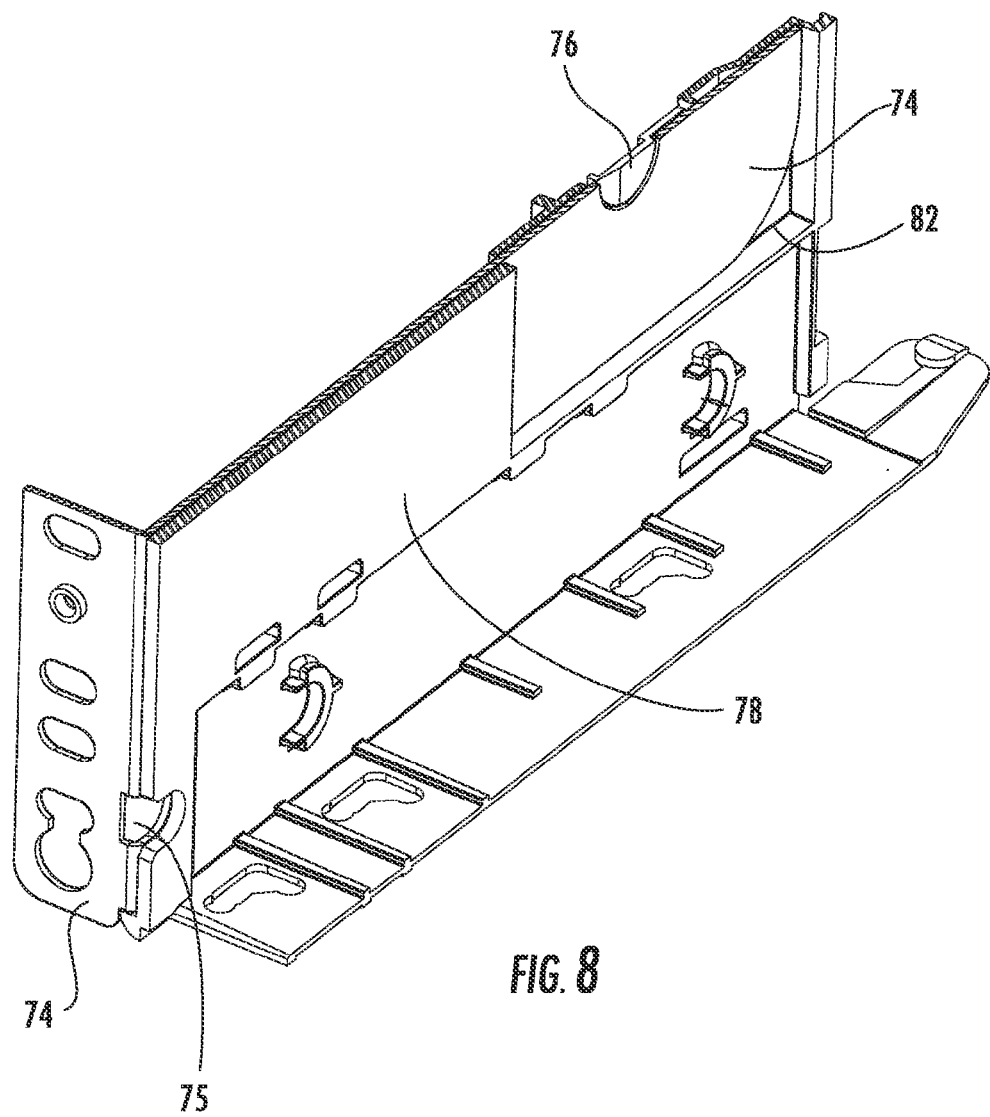
FIG. 8 is a cut section of the mounting bracket and side of the fiber optic housing illustrated in FIG. 7.

FIG. 7 is a front perspective view of a mounting bracket 74 configured to be removably attached to a side 78 of a fiber optic housing 80 according to another exemplary embodiment. FIG. 8 is a cut section of the mounting bracket 74 and side 78 of the fiber optic housing 80 illustrated in FIG. 7. The mounting bracket 74 in FIGS. 7 and 8 is of a different type than the mounting bracket 68 of FIG. 6. In the embodiment of FIGS. 7 and 8, the mounting bracket 74 has a single circular opening 76. The mounting bracket 74 may also have a plurality of recesses 75, which allow a space for other apparatuses to be attached to the fiber optic housing 80. The side 78 of the fiber optic housing 80 has a groove 82 configured to receive the mounting bracket 74. The groove 82 extends a distance down the side 78 that corresponds to a length of the mounting bracket 74. The side 78 has an interior wall with a release tab disposed thereon (similar to an interior wall 84 with a release tab 86 illustrated on the opposite side from the side 78). When the mounting bracket 74 is slid into the groove 82 toward the rear of the fiber optic housing 80, the opening 76 will selectively engage with the release tab 86 to lock the mounting bracket 74 into place. If it is desired to remove the mounting bracket 74, the release tab 86 can be pressed and the mounting bracket 74 can be pulled out of the groove 82.

Figure 9:
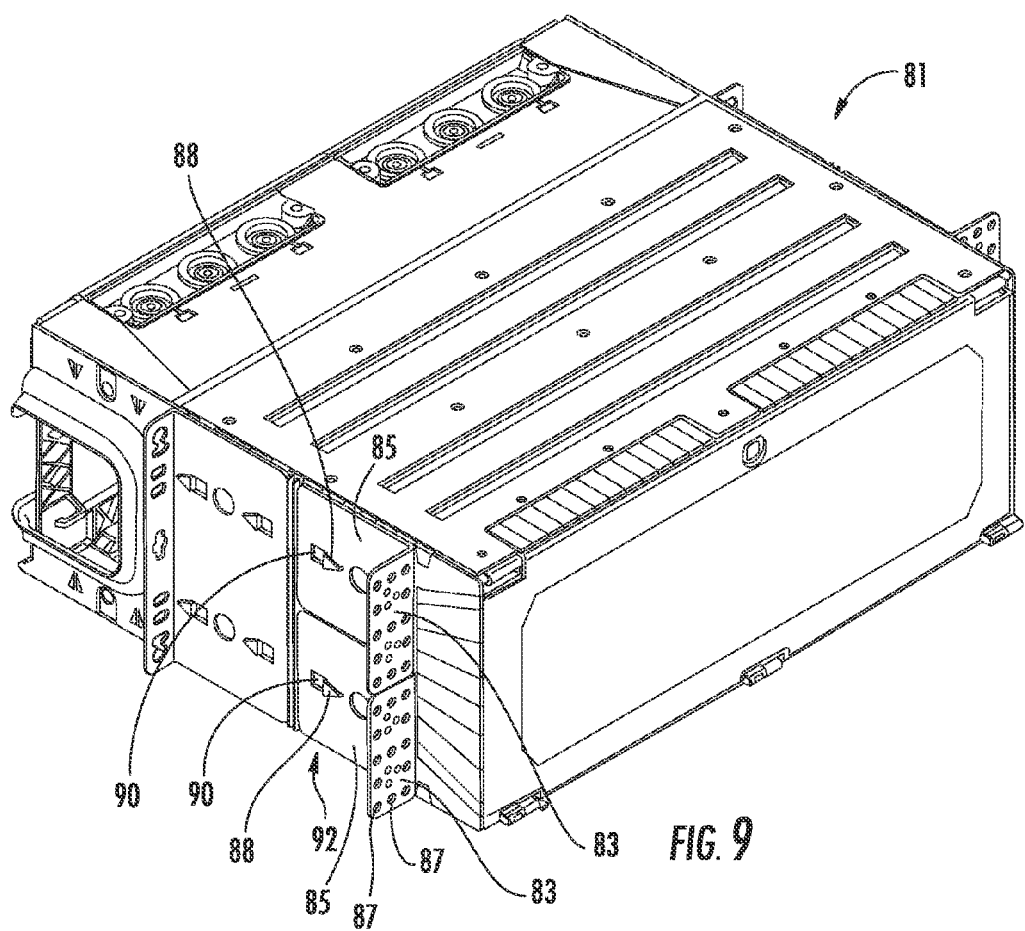
FIG. 9 is a rear perspective view of an exemplary fiber optic housing including an exemplary strain relief bracket.

FIG. 9 is a rear perspective view of a fiber optic housing 81 including one or more strain relief brackets 85. One or more snap-on removable strain relief brackets 85 may be attached to the fiber optic housing 81 as illustrated in FIG. 9. In one embodiment, the strain relief brackets 85 may be L-shaped, with a flange 83 at one end having a plurality of holes 87. The holes 87 are for ties such as tyrap or Velcro ties to help secure fiber optic cables or optical fibers to the strain relief brackets 85. The snap-on removable strain relief brackets 85 can be easily snapped on to a left side 92 of the fiber optic housing 81 using a plurality of strain relief bracket snap attachment features 88 disposed on the left side 92 of the fiber optic housing 81. In one embodiment, the plurality of strain relief bracket snap attachment features 88 are similar to the plurality of mounting bracket snap attachment features 66 used to removably attach the mounting bracket 68 to the fiber optic housing 62 in FIG. 6.

In one embodiment as illustrated in FIG. 9, the left side 92 of the fiber optic housing 81 has a plurality of strain relief bracket snap attachment features 88. Although only the left side 92 of the fiber optic housing 81 is illustrated in FIG. 9, the opposite side, the right side, may also have similar strain relief bracket snap attachment features 88. In addition, although the embodiment of FIG. 9 illustrates two (2) strain relief bracket snap attachment features 88, any number of strain relief mounting bracket snap attachment features 88 may be used.

With continuing reference to FIG. 9, each strain relief bracket 85 has at least one opening 90 which is configured to fit together with one of the strain relief bracket snap attachment features 88. The opening 90 of each strain relief bracket 85 is placed over one of the strain relief bracket snap attachment features 88 and slid toward the back of the fiber optic housing 81 until the strain relief bracket snap attachment feature 88 locks, or snaps, into place against an edge of the opening 90. In one embodiment, the strain relief bracket snap attachment features 88 fit tightly enough in the openings 90 that there is sufficient friction between the strain relief bracket snap attachment features 88 and the strain relief bracket 85 to form a friction fit. The strain relief bracket snap attachment features 88 in FIG. 9 are triangular in shape and the openings 90 are square in shape, but any shape of strain relief bracket snap attachment features 88 and openings 90 can be used that will allow the strain relief bracket snap attachment features 88 to lock, or snap, into the openings 90. The strain relief bracket 85 can then be easily removed by sliding the strain relief bracket 85 back toward the front of the fiber optic housing 81 until the strain relief bracket snap attachment feature 88 is within the opening 90, and the strain relief bracket 85 can be lifted away from the left side 92 such that the strain relief bracket snap attachment feature 88 passes through the opening 90.

As illustrated in FIG. 9, the snap-on cable strain relief brackets do not require the use of screws or other hardware to be attached to the fiber optic housing 81. The snap attachment feature saves time during installation. No tools or hardware may be needed. Thus, a technician need not worry about tools or hardware that may be lost or missing. In addition, the strain relief brackets may be easily changed out for different strain relief applications. In this manner, the strain relief brackets may be removably attached to at least one of the right side and the left side of the fiber optic housing tool-lessly, and by other than external fastening means. As described above, "tool-lessly" as used here means that the strain relief brackets are attached to the fiber optic housing fastening means, such as snap attachments, that are integral to one or more of the components in the set of components, rather than by using external fastening means.

Figure 10:
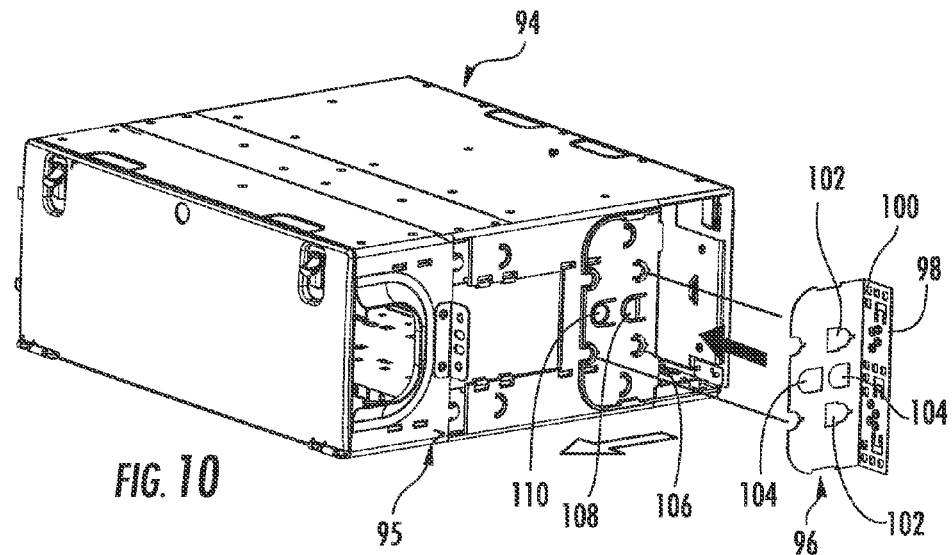
FIG. 10 is a side perspective view of an exemplary fiber optic housing including an exemplary strain relief bracket.
Figure 11A:
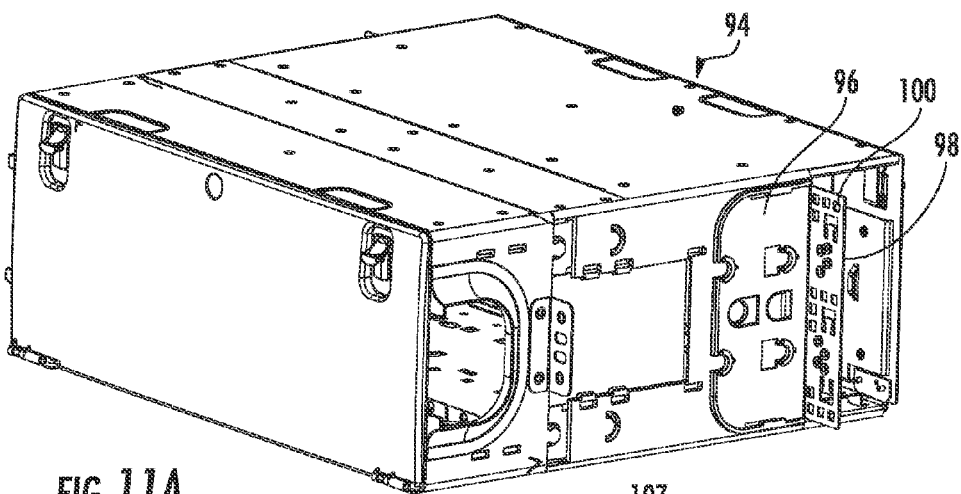
FIGS. 11A and 11B are a side view of the strain relief bracket in FIG. 10 mounted to the fiber optic housing in FIG. 10 and a close-up view of the fiber optic housing and strain relief bracket illustrated in FIG. 10, respectively.
Figure 11B:
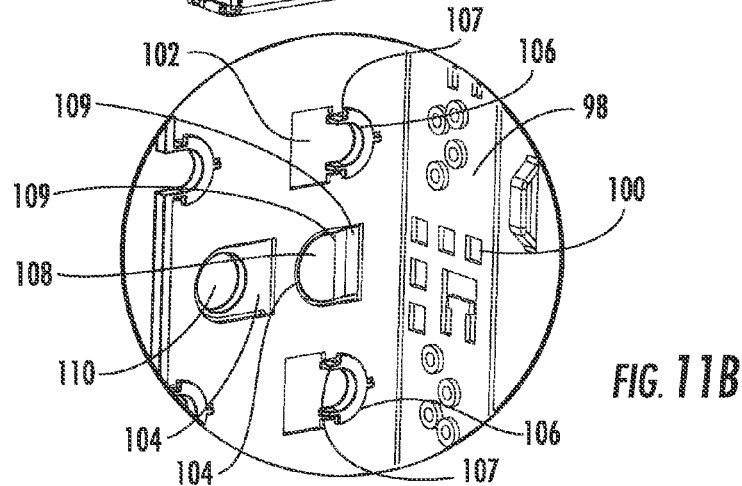

FIG. 10 is a side perspective view of a fiber optic housing 94 and a strain relief bracket 96. In FIG. 10, an alternate type of strain relief bracket and an alternate type of strain relief bracket snap attachment feature are illustrated. FIGS. 11A and 11B illustrate a close-up view of the fiber optic housing 94 and strain relief bracket 96 illustrated in FIG. 10. In one embodiment, the strain relief bracket 96 may be attached to the fiber optic housing 94 as illustrated in FIGS. 10, 11A, and 11B. In one embodiment, the strain relief bracket 96 may be L-shaped, with a flange 98 at one end having a plurality of holes 100. The holes 100 may be of any shape and are configured to receive ties such as tyrap or Velcro ties to help secure fiber optic cables or optical fibers to the strain relief bracket 96. The snap-on removable strain relief brackets 96 may also comprise a plurality of openings 102 and 104. In the embodiments seen in FIGS. 10, 11A, and 11B, there are a pair of keyhole-shaped openings 102 and a pair of U-shaped openings 104. However, there may be any number and any shape of openings in other embodiments.

The strain relief bracket 96 can be easily snapped onto a right side 95 of the fiber optic housing 94 using a plurality of strain relief bracket snap attachment features 106, 108, and 110 disposed on the right side 95 of the fiber optic housing 94. In one embodiment, as seen in FIG. 11B, the plurality of strain relief bracket snap attachment features 106, 108, and 110 comprise a pair of half-moon-shaped snap attachment features 106 with a lip 107, a U-shaped snap attachment feature 108 with raised edges 109, and a release button 110. The plurality of strain relief bracket snap attachment features 106, 108, and 110 may be used to removably attach the strain relief bracket 96 to the fiber optic housing 94 in FIGS. 10, 11A, and 11B.

In one embodiment as illustrated in FIG. 10, the right side 95 of the fiber optic housing 94 has the plurality of strain relief bracket snap attachment features 106, 108, and 110. Although only the right side 95 of the fiber optic housing 94 is illustrated in FIG. 10, the opposite side may also have similar strain relief bracket snap attachment features. In addition, any number of strain relief mounting bracket snap attachment features may be used. The strain relief bracket 96 in FIG. 10 may be easily snapped onto the right side 95 of the fiber optic housing 94 by placing the pair of keyhole-shaped openings 102 over the pair of half-moon-shaped snap attachment features 106 and the pair of U-shaped openings 104 over the U-shaped snap attachment feature 108 and the release button 110 and then sliding the strain relief bracket 96 toward the front of the fiber optic housing 94 (to the left in FIG. 10). The lip 107 on each of the half-moon-shaped snap attachment features 106 will help lock the half-moon-shaped snap attachment features 106 into the keyhole-shaped openings 102, as seen in FIG. 11B. The U-shaped snap attachment feature 108 with raised edges 109 will selectably engage with one of the U-shaped openings 104 and the release button 110 will selectably engage with the other one of the U-shaped openings 104.

Figure 12:
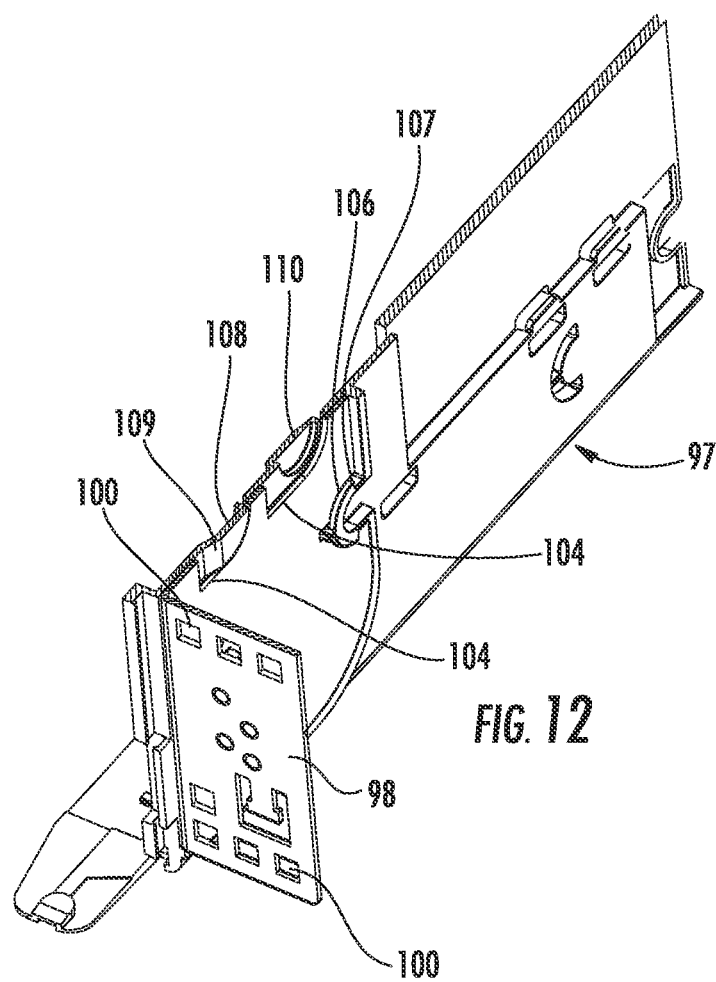
FIG. 12 is a cut section of the external strain relief bracket and a side of the fiber optic housing in FIGS. 10, 11A, and 11B.

FIG. 11A illustrates the strain relief bracket 96 snapped into place on the right side 95 of the fiber optic housing 94. Referring to FIG. 11B, in one embodiment, the strain relief bracket 96 can then be easily removed by pressing the release button 110. The release button 110 is coupled to the U-shaped snap attachment feature 108 with raised edges 109 such that when the release button 110 is pressed, the raised edges 109 of the U-shaped attachment feature 108 are disengaged with the U-shaped opening 104. A user may then slide the strain relief bracket 96 back toward the rear of the fiber optic housing 94 (to the right in FIG. 10 or FIG. 11A) to remove the strain relief bracket 96. FIG. 12 is a cut section of the strain relief bracket 96 and the back of a left side 97 of the fiber optic housing 94 in FIGS. 10, 11A, and 11B, illustrating how the strain relief bracket 96 is mounted to the fiber optic housing 94 using the snap attachment features disclosed above.

Figure 13:
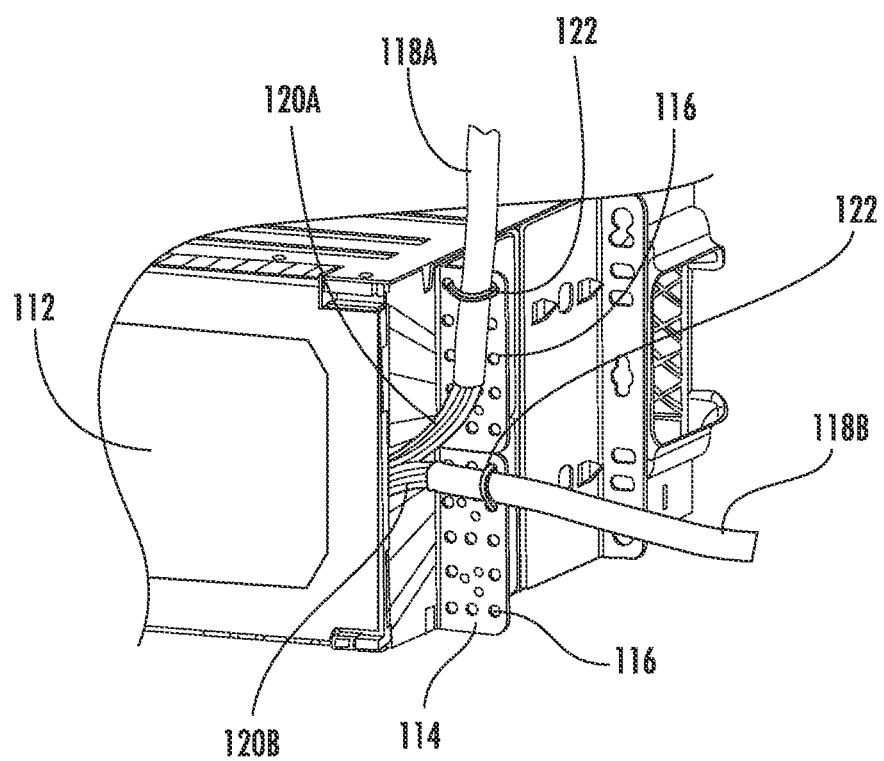
FIG. 13 is a partial, rear perspective view of the fiber optic housing in FIG. 9 illustrating exemplary strain relief brackets with exemplary fiber optic cables tied to the strain relief brackets.

FIG. 13 is a partial, rear, perspective view of a fiber optic housing 112 illustrating a strain relief bracket 114 with fiber optic cables according to one embodiment. The fiber optic housing 112 may be any type of fiber optic housing. The strain relief brackets 114 having a plurality of openings 116 may be mounted to the fiber optic housing 112 using the snap attachment features disclosed above in FIGS. 9, 10, 11A, and 11B. FIG. 13 illustrates how the removable strain relief brackets 114 allow fiber optic cables to enter at any angle. In the embodiment of FIG. 13, buffer tubes 118A and 118B each containing one or more optical fibers 120A and 120B, respectively, may be tied to the strain relief brackets 114 by means of a fastener 122 that is routed through the openings 116 of the strain relief brackets 114 to tie the buffer tubes 118A and 118B to the strain relief brackets 114. Although buffer tubes 118A and 118B are illustrated in FIG. 13, any sort of fiber optic cable or optical fiber can be fastened to the strain relief brackets 114. The fastener 122 may be any suitable fastener, including but not limited to a tywrap, a Velcro tie, or a plastic fastener, that will tie the buffer tubes 118A and 118B, or other fiber optic cable or optical fiber, to the strain relief brackets 114. With traditional strain relief brackets, fiber optic cables can enter the fiber optic housing 112 at only a single angle, but with the snap-on removable strain relief brackets 114 disclosed above, the fiber optic cables may enter at any angle, and different fiber optic cables may enter at multiple angles, as illustrated in FIG. 13.

Embodiments disclosed below include fiber optic housings configured for tool-less assembly, and related components and methods. In one embodiment, a fiber optic housing is provided having a top, a bottom, a right side, and a left side which removably attach to each other tool-lessly, and by other than external fastening means, thereby defining at least one interior chamber configured to support fiber optic equipment. The top, bottom, right side, and left side of the fiber optic housing may be removably attached to each other by using a snap attachment integral to at least one of the bottom, the right side, and the left side. In an embodiment, the fiber optic housing further has one or more mounting brackets and/or strain relief brackets, which may be attached to the fiber optic housing by other than external fastening means. In another embodiment, the mounting brackets and/or strain relief brackets may be attached to a side of the fiber optic housing by using a quick snap attachment integral to at least one of the side of the fiber optic housing and the mounting brackets and/or strain relief brackets.

Figure 14:
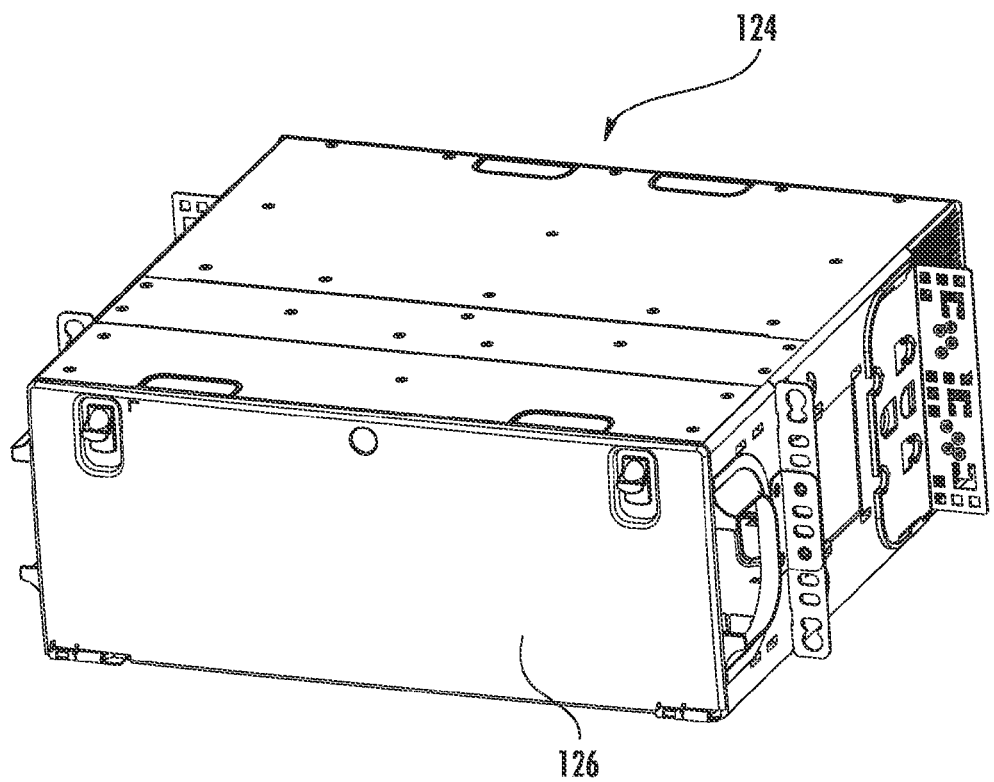
FIG. 14 is a front perspective view of an exemplary fiber optic housing with a front door closed.

In this regard, FIG. 14 is a front perspective view of a fiber optic housing 124 with a front door 126 closed. The fiber optic housing 124 in FIG. 14 may be a seven inch fiber optic housing for the local area network (LAN) and data center environment. The fiber optic housing 124 in FIG. 14 may be mountable in 19- or 23-inch equipment racks or cabinets. The fiber optic housing 124 in FIG. 14 may provide interconnect or cross-connect capabilities between the outside plant, riser, or distribution cables and the opto-electronics.

Figure 15:
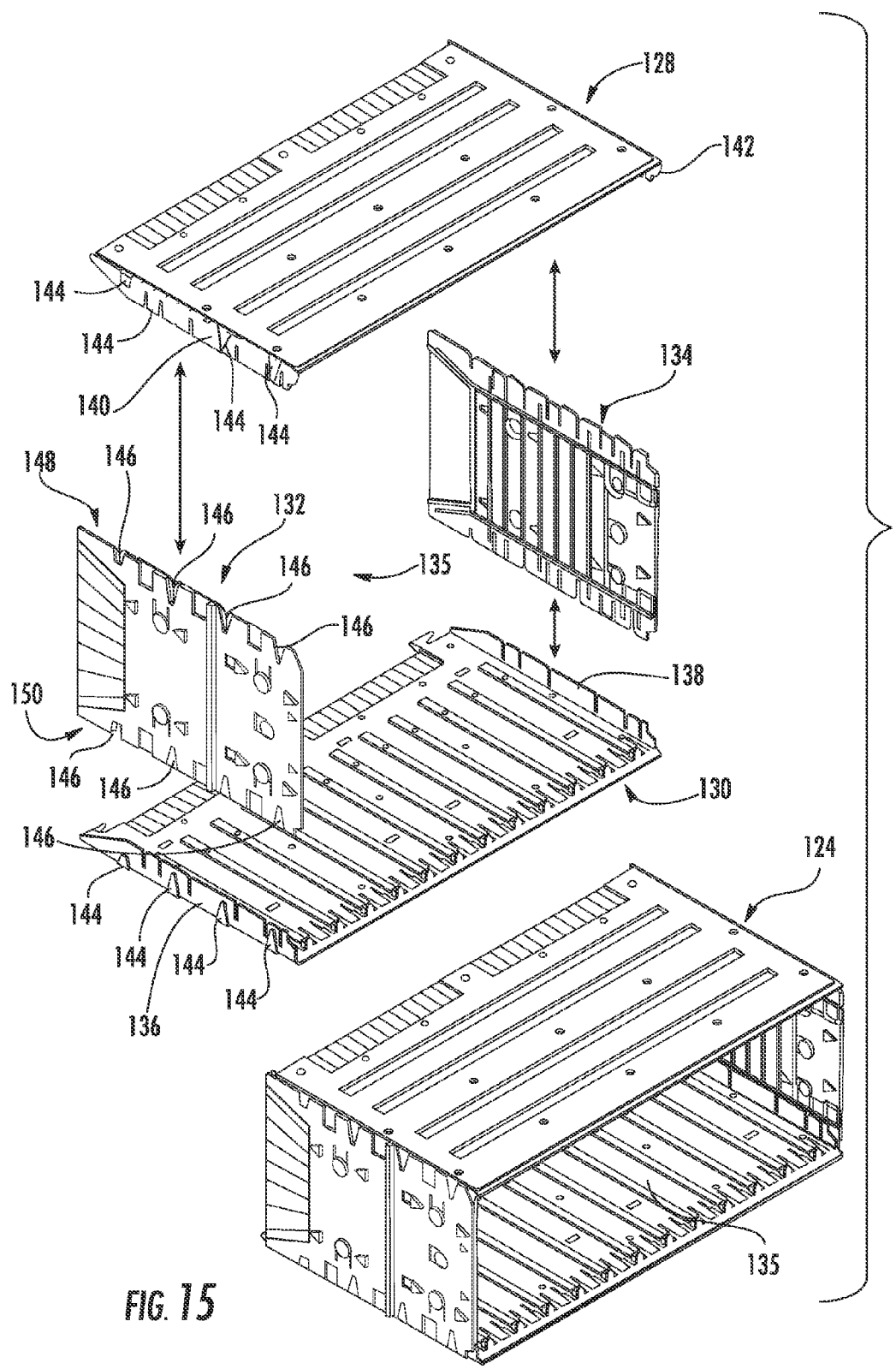
FIG. 15 illustrates exploded and assembled front perspective views of exemplary components of an exemplary fiber optic housing.

FIG. 15 illustrates exploded and assembled front perspective views of an exemplary embodiment of the fiber optic housing 124. FIG. 15 illustrates a quick fit assembly of the components of the fiber optic housing 124, particularly, a top panel 128, a bottom panel 130, a left side panel 132, and a right side panel 134, which are configured to be quickly and easily assembled with little or no tools. The top panel 128, the bottom panel 130, the left side panel 132, and the right side panel 134 may also be referred to as the top, the bottom, the left side, and the right side, respectively. The top panel 128, the bottom panel 130, the left side panel 132, and the right side panel 134 together define at least one interior chamber 135 of the fiber optic housing 124 configured to support fiber optic equipment. In this embodiment, each of the top panel 128, the bottom panel 130, the left side panel 132, and the right side panel 134 of the fiber optic housing 124 further includes snap attachment features configured to snap the components together, as described more fully below.

In the embodiment of FIG. 15, the bottom panel 130 has side extensions 136, 138 that extend upward in a direction approximately perpendicular to the bottom panel 130. Likewise, the top panel 128 has side extensions 140, 142 that extend downward in a direction approximately perpendicular to the top panel 128. The side extensions 136, 138 of the bottom panel 130 and the side extensions 140, 142 of the top panel 128 each have a plurality of snap attachments 144 disposed thereon (though only the snap attachments 144 disposed on the side extension 136 of the bottom panel 130 and the snap attachments 144 disposed on the side extension 140 of the top panel 128 can be seen in FIG. 15). These snap attachments 144 may be raised from a surface of the side extensions 136, 138, 140, and 142. The left side panel 132 may have a plurality of snap attachment receivers 146 at a top edge 148 and a bottom edge 150 of the left side panel 132. Although not seen in FIG. 15, the right side panel 134 may have similar snap attachment receivers 146 at a top edge and at a bottom edge.

The snap attachment receivers 146 at the top edge 148 of the left side panel 132 are configured to receive the snap attachments 144 disposed on the side extension 140 of the top panel 128. The snap attachment receivers 146 at the bottom edge 150 of the left side panel 132 are configured to receive the snap attachments 144 disposed on the side extension 136 of the bottom panel 130. In this manner, the left side panel 132 may be tool-lessly attached to the top panel 128 and the bottom panel 130. The right side panel 134 may be similarly attached to the top panel 128 and the bottom panel 130 using snap attachment receivers on a top edge and a bottom edge to receive snap attachments on the side extension 142 of the top panel 128 and the side extension 138 of the bottom panel 130, respectively. In this manner, the top panel 128, the bottom panel 130, the left side panel 132, and the right side panel 134 may be assembled together into the fiber optic housing 124 quickly and easily with little or no tools.

The snap attachments 144 and the snap attachment receivers 146 may be any size and shape as long as the snap attachment receivers 146 are of a size and shape that allows the snap attachments 144 to fit and snap into the snap attachment receivers 146 in a manner that the components of the fiber optic housing 124 are assembled together in a sturdy fashion.

The assembled fiber optic housing 124 can be quickly and easily unassembled by detaching the top panel 128, the bottom panel 130, the left side panel 132 and the right side panel 134 from each other tool-lessly.

The quick fit assembly allows the components of the fiber optic housing 124 to be shipped in smaller packaging, saving shipping cost and storage space. In one embodiment, an end user can assemble the fiber optic housing 124 at the time of use, such as at the installation location. In one embodiment, an end user can assemble the fiber optic housing 124 with little or no tools. Additionally, the quick fit assembly makes field repairs a possibility with the purchase of repair kits, and allows the fiber optic housing 124 to be transformed in the field by replacing components with ones that provide a different function.

Figure 16:
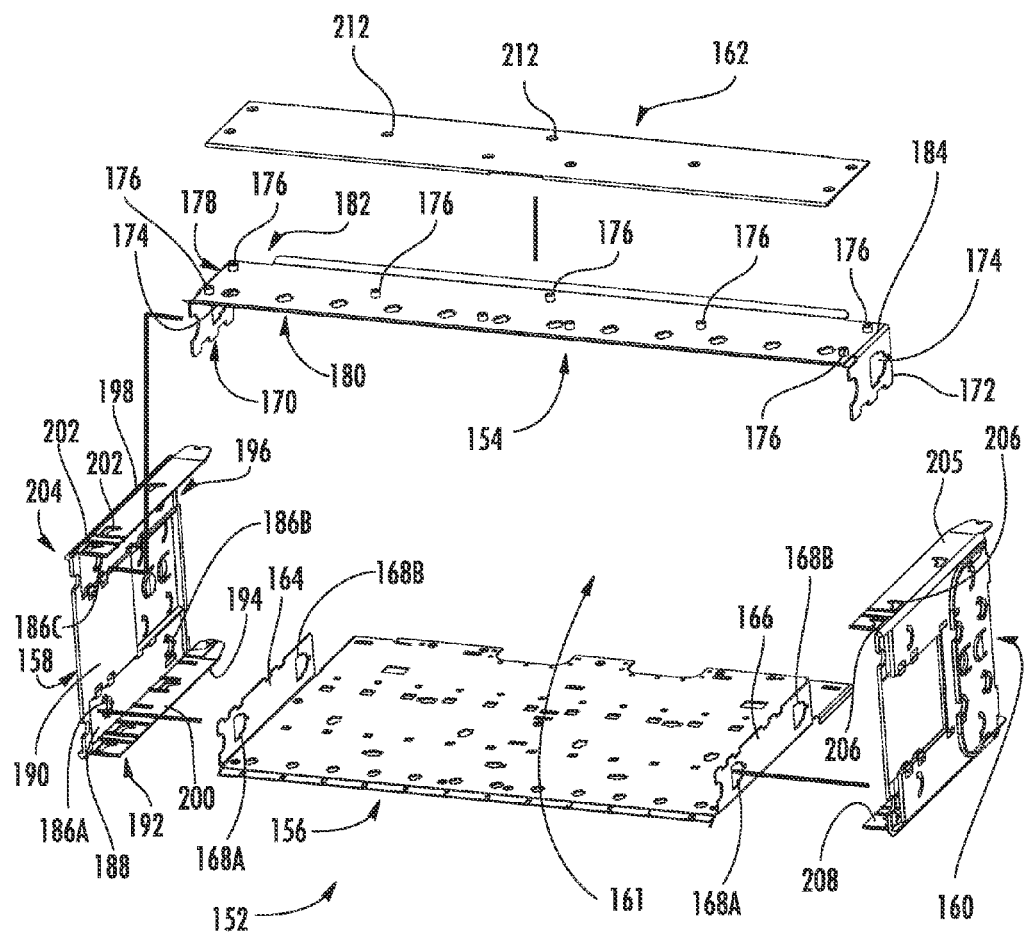
FIG. 16 illustrates an exploded front perspective view of exemplary components of an exemplary fiber optic housing.

FIG. 16 illustrates an exploded front perspective view of an exemplary embodiment of a fiber optic housing 152. FIG. 16 illustrates an alternate embodiment of the fiber optic housing 152 that can be assembled easily and quickly with little or no tools. FIG. 16 illustrates a quick fit assembly of the components of the fiber optic housing 152, particularly, an inside top panel 154, a bottom panel 156, a left side panel 158, and a right side panel 160, which are configured to be quickly and easily assembled with little or no tools. The inside top panel 154, the bottom panel 156, the left side panel 132, and the right side panel 160 together define at least one interior chamber 161 of the fiber optic housing 152 configured to support fiber optic equipment. In this regard, each of the inside top panel 154, the bottom panel 156, the left side panel 158, and the right side panel 160 includes snap attachment features configured to snap the components together. In one embodiment, the fiber optic housing 152 may also include a cover plate 162 for the inside top panel 154.

In one embodiment, as seen in FIG. 16, the bottom panel 156 has side flanges 164, 166 on each side of the bottom panel 156 that extend upward in a direction approximately perpendicular to the bottom panel 156. The side flanges 164, 166 of the bottom panel 156 each have one or more receivers 168A, 168B disposed on the side flanges 164, 166. The inside top panel 154 has side flanges 170, 172 on each side of the inside top panel 154 that extend downward in a direction approximately perpendicular to the inside top panel 154. The side flanges 170, 172 of the inside top panel 154 each have one or more receivers 174 disposed on the side flanges 170, 172. Although FIG. 16 illustrates the side flanges 164, 166 of the bottom panel 156 each having two (2) receivers 168A, 168B, and the side flanges 170, 172 of the inside top panel 154 each having one receiver 174, any number of receivers like the receivers 168A, 168B may be disposed on the side flanges 164, 166 of the bottom panel 156 and any number of receivers 174 may be disposed on the side flanges 170, 172 of the inside top panel 154. The inside top panel 154 also has a plurality of standoffs 176 on its top surface. In the embodiment of FIG. 16, the inside top panel 154 has two (2) standoffs 176 on a left edge 178 of the inside top panel 154, one toward a front edge 180 of the inside top panel 154, and one toward a back edge 182 of the inside top panel 154. The inside top panel 154 of FIG. 16 also has two standoffs 176 on a right edge 184 of the inside top panel 154, one toward the front edge 180 of the inside top panel 154 and one toward the back edge 182 of the inside top panel 154. The standoffs 176 are also used together with the receivers 168A, 168B, 174 to attach the inside top panel 154 to the left side panel 158 and to the right side panel 160.

The left side panel 158 may include a plurality of snap attachments 186A, 186B, and 186C. In the embodiment of FIG. 16, the left side panel 158 has two (2) snap attachments 186A, 186B on a bottom portion 188 of an interior side 190 of the left side panel 158, one toward a front portion 192 of the left side panel 158 and one toward a rear portion 194 of the left side panel 158. The left side panel 158 also has at least one snap attachment 186C on a top portion 196 of the interior side 190 of the left side panel 158 toward the front portion 192 of the left side panel 158. The snap attachments 186A, 186B, and 186C in the embodiment of FIG. 16 are half-moon-shaped with a lip. In other embodiments, the number, location, and shape of the snap attachments 186A, 186B, and 186C may vary in order to correspond to the receivers 168A, 168B on the side flanges 164 and 166 of the bottom panel 156 and the receivers 174 on the side flanges 170, 172 of the inside top panel 154. The left side panel 158 also may include a top flange 198 and a bottom flange 200. The top flange 198 may have a plurality of grooves 202 disposed thereon. In the embodiment of FIG. 16, the top flange 198 has two (2) grooves 202 toward a front portion 204 of the top flange 198. In one embodiment, as illustrated in FIG. 16, the grooves 202 are L-shaped, but other shapes may also be used.

With continued reference to FIG. 16, the right side panel 160 is symmetrical to the left side panel 158 and may also include a plurality of snap attachments 186A and 186B, a top flange 205 having a plurality of grooves 206, and a bottom flange 208. The left side panel 158 and the right side panel 160 may be tool-lessly attached to the bottom panel 156 quickly and easily. The left side panel 158 may be attached to the side flange 164 of the bottom panel 156 by positioning the snap attachments 186A, 186B on the left side panel 158 within the receivers 168A, 168B on the side flange 164 of the bottom panel 156 and sliding the left side panel 158 toward the back of the bottom panel 156 until the snap attachments 186A, 186B snap, or lock, into place within the receivers 168A, 168B. The bottom flange 200 will be positioned under the bottom panel 156 as the left side panel 158 is attached to the bottom panel 156. In the embodiment seen in FIG. 16, the receivers 168A, 168B are keyhole-shaped and correspond to the half-moon shaped snap attachments 186A, 186B. However, the snap attachments 186A, 186B and the receivers 168A, 168B may be any shape as long as the receivers 168A, 168B correspond to the snap attachments 186A, 186B such that the snap attachments 186A, 186B snap, or lock, into place within the receivers 168A, 168B. In one embodiment, the receivers 168A, 168B are slightly larger at one end than the snap attachments 186A, 186B so that the snap attachments 186A, 186B may fit into the receivers 168A, 168B, respectively.

The right side panel 160 may be attached to the side flange 166 of the bottom panel 156 in a fashion similar to that disclosed above for attaching the left side panel 158 to the side flange 164 of the bottom panel 156.

Figure 17A:
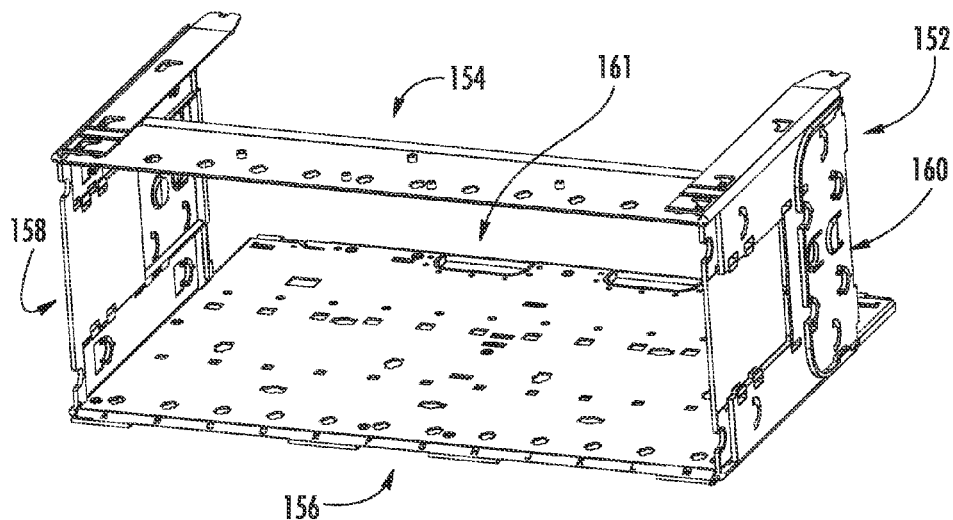
FIG. 17A is an assembled front perspective view of the fiber optic housing in FIG. 16.
Figure 17B:
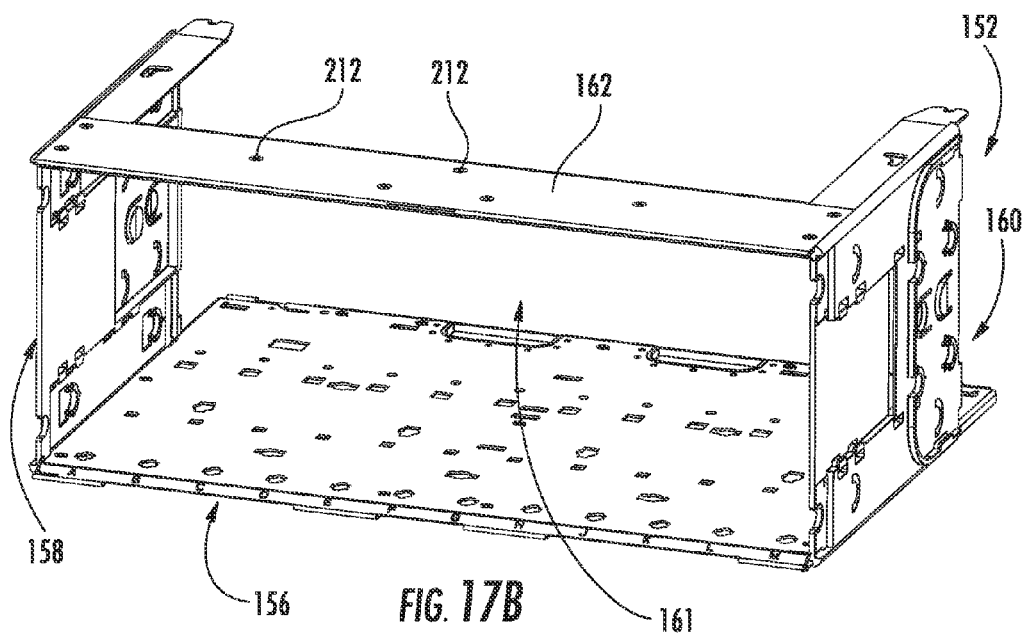
FIG. 17B is an assembled front perspective view of the fiber optic housing in FIG. 17A with a cover plate.
Figure 18:
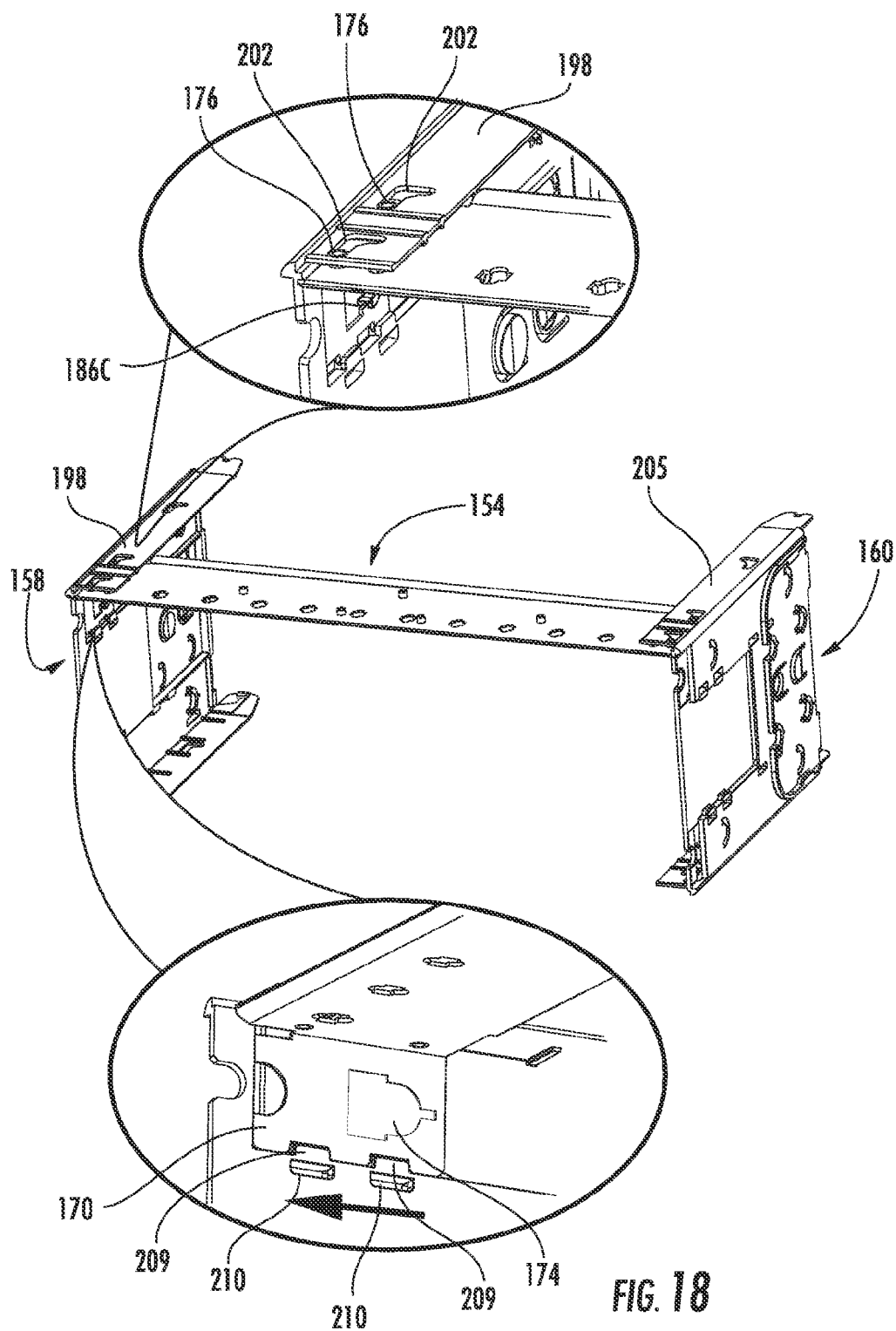
FIG. 18 is a close-up front perspective view illustrating details of how an inside top panel of the fiber optic housing in FIGS. 17A and 17B is connected to a side panel of the fiber optic housing.

Still referring to FIG. 16, as well as to FIG. 18, the inside top panel 154 may be tool-lessly attached to the left side panel 158 and the right side panel 160 quickly and easily. FIG. 18 is a close up front perspective view illustrating details of how the inside top panel 154 of the fiber optic housing 152 of FIGS. 16, 17A and 17B is connected to a side panel 158, 160 of the fiber optic housing 152. To do so, a user will slide the inside top panel 154 from the front of the left side panel 158 and the right side panel 160 toward the back of the left side panel 158 and the right side panel 160 such that the inside top panel 154 slides under the top flange 198 of the left side panel 158 and under the top flange 205 of the right side panel 160. The inside top panel 154 is positioned such that the receiver 174 on the side flange 170 of the inside top panel 154 is aligned with the snap attachment 186C located at the top portion 196 of the left side panel 158, which will also align the standoffs 176 on the left edge 178 of the inside top panel 154 with the grooves 202 on the top flange 198 of the left side panel 158. The inside top panel 154 should also be positioned such that the receiver 174 on the side flange 172 of the inside top panel 154 is aligned with the snap attachment 186C located at the top portion of the right side panel 160, which will also align the standoffs 176 on the right edge 184 of the inside top panel 154 with the grooves 206 on the top flange 205 of the right side panel 160. Once the inside top panel is aligned, the inside top panel 154 can be snapped onto the left side panel 158 and the right side panel 160 by snapping, or locking, the snap attachments 186C into the receivers 174 and the standoffs 176 into the grooves 202 and 206 (as seen in the close-up insets of FIG. 18).

In the embodiment as illustrated in FIGS. 16 and 18, the receivers 174 are keyhole-shaped in order to correspond to the half-moon shaped snap attachments 186C. However, the snap attachments 186C and the receivers 174 may be any shape as long as the receivers 174 correspond to the snap attachments 186C such that the snap attachments 186C snap, or lock, into place within the receivers 174. In one embodiment, the receivers 174 are slightly larger at one end than the snap attachments 186C so that the snap attachments 186C may fit into the receivers 174. Likewise, the standoffs 176 and the grooves 202 and 206 may be any size and shape as long as the standoffs 176 will lock into place in the grooves 202 and 206.

In the embodiment as illustrated in FIG. 18, the side flanges 170 and 172 of the inside top panel 154 may also include one or more cut out sections 209, sometimes known as crenels. The left side panel 158 may also include one or more protrusions 210, sometimes known as merlons, on the interior side 190 of the left side panel 158 toward the front portion 192 of the left side panel 158. In one embodiment, the merlons 210 are located directly beneath the snap attachment 186C. The right side panel 160 may have similar merlons 210 on its interior side. In the embodiment illustrated in FIG. 18, when the inside top panel 154 is positioned such that the receiver 174 on the side flange 170 of the inside top panel 154 is aligned with the snap attachment 186C located at the top portion 196 of the left side panel 158, the crenels 209 of the side flange 170 of the inside top panel 154 are also aligned with the merlons 210 of the left side panel 158. Then, when the inside top panel 154 is locked into place (such as by sliding the inside top panel 154 toward the front portion 192 of the left side panel 158, as indicated by the arrow in FIG. 18), the snap attachment 186C is locked into the receiver 174 and the merlons 210 interlock with the crenels 209 to provide additional stability for the attachment between the inside top panel 154 and the left side panel 158 and the right side panel 160.

FIG. 17A is an assembled front perspective view of the fiber optic housing 152 of FIG. 16. Once the left side panel 158 and the right side panel 160 have been tool-lessly attached to the bottom panel 156 and the inside top panel 154 has been tool-lessly attached to the left side panel 158 and the right side panel 160, the fiber optic housing 152 has been tool-lessly assembled, as illustrated in FIG. 17A.

The assembled fiber optic housing 152 can be quickly and easily unassembled by detaching the inside top panel 154, the bottom panel 156, the left side panel 158, and the right side panel 160 from each other tool-lessly.

In one embodiment, the fiber optic housing 152 may also include the cover plate 162 (as seen in FIG. 16) for the inside top panel 154. As seen in FIG. 16, the cover plate 162 may have a plurality of openings 212 configured such that when the cover plate 162 is positioned over the inside top panel 154, the openings 212 fit over the standoffs 176 on the inside top panel 154 in order to provide a gap between the inside top panel 154 and the cover plate 162. FIG. 17B is an assembled front perspective view of the fiber optic housing 152 of FIG. 17A with the cover plate 162 attached. In one embodiment, the cover plate 162 may be attached to the assembled fiber optic housing 152 by means of fasteners, with screws being one non-limiting example. In one embodiment, the fasteners extend through the grooves 202, 206 to attach the cover plate 162 to the right and left side panels 158, 160.

Embodiments disclosed below include fiber optic housings having a removable top, and related components and methods. In one embodiment, a fiber optic housing is provided having a removable top. In one embodiment, the fiber optic housing comprises a top, a bottom, a right side, and a left side defining at least one interior chamber configured to support fiber optic equipment. The top comprises a base and a cover in one embodiment. The top is configured to provide a gap between the base and the cover such that at least one of the right side and the left side of the fiber optic housing is configured to be slidably engaged into and out of the gap. In this manner, the top can be easily removed to provide access to the interior of the fiber optic housing.

Figure 19A:
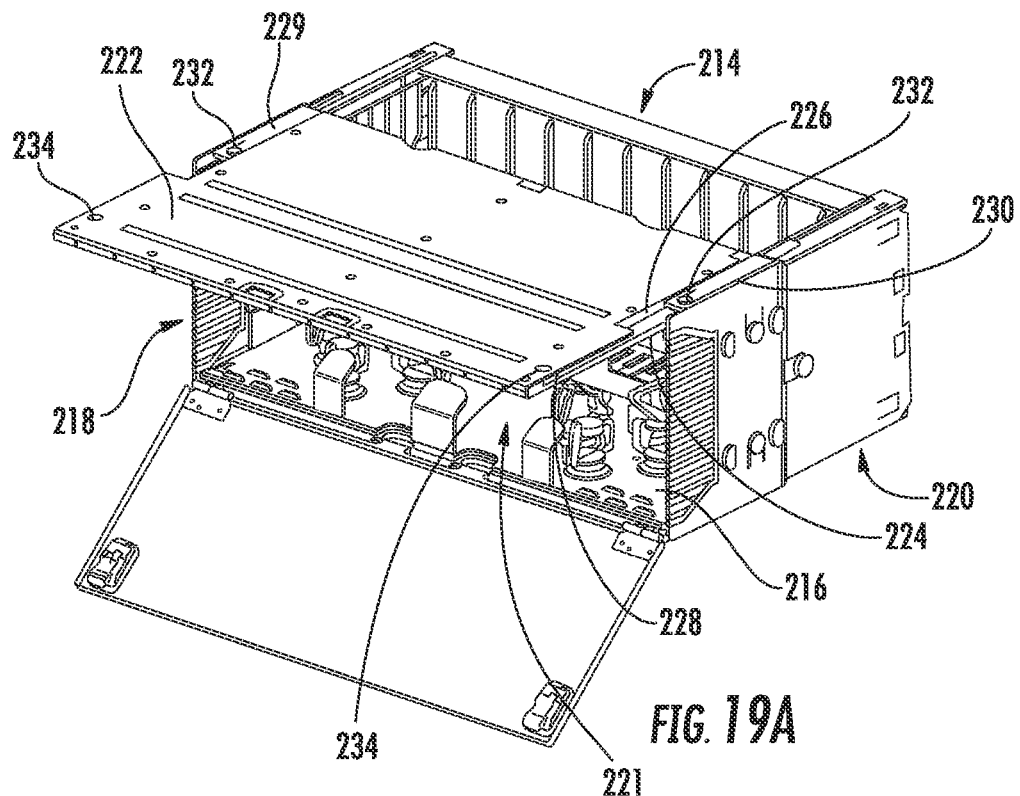
FIG. 19A is a rear perspective view of an exemplary fiber optic housing having an exemplary removable top.

In this regard, FIGS. 19A-21B disclose another embodiment, in which a removable top for a fiber optic housing is disclosed. The removable top allows easy access to internal features of the fiber optic housing at initial installation or afterwards. The removable top thus may provide an advantage over current fiber optic housing designs which are not removable since the removable top allows the technician or user easy access and a clear view of the working area inside the fiber optic housing. FIG. 19A illustrates the removable top as it slides out of the fiber optic housing. FIG. 19B illustrates the fiber optic housing after the removable top has been removed.

In one embodiment, the removable top on the fiber optic housing consists of a base and a cover plate capable of being fastened with pop-rivets or screws. In one embodiment, the removable top may be shaped in a way to provide a gap between the base and cover into which the side panel on the housing can slide. The side panel of the fiber optic housing has a release tab that engages and locks the removable top in place. In one embodiment, the removable top is made from any satisfactory metal. In other embodiments, the removable top can be one piece made out of plastic. In the embodiment illustrated in FIGS. 19A-21B, the release tab is round, but the release tab can be different shapes in other embodiments. In one embodiment, the release tab may be located on a top side of the removable top, or on an underside of the removable top.

FIG. 19A is a rear perspective view of a fiber optic housing 214 having a removable top 222 according to one embodiment. The fiber optic housing 214 has a bottom 216, a right side 218, and a left side 220. The bottom 216, the right side 218, and the left side 220 together define at least one interior chamber 221 of the fiber optic housing 214 configured to support fiber optic equipment. The fiber optic housing 214 also comprises the removable top 222 in this embodiment. In one embodiment, the fiber optic housing 214 may be assembled by attaching the bottom 216, the right side 218, the left side 220, and the removable top 222. In one embodiment, the fiber optic housing 214 may be assembled tool-lessly as disclosed above with respect to FIGS. 14-18. However, in other embodiments, the fiber optic housing 214 need not be assembled tool-lessly to have the removable top 222 as described herein.

The removable top 222 comprises a base 224 and a cover plate 226. The cover plate 226 is attached to the base 224 such that a gap 228 exists between the base 224 and the cover plate 226. The right side 218 may comprise a top flange 229. The left side 220 may comprise a top flange 230. The gap 228 between the base 224 and the cover plate 226 may be of a size that corresponds to the thickness of the top flanges 229 and 230. In this manner, the removable top 222 may slide on and off the right side 218 and the left side 220, where the gap 228 between the base 224 and the cover plate 226 allows the cover plate 226 of the removable top 222 to pass over the top flanges 229, 230 and the base 224 of the removable top 222 to pass under the top flanges 229, 230. One or both of the top flanges 229, 230 may have a release tab 232. The cover plate 226 may have one or more holes 234 configured to receive the release tab(s) 232 when the removable top 222 is slid onto the right side 218 and the left side 220. As the removable top 222 is slid onto the right side 218 and the left side 220, the release tab(s) 232 selectably engages with the hole(s) 234 to hold the removable top 222 in place in the fiber optic housing 214. If it is desired to remove the removable top 222, the user will press the release tab(s) 232 down, allowing the release tab(s) 232 to be disengaged from the hole(s) 234 and allowing the removable top 222 to be slid out from the fiber optic housing 214. In one embodiment, the release tab 232 is flexible and resilient, such that it is biased to move from a first position to a second position when a force is exerted on the release tab 232, and then returns to the first position by itself when the force is no longer exerted. In another embodiment, the release tab 232 may be spring loaded. In one embodiment, as seen in FIG. 19A, the release tab 232 is accessible from the top of the removable top 222. Although the release tab 232 is pressed downward in the above embodiments, in other embodiments, the release tab 232 may be lifted up, pulled outward, pressed inward, or manipulated in other ways and/or directions to cause the release tab 232 to disengage from the hole(s) 234 and allow the removable top 222 to be slid out from the fiber optic housing 214.

Figure 19B:
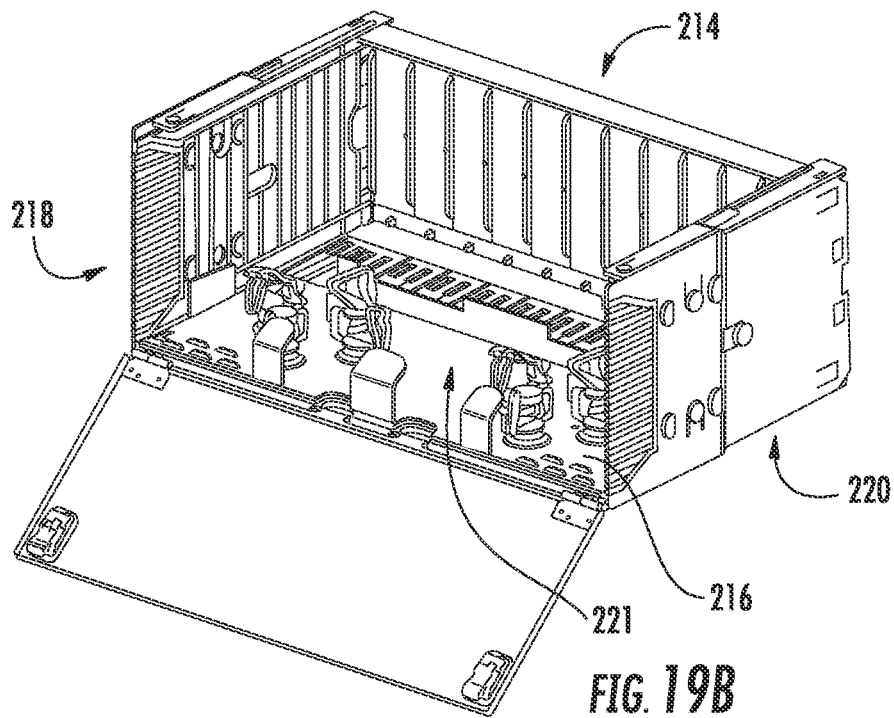
FIG. 19B is a rear perspective view of the fiber optic housing of FIG. 19A after the removable top is removed.
Figure 19C:
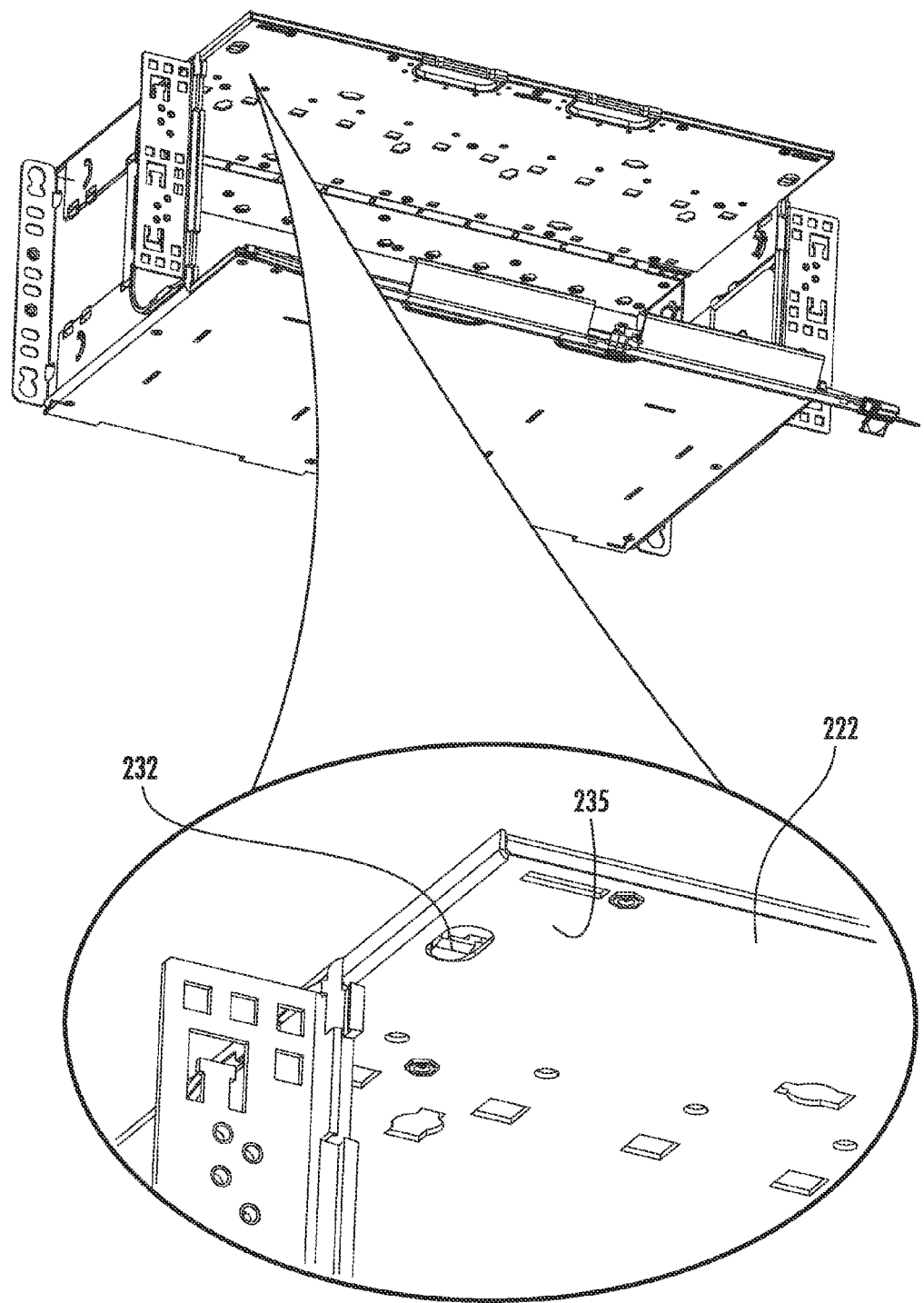
FIG. 19C illustrates an exemplary release tab in the fiber optic housing in FIGS. 19A and 19B.

FIG. 19A illustrates the removable top 222 sliding out of the fiber optic housing 214. FIG. 19B is a rear perspective view of the fiber optic housing 214 of FIG. 19A after the removable top 222 is removed. This allows the user or technician access to the fiber optic cables, modules, cassettes, optical fibers, or other fiber optic apparatuses inside the fiber optic housing 214. FIG. 19C illustrates an alternate embodiment of the release tab 232. In this embodiment, the release tab 232 is accessible from an underside 235 of the removable top 222. In another embodiment, the release tab 232 may be located on a top side of the removable top 222.

Figure 20A:
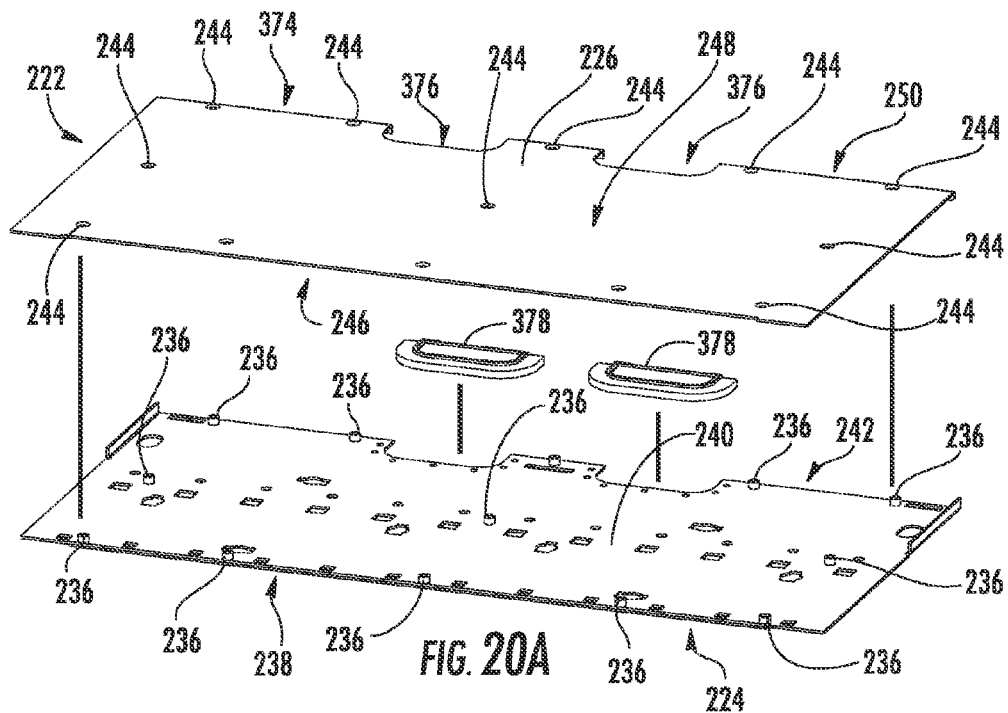
FIG. 20A illustrates an exploded front perspective view of an exemplary removable top.

FIG. 20A illustrates an exploded front perspective view of an exemplary embodiment of the removable top 222. FIG. 20A illustrates how the removable top 222 of FIG. 19A is assembled according to one embodiment. The removable top 222 is assembled using the base 224 and the cover plate 226. The base 224 may have a plurality of standoffs 236 disposed on its top surface. In the embodiment of FIG. 20A, the base 224 has a plurality of standoffs 236 arranged along a front edge 238 of the base 224, a plurality of standoffs 236 arranged in a middle portion 240 of the base 224, and a plurality of standoffs along a back edge 242 of the base 224. The cover plate 226 has a plurality of openings 244 that correspond to the plurality of standoffs 236 in one embodiment. In the embodiment of FIG. 20A, the cover plate 226 has a plurality of openings 244 arranged along a front edge 246 of the cover plate 226, a plurality of openings 244 arranged in a middle portion 248 of the cover plate 226, and a plurality of openings 244 along a back edge 374 of the cover plate 226. The number of standoffs 236 and openings 244 may vary.

The standoffs 236 may be a predetermined height in one embodiment. In one embodiment, the standoffs 236 may be between approximately one eighth (⅛) of an inch tall and approximately one half (½) of an inch tall. In one embodiment, the standoffs 236 may be approximately one quarter (¼) of an inch tall. The cover plate 226 is attached to the base 224 by placing the openings 244 over the corresponding standoffs 236 in order to form the removable top 222 of FIGS. 19A and 20B (discussed below). In one embodiment, the standoffs 236 are configured to receive screws or other fasteners that will affix the cover plate 226 to the base 224. In one embodiment, the base 224 may also have cutout sections 376 that are configured to receive rubber grommets 378. The rubber grommets 378 can be used for access for fiber optic cables or optical fibers to be routed into and out of the fiber optic housing 214.

When the cover plate 226 is attached to the base 224 to form the removable top 222, the standoffs 236 help form the gap 228 between the base 224 and the cover plate 226 as seen in FIGS. 19A and 20A. The gap 228 allows the removable top 222 to be slid on and off of the fiber optic housing 214.

Figure 20B:
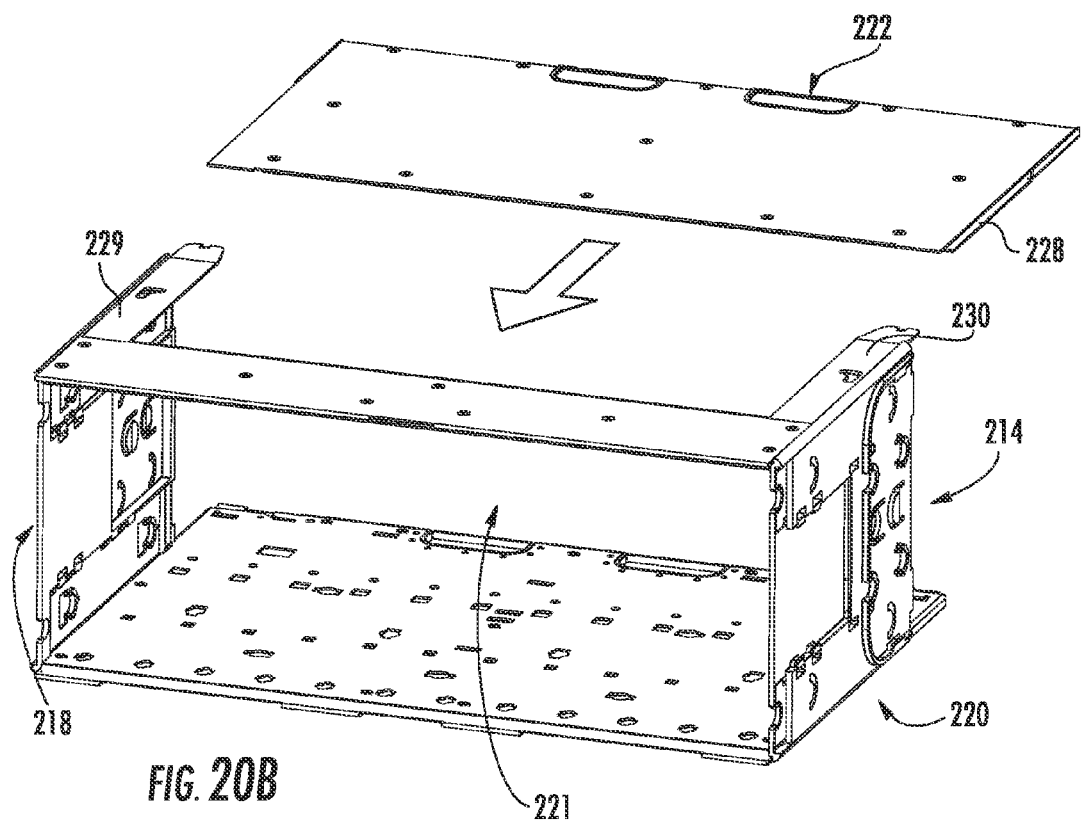
FIG. 20B illustrates an assembled front perspective view of the fiber optic housing in FIG. 17B as the removable top in FIG. 20A is being installed into the fiber optic housing.

FIG. 20B illustrates an assembled front perspective view of an exemplary embodiment of the fiber optic housing 214 of FIG. 19A as the removable top 222 is being reinstalled into the fiber optic housing 214. As seen in FIG. 20B, the removable top 222 can be slid back onto the fiber optic housing 214 such that the gap 228 allows the cover plate 226 of the removable top 222 to pass over the top flanges 229 and 230 of the right side 218 and left side 220 of the fiber optic housing 214 and the base 224 of the removable top 222 to pass under the top flanges 229, 230.

Figure 21A:
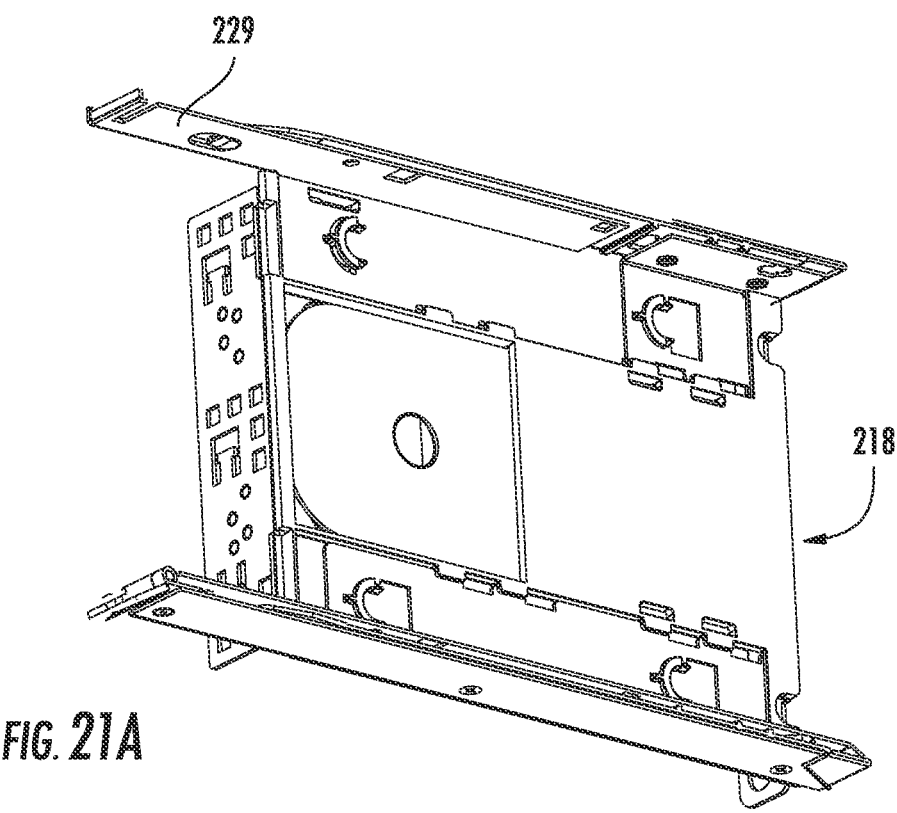
FIG. 21A is a side view section cut of an exemplary side panel of an exemplary fiber optic housing with the removable top in FIGS. 19A, 20A, and 20B installed.
Figure 21B:
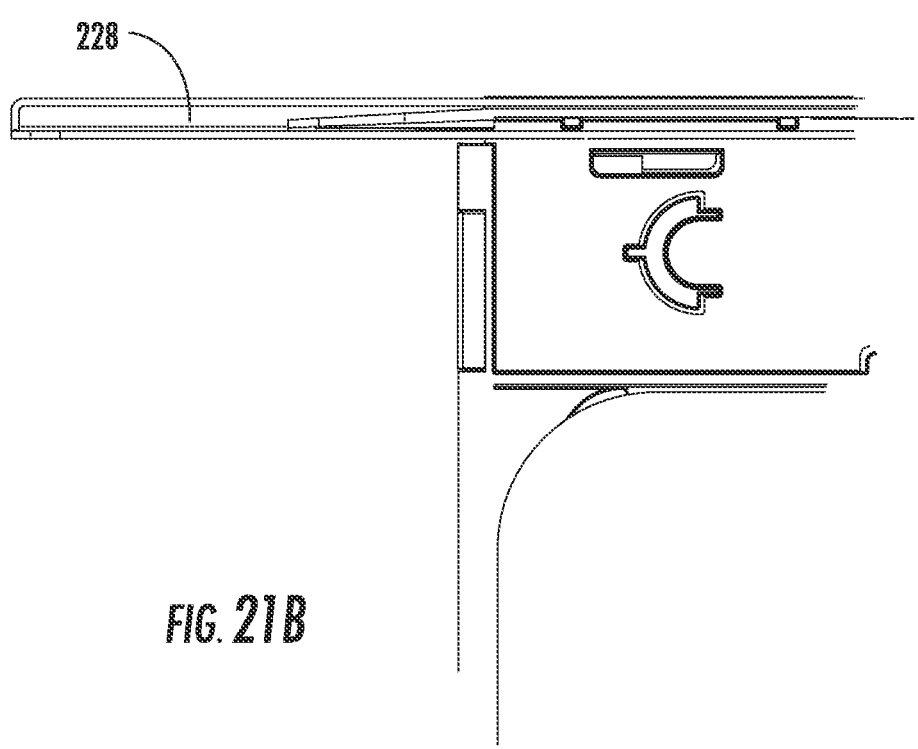
FIG. 21B is a side view of an exemplary gap in the removable top in FIGS. 19A, 20A, and 20B configured to receive the side panel of the fiber optic housing.

FIG. 21A is a side view section cut of a side panel (such as the right side 218 or the left side 220 of the fiber optic housing 214 of FIGS. 19A and 20A) of a fiber optic housing configured to receive the removable top 222 of FIGS. 19A, 20A, and 20B. FIG. 21B is a side view of the gap 228 in the removable top 222 of FIGS. 19A, 20A, and 20B configured to receive the side panel of the fiber optic housing. As discussed above, the right side 218 in FIG. 21A has a top flange 229 of a thickness that corresponds to the gap 228 between the base 224 and the cover plate 226 of the removable top 222. As illustrated in FIG. 21B, the gap 228 is configured to correspond to the thickness of the top flange 229 such that the removable top 222 can slide along the top flange 229, with the gap 228 receiving the top flange 229. In this manner, the removable top 222 can be reinstalled into the fiber optic housing 214.

Figure 22:
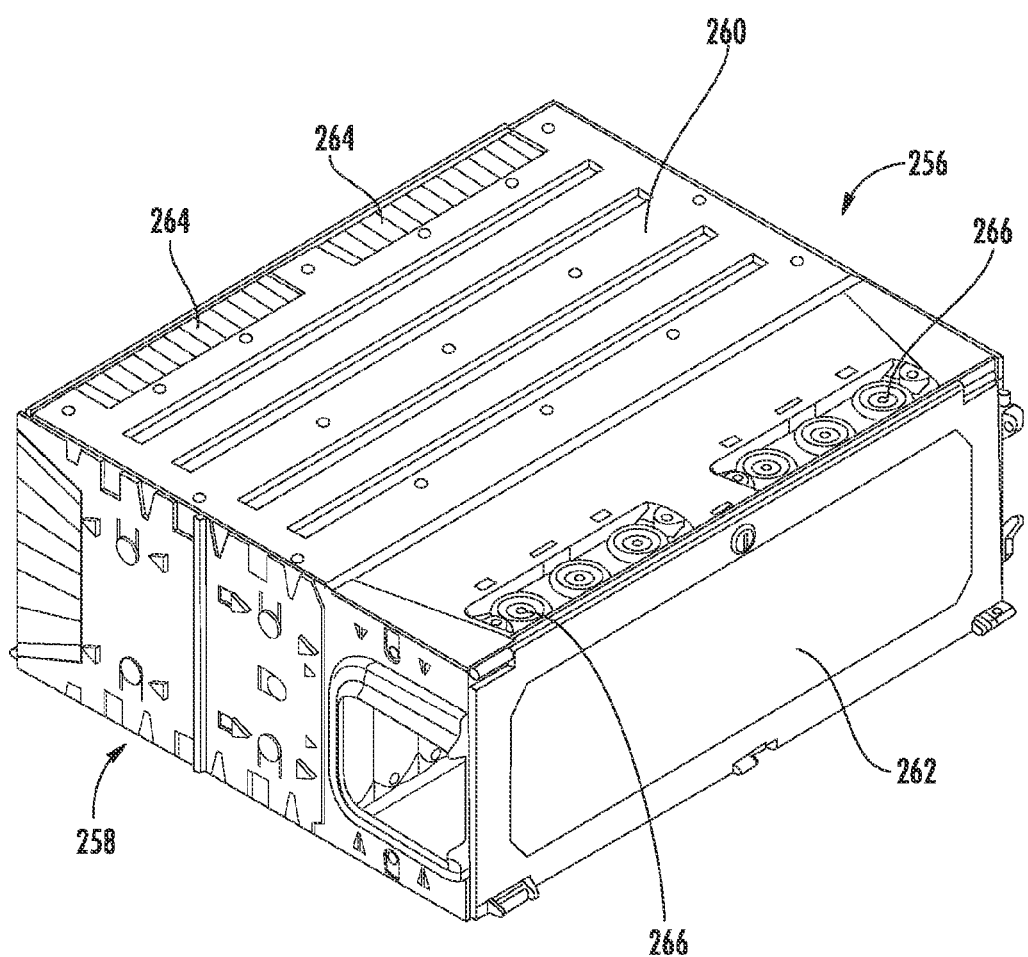
FIG. 22 is a front perspective view of an exemplary fiber optic housing including exemplary openings disposed in the sides of the fiber optic housing and rubber entry grommets disposed in the fiber optic housing, both for fiber management.

FIG. 22 is a front perspective view of a fiber optic housing 256 illustrating rubber entry grommets 264, 266. The fiber optic housing 256 may be of any type and can be assembled in any manner. In one embodiment, the fiber optic housing 256 has a bottom (not illustrated in FIG. 22), a left side 258, a right side (not illustrated in FIG. 22), and a top 260. The fiber optic housing 256 also comprises a front door 262 in this embodiment. In one embodiment, the fiber optic housing 256 may be assembled by attaching the bottom, the left side 258, the right side, and the top 260. In one embodiment, the fiber optic housing 256 may be assembled tool-lessly as disclosed above with respect to FIGS. 14-18. However, in other embodiments, the fiber optic housing 256 need not be assembled tool-lessly. The top 260 may or may not comprise a removable top as disclosed above with respect to FIGS. 19A-21B. The fiber optic housing 256 has a plurality of rubber grommets 264 and 266. In one embodiment, the fiber optic housing 256 may have rubber grommets 264 or 266 on the top and bottom rear and front, and left and right sides rear and front of the fiber optic housing 256. The rubber grommets 264, 266 may be in the form of a single piece of rubber, like the rubber grommets 264, or they may be part of a jumper management device, like the rubber grommets 266, which are disclosed in more detail below with respect to FIGS. 29 and 31-34. The rubber grommets may be of any shape, including but not limited to rectangles, like the rubber grommets 264, or circles, like the rubber grommets 266. Rubber provides better protection than solid materials, especially on the edges, and provides a better seal to keep dust, insects, and rodents out of the housings. In one embodiment, the rubber grommets 264, 266 may be easily removed to provide entry and exit points for fiber optic cables or optical fibers to be routed in and out of the fiber optic housing 256 to the appropriate locations.

Figure 23:
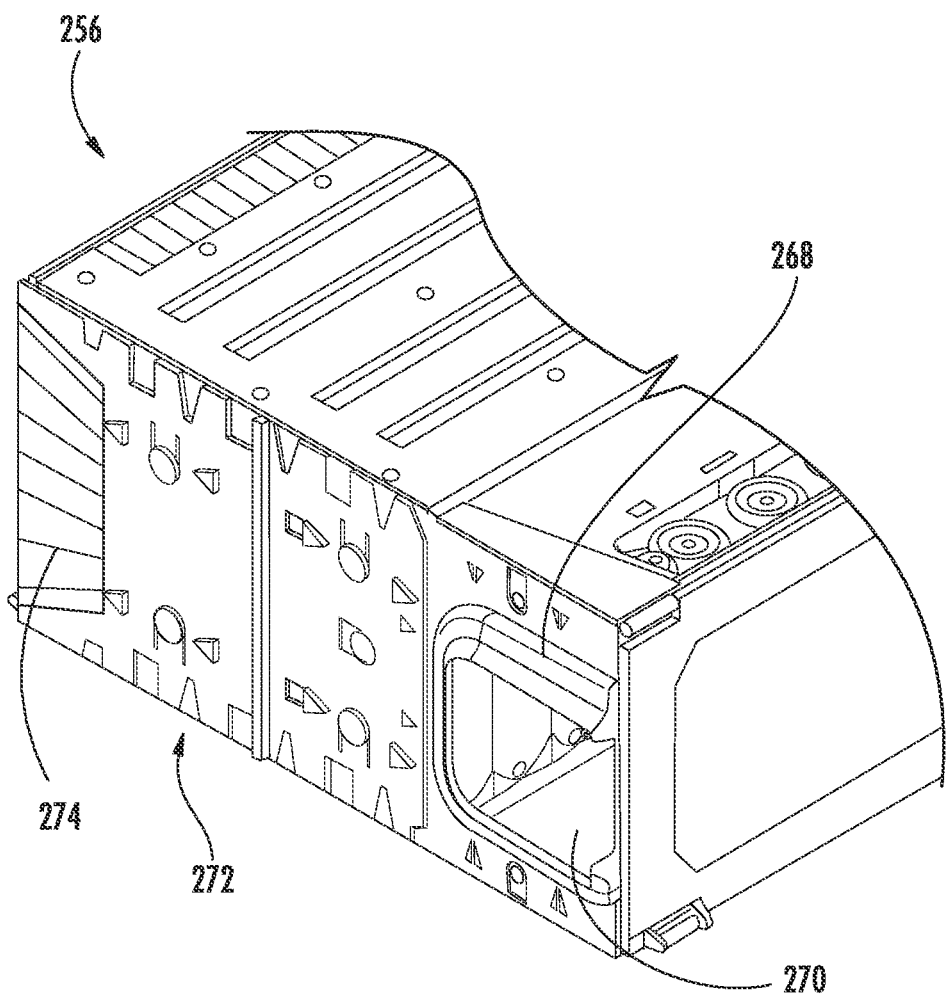
FIG. 23 is a partial, front perspective view of an exemplary fiber optic housing in FIG. 22, illustrating exemplary molded in flexible edge protection disposed in the fiber optic housing.

FIG. 23 is a partial, front perspective view of the fiber optic housing 256 of FIG. 22. The fiber optic housing 256 may include molded in flexible edge protection. A molded in flexible edge protection piece 268 is located around an opening 270 on one or more sides 272 of the fiber optic housing 256, as illustrated in FIG. 23. Fiber optic jumper cables or other fiber optic cables or optical fibers (not illustrated in FIG. 23) may be routed out of the fiber optic housing 256 through the opening 270, and the molded in flexible edge protection piece 268 offers protection for the fiber optic jumper cables. In addition, one or more side grommets 274 are molded onto the solid material of the side 272 for a strong bond with the lowest profile possible. The side grommets 274 also offer access points for fiber optic jumper cables or other fiber optic cables or optical fibers to be routed into or out of the fiber optic housing 256.

The rubber grommets disclosed above with respect to FIGS. 22 and 23 allow for the routing of various fiber optic cables and optical fibers in and out of fiber optic housings. The fiber optic housings may also include various features to help better route and manage the fiber optic cables and optical fibers in and around the fiber optic housings. In one embodiment, the fiber optic housing may have a removable front section. The removable front section allows the fiber optic housing to be used for different applications and/or designs, as examples, where no jumper management is needed, or where a sealed version may be required. Further, the removable front section may comprise a removable front jumper management device with pass-through grommets. Fiber optic cables may be allowed to pass through using the pass-through grommets while keeping the fiber management within the housing envelope. When removed, it allows for a greater volume of fiber jumpers to exit from the top and bottom, without sacrificing the space above the unit. Additionally, it allows pass-through of fiber optic cables or optical fibers on the top and bottom, instead of the top only like previous designs.

In this regard, embodiments disclosed below include removable fiber management sections for fiber optic housings, and related components and methods. In one embodiment, a fiber optic system is provided. The fiber optic system comprises a fiber optic housing defining at least one interior chamber configured to support fiber optic equipment. The fiber optic system also comprises a removable front section connected to the fiber optic housing and defining at least one front section interior chamber coupled to the at least one interior chamber of the fiber optic housing. The removable front section is configured to support at least one fiber management device to manage one or more optical fibers connected to fiber optic equipment disposed in the fiber optic housing.

Figure 24:
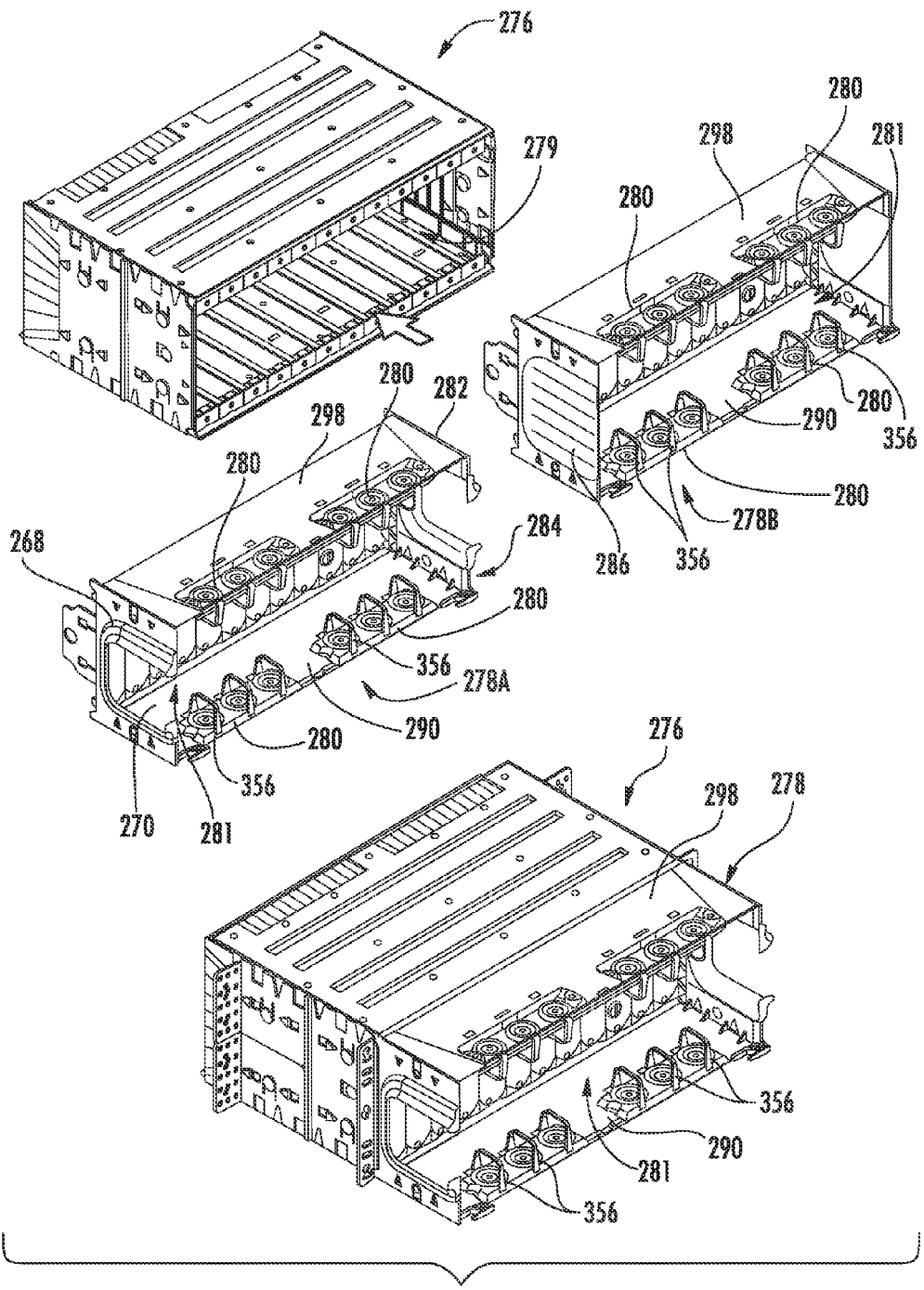
FIG. 24 illustrates a front perspective view of an exemplary fiber optic housing and perspective views of exemplary removable front section versions attached to the fiber optic housing to provide additional capacity for fiber management devices.

In this regard, FIG. 24 illustrates a front perspective view of a fiber optic housing 276 with a removable front section 278 and perspective views of two (2) removable front section versions. The fiber optic housing 276 defines an interior chamber 279 configured to support fiber optic equipment. The removable front section 278 also defines a front section interior chamber 281 to support fiber management components for managing one or more optical fibers connected to the fiber optic equipment supported by the fiber optic housing 276, as will be discussed in more detail below. In this embodiment, the removable front section 278 is attached to the fiber optic housing 276. The removable front section 278 can also be removed from the fiber optic housing 276 when no longer needed or desired. Optical fibers can be managed in fiber management components disposed in the removable front section 278 before or after the removable front section 278 is attached to the fiber optic housing 276. Further, optical fibers routed in fiber management devices disposed in the removable front section 278 can be unrouted or removed before or after the removable front section 278 is detached from the fiber optic housing 276.

The removable front section 278 may come in different versions. In one embodiment, the removable front section 278 may include fiber management components in the form of a plurality of front jumper management devices 280 and an opening 270 disposed on both sides of the removable front section 278. The front jumper management devices 280 allow optical fibers that are connected to fiber optic equipment supported in the fiber optic housing 276 to be routed and maintained. The removable front section 278 can be employed to provide capacity for employing such a fiber management component when the fiber optic housing 276 is either not able or is not configured to provide sufficient additional room for fiber management components. The openings 270 are both configured to provide fiber management by being configured to route one or more optical fibers connected to fiber optic equipment in the fiber optic housing 276 outside of the fiber optic housing 276 and to the sides of the removable front section 278. When optical fibers are not routed through the openings 270, a rubber seal 286 can be disposed in the openings 270, as exemplified by the removable front section 278B. The rubber seal 286 can fit in the place of the openings 270 in the removable front section 278A to provide protection for the inside of the fiber optic housing 276 and to keep dust, insects, rodents, and other things out of the fiber optic housing 276.

In this embodiment, the opening 270 includes a molded in flexible edge protection piece 268, as exemplified by the removable front section 278A. The flexible edge protection piece 268 protects optical fibers routed or otherwise disposed through the openings 270 from being damaged by kinking or bending against the edges of the openings 270 which may be sharp, especially if the fiber optic housing 276 is constructed from sheet metal as an example. The flexible edge protection piece 268 may be made from any type of material desired, including any type of polymer, rubber, plastic, etc. The flexible edge protection piece 268 may also be removable.

Fiber optic jumper cables or other fiber optic cables or optical fibers (not illustrated in FIG. 24) may be routed out of the fiber optic housing 276 through the opening 270, and the molded in flexible edge protection piece 268 offers protection for the fiber optic jumper cables. The front jumper management devices 280 aid in fiber management and routing, as will be described in more detail below, with respect to FIGS. 29-34. The front jumper management devices 280 may be easily removable in one embodiment.

The front jumper management devices 280 may be located on a top portion 282 and/or on a bottom portion 284 of the removable front section 278.

In another embodiment, the removable front section 278 may also include a fiber management component in the form of a plurality of front jumper management devices 280 to route optical fibers along and through the bottom and top panels 298, 290 of the removable front section 278. As will also be discussed in more detail below with regard to FIGS. 31-33, the front jumper management devices 280 may include a plurality of fiber routing guides in the form of routing clips 356 (see also FIG. 31) configured to route optical fibers connected to fiber optic equipment supported in the fiber optic housing 276. As will also be discussed in more detail below with regard to FIGS. 31-33, the front jumper management devices 280 may also include openings to allow optical fibers to be routed through bottom and top sections 290, 298 away from the removable front section 278. Although in the embodiment of FIG. 24, the removable front section 278A also has front jumper management devices 280, in other embodiments, the removable front section 278A or 278B may not have any front jumper management devices 280, or may have less front jumper management devices 280.

Figure 25:
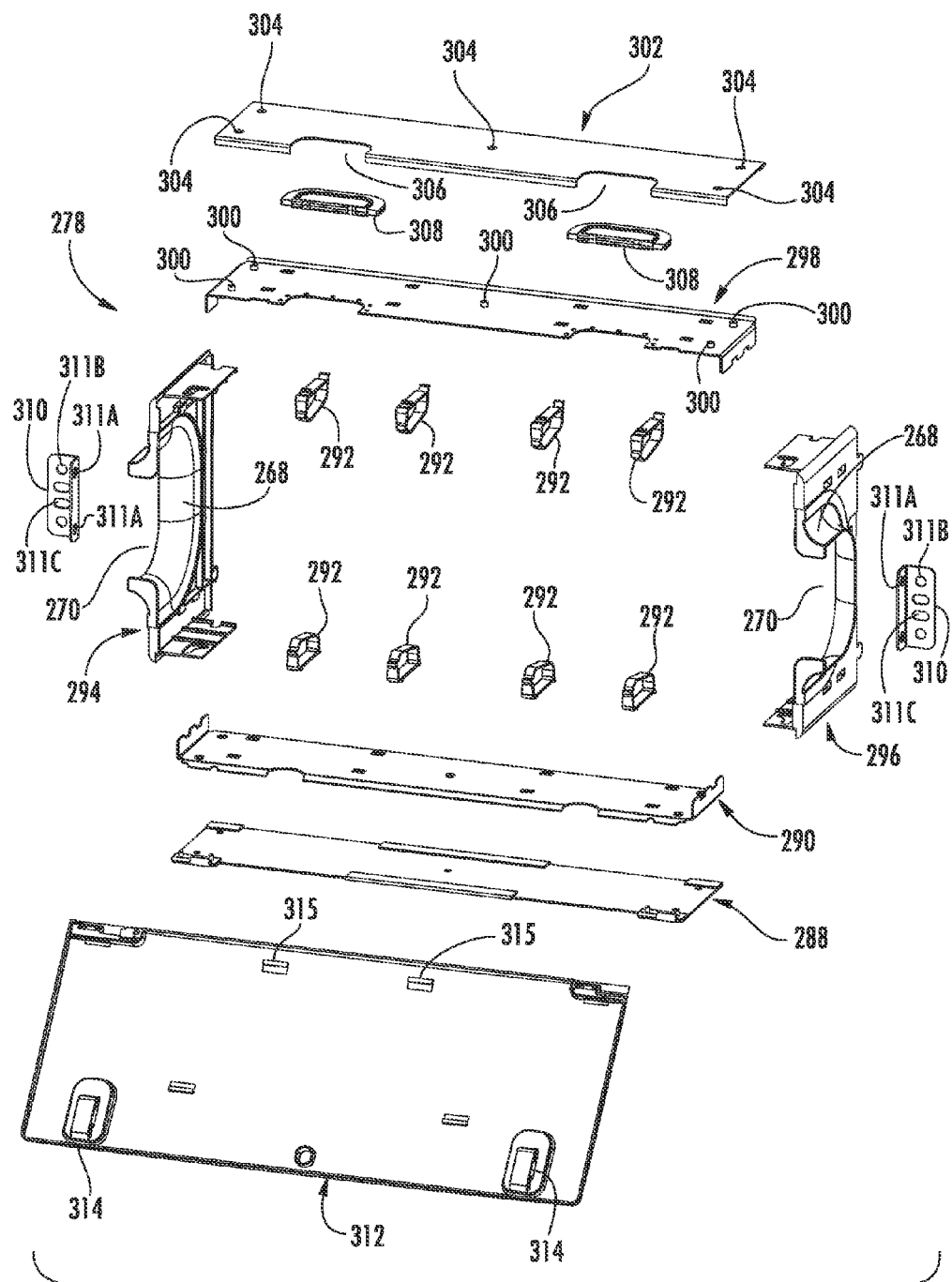
FIG. 25 illustrates an exploded, front perspective view of an exemplary removable front section in FIG. 24 configured to be attached to the fiber optic housing in FIG. 24.

FIG. 25 illustrates an exploded, front perspective view of the removable front section 278 of a fiber optic housing. The removable front section 278 has a base 288 which is attached to a bottom panel 290. A plurality of clips 292 for routing optical fibers may be configured to be attached to the bottom panel 290 of the base 288. A left side panel 294 with an opening 270 having a molded in flexible edge protection piece 268 is configured to be attached to the bottom panel 290. A symmetrical right side panel 296 with an opening 270 having a molded in flexible edge protection piece 268 is also configured to be attached to the bottom panel 290. In one embodiment, the left side panel 294 and the right side panel 296 may be attached to the bottom panel 290 tool-lessly in a manner as described above with respect to FIGS. 14-18.

With continued reference to FIG. 25, a top panel 298 having a plurality of standoffs 300 disposed on its top surface is configured to be attached to the left side panel 294 and to the right side panel 296. In one embodiment, the top panel 298 may be attached to the left side panel 294 and to the right side panel 296 tool-lessly in a manner as described above with respect to FIGS. 14-18. Alternative fiber management components in the form of a plurality of clips 292 for routing optical fibers may be configured to be attached to the top panel 298 for routing optical fibers. A cover plate 302 having openings 304 disposed thereon is configured to be attached to the top panel 298. The openings 304 on the cover plate 302 are configured to fit over the standoffs 300 on the top panel 298. In one embodiment, a fastener (not illustrated), including but not limited to a screw or pop rivet, will pass through the openings 304 into the standoffs 300 in order to attach the cover plate 302 to the top panel 298. In one embodiment, the top panel 298 and the cover plate 302 have corresponding cutout sections 306. The cutout sections 306 are configured to receive rubber grommets 308, as illustrated in the embodiment of FIG. 25, or front jumper management devices 280 in another embodiment.

Still referring to FIG. 25, L-shaped brackets 310 are configured to be attached to each of the left side panel 294 and the right side panel 296. The L-shaped brackets 310 may be attached to the left and right side panels 294, 296 by any means, including by screws or pop rivets. The L-shaped brackets 310 may have openings 311A on one flange of the L-shaped brackets 310 to attach the L-shaped brackets 310 to the left and right side panels 294, 296. The L-shaped brackets 310 may also have openings 311B and 311C on another flange of the L-shaped brackets 310 to attach the removable front section 278 to a fiber optic housing, as described more fully below in connection with FIG. 27. In one embodiment, the L-shaped brackets 310 may take a form similar to the mounting brackets disclosed above (see, e.g., FIG. 6) and the left side panel 294 and the right side panel 296 may have snap attachment features as disclosed above (see, e.g., FIG. 6), and the L-shaped brackets 310 may be tool-lessly attached to the left side panel 294 and the right side panel 296. The removable front section 278 may also have a door 312. The door 312 is configured to attach to the base 288 and may be opened and closed.

Figure 26A:
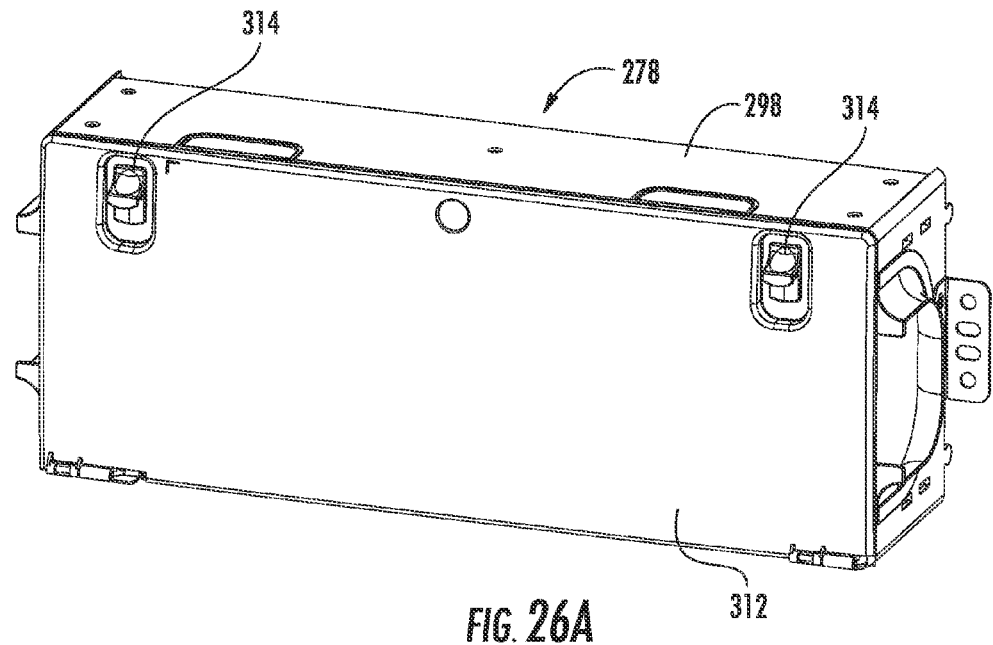
FIG. 26A illustrates a front perspective view of the removable front section in FIG. 25 with a door closed against the removable front section.

Once the various components of the removable front section 278 of FIG. 25 are assembled, the removable front section 278 will look like the removable front section 278 of FIG. 26A. FIG. 26A illustrates a front perspective view of the removable front section 278 of a fiber optic housing with the door 312 closed. The door 312 may have one or more latches 314 for opening and closing the door 312.

Figure 26B:
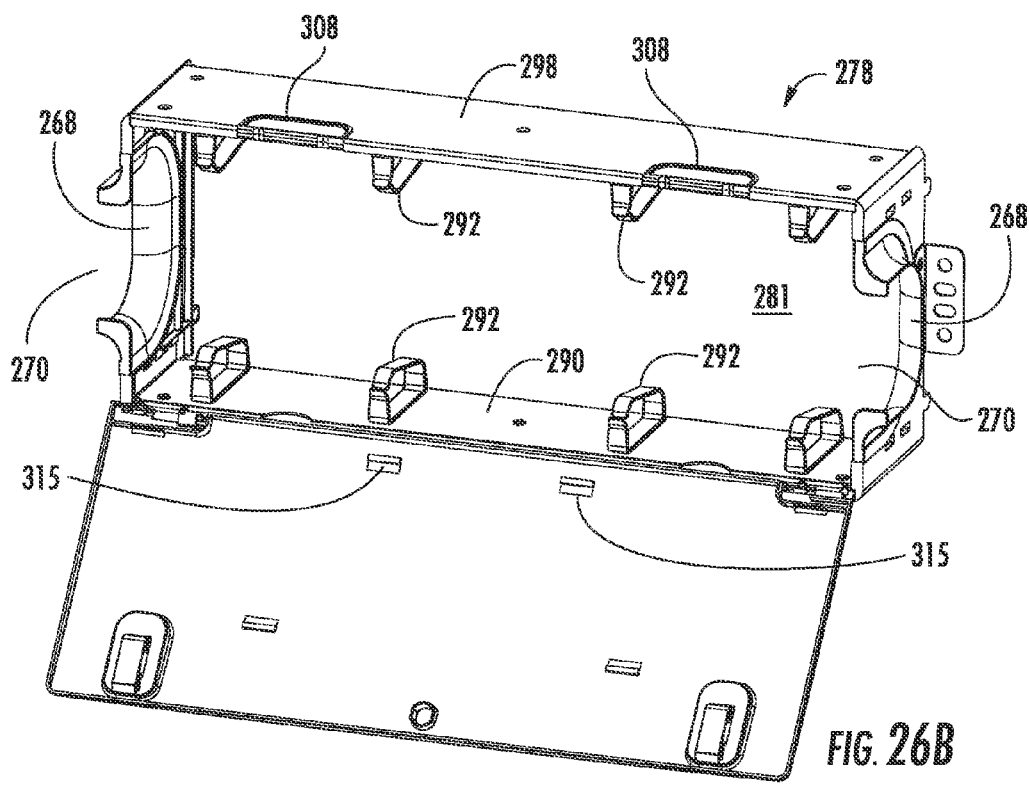
FIG. 26B illustrates a front perspective view of the removable front section in FIGS. 25 and 26A with the door in FIG. 26A opened.

FIG. 26B illustrates a front perspective view of the removable front section 278 with the door 312 open. With the door 312 open, the plurality of clips 292 are visible. The plurality of clips 292 are used for routing control and management of fiber optic cables and optical fibers, including but not limited to fiber optic jumper cables. The fiber optic jumper cables, or other fiber optic cables and optical fibers, may be routed through one or more of the plurality of clips 292 and in or out of the openings 270 on either side of the removable front section 278. In addition, the rubber grommets 308 may be removed to another access point for the fiber optic jumper cables, or other fiber optic cables and optical fibers, to be routed in and out of the removable front section 278. In one embodiment, the door 312 may also comprise one or more lips 315. The lips 315 are configured to allow flip cards (not illustrated) to be removably attached to the lips 315.

Figure 26C:
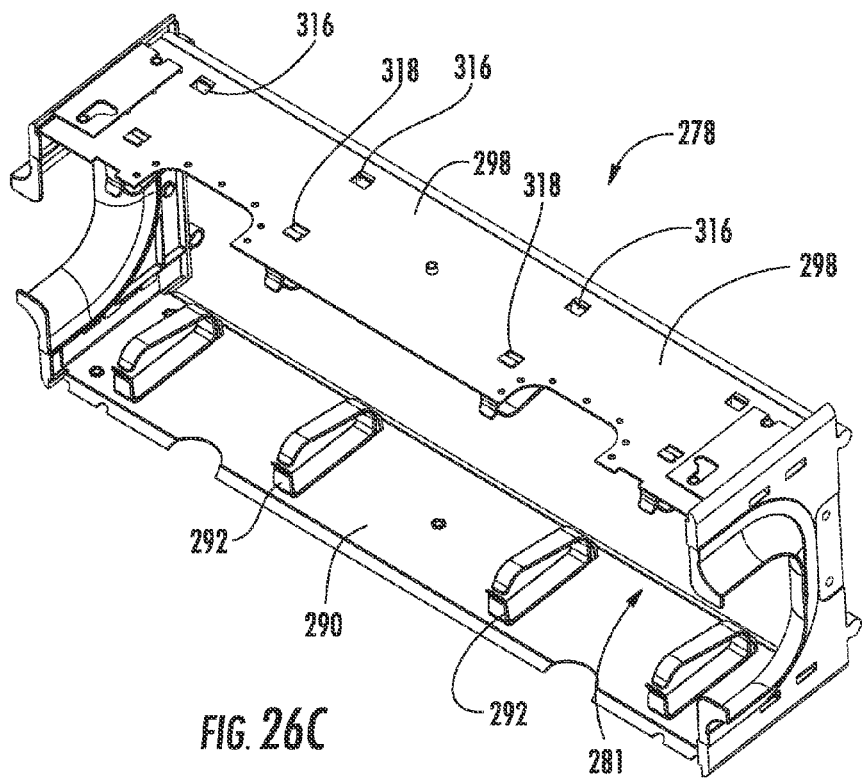
FIG. 26C illustrates a top perspective view of the removable front section in FIGS. 25, 26A, and 26B with the door removed.
Figure 26D:
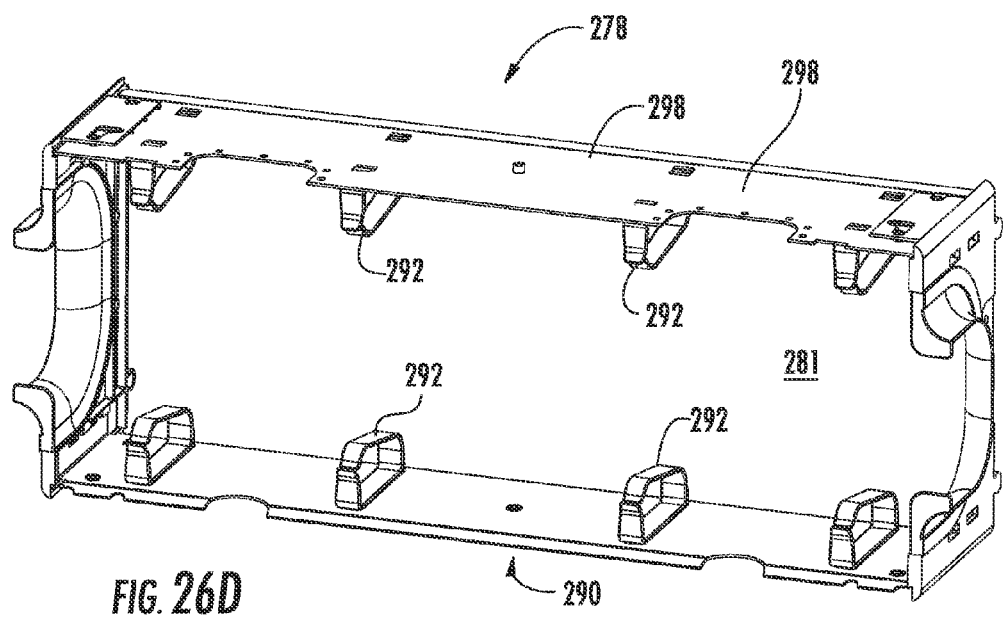
FIG. 26D illustrates a front perspective view of the removable front section in FIGS. 25 and 26A-C with the door removed.

FIG. 26C illustrates a top front perspective view of the removable front section 278 with the door 312 removed. FIG. 26D illustrates another front perspective view of the removable front section 278 with the door 312 removed. Referring to FIG. 26C, the top panel 298 has a plurality of receivers 316 disposed thereon. The plurality of receivers 316 are configured to receive the plurality of clips 292. In one embodiment, each of the plurality of clips 292 has a hook 318 that is configured to selectively fit into one of the plurality of receivers 316, thereby attaching the clip 292 to the top panel 298. Each of the plurality of clips 292 is inserted from underneath the top panel 298 such that the hook 318 on each respective clip 292 fits into one of the plurality of receivers 316, locking the respective clip 292 into the respective receiver 316. The bottom panel 290 may also have a plurality of receivers like the receivers 316 that are configured to receive a plurality of clips 292 such that a plurality of clips 292 may also be attached to the bottom panel 290.

Figure 27:
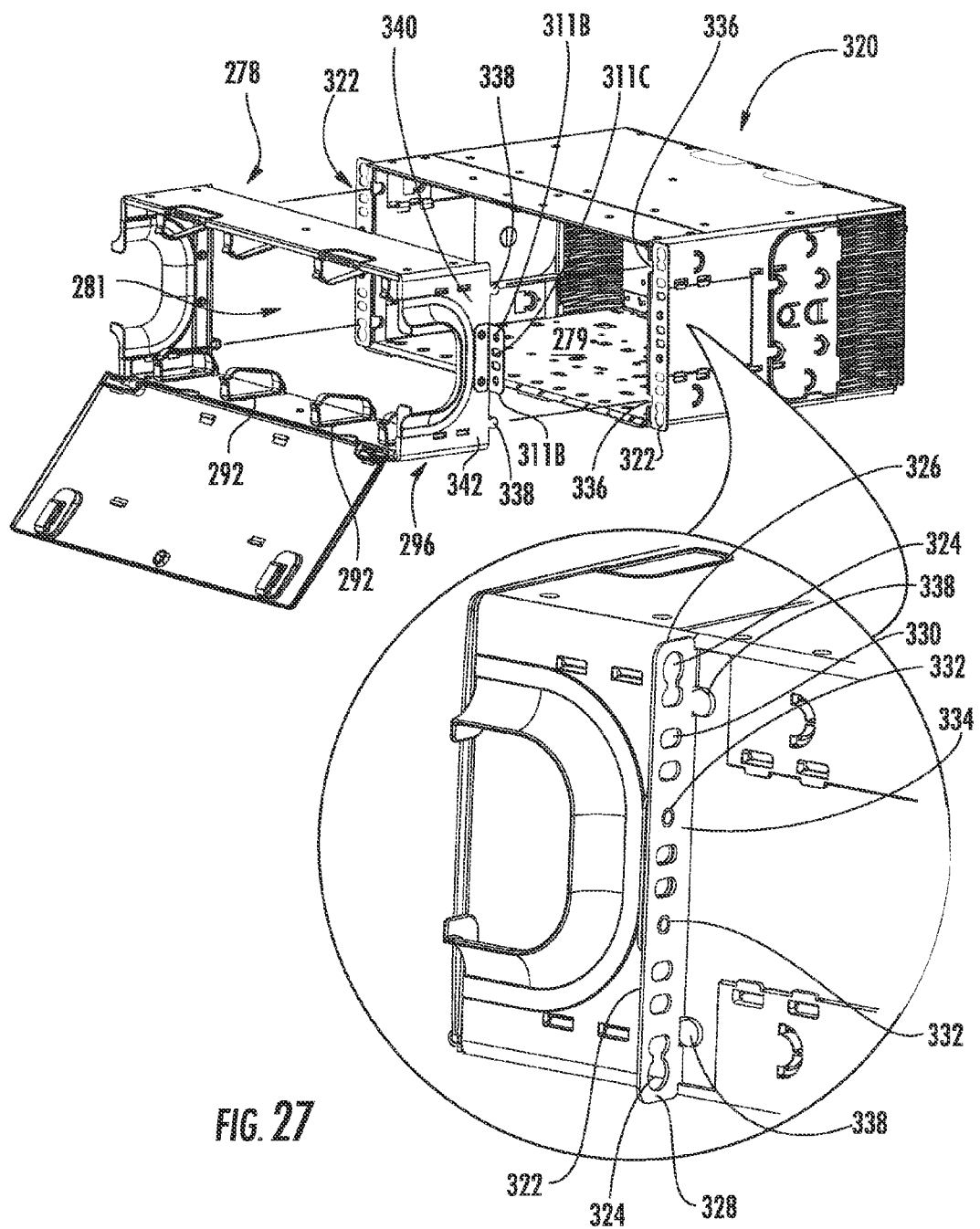
FIG. 27 illustrates a front perspective view of an exemplary removable front section being attached to an exemplary fiber optic housing.

FIG. 27 illustrates a front perspective view of the removable front section 278 being attached to a fiber optic housing 320. The fiber optic housing 320 may be of any type and may be assembled in any manner. In one embodiment, the fiber optic housing 320 may be assembled tool-lessly as disclosed above with respect to FIGS. 14-18. The fiber optic housing 320 may have mounting brackets 322 attached to each side of the fiber optic housing 320. In one embodiment, the mounting brackets 322 may be like any of the mounting brackets disclosed above in FIGS. 4-8 and may be attached to the fiber optic housing 320 as disclosed therein. The mounting brackets 322 may have a plurality of keyhole-shaped openings 324. In one embodiment, there may be one keyhole-shaped opening 324 at a top 326 of each of the mounting brackets 322 and one keyhole-shaped opening 324 at a bottom 328 of each of the mounting brackets 322. In one embodiment, the mounting brackets 322 may also include a plurality of oval-shaped openings 330 and a plurality of circular holes 332. In one embodiment, the plurality of circular holes 332 may be located at or near a center 334 of the each of the mounting brackets 322. In other embodiments, the keyhole-shaped openings 324, the oval-shaped openings 330 and the circular holes 332 may be different shapes. The mounting brackets 322 may also have a plurality of recesses 336, which allow a space for other apparatuses, such as the removable front section 278, to be attached to the fiber optic housing 320, as described more fully below.

With continued reference to FIG. 27, including the inset view, the removable front section 278 has a plurality of tabs 338 at a top 340 and a bottom 342 of each of the left side panel 294 and the right side panel 296 (although only the tabs 338 on the right side panel 296 are visible in FIG. 27). In order to attach the removable front section 278 to the fiber optic housing 320, the removable front section 278 is positioned such that the tabs 338 fit into the recesses 336 of the mounting brackets 322. This will align the openings 311B of the L-shaped bracket 310 of the removable front section 278 with the circular holes 332 of the mounting bracket 322, and will align the openings 311C of the L-shaped bracket 310 with the oval-shaped openings 330 of the mounting bracket 322. A fastener, such as a screw or pop rivet, may then be placed through one or more of the openings 311B of the L-shaped bracket 310 of the removable front section 278 and through the circular holes 332 of the mounting bracket 322 to securely attach the removable front section 278 to the fiber optic housing 320.

Figure 28:
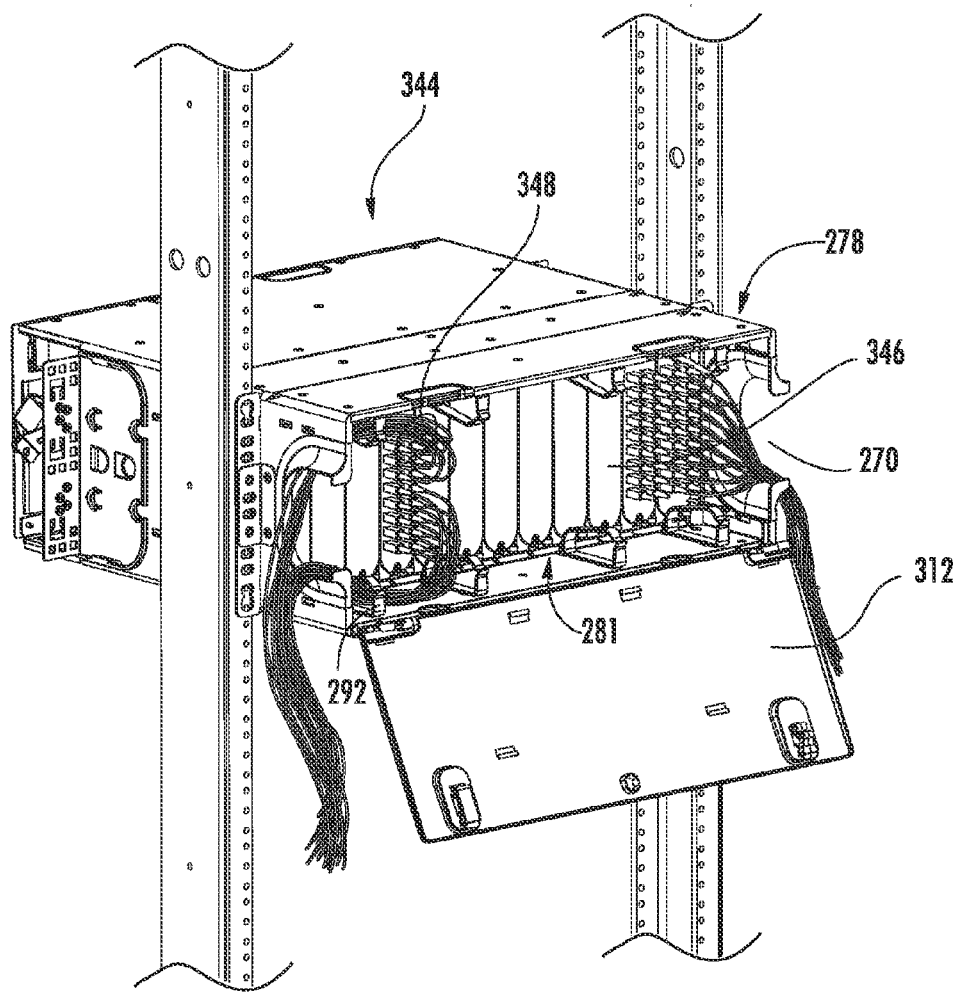
FIG. 28 illustrates a front perspective view of an exemplary removable front section in FIGS. 25 and 26A-C attached to an exemplary fiber optic housing with exemplary fiber optic jumpers being routed out of sides of the removable front section.

FIG. 28 illustrates a front perspective view of the removable front section 278 attached to a fiber optic housing 344 with fiber optic jumpers being routed out of sides of the removable front section 278. The door 312 is open, allowing access to the inside of the removable front section 278. The fiber optic housing 344 in the embodiment of FIG. 28 has fiber optic panels 346 loaded in the removable front section 278, although any sort of fiber optic apparatuses, including but not limited to fiber optic modules and cassettes, may be loaded into the removable front section 278. Fiber optic jumpers 348 are connected to the fiber optic panels 346 and may be routed through the clips 292 and then out of the openings 270 on either side of the removable front section 278.

FIGS. 29-34 illustrate various embodiments of a front jumper management device for use with a fiber optic housing or a removable front section attached to a fiber optic housing.

Figure 29:
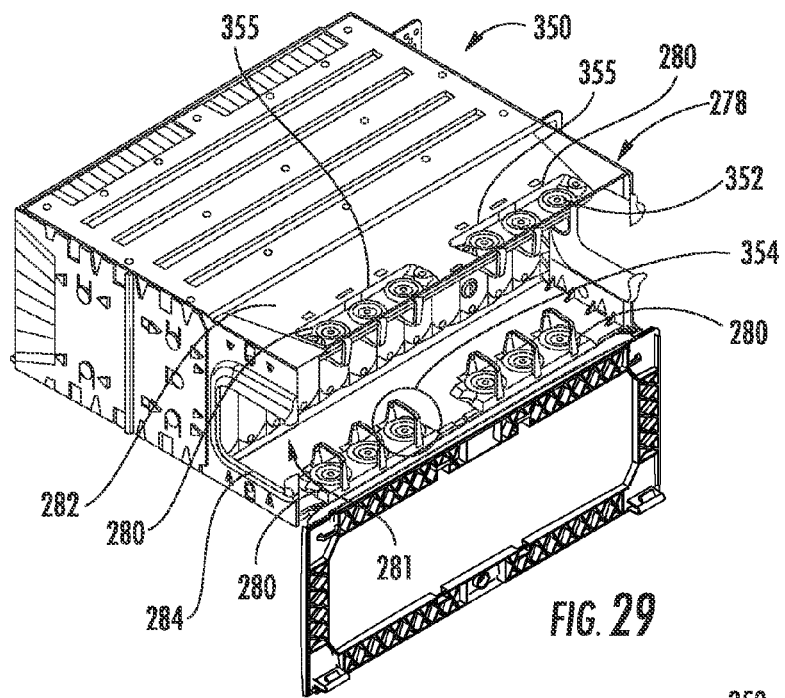
FIG. 29 is a front perspective view of an exemplary fiber optic housing illustrating an exemplary removable front section having a plurality of exemplary removable front jumper management devices with grommets.

FIG. 29 is a front perspective view of a fiber optic housing 350 illustrating a removable front section 278 having a plurality of removable front jumper management devices 280 with grommets 352, as previously mentioned in FIG. 24. The front jumper management devices 280 aid in fiber management and routing. The front jumper management devices 280 may be easily removable in one embodiment. The front jumper management devices 280 may be located on the top portion 282 and/or on the bottom portion 284 of the removable front section 278.

In one embodiment, the front jumper management devices 280 comprise a plurality of grommet/clip assemblies 354 for use with the fiber optic housing 350 or the removable front section 278. Each of the grommet/clip assemblies 354 may include a clip 356 and a grommet 352. The grommet 352 may be made of rubber in one embodiment. In one embodiment, the grommet/clip assembly 354 may be removably mounted in openings 355 on the front of the fiber optic housing 350 on both the top and the bottom. The grommet/clip assembly 354 may be removably mounted to the fiber optic housing 350 by sliding it into the opening 355 in the fiber optic housing 350.

Figure 30:
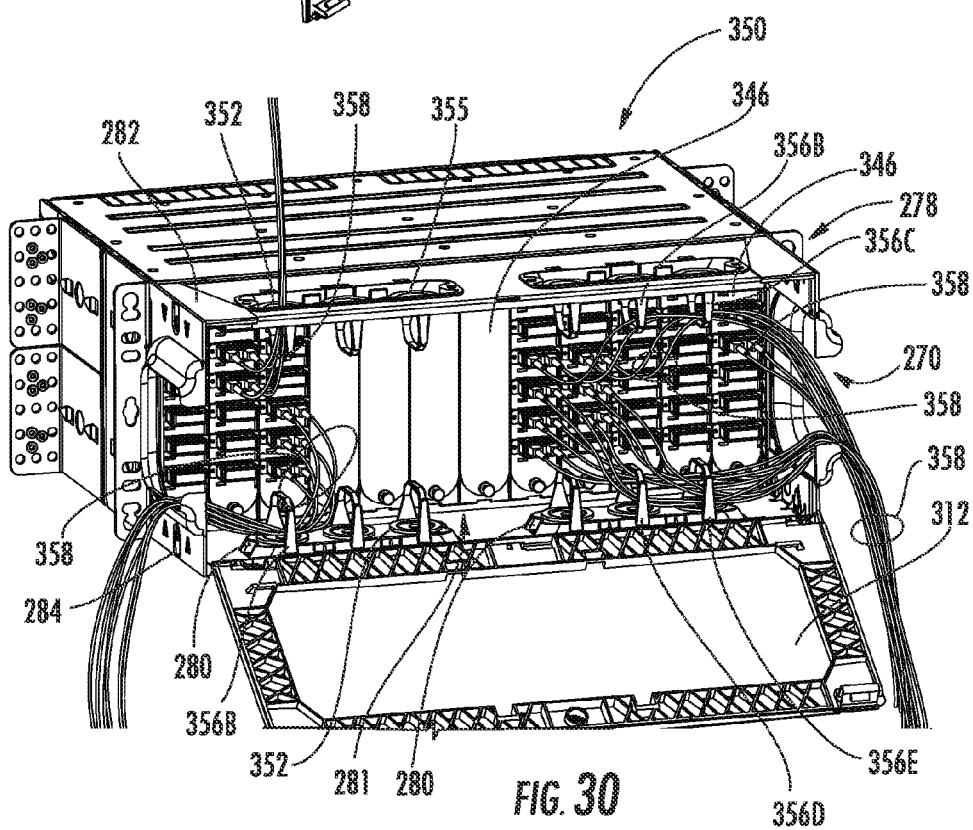
FIG. 30 is a front perspective view of the fiber optic housing in FIG. 29 illustrating exemplary fiber management of exemplary optical fiber jumpers using the front jumper management device with pass-through grommets in FIG. 29.

The front jumper management devices 280 may be removably mounted on the inside of the fiber optic housing 350 to aid in fiber management, or on the outside of the fiber optic housing 350 to serve as an external fiber management device or component, as seen in FIG. 30.

FIG. 30 is a front perspective view of the fiber optic housing 350 of FIG. 29 illustrating fiber management of optical fiber jumpers 358 using the front jumper management devices 280. The door 312 is open, allowing access to the inside of the removable front section 278. The fiber optic housing 350 in the embodiment of FIG. 30 has fiber optic panels 346 loaded in the removable front section 278, although any sort of fiber optic apparatuses, including but not limited to fiber optic modules and cassettes, may be loaded into the removable front section 278. Although the embodiment of FIG. 30 illustrates a removable front section 278, in other embodiments, the fiber optic housing 350 may not have a removable front section 278, and the fiber optic panels 346 may be loaded into the fiber optic housing 350 itself.

The optical fiber jumpers 358 are connected to the fiber optic panels 346 and, in one embodiment, may be routed out of the fiber optic housing 350 through the openings 270 on either side of the removable front section 278. In one embodiment, certain of the optical fiber jumpers 358 may be routed out of the fiber optic housing 350 through the grommets 352 of the front jumper management devices 280. For example, in FIG. 30, some of the optical fiber jumpers 358 are routed from the fiber optic panels 346 directly through the grommets 352 of one of the front jumper management devices 280. In one embodiment, the optical fiber jumpers 358 may be first passed through the grommet/clip assemblies 354 of the front jumper management devices 280 and then through the openings 270 on either side of the removable front section 278. For example, some of the optical fiber jumpers 358 are routed through the clip 356B of one of the front jumper management devices 280 and through the openings 270 on the left side of the removable front section 278.

By locating front jumper management devices 280 on both the top portion 282 and/or on the bottom portion 284 of the removable front section 278, a variety of options for optical fiber routing and management are provided. For example, in FIG. 30, some of the optical fiber jumpers 358 are routed through the clip 356B and then through the clip 356C of one of the front jumper management devices 280 at the top portion 282 and then through the openings 270 on the right side of the removable front section 278. Some of the optical fiber jumpers 358 are routed through only one of the clips (clip 356C) of the one of the front jumper management devices 280 at the top portion 282 before being routed through the openings 270 on the right side of the removable front section 278. Finally, some of the optical fiber jumpers 358 are routed through one or more of the clips (clips 356D and 356E) of the one of the front jumper management devices 280 at the bottom portion 284 before being routed through the openings 270 on the right side of the removable front section 278. Although not illustrated in FIG. 30, certain of the optical fiber jumpers 358 could be routed through one or more of the grommets 352 on the front jumper management devices 280 at the bottom section 284 without being routed through the openings 270.

Figure 31:
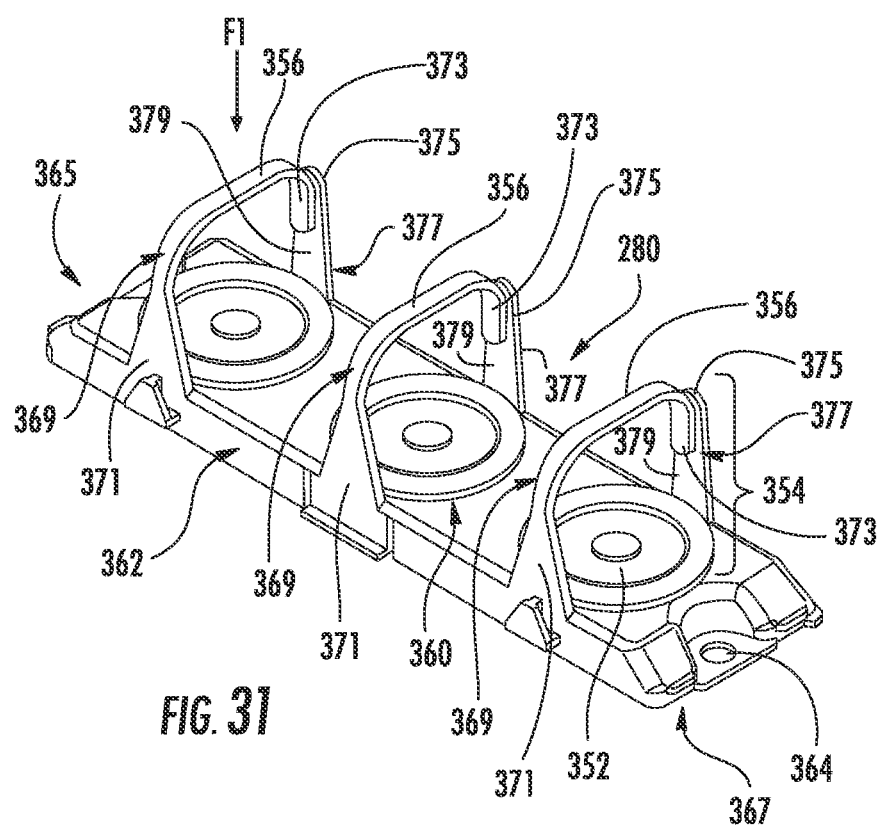
FIG. 31 is a front perspective view of the front jumper management device with the pass-through grommets in FIGS. 29 and 30.

FIG. 31 is a front perspective view of the front jumper management device 280 to illustrate more detail for this particular embodiment of a fiber management component with the pass-through grommets of FIGS. 29 and 30. In one embodiment, as illustrated in FIG. 31, the front jumper management device 280 may comprise the grommet/clip assembly 354. The grommet/clip assembly 354 may include the routing clips or clips 356 and the grommets 352 mounted in openings or ports 360 to allow optical fibers to be routed through the grommet/clip assembly 354. The ports 360 are provided to allow optical fibers to be routed therethrough as previously discussed. If optical fibers are routed through the ports 360, the appropriate grommets 352 are removed. The grommets 352 are removable and close off the ports 360 to prevent dust or debris from entering into the fiber optic housing or removable front section, as examples, when the ports 360 are not used to route optical fibers. The grommets 352 may be made from any type of material, including a flexible material. The grommets 352 may be made from any type of polymer or rubber, as additional non-limiting examples. In one embodiment, the clips 356 may be routing clips/fiber holders.

In this embodiment, as illustrated in FIG. 31, a plurality of clips 356 may be disposed in a base 362, with one clip 356 disposed on a first end 365 of the base 362 and another clip 356 disposed on a second end 367 of the base 362. Also in this embodiment, the clip 356 is comprised of a first arcuate member 369 having a first end 371 attached to the base 362 and a second end 373 adjacent a second end 375 of a second member 377 having a first end 379 attached to the base 362. The first arcuate member 369 and the second member 377 may be flexible. In this embodiment, the second end 373 of the first arcuate member 369 abuts against the second end 375 of the second member 377 when a compression force F1 is not applied inward to the first arcuate member 369 towards the second member 377. The second end 373 of the first arcuate member 369 is configured to separate from the second end 375 of the second member 377 when the compression force F1 is applied inward to the first arcuate member 369 towards the second member 377.

The grommet/clip assembly 354 may also comprise the base 362 with one or more mounting holes 364, as illustrated in FIG. 31, to allow the grommet/clip assembly 354 to be mounted to a fiber optic housing. In this embodiment, the clips 356 are attached to the base 362. The mounting holes 364 may be used for fasteners (not illustrated), such as a screw, pop rivet, or a plunger fastener, to removably attach the grommet/clip assembly 354 to a fiber optic housing. The grommet/clip assembly 354 retains optical fiber jumpers (like the optical fiber jumpers 358 in FIG. 30) while creating a pathway to routing fibers that are terminated in optical connectors. In one embodiment, the grommet/clip assembly 354 may be removably attached to a fiber optic management panel, and may be installed in the same location as a connector panel. In another embodiment, as illustrated in FIG. 29, the grommet/clip assembly 354 may be removably mounted in the openings 355 on the front of the fiber optic housing 350 on both the top and the bottom. The grommet/clip assembly 354 may be removably mounted to the housing by sliding it into the opening 355 in the fiber optic housing 350.

Figure 32:
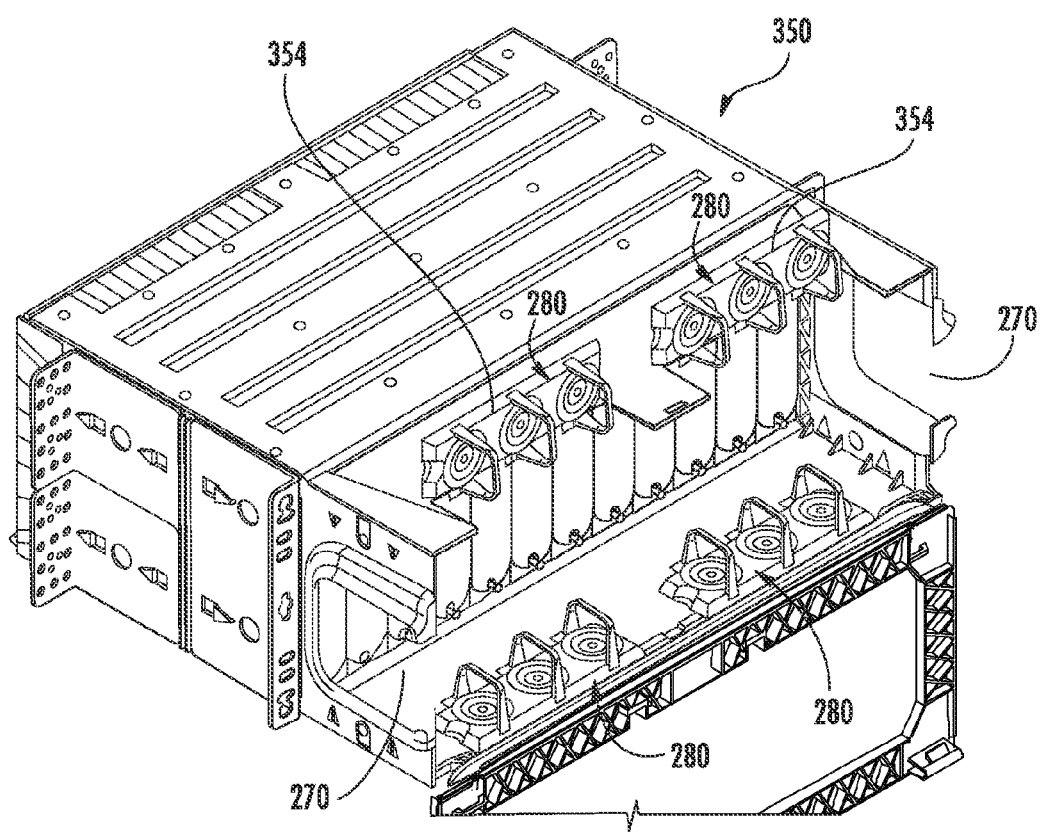
FIG. 32 illustrates how exemplary front jumper management devices with pass-through grommets may be mounted on their sides to create horizontal fiber management outside an exemplary fiber optic housing.

The grommet/clip assembly 354 may also have features that allow it to be installed in different orientations and in different locations. FIG. 32 illustrates how front jumper management devices with grommets can be mounted on their sides to create horizontal fiber management outside the fiber optic housing. In the embodiment of FIG. 32, the grommet/clip assembly 354 at the top of the fiber optic housing 350 is removably mounted on its side to create horizontal fiber management outside the fiber optic housing 350. This will use a 1U rack unit space of 1.75 inches. However, the grommet/clip assembly 354 may be removed to allow fiber optic housings to be stacked directly on top of each other and still maintain the pass-through feature.

Figure 33:
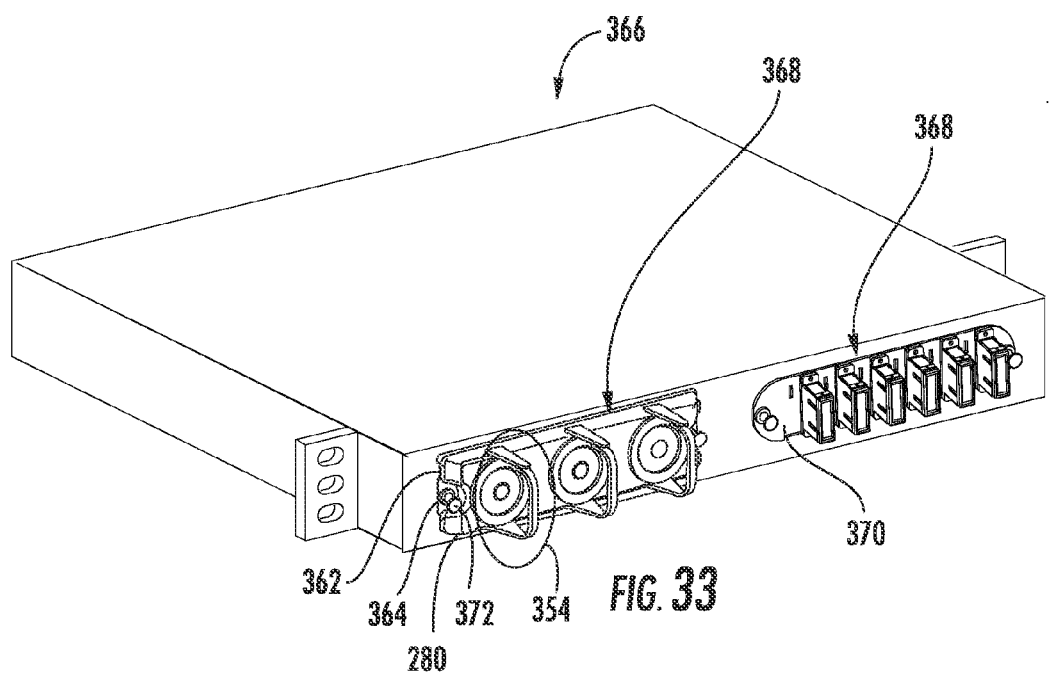
FIG. 33 illustrates how an exemplary front jumper management device with pass-through grommets may be mounted in an exemplary fiber optic housing in place of a fiber optic panel to allow for fiber management.

Further, the grommet/clip assembly 354 may be mounted in the same location as a connector panel using the same mounting hardware as the connector panels. FIG. 33 illustrates how a front jumper management device with grommets may be mounted in a fiber optic housing in place of a fiber optic panel to allow for fiber management. In the embodiment of FIG. 33, a 1U fiber optic housing 366 has a plurality of openings 368. A fiber optic panel 370 may be placed in one of the plurality of openings 368. In the other opening 368, a front jumper management device 280 comprising one or more grommet/clip assemblies 354 is positioned horizontally. The grommet/clip assembly 354 may also comprise a base 362 with one or more mounting holes 364, as illustrated in FIG. 31, to allow the grommet/clip assembly 354 to be mounted to the fiber optic housing 366. A fastener, such as a plunger fastener 372 as illustrated in FIG. 33, may be used to removably attach the grommet/clip assembly 354 to the fiber optic housing 366. In other embodiments, different fasteners, such as a screw or pop rivet, may be used in place of the plunger fastener 372.

The front jumper management device 280 with the grommet/clip assembly 354 disclosed above may be removably attached to a fiber optic housing. The end user may configure the front jumper management device 280 in multiple ways or remove it when it is not needed. Various other ways of mounting the front jumper management device 280 are possible, including but not limited to sliding the front jumper management device 280 into a cutout in a wall of a fiber optic housing, installing the front jumper management device 280 on its side using snaps that latch into a cutout in a wall of a fiber optic housing, or installing the front jumper management device 280 using plungers in the same location as a fiber adapter panel or module. Additionally, the grommets 352 in the grommet/clip assembly 354 allow fiber to transition in any direction (including, but not limited to, the rear, up, or down) depending on the orientation of the grommet/clip assembly 354, as seen in FIG. 30 above.

Figure 34:
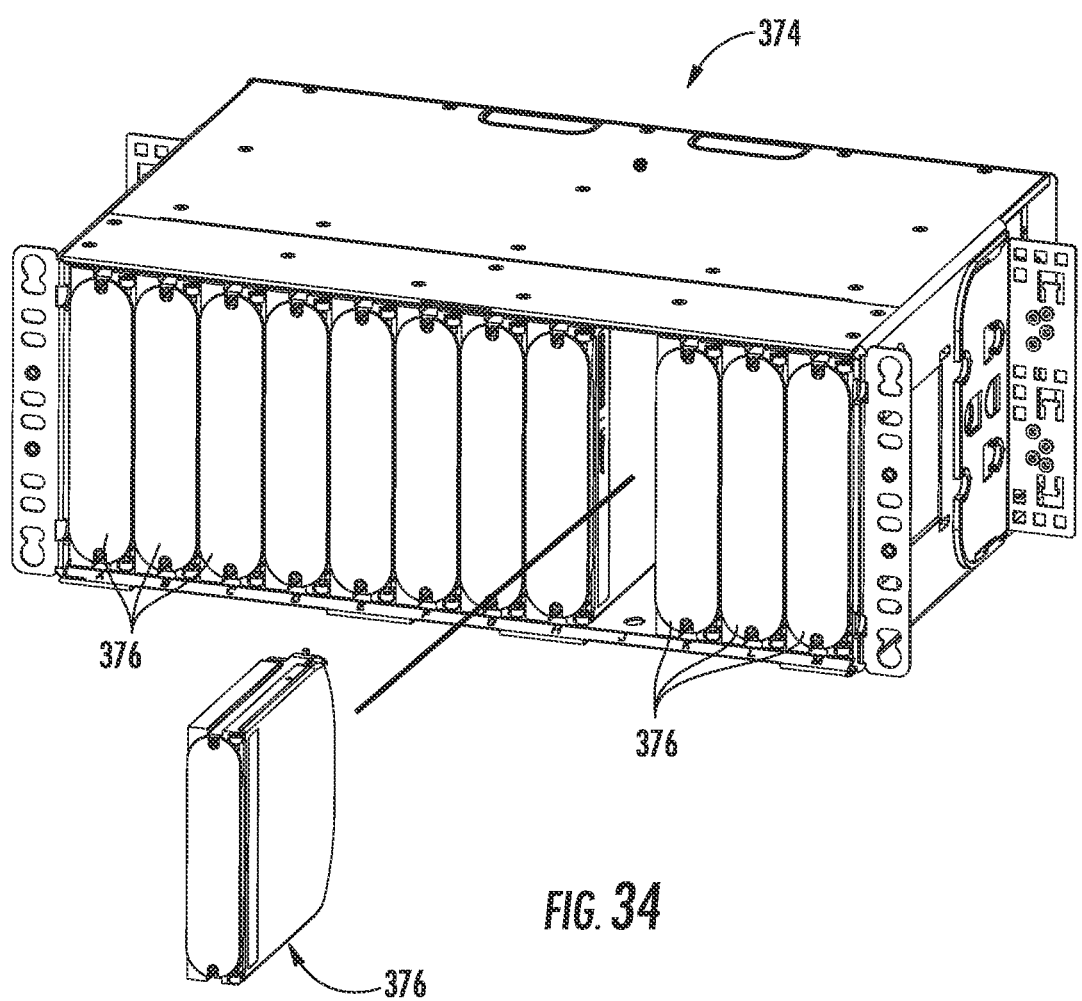
FIG. 34 is a perspective view of an exemplary fiber optic housing configured to support exemplary fiber optic modules.

FIG. 34 is a perspective view of an alternative fiber optic housing 374 configured to support fiber optic modules 376. In one embodiment, the fiber optic housing 374 may also support fiber optic panels (like fiber optic panels 378 illustrated in FIG. 36A) interchangeably by employing a removable panel clip (which is disclosed more fully in FIGS. 37A-37G). The fiber optic housing 374 is configured to support fiber optic equipment in a vertical orientation. FIG. 34 illustrates the fiber optic housing 374 supporting the fiber optic modules 376. If it desired to provide fiber optic panels 378 in the fiber optic housing 374, removable panel clips 380 (see FIGS. 37A-37G) can be installed in a base 382 and a top 384 of the fiber optic housing 374, as illustrated in FIGS. 35A-35C.

Figure 35A:
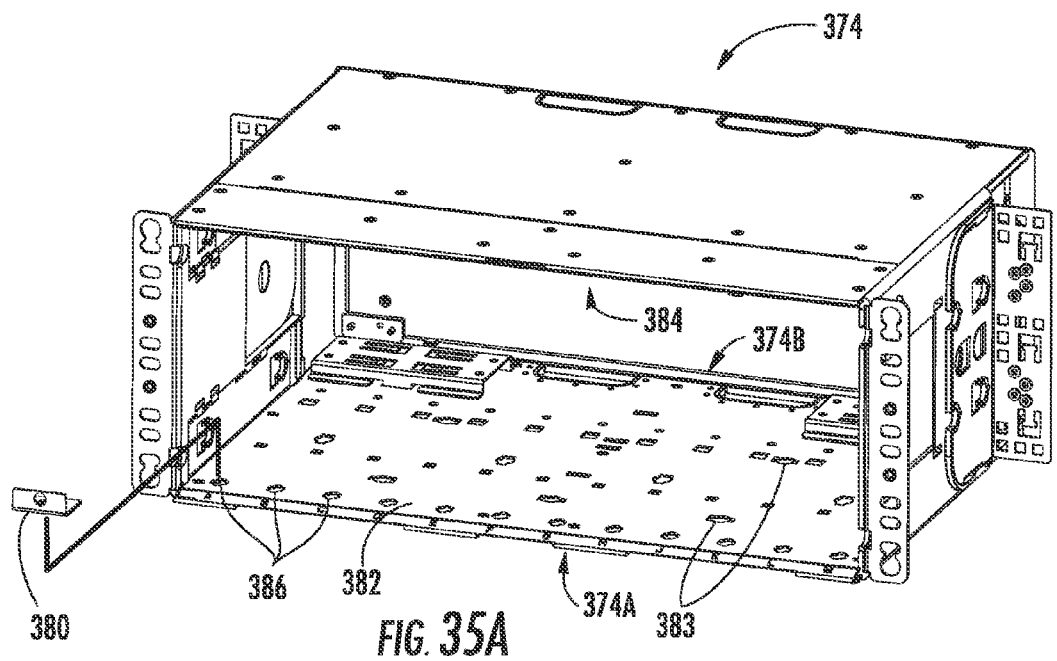
FIG. 35A is a front perspective view illustrating where and how an exemplary removable panel clip is attached to a bottom panel of an exemplary fiber optic housing.
Figure 35B:
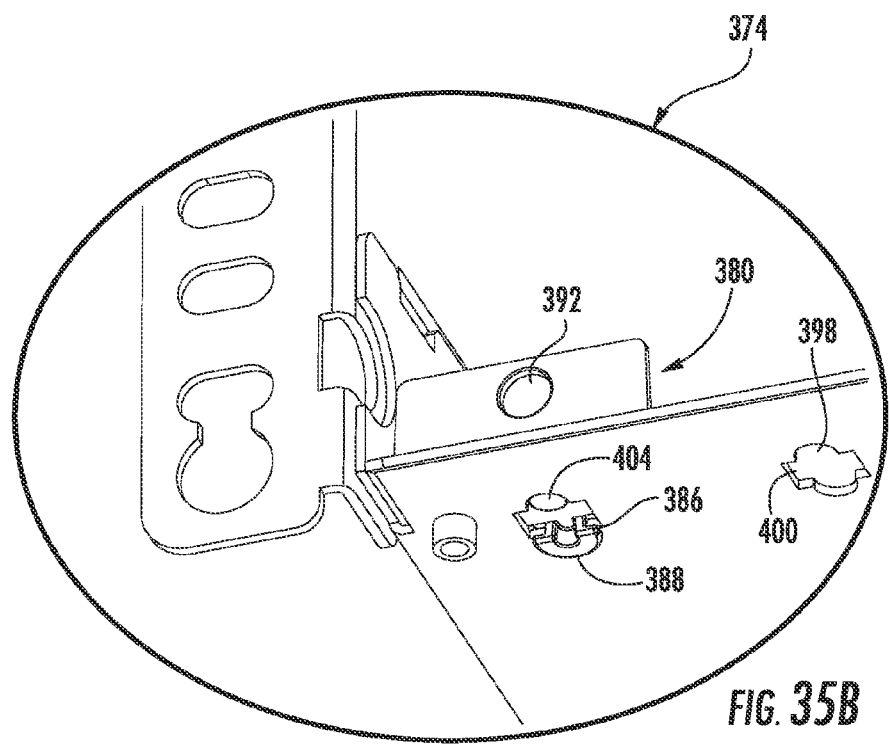
FIG. 35B is a close-up view of the removable panel clip in FIG. 35A being attached to the bottom panel of the fiber optic housing.
Figure 35C:
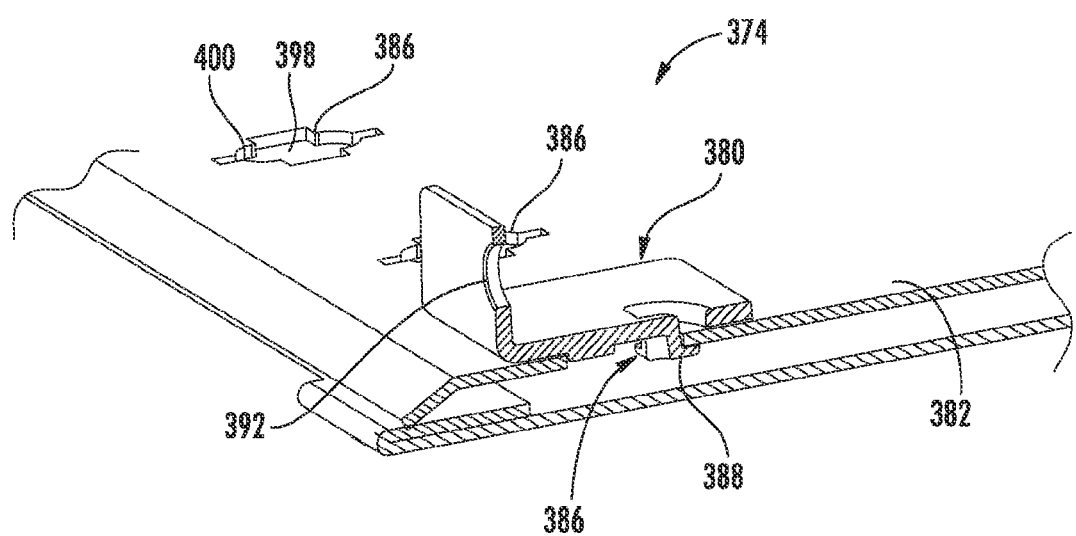
FIG. 35C is a cut section of the removable panel clip in FIGS. 35A and 35B being attached to the bottom panel of the fiber optic housing.

FIGS. 35A-35C are perspective, perspective close-up, and perspective close-up cut section views, respectively, of the removable panel clip 380 installed in the fiber optic housing 374 to enable the fiber optic housing 374 to support fiber optic panels 378 and fiber optic modules 376 interchangeably. The removable panel clips 380 may be installed in a front 374A of the fiber optic housing 374, or may be installed in a rear 374B of the fiber optic housing 374. The base 382 contains receivers 386 in the form of openings to receive and secure a flange 388 of the removable panel clip 380 (see FIGS. 37A-37G). The removable panel clip 380 is secured to the receiver 386 in the base 382, as described more fully below.

Figure 36A:
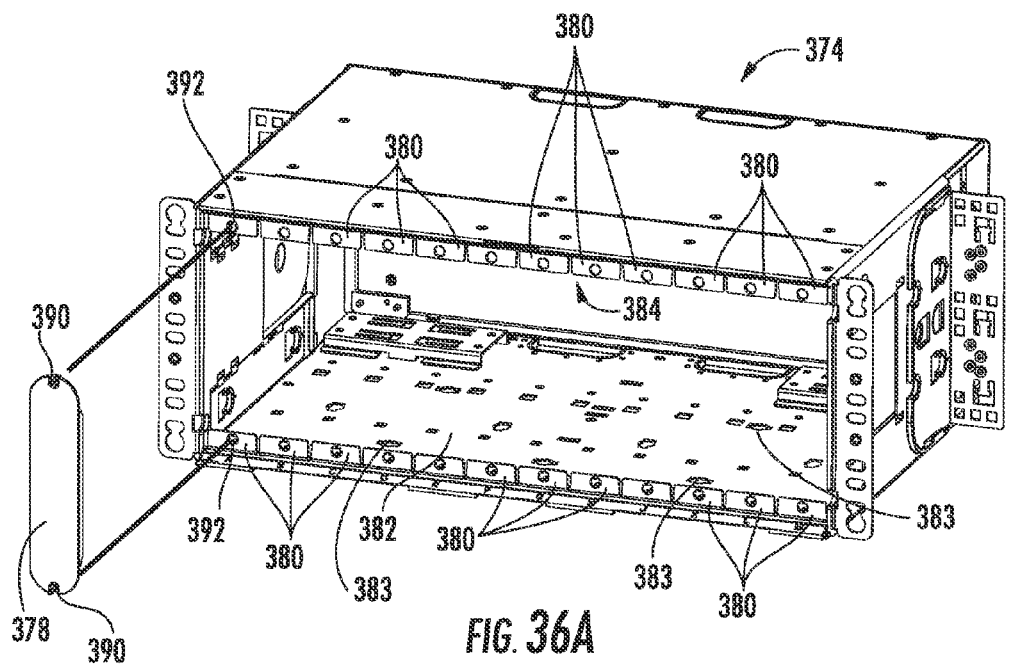
FIG. 36A is a front perspective view of exemplary fiber optic panels being mounted in the fiber optic housing in FIGS. 35A-C by being attached to the removable panel clips illustrated in FIGS. 35A-C.
Figure 36B:
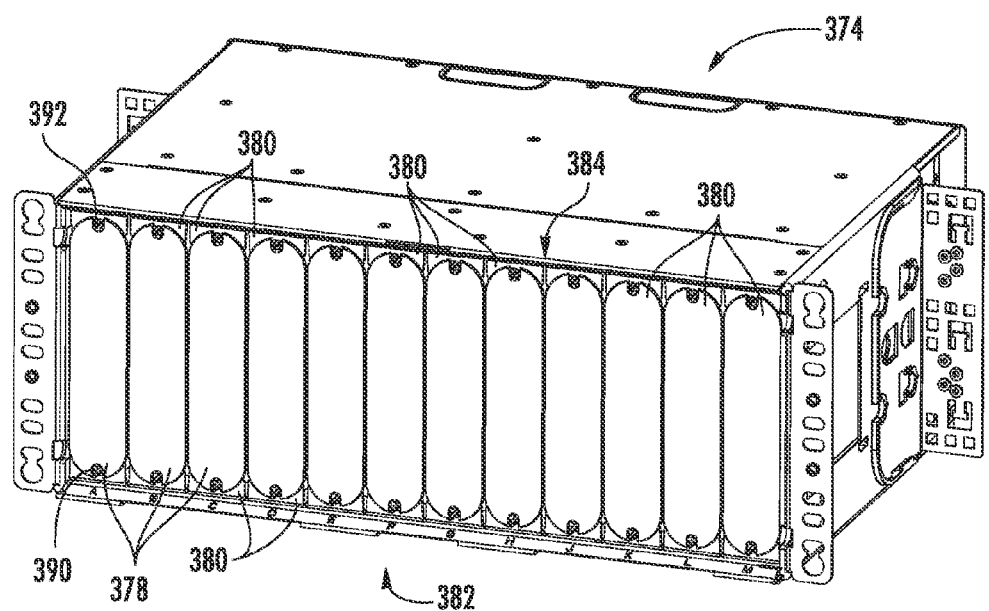
FIG. 36B is a front perspective view of the fiber optic housing in FIG. 36A fully loaded with fiber optic panels attached to removable panel clips.
Figure 37A:
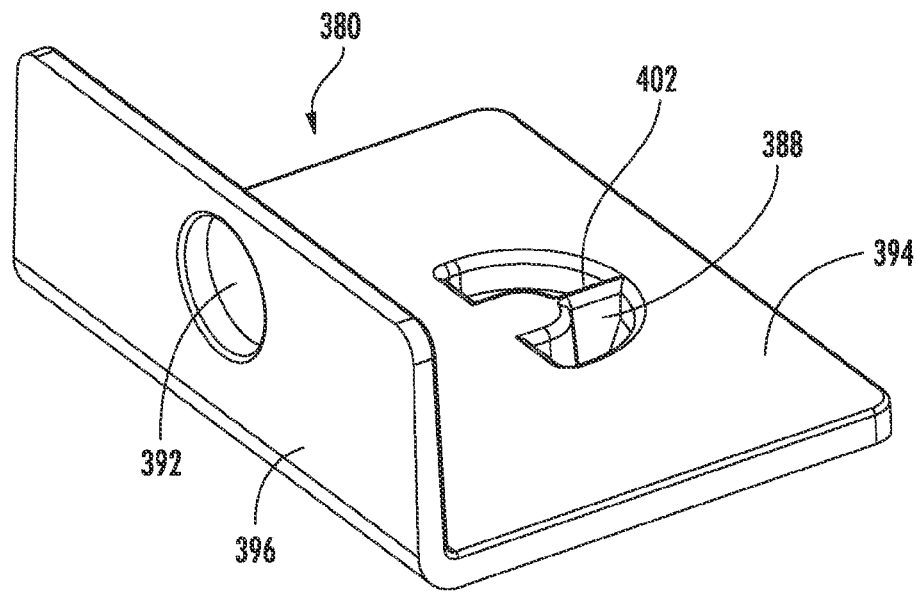
FIGS. 37A-37G are top perspective, bottom perspective, rotated perspective, right side, left side, top, and front views, respectively, of a removable panel clip to be used with the fiber optic housing in FIGS. 34, 35A, 36A, and 36B.
Figure 37B:
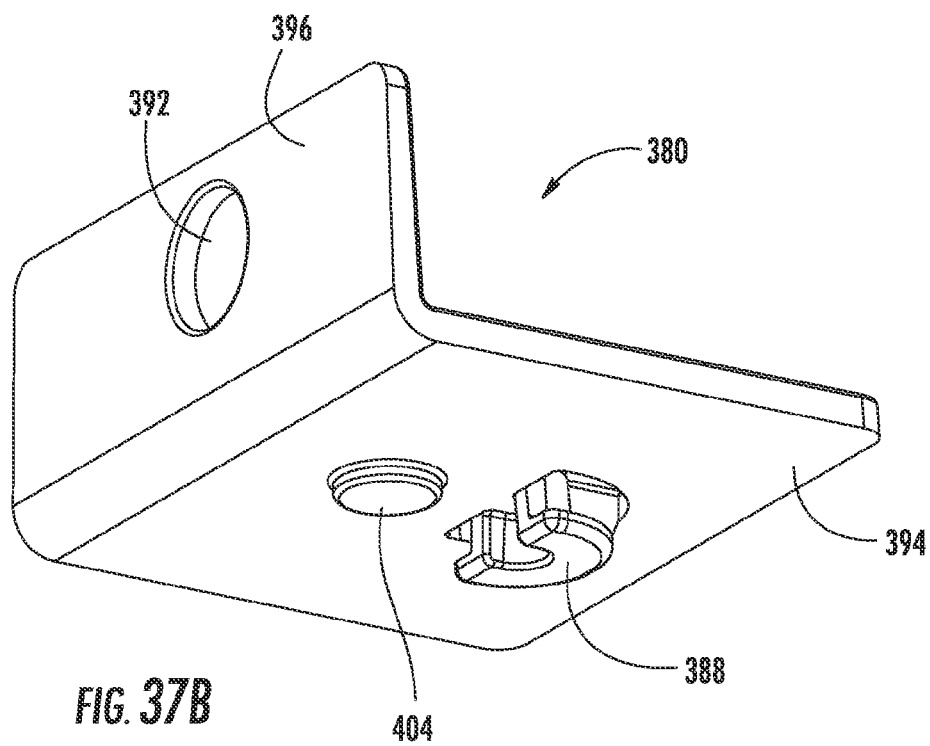
Figure 37C:
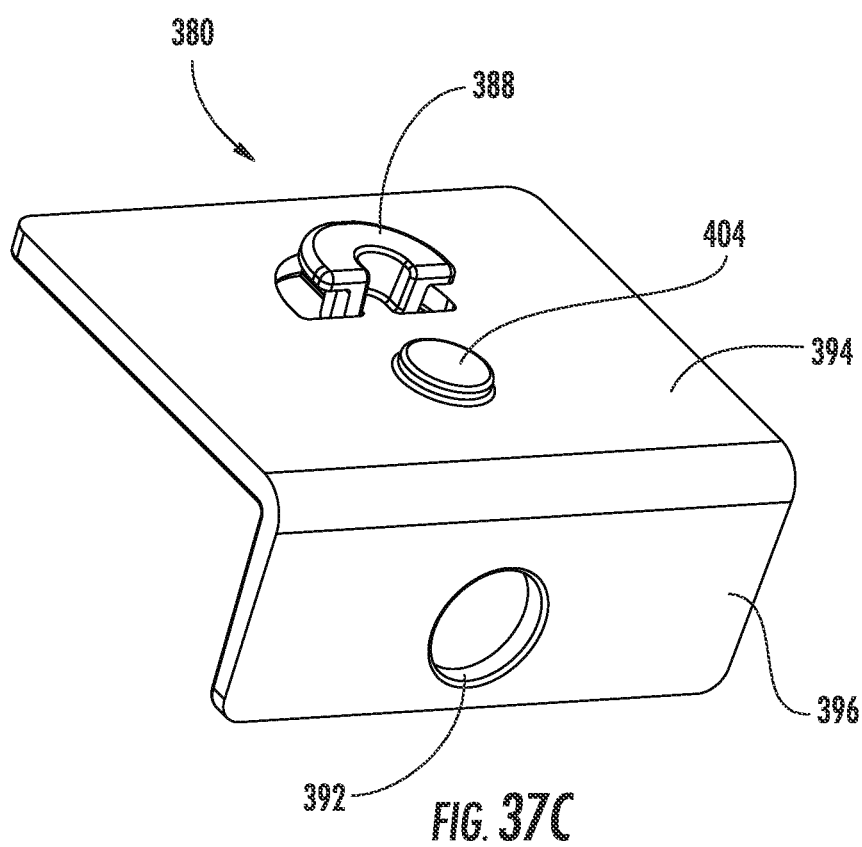
Figure 37D:
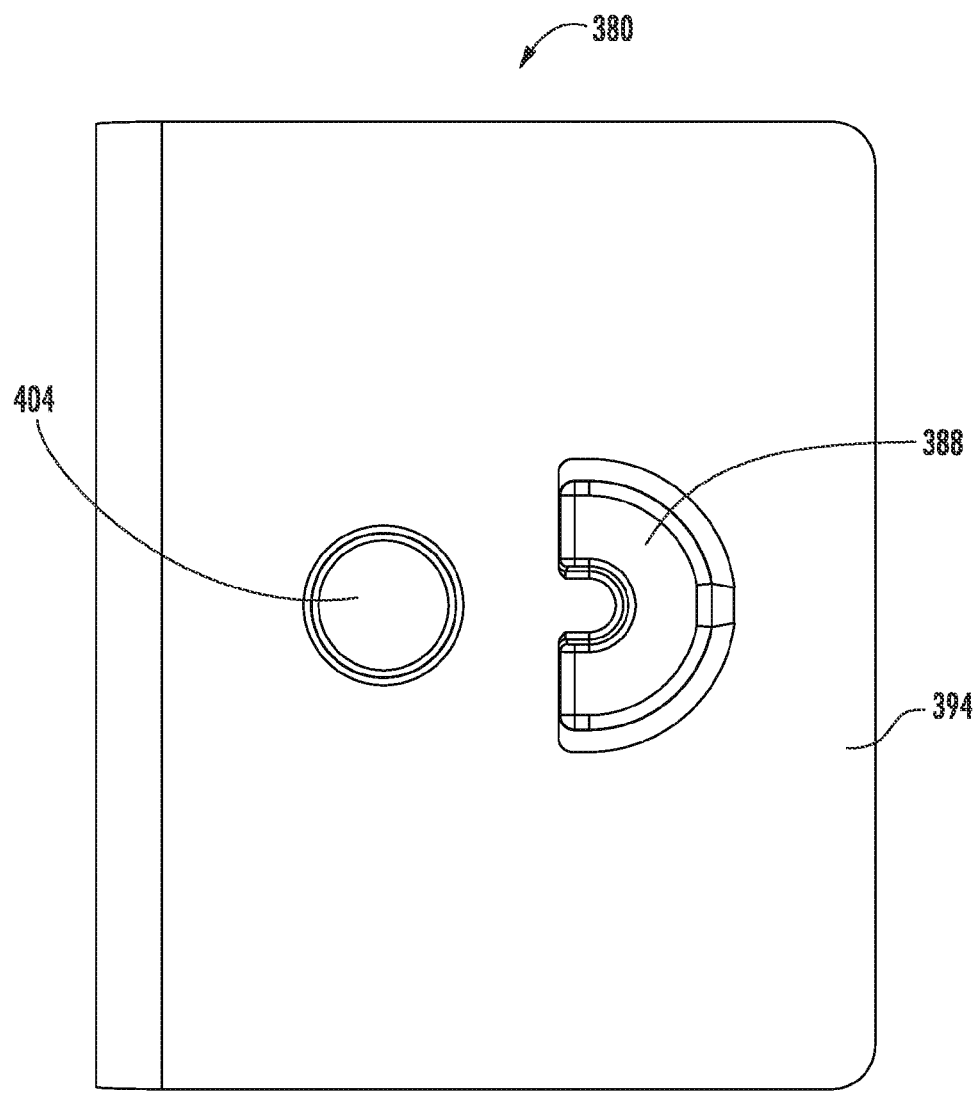
Figure 37E:
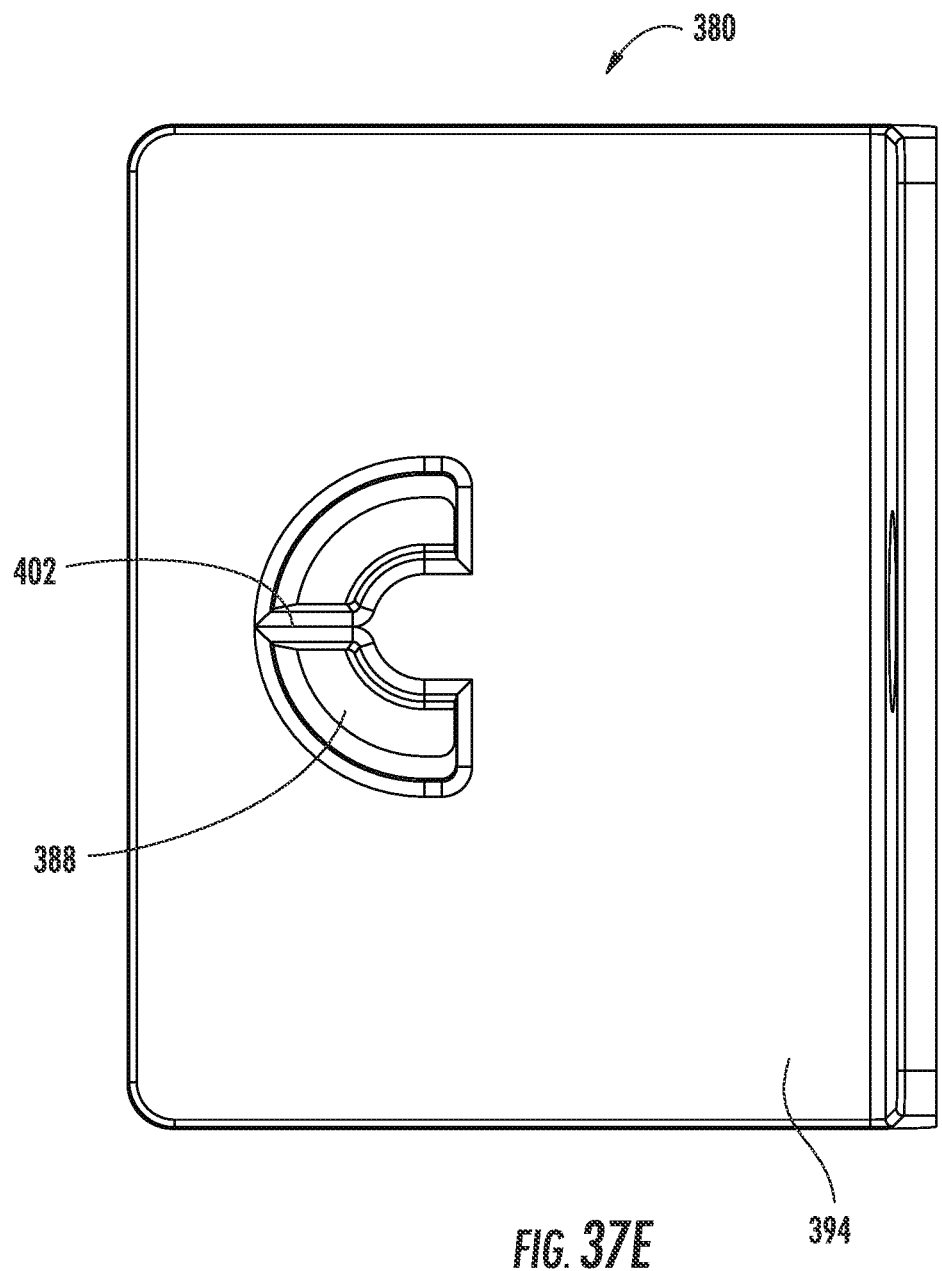
Figure 37F:
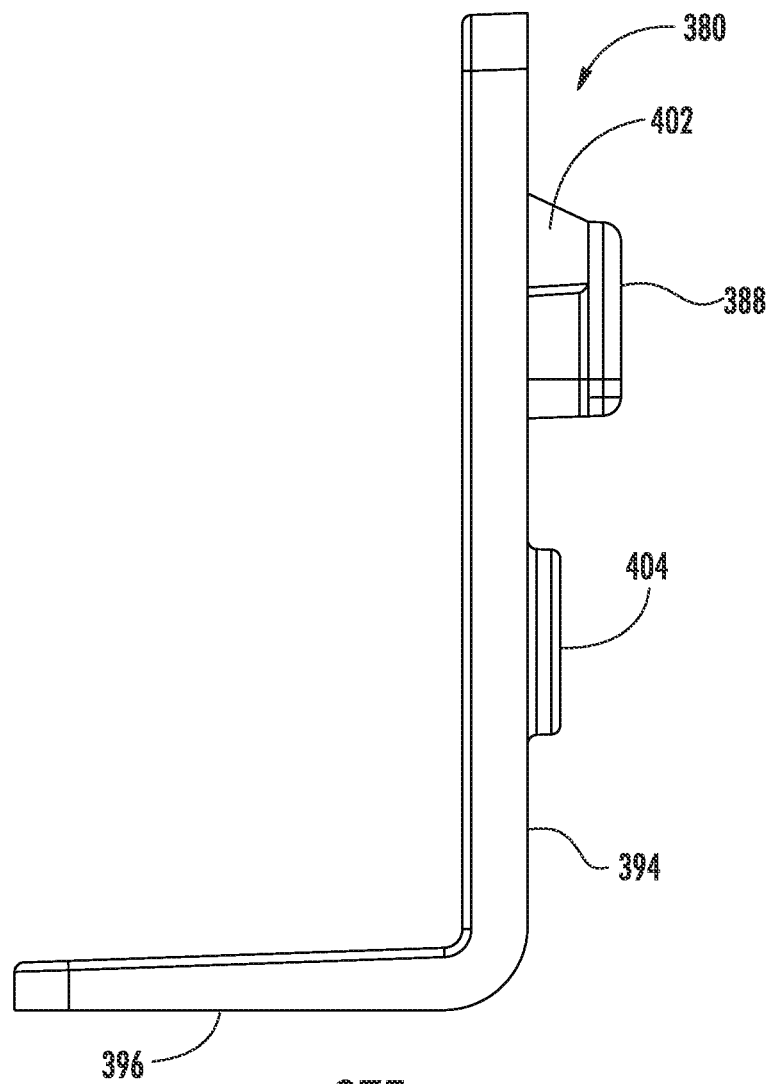
Figure 37G:
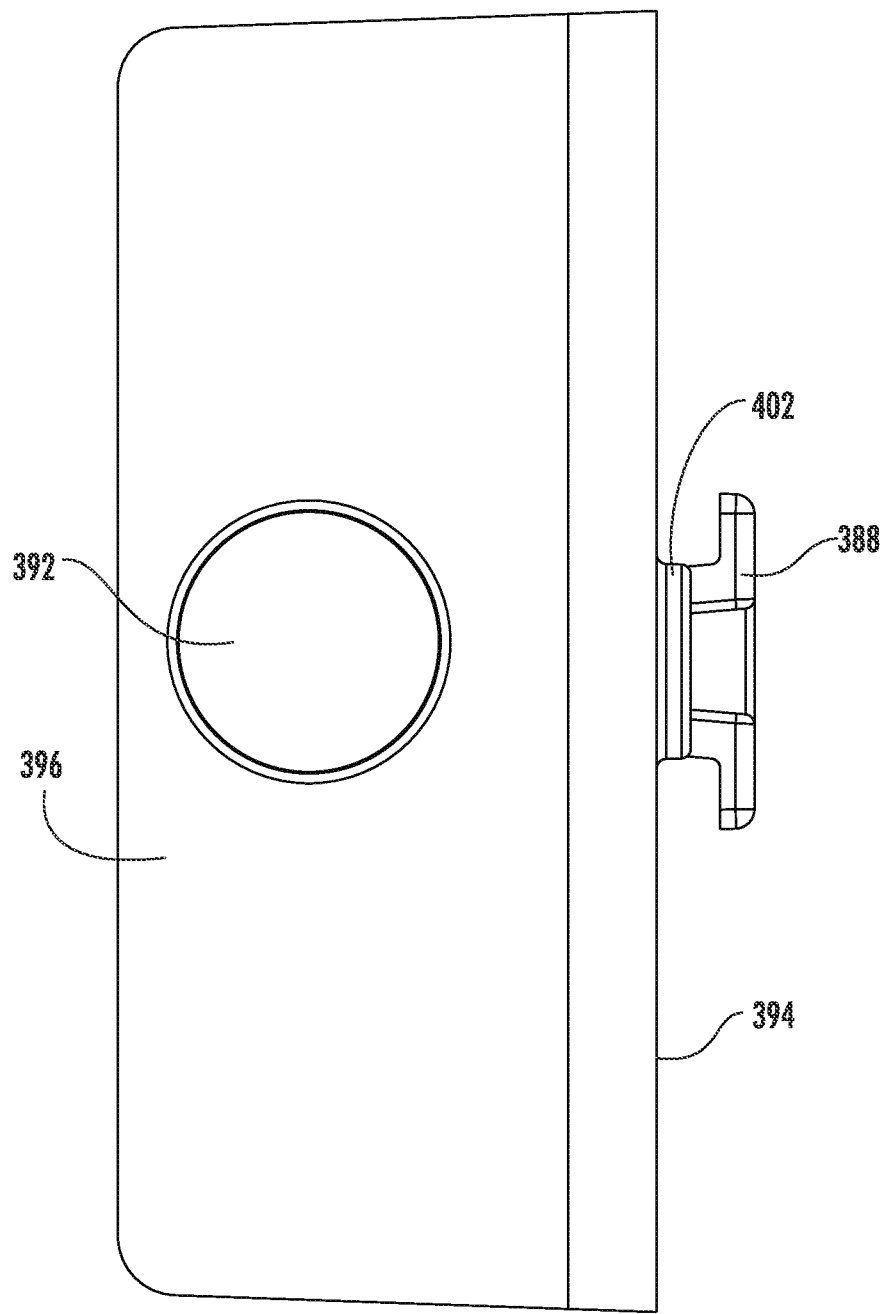

FIG. 36A is a perspective view of the fiber optic housing 374 in FIG. 35A with removable panel clips 380 installed in the base 382 and the top 384 to be able to support the fiber optic panels 378. FIG. 36B is a perspective view of the fiber optic housing 374 in FIG. 35A with removable panel clips 380 installed and inserts 390 provided in the form of push pins of the fiber optic panels 378 inserted into receptacles 392 of the removable panel clips 380 to support the fiber optic panels 378 in the fiber optic housing 374. In another embodiment, the inserts 390 may be provided in the form of plungers As illustrated in FIGS. 37A-37G, the removable panel clip 380 includes the flange 388. The flange 388 is configured to be inserted into the receiver 386 of the base 382 (FIGS. 35A-35C) to attach the removable panel clip 380 to the base 382. The flange 388 in this embodiment is circular-shaped, but other shapes can be provided. The flange 388 is disposed in a first side 394 of the removable panel clip 380. A receptacle 392 disposed in a second side 396 of the removable panel clip 380 is configured to receive the insert 390 of a fiber optic panel 378, as illustrated in FIGS. 36A-36B. The first side 394 may be generally at a right angle to the second side 396 in this embodiment.

Referring to FIGS. 35B and 35C as well as FIGS. 37A-37G, the flange 388 of the removable panel clip 380 is configured to be inserted into a first area 398 of the receiver 386 of the base 382 and slid into a second area 400 of the receiver 386 to attach the removable panel clip 380 to the base 382. A standoff or extender 402 is disposed between the flange 388 and the first side 394 to extend the flange 388 a distance away from the first side 394 so the flange 388 can be inserted into the receiver 386 in the base 382. The flange 388 can then be slid behind the second area 400 of the receiver 386, which has an opening size less than the size of the flange 388.

The flange 388 cannot be removed from the receiver 386 unless and until the flange 388 is slid back to the first area 398 of the receiver 386, which has an opening size that will allow the flange 388 to be removed from the receiver 386. A protrusion 404 is also disposed in the first side 394 of the removable panel clip 380 to be disposed into the second area 400 of the receiver 386 to further secure the removable panel clip 380 to the base 382. In one embodiment, in order to remove the flange 388 from the receiver 386, the removable panel clip 380 is slightly lifted in a vertical direction until the protrusion 404 overcomes the base 382. In one embodiment, the removable panel clip 380 can also be installed in the base 382 in a position one hundred eighty (180) degrees from the orientation discussed above and shown in FIGS. 35B and 35C to allow the fiber optic panel or fiber optic module/cassette disposed therein to move independently.

Figure 38:
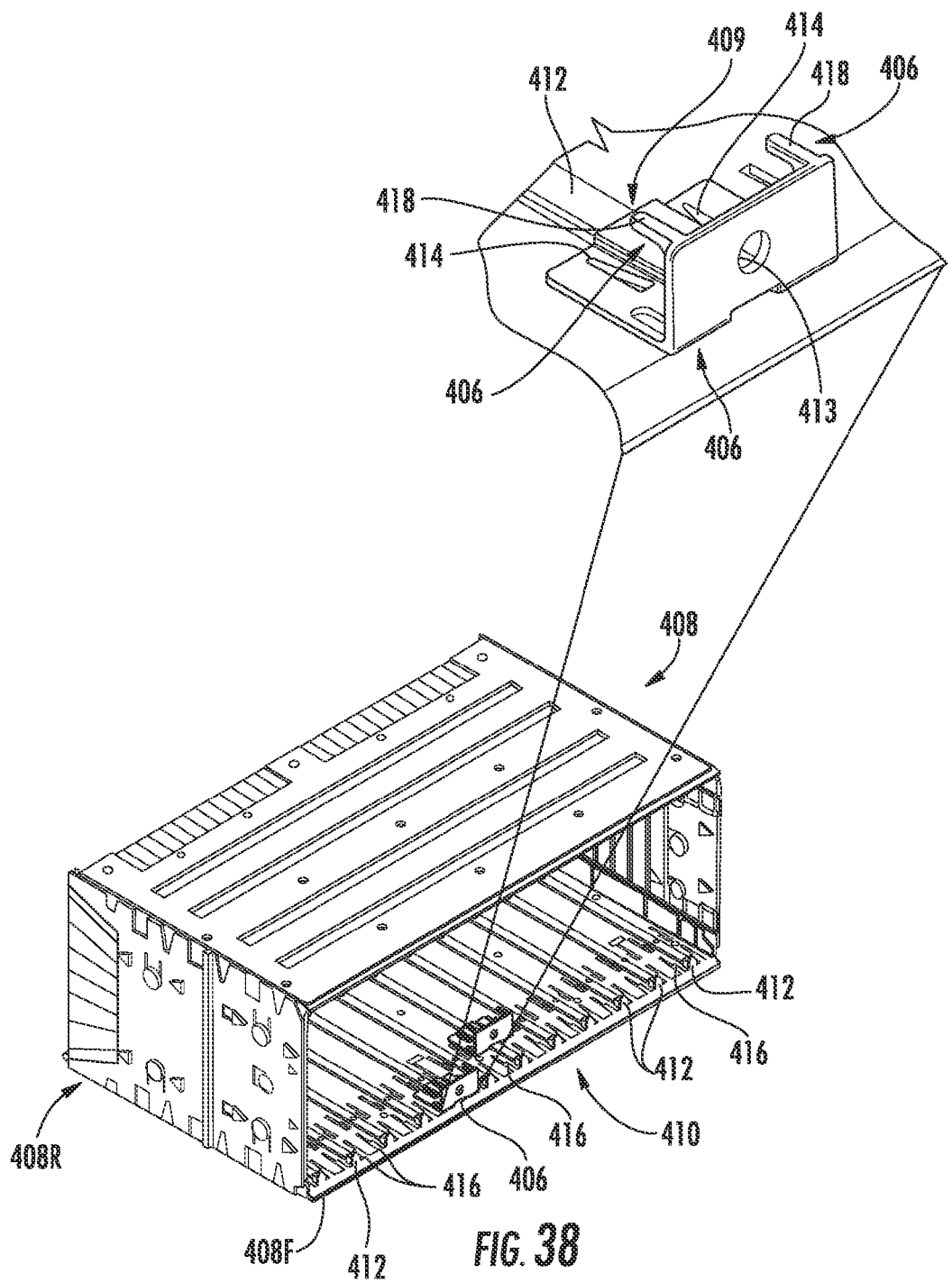
FIG. 38 is a perspective view of an alternate exemplary removable panel clip installed in an exemplary fiber optic housing to enable the fiber optic housing to interchangeably support exemplary fiber optic panels and fiber optic modules.
Figure 39A:
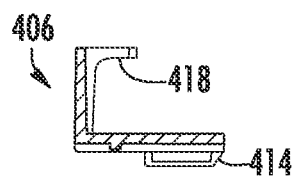
FIGS. 39A-39D are bottom, side, front, and back views, respectively, of the removable panel clip in FIG. 38.
Figure 39B:
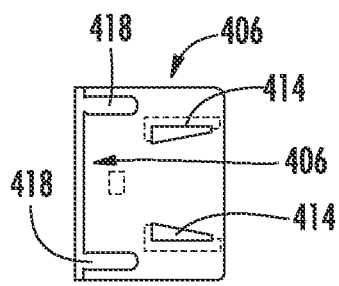
Figure 39C:
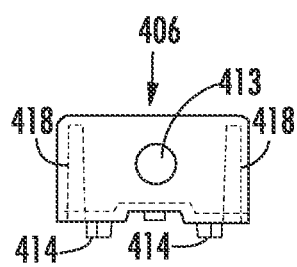
Figure 39D:
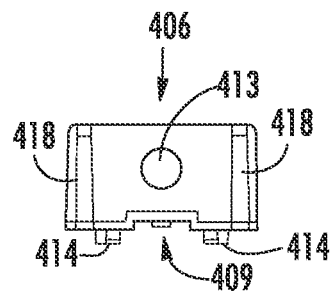

FIG. 38 is a perspective view of another removable panel clip 406 installed in a fiber optic housing 408 to enable the fiber optic housing 408 to interchangeably support fiber optic panels and fiber optic modules. FIG. 39A-39D illustrate bottom, side, front, and back views, respectively, of the removable panel clip 406 in FIG. 38. The removable panel clips 406 are configured to be attached to a rail system 410 disposed in the fiber optic housing 408 to attach the removable panel clips 406 to the fiber optic housing 408 to support fiber optic panels. The rail system 410 is configured to support fiber optic modules in the fiber optic housing 408 when the removable panel clip 406 is not attached to the rail system 410. In this regard, the removable panel clips 406 each comprise a groove 409 configured to receive a rail 412 disposed in the fiber optic housing 408 to attach the removable panel clips 406 to the fiber optic housing 408. Like the removable panel clip 380, the removable panel clip 406 contains a receptacle 413 disposed therein that is configured to receive an insert in the form of a push pin or plunger from a fiber optic panel to secure the fiber optic panel to the removable panel clip 406 and thus the fiber optic housing 408. Protrusions 414 are disposed in the removable panel clip 406, as illustrated in FIG. 38, and are configured to engage with receivers 416 to further secure the removable panel clips 406 to the fiber optic housing 408. A support member 418 is disposed or provided as part of the removable panel clip 406 to provide structural support, as illustrated in FIGS. 39A and 39B.

The base of the fiber optic housing (such as the base 382 of the fiber optic housing 374 in FIGS. 35A and 36A, or the base of the fiber optic housing 408 in FIG. 38) may be configured to support either fiber optic panels or fiber optic modules/cassettes. To support fiber optic panels, a receiver (like the receiver 416 in FIG. 38) is disposed in the fiber optic housing 374 or 408 to receive the removable panel clips 406. If a fiber optic module(s) is desired to be supported, the removable panel clips 406 are not employed. Instead, the fiber optic module(s) includes a rail guide that is configured to receive a rail disposed in the fiber optic housing 374 of FIGS. 35A and 36A or the fiber optic housing 408 in FIG. 38.

Figure 41A:
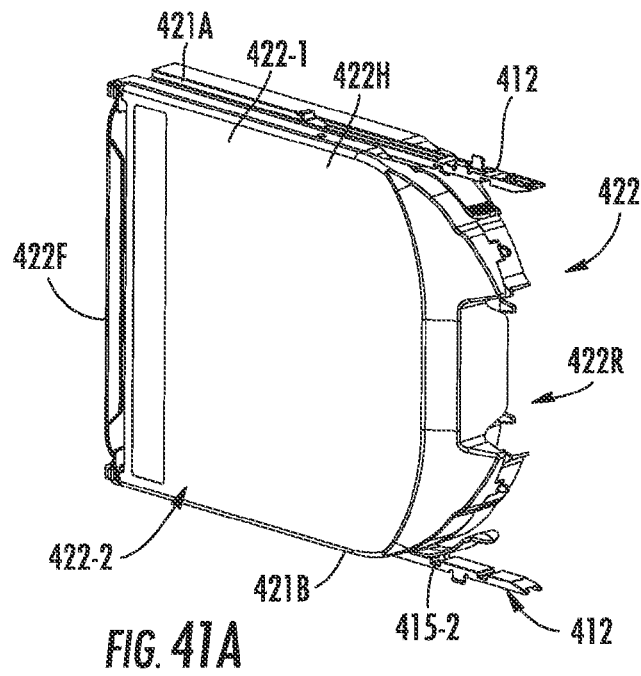
FIGS. 41A and 41B are front perspective and side views, respectively, of an exemplary fiber optic splice cassette that may be mounted on an exemplary rail in an exemplary fiber optic housing.
Figure 41B:
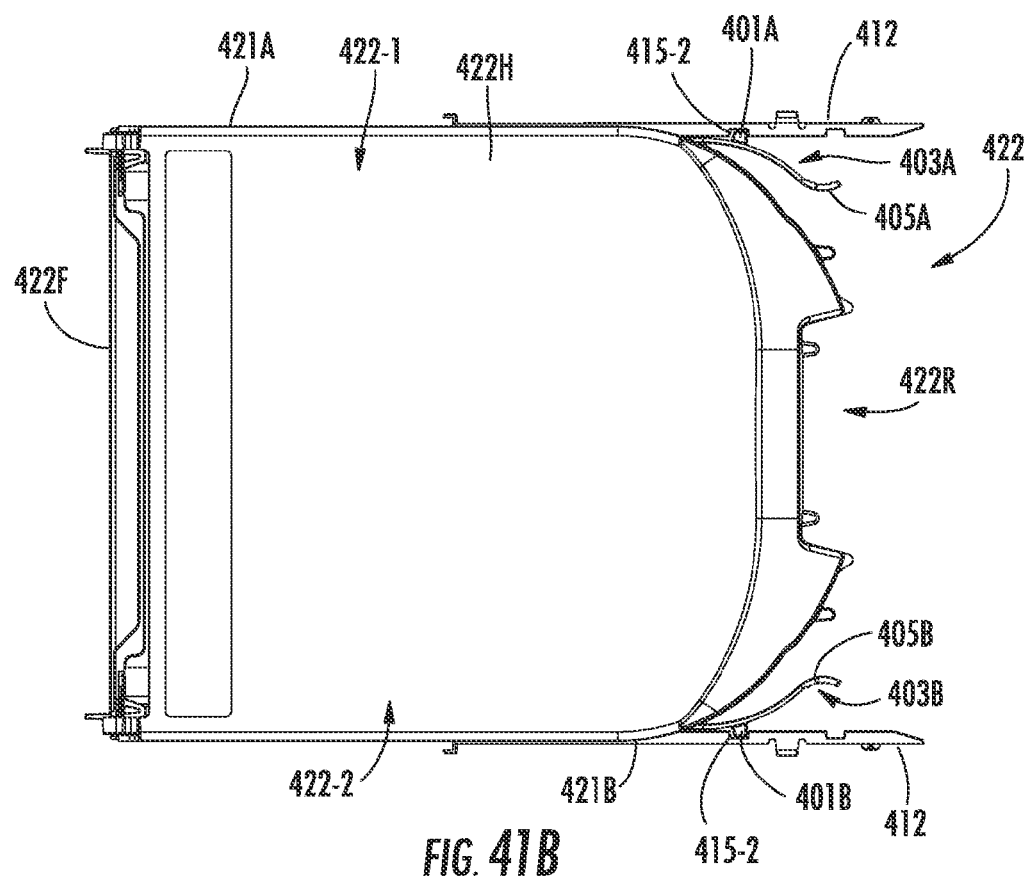

FIGS. 40A-40D illustrate various views of exemplary rails 412 to be used in the fiber optic housing 408 of FIG. 38. In one embodiment, the rail 412 has three sections 412-1, 412-2, 412-3 formed by two notches 415-1, 415-2. The notches 415-1, 415-2 are used to lock fiber optic modules or cassettes onto the rail 412, as will be discussed in more detail below. The rail 412 may also have a pair of latches 419-1, which may extend from the section 412-2 in one embodiment, as illustrated in FIGS. 40A-40D. The rail 412 may have a groove 417 at one end of the section 412-1. The rail 412 may also have a latch 419-2 at one end of the rail 412, such as at the end of portion 412-3, as illustrated FIGS. 40A-40D. The latches 419-1, 419-2 may be used to attach the rail 412 to the fiber optic housing 374 of FIGS. 35A and 36B, or the fiber optic housing 408 of FIG. 38. In one embodiment, the latches 419-1, 419-2 may fit into receivers 383 disposed in the base 382 of the fiber optic housing 374 of FIGS. 35A and 36B and be used to attach the rail 412 to the fiber optic housing 374. The latches 419-1, 419-2 may be flexible and resilient such that they provide biasing to allow the latches 419-1, 419-2 to extend into the receivers 383 to secure the rail 412 to the base 382 of the fiber optic housing 374 of FIGS. 35A and 36B. FIGS. 41A and 41B are front perspective and side views, respectively, of an exemplary fiber optic module or cassette 422 that may be mounted on a rail in the fiber optic housing 408 of FIG. 38. As illustrated in the front perspective and top views of the fiber optic module/cassette 422 in FIGS. 41A and 41B, respectively, the fiber optic module/cassette 422 includes a housing 422H that includes a first end 422-1 and a second end 422-2. Rails guides 421A, 421B are disposed in the housing 422H on the first end 422-1 and the second end 422-2 of the housing 422H, respectively. Thus, when a rear portion 422R of the fiber optic module/cassette 422 is inserted onto a rail or rails 412 disposed on the fiber optic housing 408, the rail guides 421A, 421B of the fiber optic module/cassette 422 are aligned with the rails 412. The rail guides 421A, 421B receive the rails 412. The fiber optic module/cassette 422 can be slid back from a front 408F of the fiber optic housing 408 to a rear 408R of the fiber optic housing 408 (FIG. 38), until a front side 422F of the fiber optic module/cassette 422 locks into place in one of the notches 415-1 or 415-2 on the rail 412.

The fiber optic module/cassette 422 can be locked into place on the rails 412 by protrusions 401A, 401B provided in a latching system 403A, 403B disposed in the rail guides 421A, 421B, respectively. As illustrated in FIGS. 41A and 41B, the protrusions 401A, 401B are each configured to be secured into notches 415-2 disposed in the rails 412 to lock the fiber optic module/cassette 422 into place. When it is desired to release the fiber optic module/cassette 422 from the rail 412, latches 405A, 405B can be pushed inward toward the fiber optic module/cassette 422 to release the protrusions 401A, 401B from the notches 415-2 to allow the rail guides 421A, 421B of the fiber optic module/cassette 422 to be moved about the rails 412 of the fiber optic housing 408. In one embodiment, the fiber optic module/cassette 422 might be slid onto the rail 412 such that the protrusions 401A, 401B lock into place in the notch 415-1 instead of notches 415-2.

The fiber optic housing 408 illustrated in FIG. 38 thus provides integrated tracks or rails to house large splice modules, with removable panel clips to hold fiber optic panels or smaller fiber optic modules. The integrated tracks or rails allow the fiber optic housing to work with any panel designed for the housing, for example a 4U housing, simply by changing the adapter to match the desired panel. The rails allow larger fiber optic modules to slide in place for maximum use of the available space inside the fiber optic housing. The removable panel clips also allow for multiple mounting locations in the front to back orientation, allowing the user to move the fiber optic panel to a more recessed position when needed for the use of components which may require additional space, including, as one non-limiting example, in-line attenuators or other apparatuses.

Embodiments disclosed below also include door fiber management for fiber optic housings, and related components and methods. In one embodiment, a fiber optic housing is provided. The fiber optic housing comprises an enclosure defining at least one interior chamber configured to support fiber optic equipment. The fiber optic housing also comprises at least one door attached to the enclosure and configured to seal off at least a portion of the at least one interior chamber when the door is closed. The fiber optic housing also comprises at least one fiber management component disposed in the at least one door. The door can be a front door, a rear door, both a front and rear door, or any other door attached or provided as part of the fiber optic housing. The fiber management component can be any type of fiber management device or component, including but not limited to a slack storage device or component, a routing guide, and a fan-out body holder.

Figure 42:
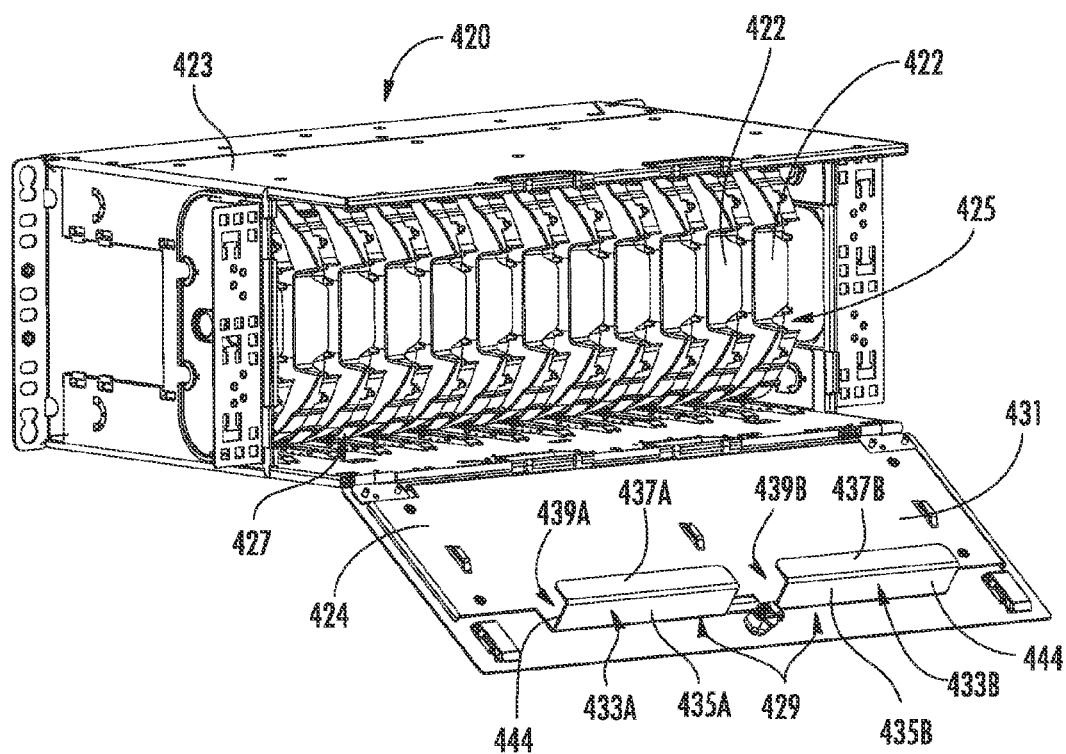
FIG. 42 is a rear view of an exemplary fiber optic housing with the rear door opened that is fully loaded with exemplary fiber optic splice cassettes attached to rails.

In this regard, FIG. 42 is a rear view of a fiber optic housing 420 with a rear door 424 opened that is fully loaded with fiber optic modules/cassettes 422 attached to rails. In one embodiment, the fiber optic modules/cassettes 422 may be fiber optic splice cassettes. The fiber optic housing 420 is fully loaded with fiber optic modules/cassettes 422. In other embodiments, the fiber optic housing 420 may be loaded with fiber optic panels, fiber optic connectors, or fiber optic modules. The fiber optic housing 420 has the rear door 424 that is opened to allow access to the fiber optic modules/cassettes 422. The fiber optic housing 420 in this embodiment defines an enclosure 423 defining an interior chamber 425 configured to support fiber optic equipment 427 disposed therein. The rear door 424 is attached to the enclosure 423 and configured to seal off at least a portion of the interior chamber 425 when the rear door 424 is closed against the enclosure 423.

In fiber optic housings, fiber cable management is commonly done inside the rear on the bottom of the fiber optic housing. Optical fiber slack storage is located on the bottom and top in the back section of the fiber optic housing 420. Sometimes that space becomes very limited, resulting in poor fiber management. In one embodiment as disclosed herein, the rear door 424 may be adapted to be used in fiber optic housings to store slack fiber optic cables and to provide locations for strain relief. In addition, the rear door 424 may also be used to hold fiber transition boxes. Having additional storage on the rear door 424 frees up space on the inside of the fiber optic housing for better access to the fiber optic modules. This is especially true when large splice modules are used, as there is less room for slack storage of optical fibers on the bottom or top, so storage on the rear door provides the storage space that otherwise would have been located in the bottom or the top of the fiber optic housing. When the rear door 424 is opened, the optical fiber bundle is rotated out of the way of the user providing safer access to the rear of the fiber optic modules.

Figure 43A:
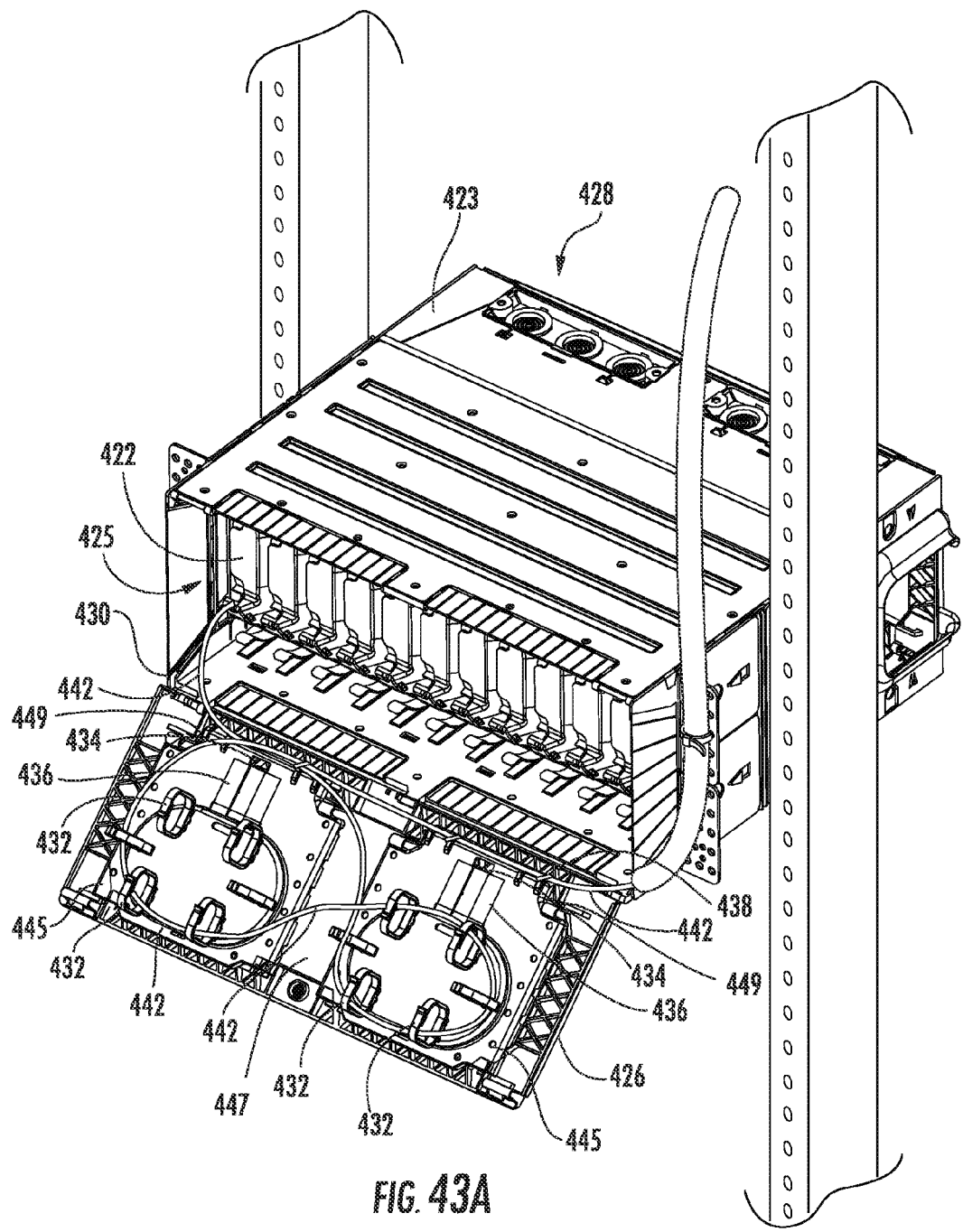
FIG. 43A is a rear perspective view of an exemplary fiber optic housing mounted in an exemplary equipment rack illustrating exemplary fiber slack storage and fiber management on a rear door of the fiber optic housing.
Figure 43B:
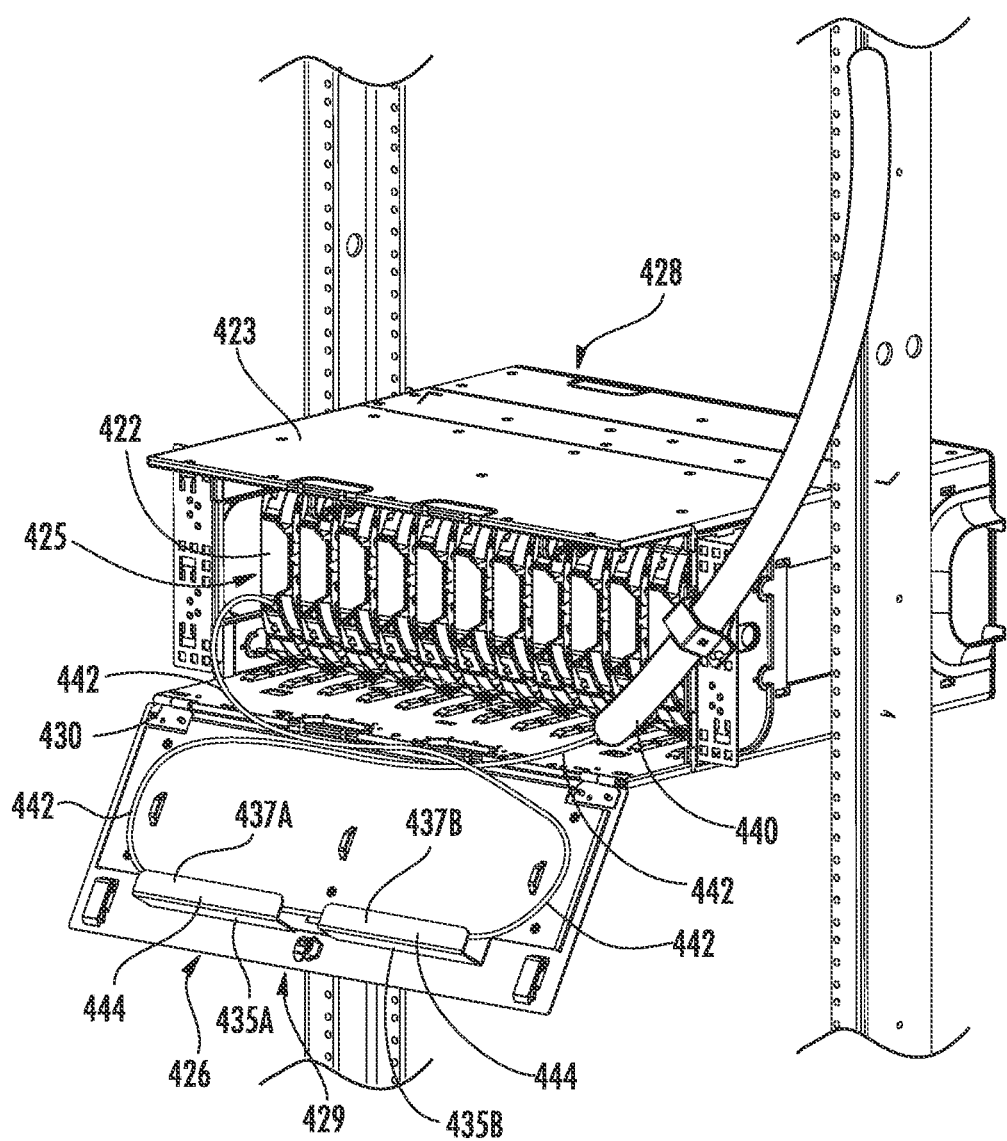
FIG. 43B is a rear perspective view of an exemplary fiber optic housing mounted in an exemplary equipment rack illustrating an alternate exemplary fiber slack storage and management scheme on a rear door of the fiber optic housing having exemplary fiber optic splice cassettes.
Figure 43C:
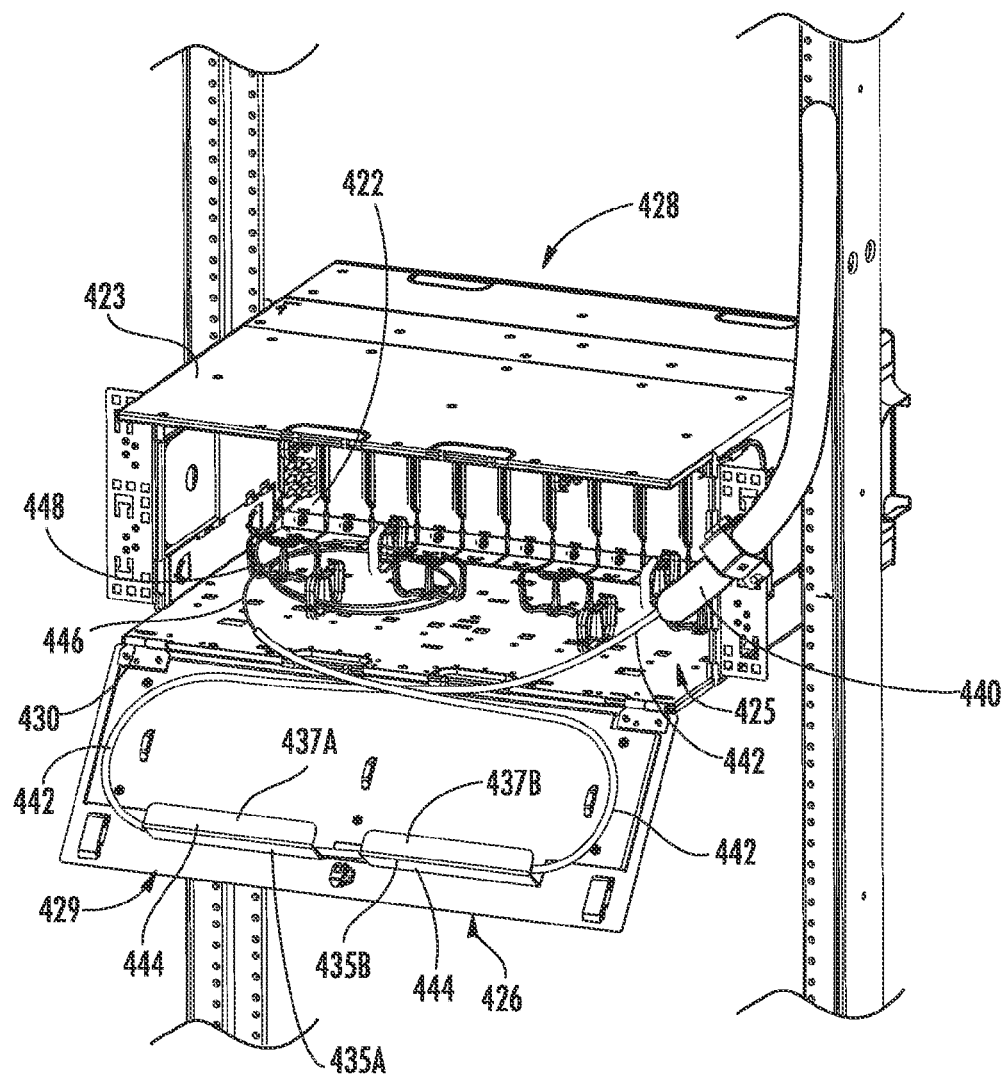
FIG. 43C is a rear perspective view of an exemplary fiber optic housing mounted in an exemplary equipment rack illustrating an alternate exemplary fiber slack storage and management scheme on a rear door of the fiber optic housing having exemplary fiber optic panels.

With continuing reference to FIGS. 42 and 43B-43C, a fiber management component in the form of a slack storage component 429 is disposed in an inside surface 431 of the rear door 424. The slack storage component 429 is designed to store slack of optical fibers 442 connected to the fiber optic equipment 427 disposed in the fiber optic housing 420, as illustrated in FIGS. 43B and 43C. In this embodiment, the slack storage component 429 is comprised of two (2) retainers 444, each comprised of two (2) flanges 433A, 433B. The retainers 444 are disposed in a perimeter of the rear door 424 in this embodiment. The flanges 433A, 443B are each comprised of a first member 435A, 435B disposed in a first plane and attached to the interior surface 431 of the rear door 424, which serves as a base, and a second member 437A, 437B attached to the first member 435A, 435B, in a second plane intersecting with the first plane to form a slack storage area 439A, 439B within the flanges 433A, 433B. Other fiber management components, including routing guides, could also be disposed in or on the rear door 424, including the interior surface 431, or an external surface of the rear door 424. Further, the fiber management components could be disposed on any door of the fiber optic housing 420, including the rear door 424, or a front door, as examples.

FIG. 43A is a rear perspective view of a fiber optic housing 428 mounted in an equipment rack illustrating an exemplary embodiment of fiber management components in the form of fiber slack storage and fiber management on a rear door 426 of the fiber optic housing 428. FIG. 43A illustrates optical fiber slack storage and management on a rear door 426 of the fiber optic housing 428. The rear door 426 may pivot downward about a pivot point 430 between the rear door 426 and the fiber optic housing 428 when the rear door 426 is opened. In one embodiment, the pivot point 430 may be a hinge. The rear door 426 may have a plurality of routing clips 432 disposed thereon. The rear door 426 may also have a plurality of lips 434 disposed thereon in one embodiment. In one embodiment, one or more transition boxes 436 may be attached to the rear door 426 via a respective one of the lips 434. In another embodiment, a flip card (not illustrated) may be attached to the rear door 426 via the lips 434. The rear door 426 may also have one or more strain relief locations 438 located near the pivot point 430 in one embodiment.

An optical fiber or fiber optic cable may be routed to the rear of the fiber optic housing 428. In the embodiment of FIG. 43A, the fiber optic cable is a buffer tube with one or more optical fibers 442 connected to one or more of the fiber optic modules/cassettes 422. The optical fibers 442 may be strain-relieved at the strain relief location 438 near the pivot point 430 of the rear door 426 to minimize fiber movement as the rear door 426 is opened. The optical fibers 442 will be routed near the pivot point 430. The routing clips 432 may hold the optical fibers 442 in a loop greater than the minimum bend radius of the optical fibers 442. When ribbon fiber is used, the transition boxes 436 may be used to fan out the ribbon into individual fibers when connectorized. The rear door 426 also has provisions (the lips 434) to hold these fan-out or transition boxes 436.

The fiber optic housing 428 may be any size. Additionally, the fiber optic housing 428 does not need to be an equipment rack-mounted fiber optic housing. For example, the fiber optic housing 428 may be a wall mount fiber optic housing. The rear door 426 may be made out of metal or plastic.

With continuing reference to FIG. 43A, the fiber management components, including the routing clips 432 are disposed in a pedestal or base 445 attached to an interior surface 447 of the rear door 426. In this manner, the routing clips 432 are disposed above the rear door 426 in a raised manner. The base 445 may include one or more recesses 449 to allow the base 445 to be disposed around and not interfere with any other components in the rear door 426. The base 445 can be removed if additional fiber management components are not needed or desired to be disposed on the rear door 426. The base 445 may be of any shape desired, including but not limited to rectangular and circular or elliptical shaped. The base 445 may be attached using one or more fasteners to the rear door 426. Although not illustrated, the base 445 and the fiber management components disposed therein may also be disposed in the front door.

FIG. 43B is a rear perspective view of the fiber optic housing 428 mounted in an equipment rack illustrating an alternate embodiment of fiber slack storage and management on the rear door 426 of the fiber optic housing 428 having fiber optic splice cassettes. In the embodiment of FIG. 43B, the fiber optic cable being routed to the rear of the fiber optic housing 428 is a buffer tube 440 with one or more optical fibers 442 is connected to one or more of the fiber optic modules/cassettes 422. In the embodiment of FIG. 43B, the optical fibers 442 will be routed near the pivot point 430. The optical fibers 442 are held in a loop greater than the minimum bend radius of the optical fibers 442 in the retainers 444 located at the bottom of the rear door 426.

FIG. 43C is a rear perspective view of the fiber optic housing 428 mounted in an equipment rack illustrating an alternate embodiment of fiber slack storage and management on the rear door 426 of the fiber optic housing 428 having fiber optic panels. In the embodiment of FIG. 43C, the fiber optic cable being routed to the rear of the fiber optic housing 428 is the buffer tube 440 with one or more optical fibers 442. The optical fibers 442 transition to a 900 micron optical fiber 446 which is connected to one or more of the fiber optic modules/cassettes 422. In the embodiment of FIG. 43C, the optical fibers 442 will be routed near the pivot point 430. The optical fibers 442 are held in a loop greater than the minimum bend radius of the optical fibers 442 in the retainers 444 located at the bottom of the rear door 426. In the embodiment of FIG. 43C, the 900 micron optical fiber 446 may also be routed through one or more routing clips 448 in the rear of the fiber optic housing 428.

Embodiments disclosed below also include fiber management sections for fiber optic housings, and related components and methods. In one embodiment, a fiber management device is provided. The fiber management device comprises a base and at least one fiber management component attached to the base and configured to manage one or more optical fibers. At least one opening is disposed in the base and configured to route one or more optical fibers from the base. The fiber management component may be a routing guide configured to route the one or more optical fibers as a non-limiting example.

Figure 44:
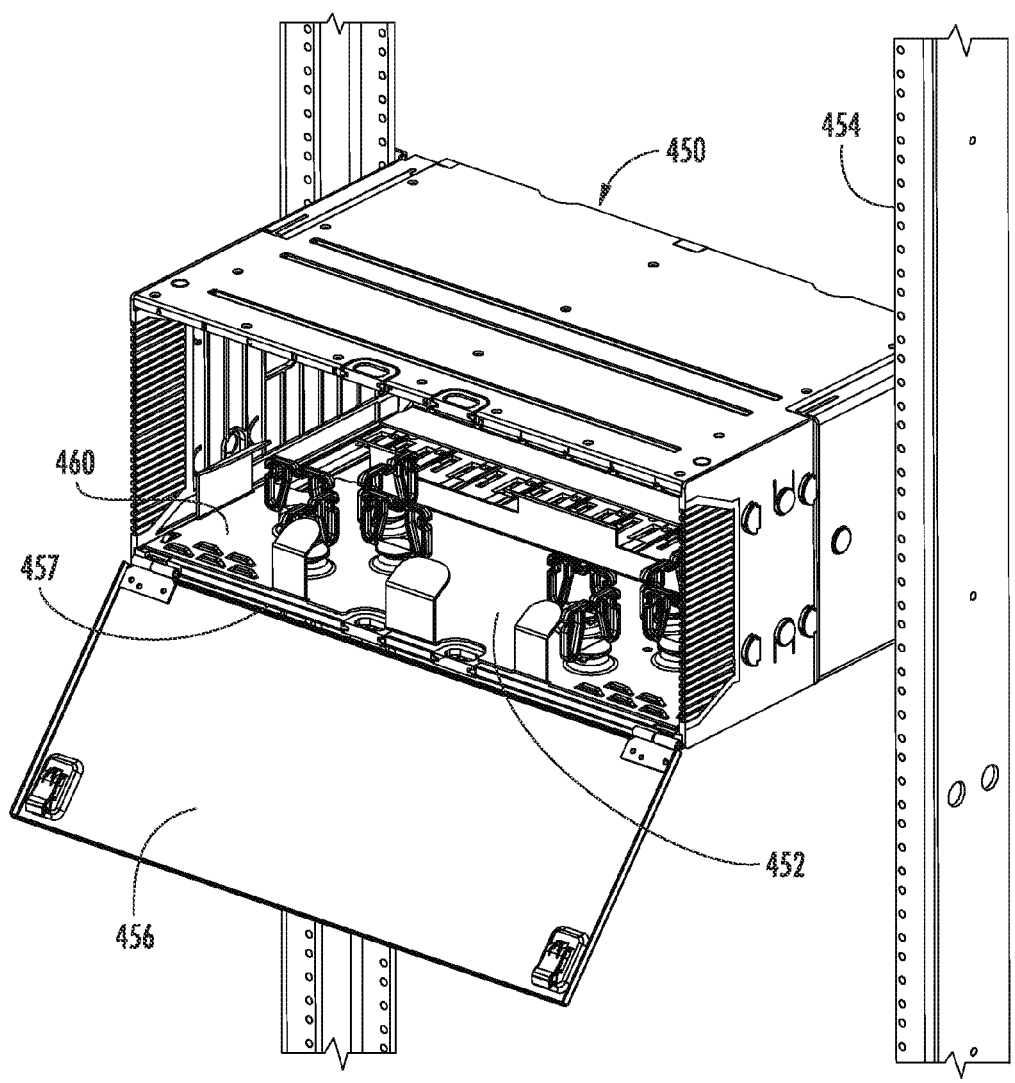
FIG. 44 is a rear perspective view of an exemplary fiber optic housing mounted in an exemplary equipment rack with an exemplary removable fiber management device mounted in the fiber optic housing.

In this regard, FIG. 44 is a rear perspective view of a fiber optic housing 450 mounted in an equipment rack with a fiber management device 452 mounted in the fiber optic housing 450. The fiber optic housing 450 has the fiber management device 452 located in a rear portion of the fiber optic housing 450 that can be removed from the fiber optic housing 450. The fiber management device 452 can be used for fiber slack storage and fiber management in a fiber optic housing for the LAN and data center environment. The fiber management device 452 can store incoming buffer tube or fiber optic cable slack and can also manage 900 micron optical fiber separately from other fiber optic cables or optical fibers.

The fiber management device 452 has the ability to strain-relieve incoming fiber optic cable, store fiber optic cable slack on a base level of the fiber management device 452, and store 900 micron optical fiber on a raised level using routing clips. The fiber management device 452 may also be removable, allowing a technician to install, route, and configure fiber optic cable and slack outside the fiber optic housing 450. In particular, a technician can remove the fiber management device 452 and place it on a work bench or table to freely install, route, and configure the fiber optic cable, as well as provide strain-relief and route the optical fiber per standard practices. After routing, the technician can easily install the fiber management device 452 into the fiber optic housing 450 without the use of tools.

Figure 45:
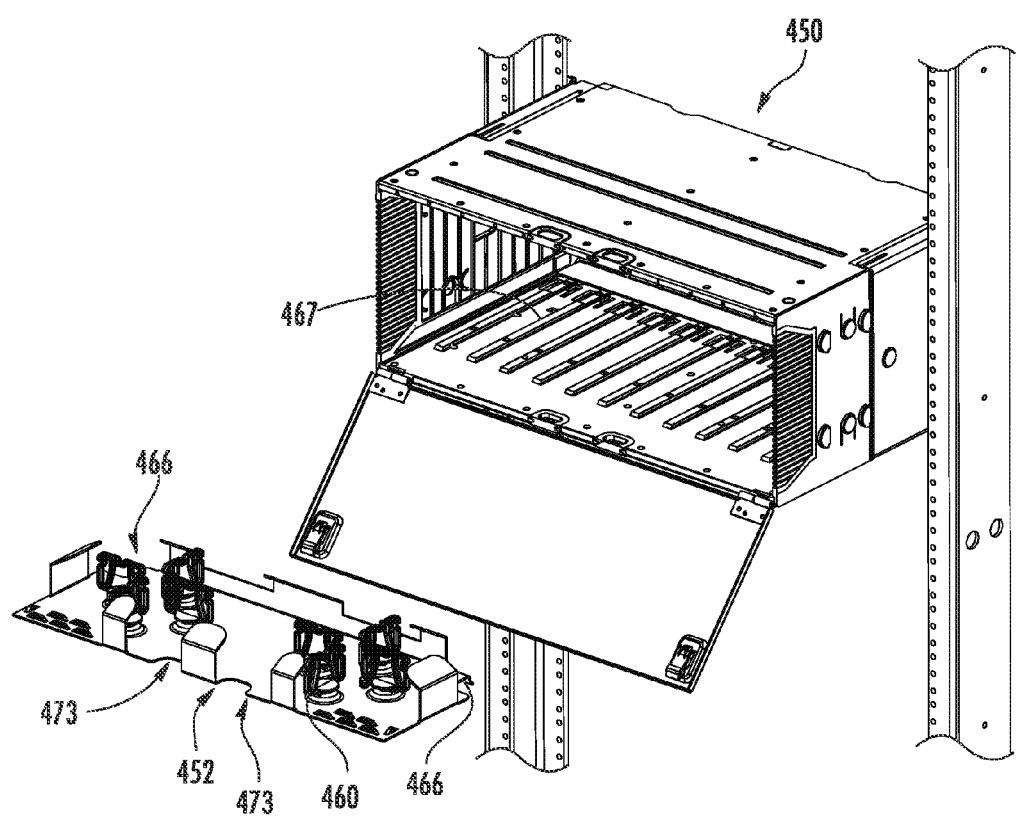
FIG. 45 is a rear perspective view of the fiber optic housing mounted in the equipment rack in FIG. 44 with the removable fiber management device in FIG. 44 removed from the fiber optic housing.

Looking at FIGS. 44 and 45, the fiber optic housing 450 is installed in a typical equipment rack 454 with the rear door 456 down. The fiber management device 452 can be mounted inside a rear door 456 on a bottom panel 457 of the fiber optic housing 450. In this embodiment, the fiber management device 452 includes a base 460 configured to support at least one fiber management component. The base 460 includes at least one attachment device in the form of a mounting clip or tab 466 disposed in the base 460 and configured to be received by at least one receiver 467 disposed in the fiber optic housing 450 to secure the base 460 in the fiber optic housing 450. The tabs 466 could be provided on each side or ends of the base 460, if desired. The base 460 is configured so that the tab 466 can be removed from the receiver 467 to remove the base 460 from the fiber optic housing 450. Alternatively, other fasteners could be used to secure the base 460 inside the fiber optic housing 450. For example, the fastener could be a thumb screw. One or more recesses 473 can also be disposed in the base 460 to provide for the base 460 to not interfere with other components disposed in the fiber optic housing FIG. 45 is a rear perspective view of the fiber optic housing 450 mounted in the equipment rack with the fiber management device 452 of FIG. 44 removed from the fiber optic housing 450.

Figure 46A:
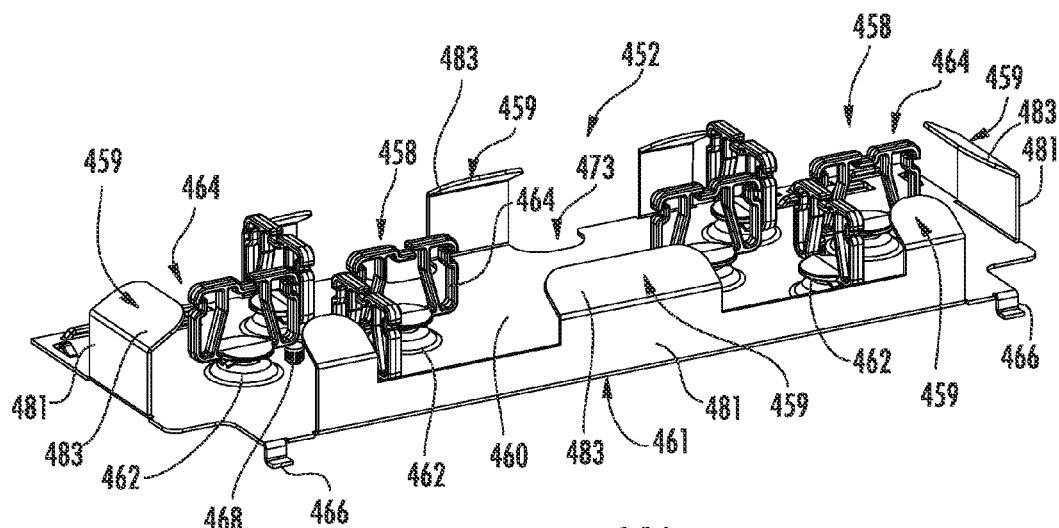
FIG. 46A is a front perspective view of the removable fiber management device in FIG. 44 with exemplary routing clips.
Figure 46B:
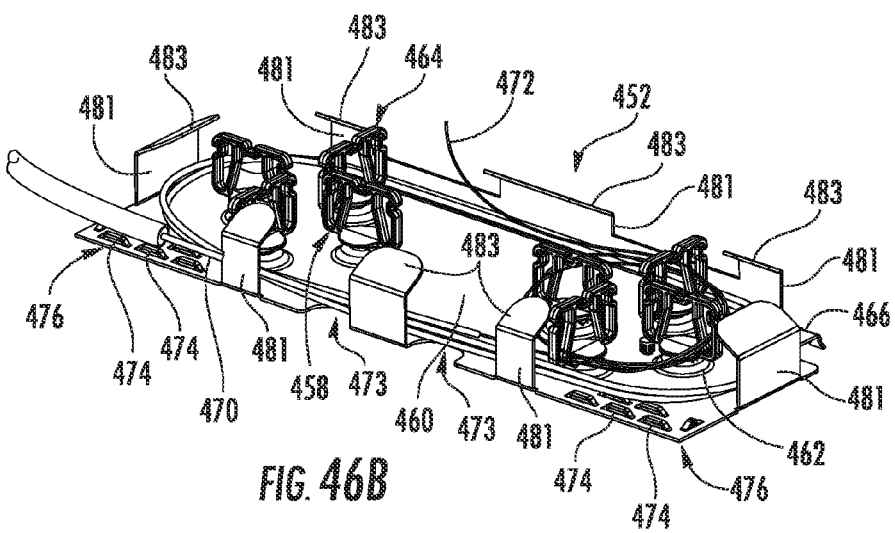
FIG. 46B is a front perspective view of the removable fiber management device in FIG. 46A illustrating an exemplary fiber optic cable routing with an exemplary buffer tube and optical fiber.

FIG. 46A is a front perspective view of the fiber management device 452 of FIG. 45. The fiber management device 452 has a plurality of routing clips 458 disposed on a base 460 of the fiber management device 452. The fiber management device 452 may be a rectangular shape in one embodiment. In one embodiment, the fiber management device 452 also comprises slack storage components in the form of retainers 459 around a perimeter 461 of the fiber management device 452. The retainers 459 are configured to store and/or retain slack storage of optical fibers. The retainers 459 may comprise a first member 481 extending upward from the base 460 and then angled inward to provide a second member 483 to retain the slack optical fiber inside the fiber management device 452. The plurality of routing clips 458 each has a pedestal 462 and a top portion 464 that allows the routing clips 458 to be raised to a level above the base 460 of the fiber management device 452. Pedestals 462 are disposed in the base 460 to support fiber management components above the base 460, in this example, the routing clips 458. The pedestals 462 may allow the routing clips 458 to be rotated about the base 460 if desired, as illustrated in FIGS. 46A and 46B. The fiber management device 452 may also have a plurality of tabs 466 for fastening the fiber management device 452 to the bottom panel 457 of the fiber optic housing 450. The base 460 may also have one or more thumb screws 468 for fastening the fiber management device 452 to the bottom panel 457 of the fiber optic housing 450.

FIG. 46B is a front perspective view of the fiber management device 452 of FIG. 46A illustrating an exemplary fiber optic cable routing with a buffer tube and 900 micron optical fiber. A buffer tube 470 may be routed along the base 460 of the fiber management device 452, while a 900 micron optical fiber 472 may be routed through one or more of the top portions 464 of the routing clips 458 such that the 900 micron optical fiber 472 is routed and stored on a raised level from the base level of the buffer tube 470. In this manner, slack storage, routing, and management is provided for both the buffer tube 470 and the 900 micron optical fiber 472 at the same time using a single device. In one embodiment, the fiber management device 452 may also comprise lances 474 near one or more corners 476 of the fiber management device 452 to provide strain relief for the incoming buffer tube 470.

Figure 46C:
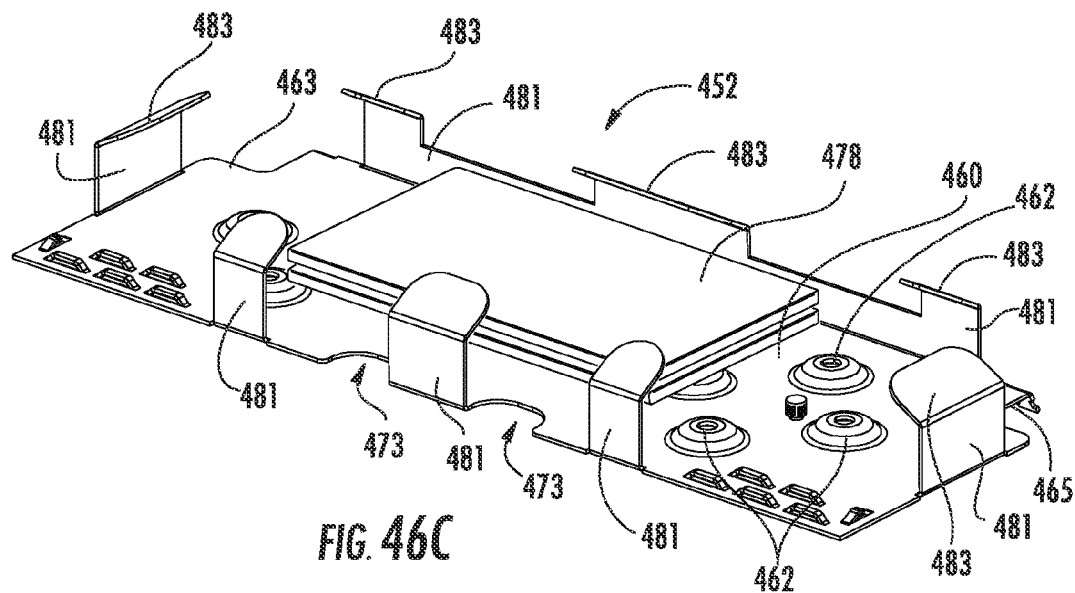
FIG. 46C is a top front perspective view of the removable fiber management device in FIG. 44 with exemplary optical fiber splice trays.
Figure 46D:
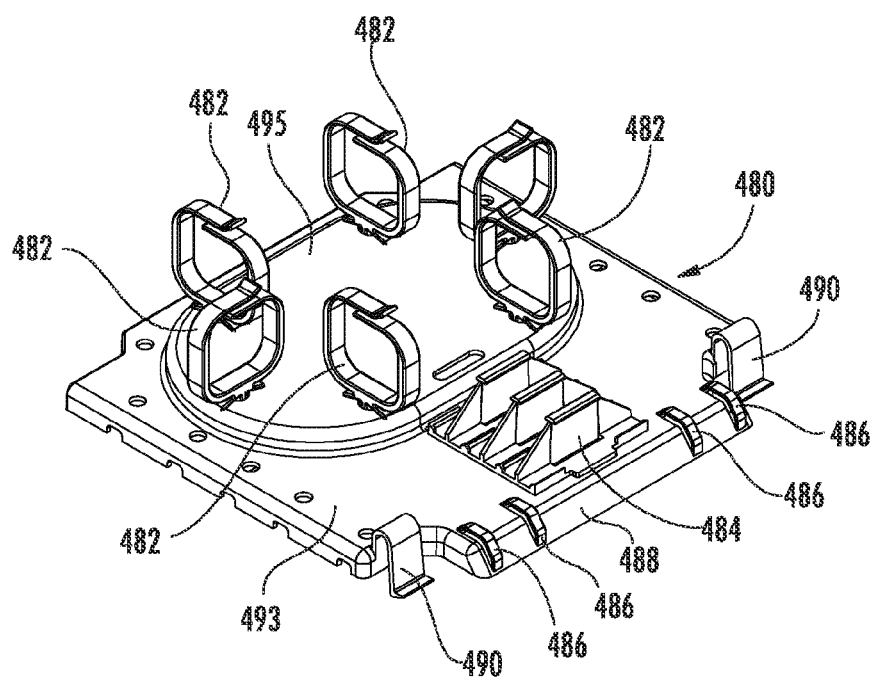
FIG. 46D is a front perspective view of an alternate exemplary removable fiber management device.

FIG. 46C is a top front perspective view of the fiber management device 452 of FIG. 45 with exemplary optical fiber splice trays. The fiber management device 452 in this embodiment is similar to the embodiment of FIG. 46B, except the routing clips 458 have been removed and a optical fiber splice tray 478 has been provided on the base 460 of the fiber management device 452. FIG. 46D is a front perspective view of an alternate fiber management device 480. In this example, the fiber management device 480 also includes a base 493 configured to support one or more fiber management components. The fiber management device 480 can be disposed on any surface of a fiber optic housing, including interior surfaces in the enclosure of a fiber optic housing and/or a door of a fiber optic housing. The fiber management device 480 has a plurality of routing clips 482 for routing and storing a buffer tube as fiber management components for routing optical fibers disposed therethrough. The routing clips 482 may be like routing clips 356 in FIG. 31 and contain the same features, as previously described. Also in this embodiment, the routing clips 482 may be disposed on a common pedestal 495 disposed in the base 493 to raise the routing clips 482 above the base 493 and to provide flexibility in attaching other types of fiber management components that may or may not be compatible to be directly attached to the base 493.

The fiber management device 480 also has a fan-out holder 484 for routing and storing one or more 900 micron optical fibers. The fan-out holder 484 is configured to retain and support fan-out bodies for optical fibers as another example of fiber management. The fiber management device 480 may also have a plurality of lances 486 for providing strain relief. In one embodiment, the lances 486 are positioned on an edge 488 of the fiber management device 480. The fiber management device 480 may also have a plurality of attachment devices in the form of a plurality of integrated mounting clips 490 that are configured to attach the fiber management device 480 to a fiber optic housing or door of a fiber optic housing, as examples of surfaces in which the fiber management device 480 can be attached.

Figure 47:
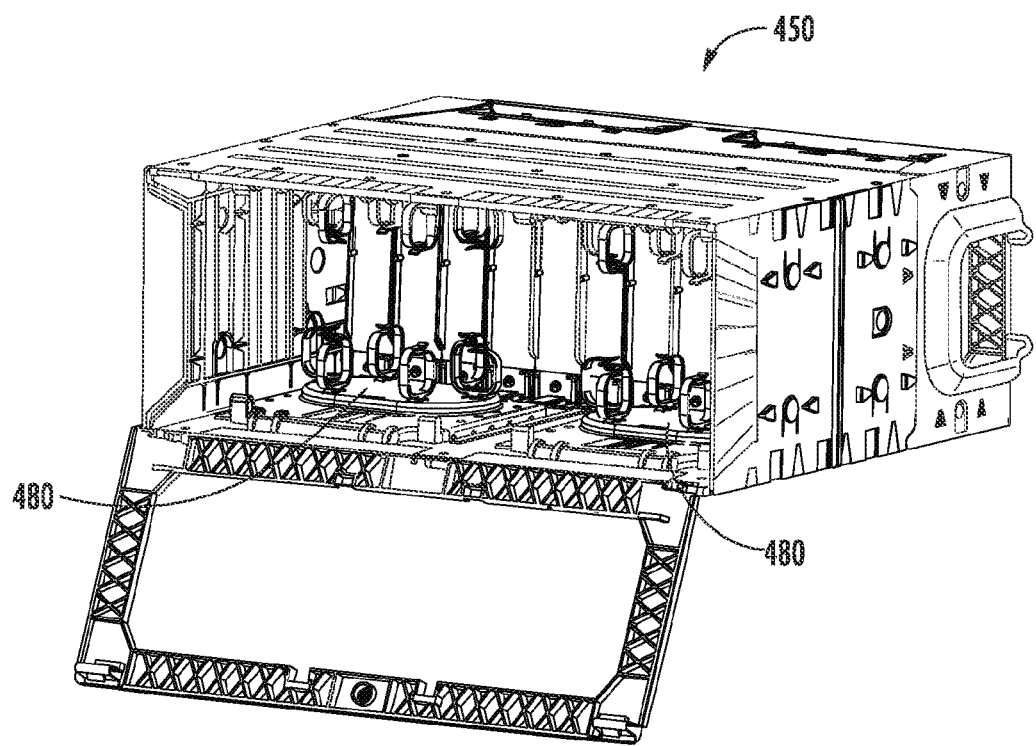
FIG. 47 is a rear perspective view of an exemplary fiber optic housing illustrating optical fiber storage using the removable fiber management devices in FIGS. 44-46D.

The fiber management devices described herein may be made out of metal or plastic. Instead of a single fiber management device, two or more smaller fiber management devices could be used such that fiber management devices are provided in different portions of a fiber optic housing, as illustrated in FIG. 47. FIG. 47 is a rear perspective view of the fiber optic housing illustrating optical fiber storage using two (2) fiber management devices similar to the fiber management devices 480 of FIG. 46D. FIG. 47 illustrates optical fiber management and storage in the rear of the housing on both the top and bottom. The optical fiber management and storage at the top is provided by routing clips and the optical fiber management and storage on the bottom is provided using the fiber management devices 480.

An attachment housing (also known as a caboose, or an expandable caboose) provides additional features and may be used to expand the depth of the fiber optic housing, as illustrated in FIGS. 48-50B. In one embodiment, the attachment housing is designed to be attached to a seven-inch fiber optic housing for use in the LAN and data center environment which may be mountable in the 19-inch or 23-inch equipment racks or cabinets. The attachment housing removably attaches to the side of the fiber optic housing in the strain relief bracket location, without the need for any extra hardware. The attachment housing allows the user to add splicing, more slack storage, and even more strain relief capability. In this way, the attachment housing allows an equipment rack-mounted fiber optic housing to be upgraded in the equipment rack from a connector housing to a splice housing, slack storage housing, or to increase the strain relief capacity of the housing to store plug and play cable assemblies. The attachment housing increases the depth of the fiber optic housing without using any more equipment rack space.

The attachment housing may involve simple tool-less installation to the fiber optic housing the attachment features provided on the fiber optic housing. The attachment housing may use the existing rear door of the fiber optic housing, and may save rack space by only increasing the depth of the fiber optic housing but not the height. Additionally, the attachment housing gives the user more flexibility due to the fact that the attachment housing can be added at any time, even after the fiber optic housing is in service.

In this regard, embodiments disclosed herein also include apparatuses and related components and methods for expanding the capacity of fiber optic housings. In one embodiment, a fiber optic apparatus comprising an attachment housing comprising a side, a top, and a bottom defining an attachment interior chamber configured to support at least a portion of fiber optic equipment is provided. The attachment housing is tool-lessly, and by other than external fasteners, configured to removably attach to a fiber optic housing comprising a housing interior chamber configured to support fiber optic equipment to couple the attachment interior chamber and the housing interior chamber and expand the capacity of the fiber optic housing.

In an embodiment, the attachment housing is removably attached to the fiber optic housing by means of snap attachments integral to at least one of the attachment housing and the fiber optic housing. In another embodiment, one or more optical components mount within the attachment housing. In another embodiment, the optical components may include, without limitation, one or more splitter trays, fiber optic jumper slack storage, and one or more strain relief devices.

In this regard, the term "capacity" is used to refer to any or all of the following non-limiting examples: additional fiber optic housings in a data distribution center; increased internal volume of a fiber optic housing; increased space in an equipment rack for adding additional fiber optic housings; increased space for making additional connections of fiber optic cables or optical fibers to fiber optic equipment; and increased space for supporting additional fiber optic equipment such as fiber optic modules, fiber optic panels, splitter trays, fiber optic jumper storage, and/or strain relief devices. As one non-limiting example, a data distribution center may have space for a certain number of equipment racks, each of which can hold a certain number of fiber optic housings, each of which can hold a certain number of optical components. By adding the attachment housing to the fiber optic housing, additional fiber optic components may be added to the data distribution center without adding additional equipment racks or fiber optic housings. This would be one non-limiting example of expanding "capacity."

Figure 48:
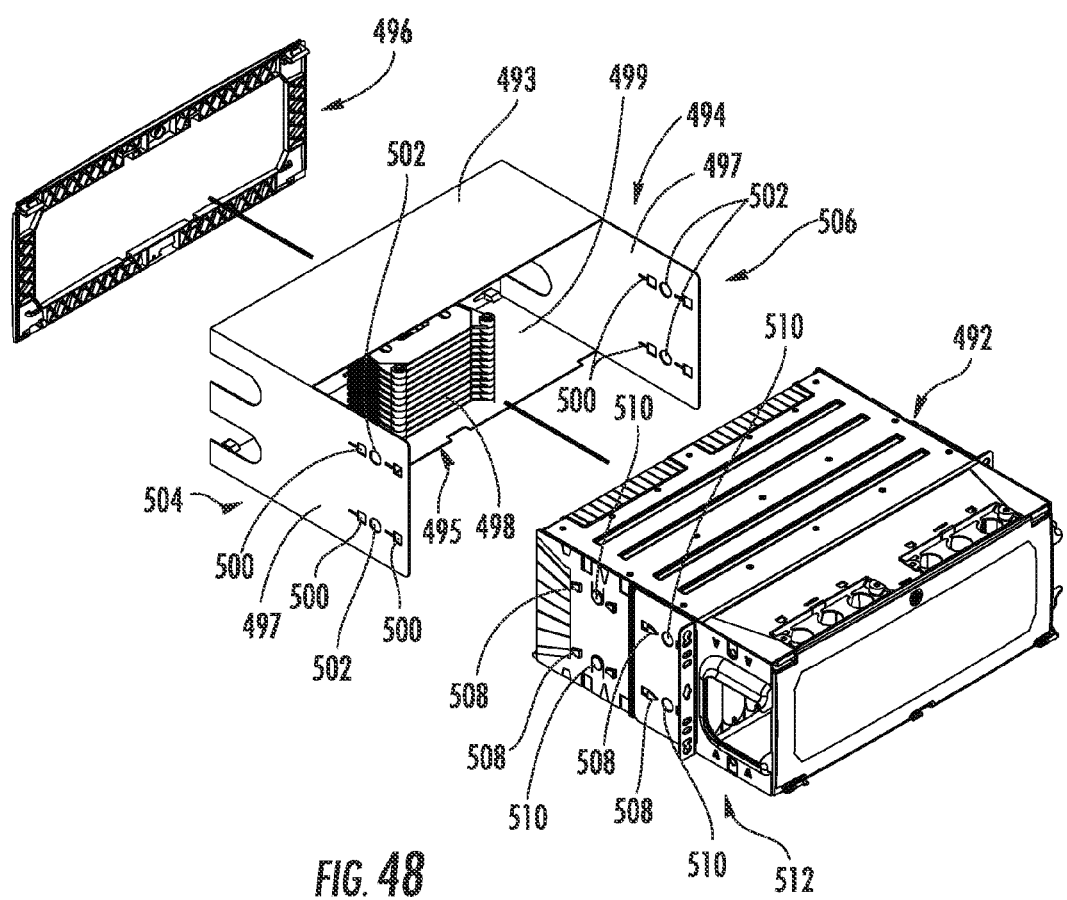
FIG. 48 is a front perspective view of an exemplary fiber optic housing illustrating an expandable attachment housing separated from the fiber optic housing.

In this regard, FIG. 48 is a front perspective view of the fiber optic housing illustrating an expandable attachment housing separated from the fiber optic housing. FIG. 48 illustrates a fiber optic housing 492, an attachment housing 494, and a rear door 496 separated from each other. The attachment housing 494 has a top 493, a bottom 495, and one or more sides 497 which define an attachment interior chamber 499 configured to support fiber optic equipment. The fiber optic housing 492 may be of any type, including but not limited to, any of the fiber optic housings disclosed herein. The fiber optic housing 492 has a housing interior chamber 501 (illustrated in FIGS. 51 and 52) configured to support fiber optic equipment. In one embodiment, the housing interior chamber 501 may be similar to any one or more of the interior chamber 135 in FIG. 15, the interior chamber 161 in FIGS. 16, 17A, and 17B, or the interior chamber 221 in FIGS. 19A, 19B, and 20B. The rear door 496 is removed from the fiber optic housing 492 and the attachment housing 494 is attached to the rear of the fiber optic housing 492. The rear door 496 is then reinstalled on the rear of the attachment housing 494. In FIG. 48, the attachment housing 494 is illustrated with splice trays 498.

In one embodiment, the attachment housing 494 is attached to the fiber optic housing 492 by means of snap attachment features like those disclosed herein. In one embodiment, the attachment housing 494 has a plurality of receivers 500, 502 located on sides 504, 506 of the attachment housing 494. In one embodiment, the receivers 500 may be square shaped and the receivers 502 may be arcuate-shaped, but in other embodiments, the receivers 500, 502 may be any shape, including but not limited to circular, semi-circular, oval, or keyhole-shaped. The fiber optic housing 492 may have a plurality of snap attachments 508, 510 located on a left side 512 of the fiber optic housing 492 (and on a right side as well, though not illustrated in FIG. 48). The snap attachments 508, 510 may be of any shape that corresponds to the shape of the receivers 500, 502. The receivers 500 are configured to receive the snap attachments 508 and the receivers 502 are configured to receive the snap attachments 510 in order to removably attach the attachment housing 494 to the fiber optic housing 492. In one embodiment, one or more of the snap attachments 510 may be in the form of release buttons configured to allow the attachment housing 494 to be easily and quickly removed, or detached, from the fiber optic housing 492.

Figure 49:
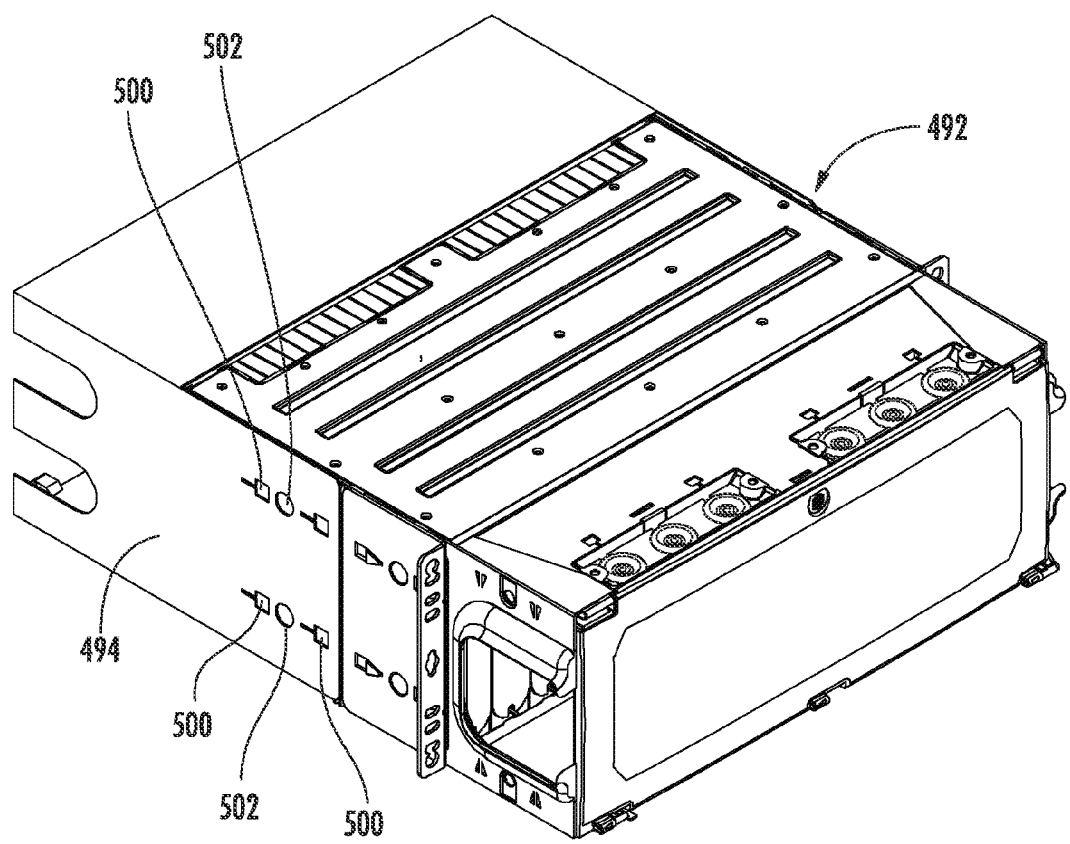
FIG. 49 is a front perspective view of the fiber optic housing in FIG. 48 illustrating the expandable attachment housing in FIG. 48 attached to the fiber optic housing.

FIG. 49 is a front perspective view of the fiber optic housing 492 illustrating the expandable attachment housing 494 assembled to the fiber optic housing 492. FIG. 49 illustrates the attachment housing 494 after it has been attached to the fiber optic housing 492. The attachment housing 494 is removably attached to the fiber optic housing 492 using the snap attachments 508, 510 on the sides of the fiber optic housing 492. Once the attachment housing 494 is removably attached to the fiber optic housing 492, additional capacity for adding fiber optic equipment is provided. In this manner, the fiber optic housing 492 is configured to support at least a portion of fiber optic equipment, and the attachment housing 494 is also configured to support at least a portion of fiber optic equipment.

Figure 50A:
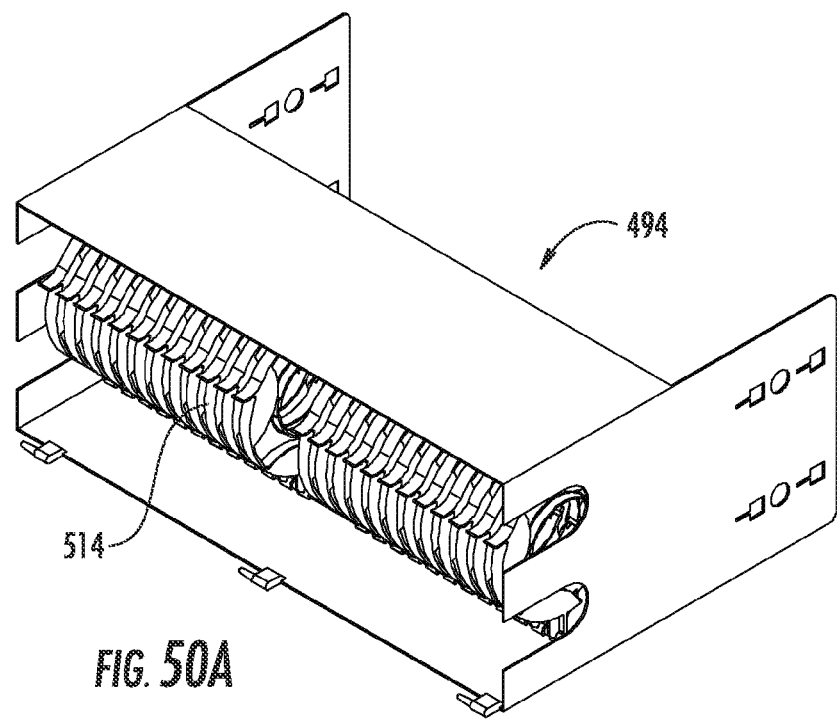
FIG. 50A is a rear, perspective view of the expandable attachment housing in FIGS. 48 and 49 with exemplary jumper slack storage.
Figure 50B:
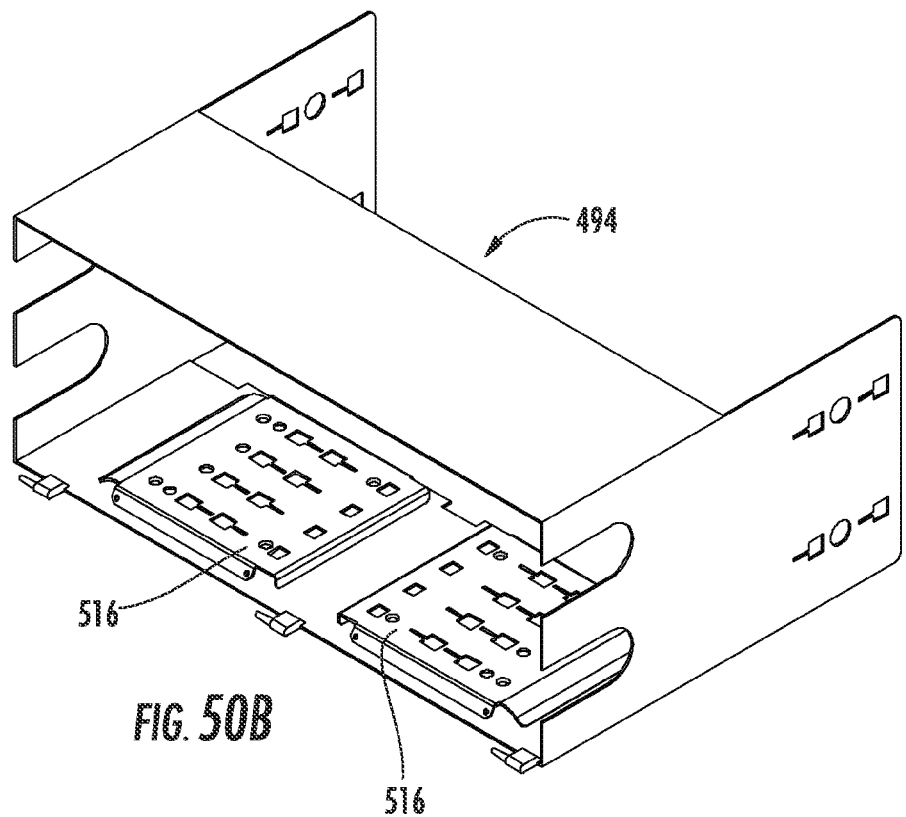
FIG. 50B is a rear, perspective view of the expandable attachment housing in FIGS. 48 and 49 with exemplary strain relief brackets.

FIGS. 50A and 50B show various versions of an attachment housing that can be used as the attachment housing 494 of FIGS. 48 and 49. FIG. 50A is a rear, perspective view of the expandable attachment housing 494 with jumper slack storage 514. FIG. 50B is a rear, perspective view of the expandable attachment housing 494 with internal strain relief brackets 516.

The attachment housings disclosed herein may be removably attached to any size housing. Additionally, the attachment housings may provide for other functions, including, but not limited to, cooling fans and panels to provide additional connection capacity.

Figure 51:
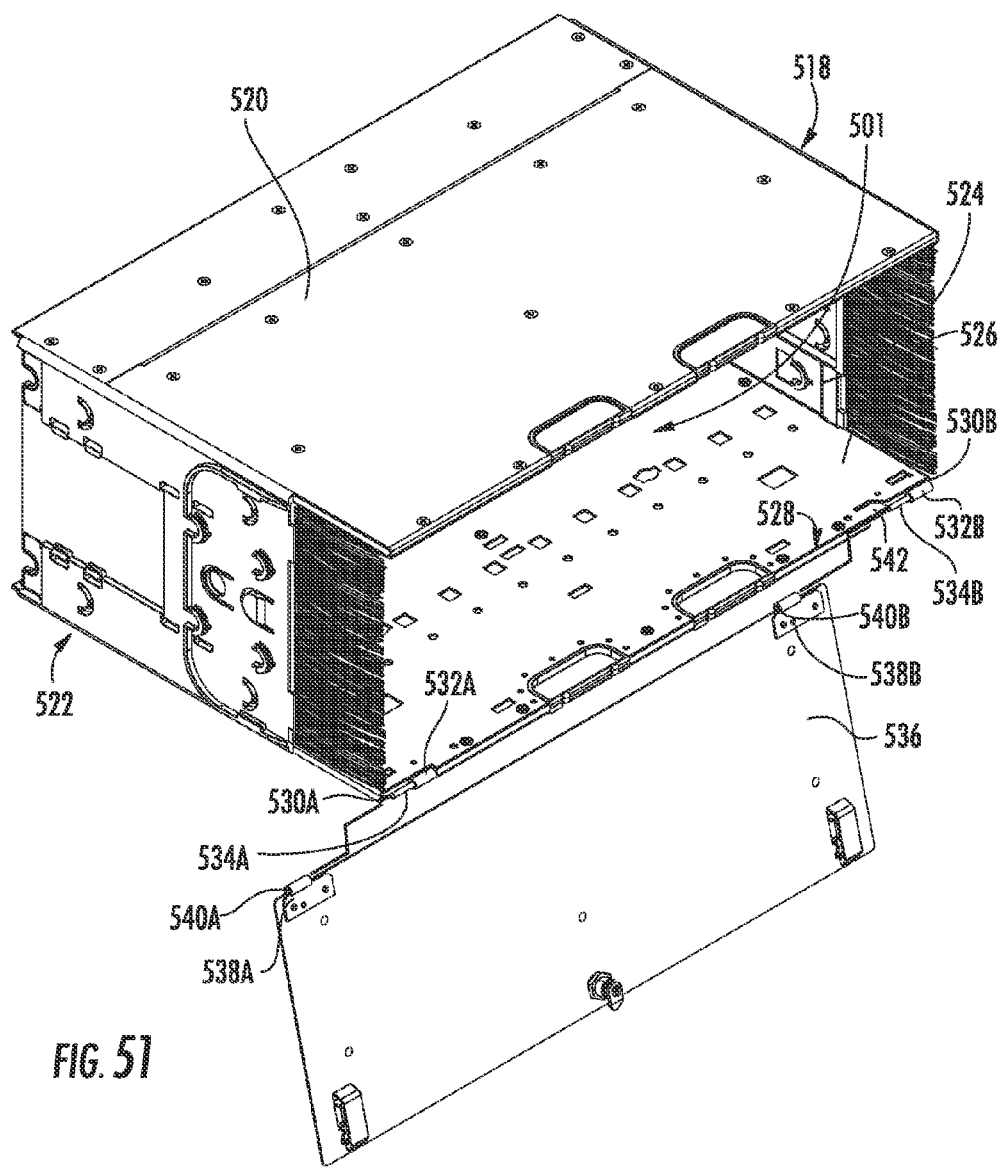
FIG. 51 is a rear view of an exemplary fiber optic housing illustrating how an exemplary door can be easily attached or removed.

FIG. 51 is a rear view of an exemplary fiber optic housing illustrating how a rear door can be easily attached or removed. In one embodiment, a rear door needs to be removed in order to attach an attachment housing to a fiber optic housing, as seen in FIG. 48. FIG. 51 illustrates a fiber optic housing 518 having a top 520, a left side 522, a right side 524, and a bottom 526. The top 520, the left side 522, the right side 524, and the bottom 526 together define the housing interior chamber 501 configured to support at least a portion of fiber optic equipment. The bottom 526 has an edge 528 with corners 530A, 530B. Male hinge portions 532A, 532B are located at or near the corners 530A, 530B, respectively. Rods 534A, 534B extend from the male hinge portions 532A, 532B. A rear door 536 has a pair of female hinge portions 538A, 538B with channels 540A, 540B configured to receive the rods 534A, 534B. A tab 542 is provided on the edge 528 of the bottom 526 of the fiber optic housing 518 near the male hinge portions 532A, 532B.

Figure 52:
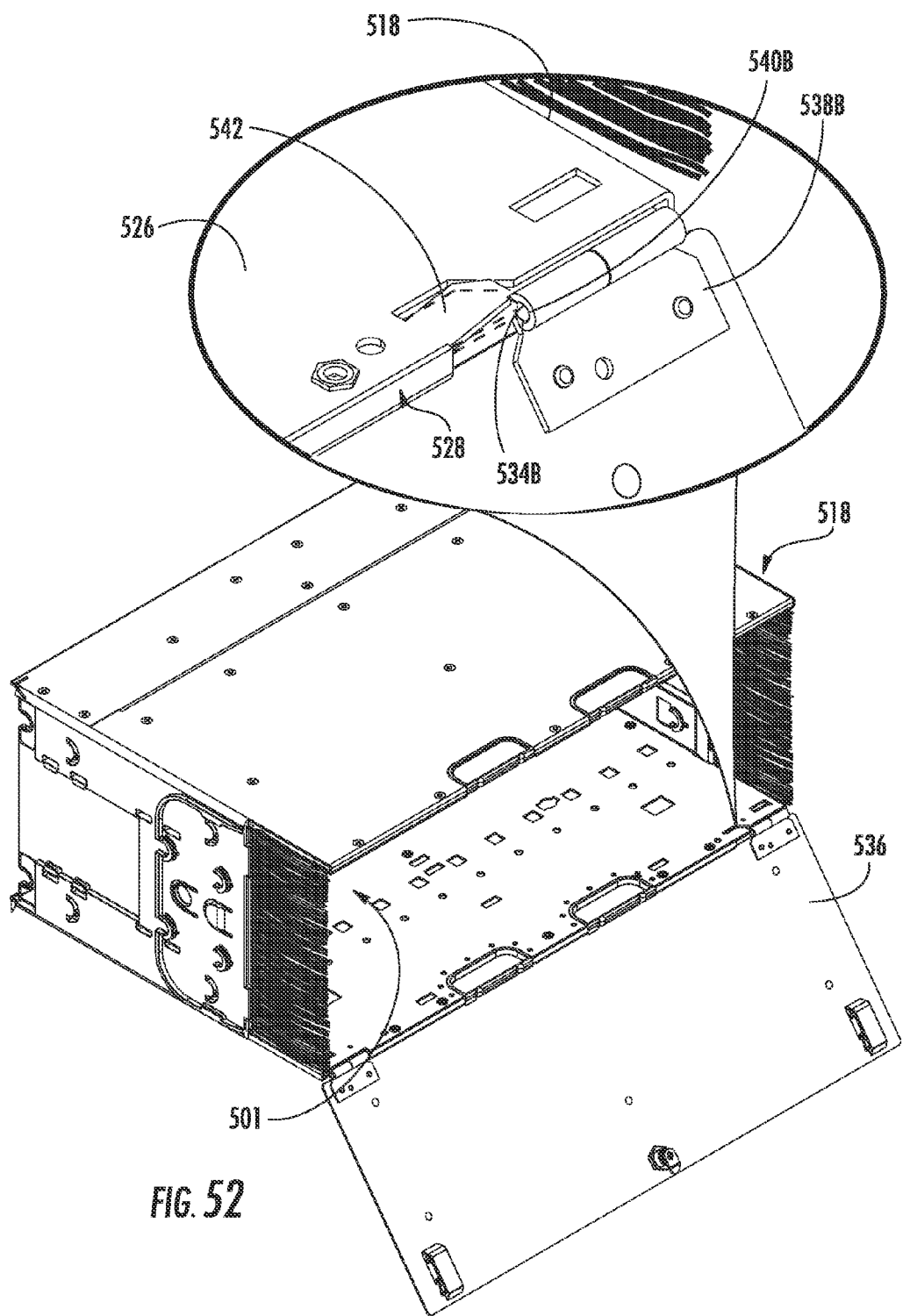
FIG. 52 is a close-up view of how the door in FIG. 51 can be easily attached to or removed from the fiber optic housing.

FIG. 52 is a close-up view of how the rear door 536 of FIG. 51 can be easily attached to or removed from the fiber optic housing 518.

Referring to FIGS. 51 and 52, the tab 542 on the edge 528 of the bottom 526 of the fiber optic housing 518 may be raised up to allow the channel 540B of the female hinge portion 538B to be positioned under the tab 542 so that the channel 540B can be slid onto the rod 534B to attach the rear door 536 to the fiber optic housing 518. If the rear door 536 is attached and it is desired to remove the rear door 536, the tab 542 may be raised in order to allow the rear door 536 to be slid such that the channel 540B is disengaged with the rod 534B, thereby allowing the rear door 536 to be removed.

Once the door is removed, an attachment housing may be attached to the fiber optic housing 518. The attachment housing may also have the tab 542 and the other features illustrated in FIGS. 51 and 52 so that the door is easily attached and removed, or detached, from the attachment housing as well. The features illustrated in FIGS. 51 and 52 also allow a door to be interchangeable for the front and rear of the fiber optic housing. The doors can be removed from the fiber optic housing and attachable to either the front or rear of the fiber optic housing.

As discussed above, the fiber optic housings disclosed herein can provide one or more features and options for fiber optic housings. Some non-limiting and non-exhaustive features disclosed herein include quick snap to rack capability for the fiber optic housing, snap-on mounting brackets, snap-on strain relief brackets, quick fit assembly housing, with no hardware or tools needed, removable top for fiber optic housings, removable front section for low profile rack installation, removable front jumper management device with pass-through grommets, integrated rails to house large splice modules, clips to hold fiber optic panels or smaller fiber optic modules, optical fiber slack storage and management on rear door, rubber entry grommets on all sides, molded in flexible edge protection for the fiber jumpers, and expandable housing additional caboose housing.

As used in this disclosure, the terms "fiber optic module" and "fiber optic cassette" are used interchangeably to refer to either a fiber optic module or a fiber optic cassette, including but not limited to a splice cassette.

Many modifications and other embodiments of the invention set forth herein will come to mind to one skilled in the art to which the invention pertains having the benefit of the teachings presented in the foregoing descriptions and the associated drawings.

Further, as used herein, it is intended that terms "fiber optic cables" and/or "optical fibers" include all types of single mode and multi-mode light waveguides, including one or more optical fibers that may be bare, upcoated, colored, buffered, tight-buffered, loose-tube, ribbonized and/or have other organizing or protective structure in a cable such as one or more tubes, strength members, jackets or the like. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163.

Therefore, it is to be understood that the embodiments are not to be limited to the specific embodiments disclosed and that modifications and other embodiments are intended to be included within the scope of the appended claims. It is intended that the embodiments cover the modifications and variations of this invention provided they come within the scope of the appended claims and their equivalents. Although specific terms are employed herein, they are used in a generic and descriptive sense only and not for purposes of limitation.

What is claimed is:

1. A fiber optic housing, comprising:
   a top, a bottom, a right side, and a left side defining at least one interior chamber configured to support fiber optic equipment,
   wherein each of the top, the bottom, the right side, and the left side is configured to individually, removably and tool-lessly attach to another of the top, the bottom, the right side, and the left side by other than external fastening means.

2. The fiber optic housing of claim 1, wherein the top, the bottom, the right side, and the left side removably attach to each other by at least one snap attachment integral to at least one of the top, the bottom, the right side, and the left side.

3. The fiber optic housing of claim 1, further comprising a side mounting bracket, wherein the side mounting bracket is configured to removably mount the fiber optic housing to an equipment rack tool-lessly, and by other than external fastening means.

4. The fiber optic housing of claim 3, further comprising snap attachments on a side of the fiber optic housing to removably mount the side mounting bracket to the fiber optic housing.

5. The fiber optic housing of claim 1, further comprising a strain relief bracket, wherein the strain relief bracket removably mounts to the fiber optic housing tool-lessly, and by other than external fastening means.

6. The fiber optic housing of claim 5, further comprising snap attachments on a side of the fiber optic housing to removably mount the strain relief bracket to the fiber optic housing.

7. The fiber optic housing of claim 6, wherein the strain relief bracket is configured to allow fiber optic cables to enter the fiber optic housing at any angle.

8. The fiber optic housing of claim 1, further comprising an interchangeable front section, wherein the interchangeable front section removably mounts to the fiber optic housing tool-lessly, and by other than external fastening means.

9. The fiber optic housing of claim 8, further comprising snap attachments on a side of the fiber optic housing to removably mount the interchangeable front section to the fiber optic housing.

10. The fiber optic housing of claim 1, further comprising one or more rubber grommets disposed on at least one of the top, bottom, right side, and left side.

11. The fiber optic housing of claim 1, further comprising an opening on at least one of the top, bottom, right side, and left side, where the opening is configured to allow optical fibers in and out of the fiber optic housing, and wherein a molded flexible edge protection piece is located around a portion of the opening.

12. The fiber optic housing of claim 1, further comprising fiber optic equipment disposed in the at least one interior chamber.

13. The fiber optic housing of claim 12, wherein the fiber optic equipment is comprised of at least one of a fiber optic module and a fiber optic panel.

14. The fiber optic housing of claim 2, wherein at least one snap attachment is located on at least one of the left side and the right side, and the bottom has at least one receiver disposed on at least one side flange of the bottom, the at least one receiver configured to receive the at least one snap attachment.

15. The fiber optic housing of claim 2, wherein the top has at least one receiver disposed on at least one side flange on the top, the at least one receiver configured to receive snap attachments disposed on the left side and the right side.

16. The fiber optic housing of claim 2, wherein at least one of the left side and the right side has a top flange with at least one groove, the at least one groove configured to receive at least one standoff disposed on the top.

17. The fiber optic housing of claim 15, wherein the side flange on the top further comprises a merlon configured to interlock with a crenel disposed on at least one of the left side and the right side.

18. A method of assembling a fiber optic housing, comprising:
individually attaching a top, a bottom, a right side, and a left side to another of the top, the bottom, the right side, and the left side tool-lessly and by other than external fastening means, defining at least one interior chamber configured to support fiber optic equipment.

19. The method of claim 18, further comprising detaching the top, the bottom, the right side, and the left side from each other tool-lessly.

20. The method of claim 18, wherein the attaching further comprises using a snap attachment integral to at least one of the top, the bottom, the right side, and the left side to removably attach the top, the bottom, the right side, and the left side to each other.

21. The method of claim 18, further comprising removably mounting a side mounting bracket to the fiber optic housing, wherein the side mounting bracket is configured to removably mount the fiber optic housing to an equipment rack tool-lessly, and by other than external fastening means.

22. The method of claim 18, further comprising using snap attachments on a side of the fiber optic housing to removably mount a side mounting bracket to the fiber optic housing.

23. The method of claim 18, further comprising removably mounting a strain relief bracket to the fiber optic housing, wherein the strain relief bracket removably mounts to the fiber optic housing tool-lessly, and by other than external fastening means.

24. The method of claim 23, further comprising using snap attachments on a side of the fiber optic housing to removably mount the strain relief bracket to the fiber optic housing.

25. The method of claim 18, further comprising removably mounting an interchangeable front section, wherein the interchangeable front section removably mounts to the fiber optic housing tool-lessly, and by other than by external fastening means.

26. The method of claim 25, further comprising using snap attachments on a side of the fiber optic housing to removably mount the interchangeable front section to the fiber optic housing.

27. The method of claim 18, further comprising disposing fiber optic equipment in the at least one interior chamber of the fiber optic housing.

28. The fiber optic housing of claim 1, wherein each of the top, the bottom, the right side, and the left side is substantially flat panel.

29. The method of claim 18, wherein each of the top, the bottom, the right side, and the left side is substantially flat panel.

* * * * *